US012617639B2

(12) United States Patent
Smith et al.

(10) Patent No.: US 12,617,639 B2
(45) Date of Patent: May 5, 2026

(54) DISPENSING HOPPER AND PRESENTATION SYSTEM FOR OVERHEAD INSTALLATION OF SOLAR PANELS FOR A SOLAR TRACKING SYSTEM

(71) Applicant: Sarcos Corp., Salt Lake City, UT (US)

(72) Inventors: Fraser M. Smith, Salt Lake City, UT (US); Matthew Torok, Cary, NC (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 19/014,057

(22) Filed: Jan. 8, 2025

(65) Prior Publication Data

US 2025/0223121 A1 Jul. 10, 2025

Related U.S. Application Data

(60) Provisional application No. 63/618,806, filed on Jan. 8, 2024.

(51) Int. Cl.
B65H 1/14 (2006.01)
B65H 1/06 (2006.01)
(Continued)

(52) U.S. Cl.
CPC ................. B65H 1/14 (2013.01); B65H 1/06 (2013.01); B65H 3/32 (2013.01); B65H 2801/87 (2013.01); H02S 20/32 (2014.12)

(58) Field of Classification Search
CPC ............... B65H 3/32; B65H 1/06; B65H 1/14
See application file for complete search history.

(56) References Cited

U.S. PATENT DOCUMENTS 3,893,647 A 7/1975 Kennedy
4,611,090 A 9/1986 Catella et al.
(Continued)

FOREIGN PATENT DOCUMENTS

CN 205901664 U 1/2017
CN 109573509 A 4/2019
(Continued)

OTHER PUBLICATIONS

Enphase Energy, Installation and Operations Manual Enphase Micro-Inverter Models M190-72-208 and M190-72-240, https://s3.amazonaws.com/RealGoods/products/documentation/m190usermanual0-42680.pdf, 2009, 27 pages, Petaluma, California.
(Continued)

*Primary Examiner* — Kaitlin S Joerger

(57) ABSTRACT

A robotic solar panel presentation system, as part of a solar panel installation system, for facilitating installation of solar panels into a panel retention system of a panel support assembly, the solar panel presentation system comprising a solar panel dispensing hopper comprising a hopper enclosure operable to receive and support one or more solar panels, and a panel acquisition and placement system comprising at least one moveable installation arm, wherein the panel acquisition and placement system is operable to acquire and manipulate a lead solar panel into an overhead installation position relative to the panel retention system, and to facilitate placement of the lead solar panel into an installed position within the panel retention system. The presentation system can further comprise a control system associated with the solar panel dispensing hopper, and comprising one or more processors and memory operable to control and operate the panel acquisition and placement system.

56 Claims, 58 Drawing Sheets

(51) Int. Cl.
  *B65H 3/32*       (2006.01)
  *H02S 20/32*      (2014.01)

(56)            References Cited

U.S. PATENT DOCUMENTS

|  |  |  |  |
|---|---|---|---|
| 6,325,749 B1 | 12/2001 | Inokuchi et al. | |
| 7,447,605 B2 | 11/2008 | Kuehnrich | |
| 8,522,490 B1 | 9/2013 | Stancel | |
| 8,567,134 B1 | 10/2013 | Grushkowitz et al. | |
| 9,733,646 B1 | 8/2017 | Nusser et al. | |
| 10,696,451 B2 * | 6/2020 | Britcher | H02S 20/10 |
| 10,801,755 B1 | 10/2020 | Nemat et al. | |
| 11,331,799 B1 | 5/2022 | Shafer | |
| 11,502,638 B2 | 11/2022 | Watson et al. | |
| 11,979,107 B2 | 5/2024 | Watson et al. | |
| 2007/0102038 A1 | 5/2007 | Kirschning | |
| 2008/0149170 A1 | 6/2008 | Hanoka | |
| 2009/0320389 A1 | 12/2009 | White | |
| 2010/0096073 A1 | 4/2010 | Adriani et al. | |
| 2011/0000544 A1 | 1/2011 | West | |
| 2011/0005581 A1 | 1/2011 | Kanbara et al. | |
| 2011/0073733 A1 | 3/2011 | Hartelius et al. | |
| 2011/0162639 A1 | 7/2011 | Jeandeaud | |
| 2011/0303262 A1 | 12/2011 | Wolter | |
| 2012/0027550 A1 | 2/2012 | Bellacicco et al. | |
| 2012/0048345 A1 | 3/2012 | Wood et al. | |
| 2012/0142221 A1 | 6/2012 | Naskali | |
| 2013/0019925 A1 | 1/2013 | Britcher et al. | |
| 2015/0093190 A1 | 4/2015 | Header | |
| 2015/0200621 A1 | 7/2015 | Reed et al. | |
| 2016/0190976 A1 | 6/2016 | Corio et al. | |
| 2016/0344330 A1 | 11/2016 | Gillis | |
| 2017/0229998 A1 | 8/2017 | Molina et al. | |
| 2017/0250648 A1 | 8/2017 | Haas et al. | |
| 2017/0359017 A1 | 12/2017 | Corio | |
| 2018/0072168 A1 | 3/2018 | Heinen et al. | |
| 2019/0074792 A1 | 3/2019 | Hakenberg | |
| 2019/0341878 A1 | 11/2019 | Watson et al. | |
| 2020/0274480 A1 | 8/2020 | Lutian | |
| 2020/0331737 A1 | 10/2020 | Reischauer et al. | |
| 2020/0350850 A1 | 11/2020 | Di Stefano et al. | |
| 2021/0180832 A1 | 6/2021 | Schuknecht et al. | |
| 2021/0189747 A1 | 6/2021 | Pearson, Jr. | |
| 2021/0205995 A1 | 7/2021 | Vu et al. | |
| 2021/0206003 A1 | 7/2021 | Zhou et al. | |
| 2021/0379757 A1 | 12/2021 | Schneider et al. | |
| 2021/0395011 A1 | 12/2021 | Crawford, Jr. et al. | |
| 2022/0035379 A1 | 2/2022 | Xu et al. | |
| 2022/0049805 A1 | 2/2022 | Hinton | |
| 2022/0069770 A1 * | 3/2022 | Shelton | H02S 99/00 |
| 2022/0103122 A1 | 3/2022 | Carter | |
| 2022/0193927 A1 | 6/2022 | Mazzetti, Jr. et al. | |
| 2022/0271707 A1 | 8/2022 | Reynolds et al. | |
| 2022/0345076 A1 | 10/2022 | Nickerson | |
| 2022/0411245 A1 * | 12/2022 | Bailey | B66F 9/087 |
| 2023/0066547 A1 | 3/2023 | Campbell et al. | |
| 2023/0188086 A1 | 6/2023 | Garza et al. | |
| 2023/0246589 A1 | 8/2023 | Morankar et al. | |
| 2023/0361715 A1 | 11/2023 | Mouniandy et al. | |
| 2024/0001836 A1 | 1/2024 | Di Stefano et al. | |
| 2024/0030863 A1 * | 1/2024 | Brulo | F24S 80/00 |
| 2024/0051152 A1 | 2/2024 | Tadepalli et al. | |
| 2024/0083699 A1 | 3/2024 | Davis et al. | |
| 2024/0190009 A1 | 6/2024 | Asmari et al. | |
| 2024/0228195 A1 | 7/2024 | Smith | |
| 2024/0235460 A1 | 7/2024 | Smith | |
| 2024/0235467 A1 | 7/2024 | Conti et al. | |
| 2024/0235470 A1 | 7/2024 | Smith | |
| 2024/0258958 A1 | 8/2024 | Watson et al. | |
| 2024/0367319 A1 * | 11/2024 | Smith | B25J 5/005 |
| 2024/0424969 A1 | 12/2024 | Hansel et al. | |
| 2024/0424971 A1 | 12/2024 | Hansel et al. | |
| 2025/0164154 A1 | 5/2025 | Morin et al. | |
| 2025/0223118 A1 * | 7/2025 | Smith | B65G 61/00 |
| 2025/0226791 A1 * | 7/2025 | Smith | H02S 30/00 |
| 2025/0226792 A1 * | 7/2025 | Smith | F16B 5/0685 |

FOREIGN PATENT DOCUMENTS

| | | |
|---|---|---|
| CN | 110402683 A | 11/2019 |
| CN | 211700658 U | 10/2020 |
| CN | 111342751 B | 7/2021 |
| DE | 102012105726 A1 | 1/2014 |
| JP | 2020-070584 A | 5/2020 |
| WO | WO 2019/136505 A1 | 7/2019 |
| WO | WO 2021/119559 A1 | 6/2021 |
| WO | WO 2021/229387 A2 | 11/2021 |
| WO | WO 2021/252427 A1 | 12/2021 |

OTHER PUBLICATIONS

SOS Engineering Inc, 11 Advantages of Spring Loaded Contacts, https://www.soseng.com/11-advantages-of-spring-loaded-contacts, 2019, 5 pages.

* cited by examiner

Sensor(s)

*Direction of Successive Panel Installation*

214

242

244

252A

252B

N

C
B

A

248A

248B

244'

288'

287' 281' 302

A3

Sensor(s)

293'

284'

304

306

Fluid Actuator

Fluid Actuator

Fluid Actuator

Fluid Actuator

Fluid Actuator

Fluid
Supply/
Return

Fluid
Control
System

216

213/
214

514

518

Multi-DOF
Platform Control
System

561

246

510

530C 534B 530D 510

518

246

Y1

522A 522C

L2

L1

526A W2 526B

W1

X1

522B 522D

514

530A 534A 530B

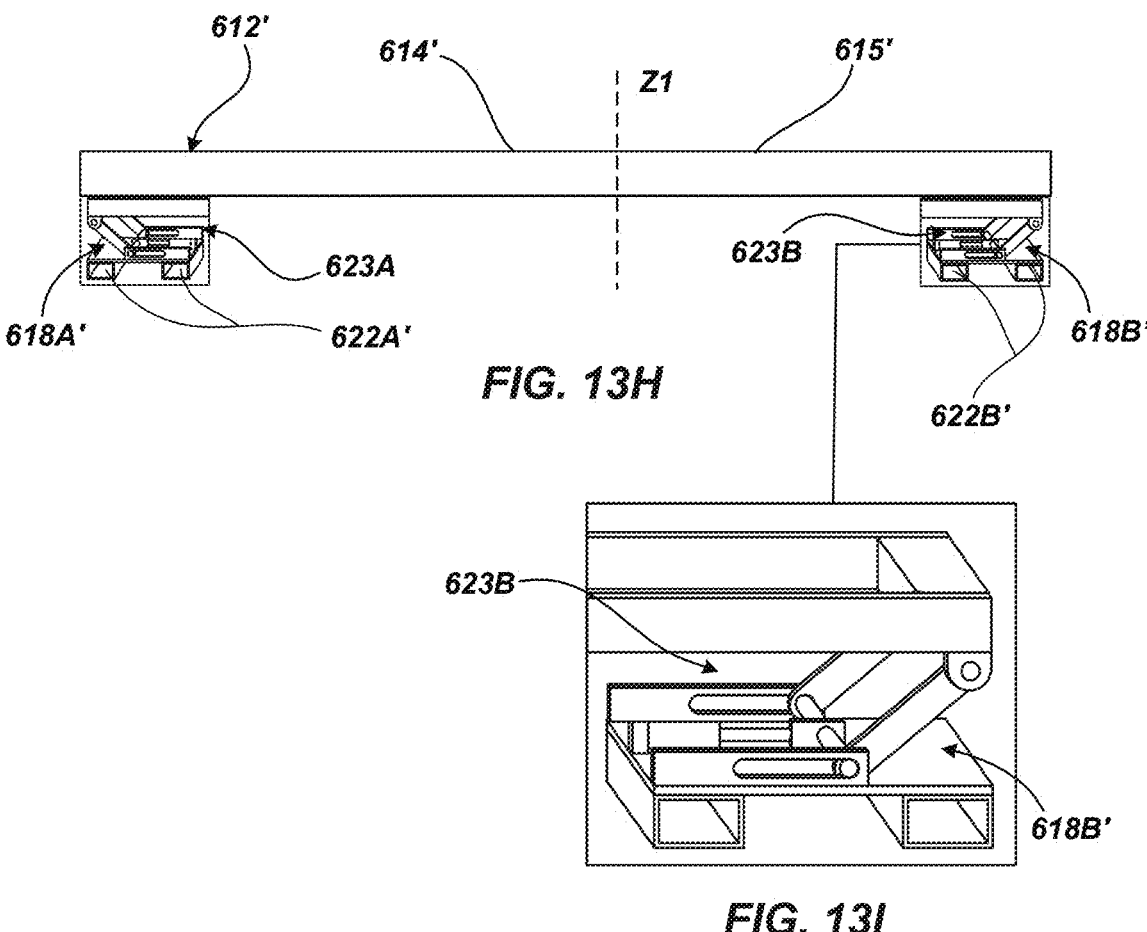
*FIG. 13H*
*FIG. 13I*
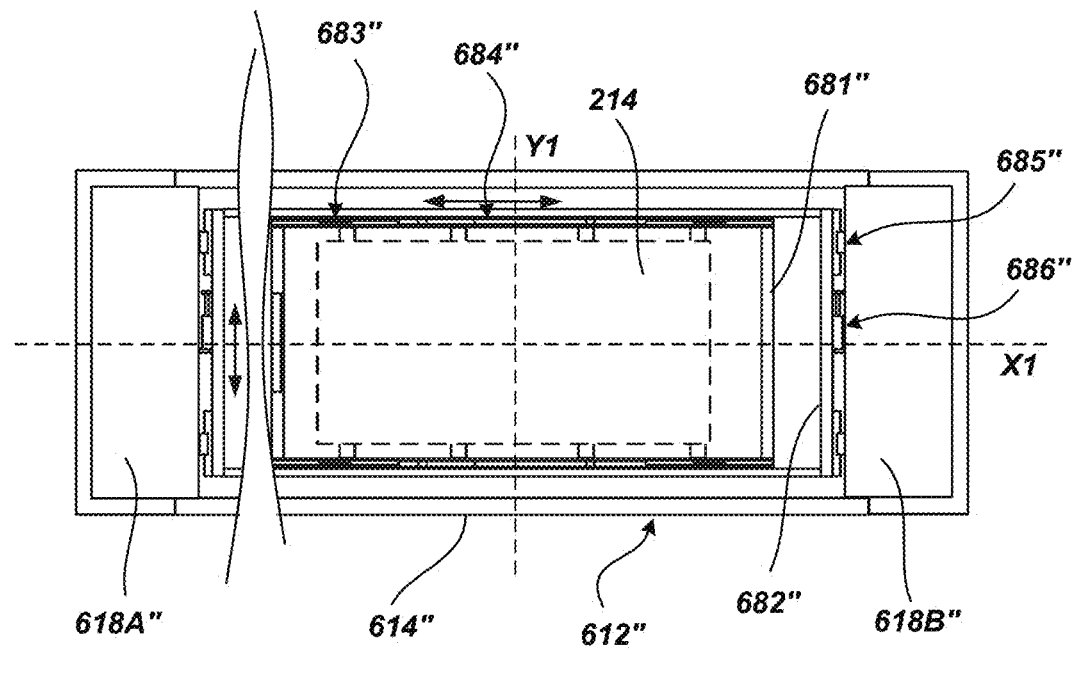
*FIG. 13J*

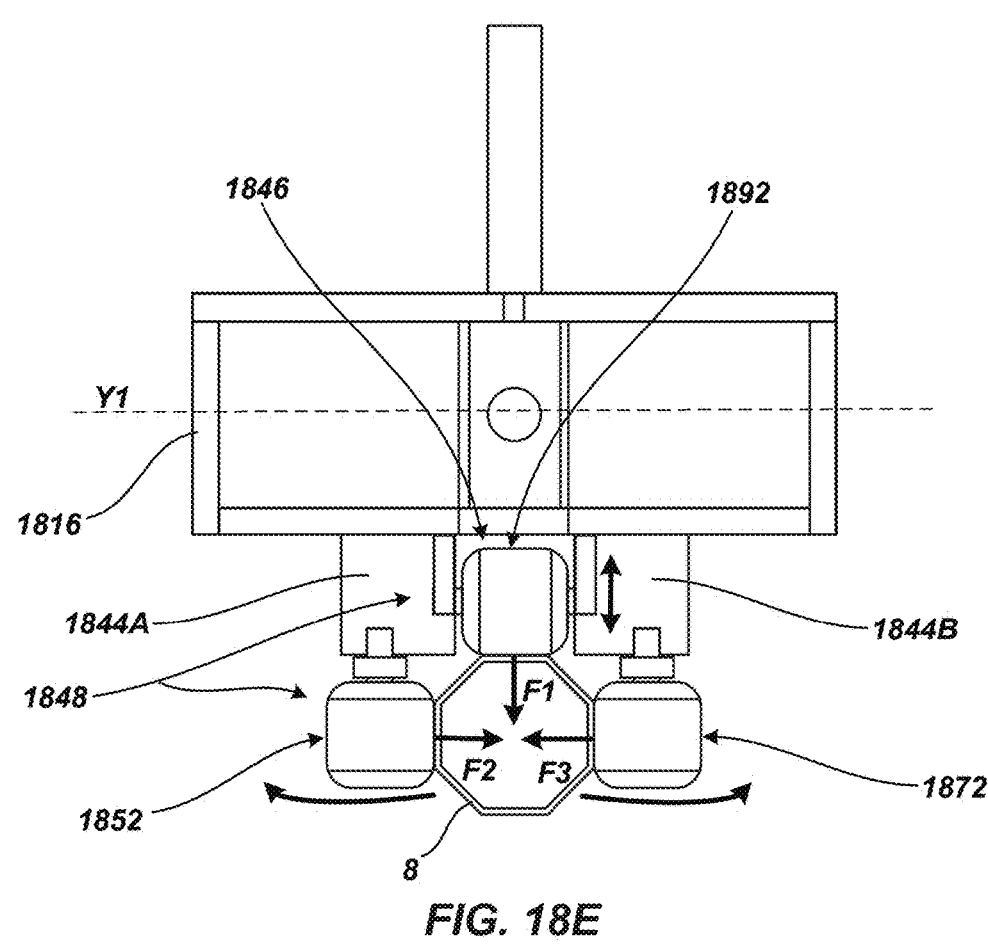
FIG. 18E
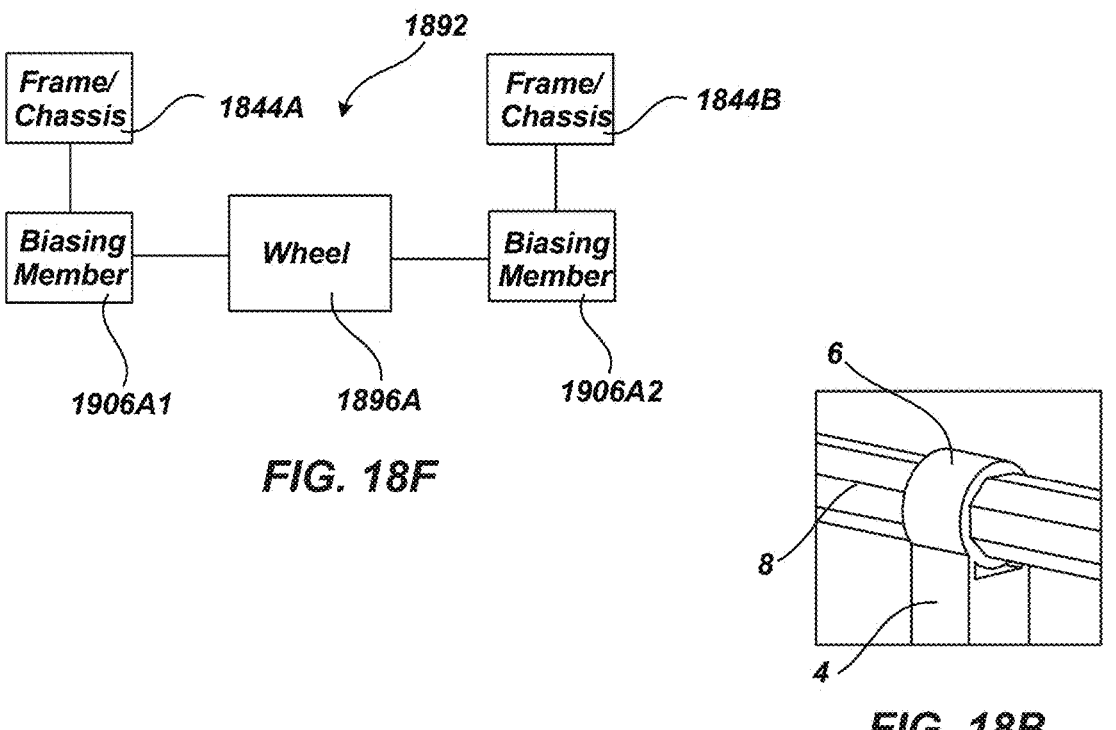
FIG. 18F
FIG. 18B

DISPENSING HOPPER AND PRESENTATION SYSTEM FOR OVERHEAD INSTALLATION OF SOLAR PANELS FOR A SOLAR TRACKING SYSTEM

RELATED APPLICATIONS

This application claims the benefit of U.S. Provisional Application Ser. No. 63/618,806, filed Jan. 8, 2024, and entitled, "Dispensing Hopper and Presentation System for Overhead Installation of Solar Panels for A Solar Tracking System" which is incorporated by reference in its entirety herein.

This application is also related to U.S. application Ser. No. 19/013,839, filed Jan. 8, 2025, and entitled, "Solar Panel Mounting Systems and Methods"; U.S. application Ser. No. 19/014,038, filed Jan. 8, 2025, and entitled, "Torque Tube Clamps for Automated Solar Panel Installation"; U.S. application Ser. No. 19/014,062, filed Jan. 8, 2025, and entitled, "Solar Panel Installation Alignment Systems"; U.S. application Ser. No. 19/014,152, filed Jan. 8, 2025, and entitled, "Solar Panel Installation Vehicles as Part of a Solar Panel Installation System for A Solar Tracking System"; and U.S. application Ser. No. 19/014,045, filed Jan. 8, 2025, and entitled, "Support Clamp Installation Vehicles as Part of a Solar Panel Installation System for A Solar Tracking System", each of which is incorporated by reference in its entirety herein.

BACKGROUND

In recent years, electricity generation through the use of solar panels has become much more common and widespread. Solar panels and solar panel arrays are commonly installed in both commercial and residential settings. Furthermore, large-scale or utility-scale solar systems consisting of a large number of solar panel arrays are being deployed on large areas of land at increasing rates across the globe. One type of common system comprising one or more solar panel arrays is known as a solar tracking system. A solar tracking system comprises one or more rows of solar panels mounted or otherwise operable with a torque tube (also referred to as a drive shaft) that is driven by one or more motors. The solar tracking system facilitates dynamic, changing orientation or positioning of an installed solar panel array payload relative to the sun so as to optimize the solar energy collected by the various individual solar panels (namely to maximize the proportion of energy derived from direct radiation onto the panels) within the solar panel array. This is accomplished by driving the torque tube so as to rotate the solar panel array(s) at a rate that tracks the movement of the Sun as it traverses across the sky within its path as the Earth orbits around the Sun. One example of a solar tracking system is a single-axis horizontal tracker having a long horizontal torque tube that is supported on bearings mounted upon support pylons or frames. The axis of the torque tube is oriented so as to be on a north-south line. Individual solar panels are mounted on the torque tube using a clamp or other mounting bracket, and the torque tube is caused to rotate about its longitudinal axis at a rate so as to track the apparent motion of the Sun throughout the day.

With solar panel arrays and solar panel installation becoming more common, quicker and more efficient ways of installing solar panels within their supporting systems are being developed in order to increase rates and decrease costs. However, despite various advancements in systems, mounts, and supports for facilitating installation of solar panels, current installation methods continue to be associated with significant manual labor requirements in order to install individual solar panels within or onto a mount to achieve an installed and operating solar panel array. This is true with solar tracking systems as well as other types of solar panel arrays, such as those supported by a non-tracking fixed-mount type of system. For example, with a solar tracking system, workers are often required to install each individual solar panel within the solar panel array by hand by mounting the individual solar panel to its mounting bracket. This is often done using a power tool and suitable fasteners. The manual efforts involved to complete installation can mean tedious, slow work for the workers, as well as significant costs. This is particularly true when large or utility-scale solar panel arrays are being installed. Moreover, installations are typically carried out in the day time so workers can see, thus eliminating a significant number of hours of the day where installation efforts could be taking place, and delaying time to completion. If installation is carried out at night, large lights are required to be deployed, which further increases costs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 13A-13J illustrate various views of a solar panel installation system in accordance with an example of the present disclosure, the solar panel installation system comprising a bridging support member in support of the solar panel dispensing hopper of FIGS. 3 and 5A-5D and the solar panel presentation system of FIG. 4.

FIGS. 18A-18K illustrate various views of a solar panel installation system comprising a support clamp (e.g., a torque tube clamp) installation vehicle in accordance with an example of the present disclosure.

Figure 1:
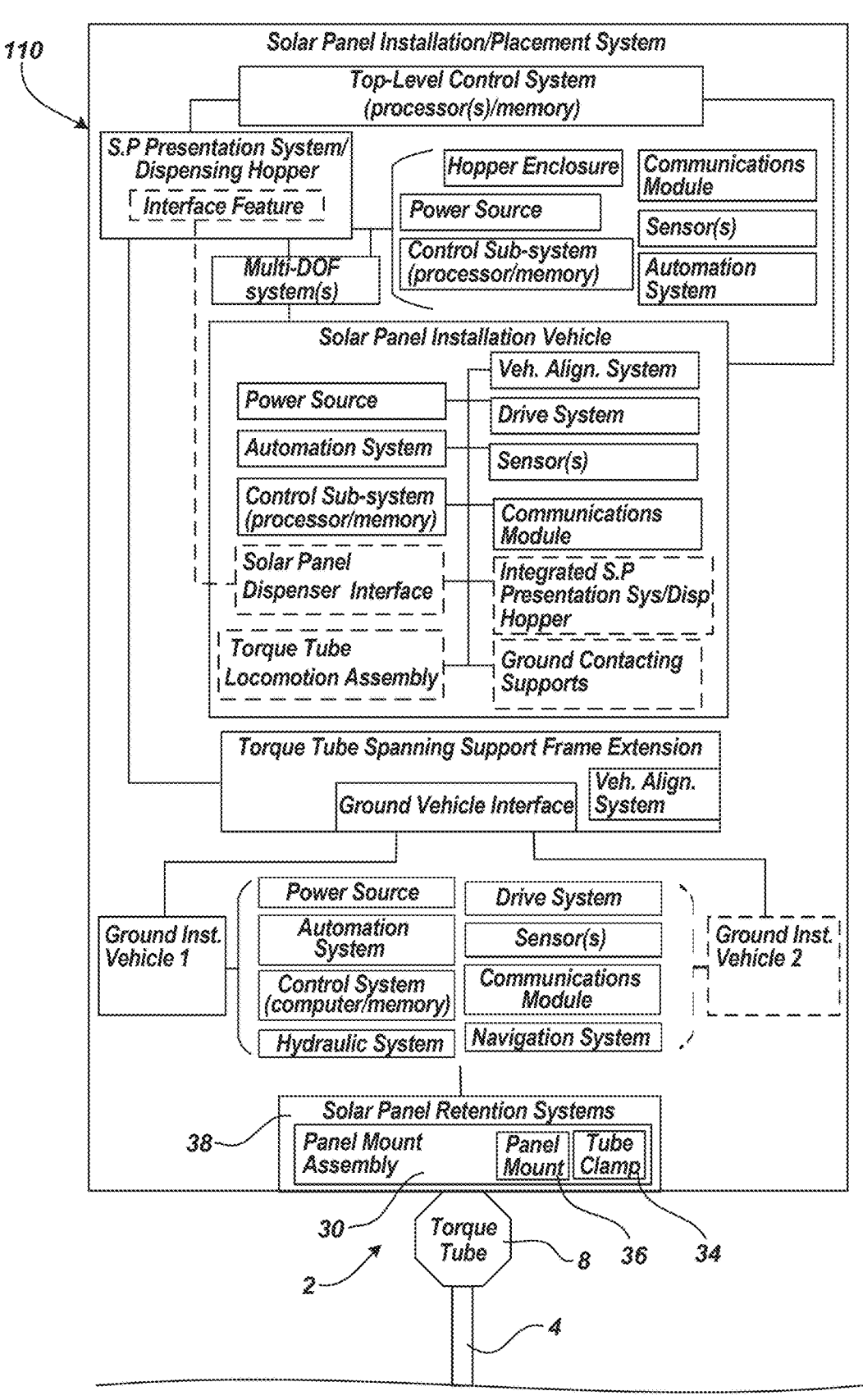
FIG. 1 illustrates a solar panel installation system in accordance with one example of the present disclosure.

Reference will now be made to the examples illustrated, and specific language will be used herein to describe the same. It will nevertheless be understood that no limitation of scope is thereby intended.

DETAILED DESCRIPTION

The following detailed description of exemplary embodiments of the present technology refers to the accompanying drawings, which form a part hereof and in which are shown, by way of illustration, examples in which the present technology may be practiced. While these exemplary embodiments are described in sufficient detail to enable those skilled in the art to practice the present technology, it should be understood that other embodiments may be realized and that various changes to the present technology may be made without departing from the spirit and scope of the present technology. Thus, the following more detailed description of the embodiments of the present technology is not intended to limit the scope of the invention, as claimed, but is presented for purposes of illustration only to describe the features and characteristics of the present technology, and to sufficiently enable one skilled in the art to practice the invention.

Description of Terms

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The term "installation site" refers to a location within and defined by the panel support assembly where an individual solar panel can be installed into a solar panel retention system comprising one or more panel mount assemblies, each of these comprising one or more panel mounts, as part of the overall panel support assembly. Using the solar panel installation system, a supported solar panel can be brought to an installation site and positioned accordingly in preparation for being installed into the panel mount assembly. In one example, an installation site can comprise a single panel mount assembly configured to receive, retain and support a solar panel on two or more sides (e.g., a frame or frame-like panel mount). In another example, an installation site can comprise a plurality of panel mount assemblies configured to receive, support and retain a solar panel, each one supporting a different portion of the solar panel (e.g., two panel mounts supporting opposing sides of the same solar panel). It is noted herein that a single panel mount assembly can be part of two panel retention systems as a single panel mount assembly can be configured to receive and retain two adjacent solar panels (e.g., see the single panel mount assembly 30 in FIG. 15C retaining two adjacent solar panels, including solar panel 50 just installed by the installation vehicle 1024; see also the panel mount assemblies that are common to the panel retention systems 38A, 38B, and 38C, respectively, of FIG. 15G).

As used herein, the term "installed position" as used herein refers to a final position at which the solar panel is fully installed and resting in a seated position within a solar panel retention system, and that corresponds to the operating position of the solar panel for its intended purpose, namely to receive solar energy and facilitate the production or generation of electricity. In other words, in the "installed position" installation of the solar panel into the solar panel retention system is complete, meaning that no further movement or manipulation of the solar panel within the solar panel retention system is needed or undertaken to position the solar panel within the solar panel retention system. Examples of one or more solar panels within their installed positions are illustrated at least in FIGS. 7C, 8G, 10C, 11J, 13A, 13F, 14B, 15C.

The term "installation position" as used herein refers to a presentation position at which a solar panel is caused (i.e., manipulated), such as by a solar panel dispensing hopper, to be in just prior to being initially inserted into, or brought into contact or interfaced with the panel retention system and its one or more solar panel mount assemblies, or at which the solar panel is caused to be properly positioned, oriented and aligned to be inserted, brought into contact or interfaced with the panel retention system, for facilitating subsequent placement (i.e., insertion, installation) of the solar panel into the panel retention system and into the installed position. In one example, the "installation position" can comprise an overhead installation position in which the lead solar panel is presented to the panel retention system from an overhead position.

As used herein, the term "installation angle" is intended to refer to an orientation angle at which a solar panel is initially inserted into, brought into contact or interfaced with, or aligned to be inserted, brought into contact with, or interfaced with the solar panel mount, for facilitating subsequent placement of the solar panel into the installed position.

As used herein, the term "overhead installation" refers to the manner of installation facilitated by a suitably configured solar panel installation system, wherein a solar panel is installed into a panel retention system of a solar panel support assembly, the panel retention system comprising one or more panel mount assemblies, from a position above the panel support assembly in support of the panel retention system and the panel mount assemblies. This can mean that the solar panel is installed from a position directly above the panel retention system, or it can mean that the panel is brought into an installation position proximate and above the panel retention system from another position above the panel support assembly, and particularly the panel retention system. Overhead installation is different from "lateral installation," wherein a solar panel is installed into a panel retention system from the side of the panel support assembly and the panel retention system. In one example, overhead installation of a solar panel can be carried out via a robotic torque tube spanning solar panel dispensing hopper supported by a manual or robotic installation vehicle that itself can be, but is not required to be, a robotic torque tube spanning installation vehicle.

As used herein, the term "span" refers to at least one of a solar panel dispensing hopper, an installation vehicle, or a bridging support member comprising one or more structural elements that extend laterally in different directions along an axis transverse or crosswise to a longitudinal axis of a torque tube (e.g., an axis extending along the length of the torque tube) of a panel support assembly, such as a solar tracking system, with the solar panel dispensing hopper, the installation vehicle, or the bridging support member being in a position overhead or above the torque tube.

As used herein, the term "solar panel presentation system" refers to a system comprising one or more robotic solar panel dispensing hoppers, along with any of the various controls or control systems, power sources, automation systems, communications system, sensors, operable with the solar panel dispensing hopper.

As used herein, the term "solar panel dispensing hopper" refers to a robotic device that is operable to support and to facilitate active, controlled dispensing of one or more solar panels, such as those contained within the solar panel dispensing hopper. The solar panel dispensing hopper can comprise a hopper enclosure or other structure configured to receive and support and contain one or more solar panels therein, and optionally a dispensing mechanism or system operable with the hopper enclosure to actively dispense the one or more solar panels from the hopper enclosure or other structure. In some examples, the hopper enclosure can be configured to provide sufficient structural support to facilitate coupling of the solar panel dispensing hopper to one of an installation vehicle, a bridging support member, a multi-degree of freedom platform or stage, or other structure. In other examples, the solar panel dispensing hopper can further comprise a support frame providing structural support to the solar panel dispensing hopper. The solar panel dispensing hopper can be brought into position at an installation site via an installation vehicle and can then be operated to present (i.e., dispense) a lead solar panel from an exit or opening in the solar panel dispensing hopper. In one example, the solar panel dispensing hopper can simply dispense a lead solar panel without regard to an installation position of the solar panel. In this example, the solar panel dispensing hopper can be operable with another system, namely a panel acquisition and placement system, that functions to acquire the dispensed lead solar panel and manipulate the lead solar panel into a proper installation position (i.e., manipulate to properly align, position, orient the solar panel into the installation position), wherein the panel acquisition and placement system can then place or install the lead solar panel within a solar panel support assembly, and specifically within a panel retention system as part of the solar panel support assembly, wherein the lead solar panel is placed into an installed position within the panel retention system. In another example, the solar panel dispensing hopper can dispense a lead solar panel and manipulate this itself into a proper installation position (i.e., manipulate to properly align, position, orient the solar panel into the installation position), wherein the solar panel dispensing hopper can then directly place or install the lead solar panel within a solar panel support assembly, and specifically within a panel retention system as part of the solar panel support assembly, wherein the solar panel is placed into an installed position within the panel retention system. This can be repeated at as many successive installation sites as needed or desired. In one example, a solar panel dispensing hopper can be manually operated, or operation can be partially or fully automated. A solar panel dispensing hopper can comprise a number of different sizes, configurations, components, systems, subsystems, capabilities depending upon the particular application. In one example, a solar panel dispensing hopper can be configured to provide or facilitate overhead dispensing and installation of one or more solar panels relative to a panel support assembly, such as within one or more solar panel retention systems comprising one or more panel mount assemblies comprising one or more panel mounts oriented transverse (e.g., orthogonal) to the torque tube. In another example, a solar panel dispensing hopper can be configured to provide or facilitate lateral or from the side dispensing and installation of one or more solar panels relative to a panel support assembly. Different example solar panel dispensing hoppers are set forth herein, but these are not intended to be limiting in any way. In one example, a solar panel dispensing hopper can comprise a self-contained dispensing hopper, meaning that the solar panel dispensing hoppers is not part of an object, device, or system (e.g., an installation vehicle, a bridging support member, a multi-degree of freedom platform or stage) with which it is being used. For instance, with respect to an installation vehicle, that means that the solar panel dispensing hopper is not a built-in (at the time of manufacturing), dedicated, integral part of the solar panel installation vehicle, rather it is a separate module or system having its own housing or frame unit, and that it is removable or removably operable with a solar panel installation vehicle that itself is designed to receive, support, and interface with the solar panel dispensing hopper. In other words, it is a type of plug-in system or module that is not considered part of the installation vehicle. In some examples, a self-contained solar panel dispensing hopper can be configured to be interchangeable with other similarly configured solar panel dispensing hoppers within a given installation vehicle. Being "self-contained" can also mean, in some examples, that at least some or all of the components, systems or other elements needed to carry out an installation task of inserting a solar panel into a panel support assembly are part of, on-board, or otherwise associated and operable with the solar panel dispensing hopper 114 (e.g., control system 120, communications module 122, sensor(s) 124, automation system 126, etc.). In another example, a solar panel dispensing hopper can be integrally formed or constructed with another object, device, or system, such as an installation vehicle, a bridging support member, a multi-degree of freedom platform or stage.

As used herein, the term "panel acquisition and placement system" refers to a system supported on and operable with one of a solar panel dispensing hopper, an installation vehicle, or a bridging support member operable with one or more installation vehicles, that operates to acquire and install within a panel retention system of a panel support assembly one or more solar panels from a structure in support of one or more solar panels, such as a hopper. In one example, a solar panel acquisition and placement system can be configured to acquire and install solar panels from a solar panel dispensing hopper (an active hopper). In another example, a solar panel acquisition and placement system can be configured to acquire and install one or more solar panels from a solar panel hopper enclosure (a passive hopper). In still another example, a solar panel acquisition and placement system can be part of or otherwise associated with any of the installation vehicles and/or bridging support members discussed herein, and can be operable to perform active, controlled acquisition of one or more solar panels from a structure in support of the solar panels, such as those contained within an active dispensing hopper or passive hopper, and can be operable to place or install the acquired solar panels in an installed position within a panel retention system as part of a panel support assembly.

As used herein, the term "solar panel installation vehicle" or simply "installation vehicle" refers to a manned or unmanned mobile vehicle operable to support and to facilitate controlled positioning of a solar panel dispensing hopper or a passive hopper enclosure and a panel acquisition and placement system or a panel acquisition and placement system, such as to position these at a plurality of installation sites for successive installation of solar panels within a solar panel support assembly. In one example, an installation vehicle can be operated manually by an operator. In another example, an installation vehicle can comprise a degree of automation from partially automated to fully automated, wherein partial automation may involve some degree of manual operation of the installation vehicle, and/or one or more components, systems, elements associated with the installation vehicle. An installation vehicle can comprise a number of different sizes, configurations, capabilities. In one example, an installation vehicle can be configured to facilitate overhead dispensing and installation of one or more solar panels relative to a panel support assembly, such as within one or more solar panel retention systems comprising one or more panel mount assemblies comprising one or more panel mounts oriented transverse (e.g., orthogonal) to the torque tube. In another example, an installation vehicle can be configured to facilitate lateral or from the side dispensing and installation of one or more solar panels relative to a panel support assembly. In another example, two or more installation vehicles can be operated in a coordinated manner with one another to facilitate the installation of solar panels. Different example installation vehicles are set forth herein, but these are not intended to be limiting in any way. In an example, an installation vehicle can comprise or otherwise be associated with a solar panel acquisition and placement system, which can function to acquire and install one or more solar panels from a passive hopper enclosure or a solar panel dispensing hopper.

As used herein, the term "solar panel support assembly" or simply "panel support assembly" refers to a collection of structural supports or support structures, systems, components, etc. configured to receive and retain, at least in part, and support one or more solar panels in an operational installed position. A solar panel support assembly is intended to refer to the collection of components, systems, etc. that are erected (e.g., about ground or another surface or structure) and assembled for the purpose of supporting one or more solar panels in the installed position. In one example, a type of solar panel support assembly can comprise a non-moving frame or frame-like structure/assembly, any connections between these, as well as various solar panel mounts supported about or comprising the frame or frame-like components. In another example, a type of solar panel support assembly can be that or part of a solar tracking system in which a series of ground structural supports, bearings and other components are in support of a torque tube operable to be driven by one or more motors operable with one or more drive mechanisms. The panel support assembly can be in support of a plurality of components of a solar panel installation system, such as one or more solar panel retention systems comprising one or more panel mount assemblies supported on the torque tube, each of the panel mount assemblies comprising a torque tube clamp and a panel mount.

As used herein, the term "solar panel mount" or simply "panel mount" refers to a structure or assembly of components supported in and as part of a panel support assembly. A panel mount can be sized and configured to receive and physically retain at least a portion (e.g., one side) of one or more solar panels in an operational installed position, either via an edge of a framed solar panel type or via one or more support rails of a frameless solar panel type depending upon which type of solar panel is being installed. A panel mount can comprise a variety of different types and configurations of retaining features, such as retaining channels, retaining pins, retaining latches, retaining mechanisms, and others. In one example, a panel mount can be configured to facilitate overhead installation of solar panels from a solar panel presentation system. In another example, a panel mount can be configured to facilitate lateral or side insertion and installation of solar panels from a solar panel presentation system. A panel mount can be part of a panel support assembly comprising a fixed, non-moving frame or frame-like structure/assembly, or a panel mount can be part of a panel support assembly comprising a solar tracking system.

As used herein, the term "torque tube clamp" refers to a structure or mechanism that couples, clamps or otherwise connects to a torque tube of a solar tracking system, and that supports a panel mount about the torque tube, thus indirectly supporting a solar panel about the torque tube.

As used herein, the term "panel mount assembly" refers, in combination, to a solar panel mount and a torque tube clamp that operate together to support a solar panel on or about or from a torque tube of a solar tracking system. In one example, a panel mount assembly can comprise a panel mount that is integrally formed with a tube clamp. In another example, a panel mount assembly can comprise a panel mount comprising a separate structure from the structure of a torque tube clamp, wherein the panel mount is coupled to, joined, or otherwise physically connected to the tube clamp. A panel support assembly can comprise a number of panel mount assemblies configured to support an array of installed solar panels.

As used herein, the term "solar panel retention system" or "panel retention system" refers to one or more panel mount assemblies used to receive, retain and support one or more solar panels in an installed position at a particular installation site. In one example, the solar panel retention system can comprise two solar panel mount assemblies, each being configured to facilitate overhead installation of solar panels (e.g., as within a panel support assembly in the form of a solar tracking system or one in the form of a fixed-frame support assembly). In another example, the solar panel retention system can comprise two solar panel mount assemblies, each being configured to facilitate lateral or side installation of solar panels (e.g., as within a panel support assembly in the form a solar tracking system or one in the form of a fixed-frame support assembly).

As used herein, the term "hopper enclosure" refers to a structure or component that is sized and configured to receive and support one or more solar panels therein in any configuration. A hopper enclosure can be configured to receive a plurality of solar panels therein or thereon, whether stacked vertically or horizontally, aligned vertically or horizontally, or otherwise. In one example, a hopper enclosure can be part of or otherwise associated with a solar panel dispensing hopper having a dispensing system, wherein the solar panel dispensing hopper operates to actively manipulate and dispense one or more solar panels from the hopper enclosure and the solar panel dispensing hopper, and in some cases install the solar panels directly. In another example, a hopper enclosure can comprise a passive hopper, such as one that is operable with a panel acquisition and placement system. A "passive" hopper can mean a hopper enclosure that is not configured by itself to dispense a solar panel from an exit or opening in the hopper, but merely to carry one or more solar panels therein. A hopper enclosure can comprise an opening or "exit opening" through which the solar panels can be actively dispensed from the hopper enclosure or actively acquired and retrieved from the hopper enclosure (e.g., an opening or exit at the top of the hopper enclosure, or an opening or exit at the bottom of the hopper enclosure) via a solar panel acquisition and placement system. In another example, a dispensing type of hopper itself or a passive hopper itself can comprise one or more active, controllable systems or mechanisms operable to manipulate the one or more solar panels as contained therein in one or more ways (e.g., to move the solar panels towards a top or other opening in the hopper). It is specifically noted that a passive hopper enclosure, while passive in that it may not itself perform a dispensing function of a solar panel, can still comprise one or more active, controllable systems or mechanisms that manipulate the solar panels within the hopper enclosure in one or more ways. For instance, a passive hopper enclosure can comprise a moveable base or platform and a lift system operable to selectively lift and advance the moveable base and a stack of solar panels supported thereon. Furthermore, in one example, a hopper enclosure can comprise a platform or bottom structural component and one or more structural members extending upward from the platform or bottom structure, such as one or more sidewalls, rods, braces, or any other type of structural elements capable of retaining or containing the solar panels as loaded onto the platform or bottom structure. In another example, a hopper enclosure can simply comprise a platform. In this case, any solar panels loaded onto the platform or bottom can be further secured if necessary using any type of securing components, such as straps, tie-downs, cords, etc.

As used herein, the term "solar panel installation system" refers to the collection of the various example components, elements, systems, devices, vehicles described herein configured to facilitate efficient installation of solar panels into a panel support assembly. In one example, the solar panel installation systems described herein can facilitate manual installation of solar panels. In another example, the solar panel installation systems described herein can be a partially automated system, with some aspects of the installation process being manual, while others are automated. In still another example, the solar panel installation systems described herein can be a fully automated system. In one example, the solar panel installation systems described herein can comprise a solar panel presentation system that comprises a solar panel dispensing hopper. The solar panel installation systems described herein can further comprise one or more solar panel installation vehicles, an solar panel installation vehicle, a torque tube clamp installation vehicle, a bridging support member, a multi-degree of freedom platform or stage, a solar panel acquisition and placement system, a control system, an automation system, a navigation system for the installation vehicle(s), a communications module, a power source, a vehicle alignment system, or any combination of these. In some examples, the solar panel installation systems described herein can further comprise one or more solar panel retention systems (comprising one or more panel mount assemblies, the panel mount assemblies comprising one or more panel mounts and one or more torque tube clamps) as supported about a solar panel support assembly.

As used herein, the term "bias" refers to the inherent force application function of a biasing member, mechanism, or system configured to store potential energy, and to exert a spring or spring-like force when compressed. A "biasing member" (or mechanism, or system) refers to a member configured to store potential energy and to exert or apply a spring or spring-like force when compressed. A biasing member can comprise one or more springs, one or more resilient members, one or more compliant members, one or more other type of spring-like members. A biasing system or mechanism can comprise any system or mechanism that can be actuated or otherwise manipulated to exert or apply a spring or spring-like force.

As used herein, the term "retention latch" refers to a retaining feature of a solar panel mount configured to engage with a portion of the solar panel to retain the solar panel in an installed position in a panel mount assembly.

Examples of the Technology

To further describe the present technology, example embodiments are now set forth and described with reference to the figures. These example embodiments are not intended to be limiting in any way. With reference to FIG. 1, illustrated is schematic diagram of a solar panel installation or placement system 110, in accordance with one example of the present disclosure, that is operable to facilitate installation of solar panels for several purposes, one of which can be to replace the often significant manual labor requirements typically involved in installing solar panels using conventional manual systems and methods. The solar panel installation system 110, as shown, can comprise a variety of different elements, configurations, systems, etc., depending upon the particular application. Some specific examples of different configurations of solar panel installation systems are set forth below. As will be discussed in more detail below, using at least a partial, and in some examples a fully, automated solar panel dispensing hopper and/or partial or fully automated installation vehicles, as well as various associated sensors, control systems, processing, automation systems, navigation systems, alignment systems, and other systems or elements, the task of installing solar panels within different types of panel support assemblies (e.g., fixed-frame panel support assemblies, panel support assemblies as part of solar tracking systems otherwise known as solar trackers, and others) to achieve an array of solar panels can minimize, and in many cases eliminate, many of the problems associated with manual installation inherent in current installation systems and methods.

In one example, the solar panel installation system 110 can comprise a solar panel presentation system comprising a solar panel dispensing hopper comprising a variety of elements, systems, and features operable to facilitate and provide manual, partially automated or fully automated dispensing and installation of a plurality of solar panels into respective solar panel retention systems of a solar panel support assembly, such as a solar tracking system or a static, fixed-frame system supported about the ground or another surface. In one example, the solar panel dispensing hopper can comprise a torque tube spanning solar panel dispensing hopper operable to be situated and supported in a position above a torque tube of a solar tracking system so as to span the torque tube, wherein one or more solar panels can be dispensed and installed in the panel support assembly from an overhead position, meaning from a position above the torque tube. In another example, the solar panel dispensing hopper can comprise a lateral or side loading type of dispenser operable to install one or more solar panels from a side position relative to and into a fixed-frame type of panel support assembly. The solar panel dispensing hopper can comprise, among other things, at least one of a hopper enclosure for receiving, supporting and facilitating the dispensing of one or more solar panels; a dispensing system for providing active, controlled manipulation and dispensing of one or more solar panels from the solar panel dispensing hopper, namely from the hopper enclosure, a power source for providing power to the various powered systems, elements, devices, etc. on-board the solar panel dispensing hopper; a control system for controlling the various controllable systems, elements, devices, etc. on-board the solar panel dispensing hopper; a communications module for receiving and transmitting data; one or more sensors for sensing aspects of or information related to the systems, components, properties, and/or operating conditions of the solar panel dispensing hopper itself, the solar panels, the panel support assembly, the vehicle(s) in support of the solar panel dispensing hopper, and/or the environment; an automation system (with its automation and/or navigation assets), including one or more of the sensors discussed above or different sensors, or other automation and/or navigation assets for facilitating automated positioning, orientation and/or installation of the one or more solar panels. Each of these system is discussed in greater detail below.

The solar panel dispensing hopper can further comprise an interface feature, such as at least one of an installation vehicle interface, a bridging support member interface, or a multi-degree of freedom platform interface that comprises various mechanical and/or electrical interfacing elements that facilitate the solar panel dispensing hopper to be removably operable with one of these, such as with a solar panel installation vehicle. In this example, the solar panel dispensing hopper can comprise a self-contained system, meaning that the solar panel dispensing hopper is not an integral part of the solar panel installation vehicle, and in some cases, that some or all of the components, systems or other elements needed to carry out an installation task of inserting a solar panel into a panel support assembly are part of, on-board, or otherwise associated and operable with the solar panel dispensing hopper (e.g., control system, communications module, sensor(s), automation system, etc.). As will be discussed below, in one example, the solar panel installation vehicle can comprise a manned or unmanned, partially or fully automated utility vehicle, such as a forklift, skid-steer, or other type of utility, or other type of vehicle, capable of traversing the ground or other surface and supporting the solar panel dispensing hopper in a position adjacent and proximate a panel support assembly (e.g., in a position overhead or to the side of a torque tube of a panel support assembly of a solar tracking system, and/or in a position to the side of a fixed frame panel support assembly). As will also be discussed below, in another example, the solar panel installation vehicle can comprise a robotic torque tube spanning solar panel installation vehicle. Examples of these can include one that is configured to traverse across the ground or other surface while spanning a torque tube, or one that is supported by and rides along a torque tube. Each of these are discussed in detail below. In any event, with a self-contained system, the solar panel installation vehicle operable with the solar panel dispensing hopper can be minimally configured, meaning that it can be configured to lift, carry, and support the solar panel dispensing hopper, to move to bring the solar panel dispensing hopper into an initial installation position at an installation site relative to the panel support assembly, and to manipulate the solar panel dispensing hopper in one or more degrees of freedom at the installation site to facilitate an installation position as most if not all of the components, elements, systems, needed to carry out the task of installing a solar panel within a panel support assembly by the solar panel dispensing hopper at the established installation site are supported on-board the solar panel dispensing hopper. For instance, if needed the installation vehicle can be configured to make additional minor movements about the ground or torque tube (depending upon the type of installation vehicle being utilized), as well as to at least one of raise, lower, tilt/rotate, and/or translate the solar panel dispensing hopper along one or more axes. Moreover, the solar panel installation vehicle in this example can be configured to position or reposition the solar panel dispensing hopper in similar installation positions at successive installation sites relative to the panel support assembly.

In another example, the solar panel dispensing hopper can be partially or mostly self-contained. In this example, one or more needed items such as power, computer hardware, or fluid actuation sources can be absent from the self-contained solar panel dispensing hopper, but can be provided to the solar panel dispensing hopper from one or more systems external to the solar panel dispensing hopper, such as from the installation vehicle, equipped with and/or configured to provide these so that they do not need to be physically on-board the solar panel dispensing hopper. For instance, the solar panel installation vehicle can be equipped with and configured to provide at least one of power, data transfer, fluids (e.g., air, hydraulics) via an umbilical connected between the solar panel installation vehicle and the solar panel dispensing hopper. The umbilical can comprise one or more power distribution lines, one or more data distribution lines, one or more fluid distribution lines, or others. In still another embodiment, the solar panel dispensing hopper can comprise various components, systems needed to facilitate installation of a solar panel within a panel retention system of a panel support assembly, but wherein at least one of the power source(s), control system(s), communications module(s), vision or other automation system(s) are supported on and part of the solar panel installation vehicle, and wherein the solar panel dispensing hopper and the solar panel installation vehicle are operable with one another via an exchange of needed items, resources, information or a combination of these. Those skilled in the art will recognize how the various elements, components, systems, subsystems, needed to achieve partial or fully automated installation of solar panels within a solar panel array can be part of the solar panel dispensing hopper, the solar panel installation vehicle, or both.

As indicated above, the solar panel installation system 110 can further comprise one or more solar panel installation vehicles. In one example, the one or more installation vehicles can be in support of the solar panel dispensing hopper, wherein the one or more solar panel installation vehicles can be configured to move about ground, another surface, or an object (e.g., a torque tube) to initially locate the solar panel dispensing hopper at various locations relative to the panel support assembly, which locations correspond to various installation sites within the panel support assembly. The solar panel installation vehicle can further be configured to be capable of and initiate more micro or fine movements, such as at least one of adjusting a position or orienting of the solar panel installation dispenser at the installation site and relative to the panel support assembly. This can include at least one of making additional minor movements about the ground or torque tube (depending upon the type of installation vehicle being utilized), as well as to at least one of raise, lower, tilt/rotate, and/or translate the solar panel dispensing hopper along one or more axes to better position the solar panel dispensing hopper relative to the panel support assembly.

In one example, the one or more installation vehicles can comprise any type of ground vehicle, such as a utility vehicle (e.g., a forklift, a skid steer, a wheel loader, a truck, a customized vehicle design, or any other type of vehicle). In another example, the one or more installation vehicles can further comprise a torque tube riding vehicle, namely a torque tube riding panel installation vehicle that rides on previously installed panel mount assemblies, that is in support of a solar panel dispensing hopper, and that installs solar panels within the panel retention systems located at and defining designated installation sites along the torque tube, the panel retention systems comprising one or more panel mount assemblies In one example, the solar panel installation vehicle can comprise a single vehicle driving along the side of the panel support assembly, and that is capable of positioning the solar panel dispensing hopper in a proper position relative to the panel support assembly at successive installation sites within the panel support assembly. In this example, the installation vehicle can be configured to carry and support the solar panel dispensing hopper, and can be operated to move about the ground or another surface proximate the panel support assembly to position the solar panel dispensing hopper at an installation site within the panel support assembly. The installation vehicle can comprise any type of vehicle, such as a utility vehicle (e.g., a forklift, a skid steer, a wheel loader), a truck, or any other type of vehicle. The installation vehicle can be operated manually, or it can comprise a degree of automation, from partially automated up to fully automated. The installation vehicle can carry and support the solar panel dispensing hopper, for instance, by using the forks of a forklift utility vehicle. The installation vehicle can support the solar panel dispensing hopper in a manner so as to locate the solar panel dispensing hopper in a position overhead the torque tube. The solar panel dispensing hopper can also be caused to span the torque tube so as to facilitate overhead installation of solar panels at various installation sites within the solar panel retention systems of the panel support assembly. The installation vehicle can comprise at least one of a power source (e.g., a gas engine, an electric motor operated by batteries, or a combination of these), a control system, a communications module, one or more sensors, an automation system (e.g., a vision system), a drive system, an interface system for interfacing with the solar panel dispensing hopper, or any other components, elements or systems to enable the installation vehicle to facilitate installation of the solar panels within the panel support assembly using the solar panel dispensing hopper. A more specific example installation vehicle in operation with an example solar panel dispensing hopper as described here is provided below, and shown in FIG. 6.

In another example, the solar panel installation vehicle can comprise two vehicles, namely a first vehicle that operates on one side of a torque tube, and a second vehicle that operates on an opposing side of the torque tube. The first and second vehicles can be driven about the ground or other surface on opposing sides of the torque tube manually, or by using one or more systems for computer-controlled coordinated operation, or a combination of these. The one or more installation vehicles can be operated in a coordinated manner to support a bridging support member carried by and between them. The bridging support member can be used to span the torque tube, and to support and carry the solar panel dispensing hopper (and also any multi-degree of freedom platform operable with the solar panel dispensing system) in a manner so as to locate the solar panel dispensing hopper in a position overhead the torque tube. The solar panel dispensing hopper can also be caused to span the torque tube so as to facilitate overhead installation of solar panels at various installation sites within the panel support assembly. Each of the first and second installation vehicles can comprise at least one of a power source (e.g., an internal combustion engine, an electric motor operated by batteries or hydrogen fuel cells, or a combination of these), a control system, a communications module, one or more sensors, an automation system, a drive system, an interface system for interfacing with the solar panel dispensing hopper, or any other components, elements or systems to enable them to facilitate installation of the solar panels within the panel support assembly using the solar panel dispensing hopper. The distance or spacing between the first and second vehicles can be any distance, depending upon the size and configuration of the bridging support member, with a minimum distance being greater than a length of the several panel mount assemblies supported on the torque tube (and oriented orthogonal to the torque tube) so that the first and second vehicles can be on either side of and drive along the length of the torque tube while clearing the panel mount assemblies (i.e., without contacting the panel mount assemblies). The bridging support member can also comprise any size and configuration as needed or desired, and that is capable of being supported by the first and second installation vehicles at a suitable spacing or distance between them. The bridging support member can further comprise, or be capable of, movement itself within one or more degrees of freedom. For example, the bridging support member can comprise or be in support of a multi-degree of freedom platform comprising an inner frame member moveable relative to an outer frame member that facilitates movement of the inner frame (and the solar panel dispensing hopper supported thereby) in a first translational degree of freedom along a first axis. The inner frame member and the outer frame member can be moveable relative to an outermost framework, such that the inner frame member and the outer frame member (and the solar panel dispensing hopper) are moveable in a second translational degree of freedom along a second axis. The bridging support member can further comprise one or more lift mechanisms operable to facilitate movement of the solar panel dispensing hopper in a third translational degree of freedom along a third axis (e.g., to change an elevation of the solar panel dispensing hopper). The bridging support member can further comprise components and can be operated so as to provide movement of the solar panel dispensing hopper in one or more rotational degrees of freedom. The clearance distance between the first and second vehicles and the respective opposing ends of the panel mount assemblies can be any distance, but should be great enough so that the first and second vehicles can drive alongside the torque tube and install the solar panels in accordance with the given pre-determined clearance offset and a margin of error that takes into account off normal axis movements (e.g., rocking, tilting, swaying, or others) by the first and second vehicles, such as may be caused by uneven ground surfaces or other factors. A more specific example of first and second installation vehicles in operation with an example bridging support member and an example solar panel dispensing hopper as described here is provided below, and shown in FIGS. 13A-13J.

In another example, the solar panel installation vehicle can comprise a solar panel installation vehicle that straddles and spans the torque tube. A more specific example installation vehicle in operation with an example solar panel dispensing hopper as described herein is provided below, and shown in FIGS. 14A-14D

In another example, the solar panel installation vehicle can comprise a type of vehicle that is supported directly on and that rides along the torque tube of a panel support assembly 2. More specific examples of installation vehicles that ride along the torque tube and that are in operation with different example solar panel dispensing hoppers as described herein are provided below, and shown in FIGS. 15A-15O, FIGS. 16A-16C, and FIGS. 17A-17I.

With any of the above example types of solar panel installation vehicles, each of these can comprise one of two configurations as it relates to the solar panel dispensing hopper. In one configuration, the solar panel installation vehicle can comprise a dedicated solar panel dispensing hopper integrally formed with the installation vehicle. In a second configuration, the solar panel installation vehicle can comprise a type of vehicle that does not have a dedicated (i.e., integrally formed) solar panel dispensing hopper, but that itself comprises a solar panel dispensing hopper interface comprising various mechanical, fluid, and/or electrical interfacing elements, such that the solar panel installation vehicle can carry and support a removable and self-contained solar panel dispensing hopper, and can at least one of receive, connect with, exchange information with, or otherwise be operable with the self-contained solar panel dispensing hopper, such as the modular or plug-in type of solar panel dispensing hopper discussed herein. In other words, the solar panel installation vehicle and the solar panel dispensing hopper can be configured to be removably coupled to one another via the installation vehicle interface on the solar panel dispensing hopper and the solar panel dispensing hopper interface on the solar panel installation vehicle, thereby enabling the solar panel dispensing hopper to be operable with the solar panel installation vehicle to install solar panels in an automated manner.

With any of the above example types of solar panel installation vehicles, each of these can be operated manually, or they can comprise a degree of automation, from partially automated (some manual control and/or input is needed) to fully automated (where the installation is achieved using computer-controlled automation systems, navigation systems, and/or a combination of these). With respect to navigation systems, in one example, movements of the one or more installation vehicles can be coordinated using a precision satellite-based radio navigation system, such as a global navigation satellite system (GNSS), and more specifically, such as a Global Positioning System (GPS). Other types of navigation systems can include, but are not limited to, wired, guide tape, laser target, inertial guidance systems, (gyroscopic), natural feature (natural target), vision guidance systems, Geoguidance systems, precision satellite-based radio navigation systems, such as a global navigation satellite systems (GNSS), and more specifically Global Positioning Systems (GPS), robotic mapping systems, or any combination of these.

The solar panel installation vehicles can further comprise an automation system that facilitates partial or full automation of the installation of the solar panels. The automation system can comprise at least one of a computer vision system, a satellite-based radio navigation system, other types of computer navigation systems, various automation assets or fiducials (e.g., imaging systems, detectors, emitters, and others), alignment systems (mechanical alignment systems operable with sensors), or other components and systems. The computer automation system can comprise a number of automation assets. These can include sensors, or other sensors and/or devices, that facilitate partial or fully automated installation of the solar panels into the panel support assembly 2. In addition, the sensors of the computer automation system can comprise a number of different types. For example, the types of sensors that can be utilized in the computer automation system include, but are not limited to imaging sensors (e.g., cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, and/or a structured light sensor, or any combination of these).

While some of the sensors of the automation system discussed herein are identified as imaging sensors (e.g., cameras), it is to be understood that any of these can be sensors of any type and may be used to accomplish vision or other types of sensing by the solar panel presentation system. For example, the cameras/sensors can provide fluorescence imaging, hyperspectral imaging, or multispectral imaging. Furthermore, some of the sensors can be audio sensors (e.g., microphones, sonar, audio positioning sensors or others), chemical sensors, electromagnetic radiation sensors (e.g. antennas with signal conditioning electronics), magnetometers (single axis and multi-axis magnetometer) and radars. In short, any sensor, imager, recorder, or other device, and any combination of these, can be used in the configuration of the sensors described herein. The computer automation system can further comprise automation assets in the form of one or more emitters, such as ultrasonic emitters, to assist in locating certain objects.

One or more computer automation assets or fiducials, as part of the computer automation system, can be attached to the solar panel dispensing hopper at any location, the installation vehicle(s) at any location, the bridging support member at any location, or any combination of these. The automation assets can comprise the computer automation system sensors and/or devices discussed herein (e.g., an imaging system comprising one or more imaging sensors, such as one or more cameras), or any other types of sensors and/or other types of devices. The computer automation assets can gather and provide information, such as visual, audio or other information, to the control system. The control system can utilize the information to assist the solar panel dispensing hopper, the installation vehicle(s) or a combination of these in any number of automated tasks. For example, the automation system can be used to identify and locate in three-dimensional space the panel support assembly 2 and its various components, such as the panel retention systems at the various installation sites. The automation system can further be configured to facilitate the proper acquiring, dispensing or retrieving, positioning, and/or orienting of the solar panels from the solar panel dispensing hopper and/or the installation vehicle(s) by locating and comparing the position and orientation of the solar panels to be dispensed relative to the position and orientation of the solar panel retention systems 38 of the panel support assembly 2 into which the solar panels are to be installed. Of course, this is not intended to be limiting in any way as those skilled in the art will recognize that the automation system can be configured to perform a number of different functions related to facilitating the automated dispensing and installing of the solar panels into the panel support assembly 2.

The solar panel installation system 110 can further comprise a multi-degree of freedom platform or stage that facilitates movement of a solar panel dispensing hopper supported thereby in multiple degrees of freedom. In one example, the multi-degree of freedom platform can comprise an X-Y platform that facilitates movement of the solar panel dispensing hopper in two degrees of freedom. In another example, the multi-degree of freedom platform can comprise an X-Y platform and a lift system that facilitates movement of the solar panel dispensing hopper in three degrees of freedom. A more specific example of a multi-degree of freedom platform/stage in operation with an example solar panel dispensing hopper as described herein is provided below, and shown in FIGS. 12A-12D.

The solar panel installation system 110 can further comprise one or more solar panel retention systems 38 supported within a panel support assembly 2 (e.g., supported on a torque tube 8 of a solar tracking system), wherein the panel retention systems 38 each comprise one or more panel mount assemblies 30, and wherein the panel mount assemblies each comprise one or more panel mounts 36 and one or more torque tube clamps 34.

Figure 2A:
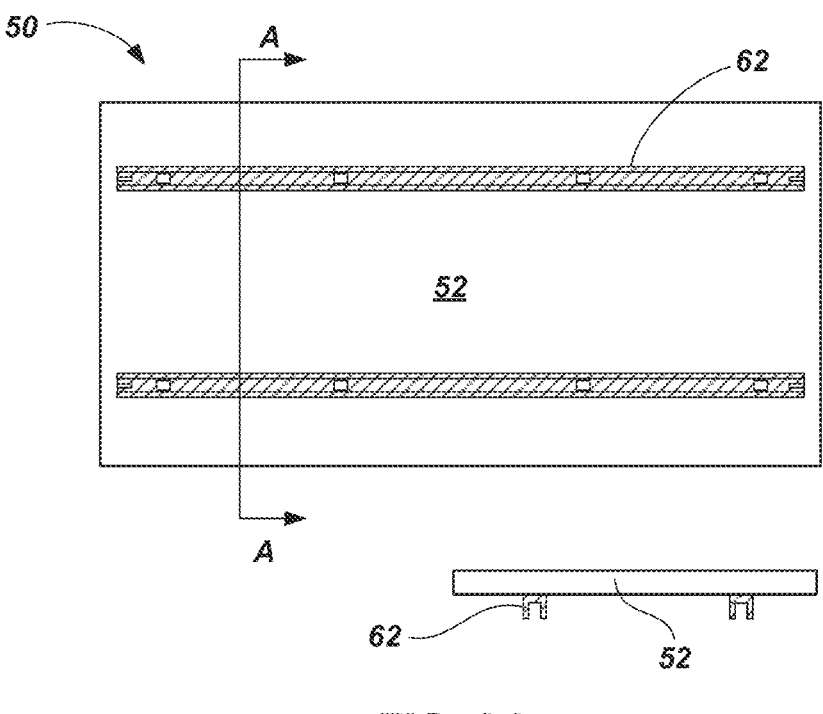
FIG. 2A illustrates an example frameless type of solar panel.
Figure 2B:
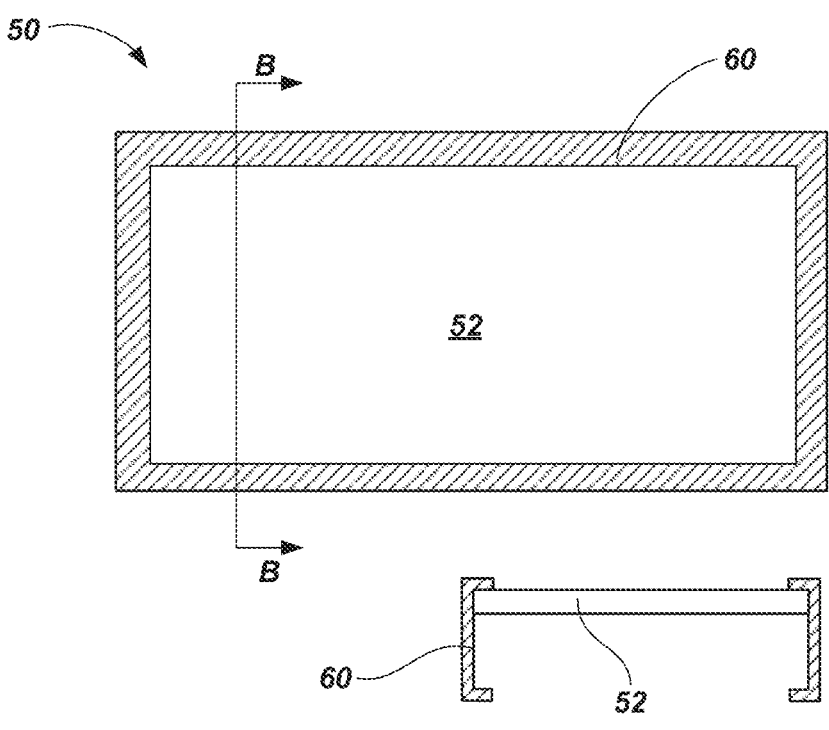
FIG. 2B illustrates an example framed solar panel.

FIGS. 2A and 2B illustrate two different types of solar panels 50 that can be used in accordance with the present disclosure. FIG. 2A illustrates a frameless solar panel, which includes a solar panel element 52, e.g., PV, supported from underneath by a pair of support rails 62. A cross-sectional view of the frameless solar panel is shown at A-A for additional clarity. FIG. 2B illustrates a framed solar panel, which includes the solar panel element, but rather than support rails, the solar panel element is supported by an exterior frame 60 that essentially follows and retains the edges of the solar panel element. A cross-sectional view of the framed solar panel is shown at B-B for additional clarity. It is noted that the panel mounts described herein are typically intended to interface with either the frame of a solar panel or the support rails of the solar panel. Each of the examples herein, and particularly in the drawings, the illustrated example typically depicts the interface between the panel mount(s) and a solar panel frame. However, it is noted that simple modification of size or other minor modification can be carried out to join the panel mount(s) with the support rails, and thus is considered to be part of the present disclosure.

Figure 3:
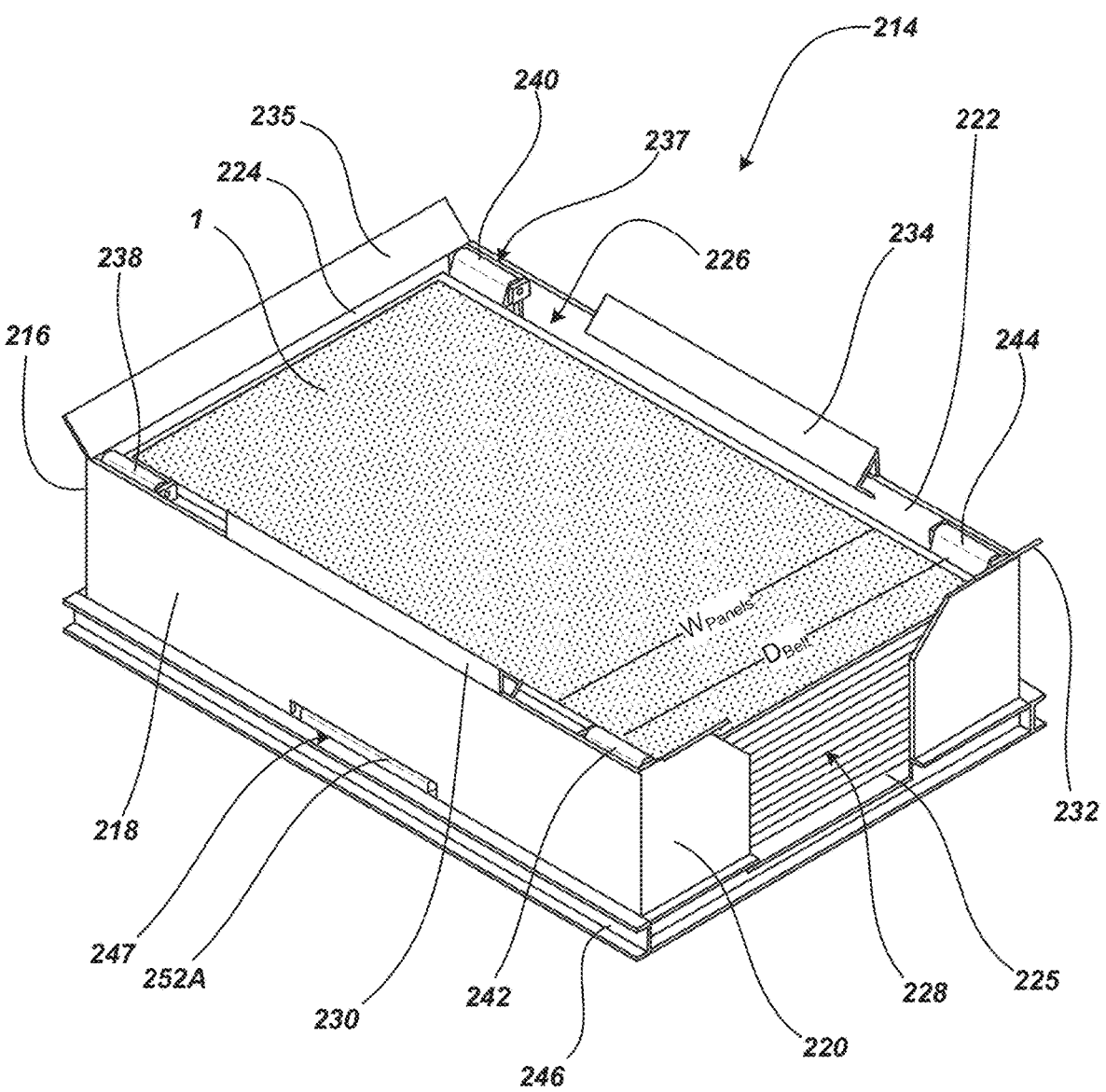
FIG. 3 illustrate a solar panel dispensing hopper in accordance with an example of the present disclosure.

With reference to FIG. 3, illustrated is a solar panel dispensing hopper 214 in accordance with an example of the present disclosure. The solar panel dispensing hopper 214 can be configured to provide overhead or top down installation of solar panels within a panel support system, meaning that one or more solar panels within the solar panel dispensing hopper 214 can be dispensed from the solar panel dispensing hopper 214 (e.g., through an opening in a bottom or lower surface) with the solar panel dispensing hopper 214 positioned above the torque tube 8 and a solar panel retention system supported thereon (comprising one or more panel mount assemblies) as part of a larger panel support assembly. The solar panel dispensing hopper 214 can comprise a hopper enclosure 216 operable to receive and contain one or more solar panels 1. In the example shown, a plurality of solar panels 1 are supported in the hopper enclosure 216 in a horizontally stacked arrangement. The hopper enclosure 216 can comprise a bottom support member (e.g., a platform, a shoulder, or any other structural configuration) for supporting the solar panels 1. The hopper enclosure 216 can further comprise one or more lateral supports extending up from the bottom support member, the lateral supports being operable to provide lateral support to the one or more solar panels 1 within the hopper enclosure 216. In one example, the lateral supports can comprise solid sidewalls (e.g., see sidewalls 218, 220, 222, and 224 forming a rectangular configuration). The configuration of the hopper sidewalls can be any as needed or desired to receive and contain a particularly configured solar panel or solar panel stack. It is noted that the hopper enclosure 216 can comprise a number of different configurations other than as shown. In another example, the hopper enclosure 216 can comprise a bottom support member in the form of a platform and lateral supports in the form of a plurality of rods or other separately (non-connected) supported structural members extending upward from the platform, wherein the rods define an interior volume. Indeed, the hopper enclosure 216 can comprise any design or configuration capable of receiving and containing the solar panels 1 therein. As indicated, the hopper enclosure 216 can further comprise an interior volume 226 (e.g., one defined by the bottom support member and the lateral supports. In the example shown, the interior volume 226 is defined by the sidewall(s) 218, 220, 222, and 224) wherein the interior volume 226 has a size and configuration suitable to receive and contain one or more solar panels 1, and preferably one or more stacks of solar panels 1.

As solar panels typically are purchased and packaged in stacks, the hopper enclosure 216 can comprise an opening in one of its sidewalls. In the example shown, the sidewall 220 comprises an opening 228 that is open along a top and bottom edge of the sidewall 220, thus providing a slot in the sidewall 220. This opening 228 facilitates the loading of a stack of solar panels by providing a clearing for the support members used to initially lift the stack of solar panels 1 and load them into the hopper enclosure 216. For example, a stack of solar panels 1 can be lifted by a forklift where the support members of the forklift comprise the forks or arms of the forklift. These arms can be used to lift the stack of solar panels and to load them into the hopper enclosure 216. The opening 228 in the sidewall 220 allows the forks of the forklift to clear the hopper so that the solar panels 1 can be lowered or loaded into the hopper enclosure 216. The opening 228 also allows the forklift to keep the stack of solar panels level as the forklift is not required to rotate or tilt the solar panels to avoid the sidewall(s) of the hopper enclosure 216. The forks of the forklift can be vertically aligned with the opening 228, and while lowering the solar panels into the hopper enclosure 216 the forks of the forklift can extend through and slide up and down within the slot created by the opening 228. Similar openings for similar purposes can be provided on any number of the sidewalls of the hopper enclosure 216 and in any configuration as needed or desired (e.g., see a similar opening formed in the opposing sidewall 224). Moreover, the sidewall 220 can be configured to provide one or more lead-in edges to further shape and define the slotted opening 228. In the example shown, the sidewall 220 comprises two opposing lead-in edges or surfaces extending downward on an angle or incline from a top edge of the sidewall to a vertical edge of the sidewall on each side of the opening, the inclined lean-in edges and the vertical edges defining the size, shape and configuration of the opening 228. The inclined lead-in edges of the sidewall 220 can facilitate proper alignment of the one or more forks of a vehicle loading the solar panel stack into the hopper enclosure 216, such a forklift or fork-lift type of vehicle or another type of vehicle comprising a set of forks. If not quite aligned, one or more of the forks can contact the lead-in edges of the slotted opening 228, which lead-in edges can function to shift one or more of the forks and the associated solar panel payload they are carrying so as to properly align the solar panel payload with the hopper enclosure 216, thus achieving proper loading of the solar panels within the hopper.

The hopper enclosure 216 can further comprise one or more top edge lead-in members extending upward and outward from a top edge of a respective sidewall of the hopper enclosure 216. These can be add-on extension members that can be removed once the solar panel stack is loaded into the hopper enclosure 216, or they can be integrally formed with the sidewalls of the hopper enclosure 216. In the example shown, the hopper enclosure 216 comprises four lead-in members 230, 232, 234, and 235 extending from the four respective sidewalls 218, 220 222, and 224 of the hopper enclosure 216. The lead-in members 230, 232, 234, and 235 can facilitate installation of the solar panels 1 into the hopper enclosure 216 by acting as guides. As the solar panels 1 are lowered into the interior volume 226 of the hopper enclosure 216, the solar panels 1 can contact one or more of the lead-in members in the event the solar panels 1 are not properly aligned with the hopper enclosure 216. The lead-in member 230, 232, 234, and 235 can help to align or realign the solar panels 1 upon contacting the solar panels 1, and can subsequently guide them into a proper position and orientation as they are loaded into the interior volume 226 of the hopper enclosure 216. It will be apparent to those skilled in the art that the lead-in members can comprise a number of different components, mechanisms, sizes, shapes and/or configurations. As such, those shown here are not intended to be limiting in any way.

In this example, the solar panel dispensing hopper 214 can further comprise a dispensing system 236 operable to facilitate dispensing of the one or more solar panels from the solar panel dispensing hopper 214, and particularly the hopper enclosure 216. The dispensing system 236 can comprise a dispenser function that merely dispenses a lead solar panel. Alternatively, the dispensing system 236 can function to both dispense and install a lead solar panel into the panel retention system 38 of the panel support assembly 2. In the example shown, the dispensing system 236 comprises both a panel feed system 237 and a panel acquisition and placement system 247, these being able to be operated in a controlled and coordinated manner to both dispense and install a lead solar panel into the panel retention system 38.

The panel feed system 237 supported within the hopper enclosure 216 can comprise a solar panel interface operable to interface with the solar panels 1, wherein the panel feed system is operable to act on the solar panels 1 to advance them towards a hopper exit or opening where they are dispensed, at least in part, from the solar panel dispensing hopper 214. The panel feed system 237 can comprise a number of different types of panel interfaces in the form of systems, mechanisms that perform the functions of advancing the solar panels 1 within the hopper enclosure 216 toward an exit of the hopper enclosure 216, and of presenting a lead solar panel to a panel acquisition and placement system 247 operable with the panel feed system 237 to further dispense and, in some cases, install the lead solar panel and the other solar panels 1 within the hopper enclosure 216 into respective panel retention systems within a panel support assembly 2. In one example, the panel feed system 237 with its panel interface can comprise a plurality of belt drive mechanisms that are sized and configured, and that function to, contact and manipulate the solar panels 1 as contained within the hopper enclosure 216. As shown, the solar panel dispensing hopper 214 comprises first and second belt drive mechanisms 238 and 240 that are supported along the first and third sidewalls 218 and 222 of the hopper enclosure 216, such that the first and second belt drive mechanisms 238 and 240 are oriented so as to oppose one another, and are within the interior volume 226 of the hopper enclosure 216. Likewise, the solar panel dispensing hopper 214 comprises third and fourth belt drive mechanisms 242 and 244 that are also supported along the first and third sidewalls 218 and 222 of the hopper enclosure 216, such that the third and fourth belt drive mechanisms 242 and 244 oppose one another, and are within the interior volume 226 of the hopper enclosure 216. The first and second belt drive mechanisms 238 and 240, while opposing one another, are spaced apart from the third and fourth belt drive mechanisms 242 and 244. As shown, the first, second, third and fourth belt drive mechanisms 238, 240, 242, 244 are positioned and supported within the hopper enclosure 216 so as to be able to interface with and act upon the solar panels 1, such as at positions along their side edges and at or near their respective ends. Indeed, the first and second belt drive mechanisms 238 and 240 interface with and act on a first end of the solar panels 1, while the third and fourth belt drive mechanisms 242 and 244 interface with and act on a second end of the solar panels 1. The hopper enclosure 216 and the first, second, third and fourth belt drive mechanisms 238, 240, 242, 244 can be configured so that a width of the solar panels $W_{panels}$ is slightly greater than a distance $D_{belts}$ between opposing belt drive mechanism pairs (when the belt drive mechanisms are in an unloaded state where no solar panels are loaded into the hopper enclosure 216), such as the pair of the first and second belt drive mechanisms 238 and 240 and the pair of third and fourth belt drive mechanisms 242 and 244. The first, second, third and fourth belt drive mechanisms 238, 240, 242, 244 can be made compliant in that the distance $D_{belts}$ between opposing belt drive mechanism pairs can be made to be variable, the distance varying depending upon if the hopper enclosure 216 is empty or loaded with solar panels. Stated another way, the first, second, third and fourth belt drive mechanisms 238, 240, 242, 244 can each be made compliant such that a distance from the outermost surface of the belt of the belt drive mechanism is variable relative to the opposing sidewall facing the belt and/or the sidewall along which the belt drive mechanism is supported. Providing compliance to the first, second, third and fourth belt drive mechanisms 238, 240, 242, 244 allows them to apply a force to the solar panels 1 once loaded into the hopper enclosure 216 to help retain the solar panels 1 within the hopper enclosure 216, and to facilitate manipulation and advancement of the solar panels 1 within the hopper enclosure 216 during an installation phase as will be explained in greater detail below.

The solar panel dispensing hopper 214 can further comprise a support frame 246 operable to provide support to the hopper enclosure 216 (and its sidewalls), as well as, in some examples, to house or otherwise provide support to the other components of the solar panel dispenser 214, such as one or more components of the panel acquisition and placement system 247 (e.g., the flippers and panel pushers discussed herein). Indeed, the components of the panel acquisition and placement system 247 can be coupled or mounted to the support frame 246 in a manner so as to achieve their intended function. The support frame 246 can be integrally formed with the hopper enclosure 216, or it can be a separate structural element or combination of elements that couple or otherwise join to the hopper enclosure 216. The support frame 246 can extend around one or more sides of the solar panel dispensing hopper 214, and can comprise any size, shape, components or configuration. The hopper enclosure 216 and the support frame 246 can be made of metal, composite(s), or a high strength polymer material. Furthermore, the support frame can comprise an interface feature, such as a structural channel or other interface feature(s) designed and configured to interface with an installation vehicle and/or a torque tube spanning bridging support member, a multi-degree of freedom platform (e.g., an X-Y table), etc. such as described herein, and operable to facilitate support of the solar panel dispensing hopper 214 by or otherwise within an installation vehicle or a bridging support member. As discussed above with respect to the solar panel dispenser 114 of FIG. 1, in one example the solar panel dispensing hopper 214 can be a self-contained type of dispensing hopper. In this case, the support frame 246 can be used to removably interface with one or more suitable structural members of the installation vehicle and/or the torque tube spanning bridging support member that is intended to carry and support the solar panel dispensing hopper 214 in an overhead position relative to a torque tube of a panel support assembly (i.e., a solar tracking system). In another example, the solar panel dispensing hopper 214 can be integrally formed with and part of an installation vehicle, a multi-degree of freedom platform (e.g., an X-Y table), or a torque tube spanning bridging support member. In this case, the support frame 246 can be used to more permanently interface with one or more structural members of the installation vehicle and/or the torque tube spanning bridging support member. It will be apparent to those skilled in the art that the support frame 246 can comprise a number of different components, mechanisms, sizes, shapes and/or configurations. As such, the support frame 246 shown here is not intended to be limiting in any way.

The solar panel dispensing hopper 214 can further comprise an open bottom 225 (or exit opening 225 located at the bottom) that defines, at least in part, and that operates as an exit through which the individual solar panels 1 pass as they are caused to be dispensed from the hopper enclosure 216 and the solar panel dispensing hopper 214 and as they are installed from an overhead position into a solar panel retention system of a panel support assembly. In other words, the hopper enclosure 216 can comprise an exit or exit opening 225 suitably configured to permit the passage of a solar panel therethrough. The open bottom 225 can be defined by the hopper enclosure 216 and its various sidewalls, as well as the support frame 246. In other words, the open bottom 225, or the opening 225 at the bottom of the solar panel dispensing hopper 214, can extend through and be defined by the various components of the solar panel dispensing hopper 214 so that the solar panels 1 can properly be caused to exit the opening 225 and be dispensed from the solar panel dispensing hopper 214 from the bottom that facilitates installing the solar panels with the solar panel dispensing hopper 214 in an overhead position relative to a panel support assembly. How the solar panels 1 are supported within the solar panel dispensing hopper 214 (e.g., vertically), how they are individually presented for dispensing, and how they are ultimately dispensed through the opening 225 will be described in detail below.

Figure 4:
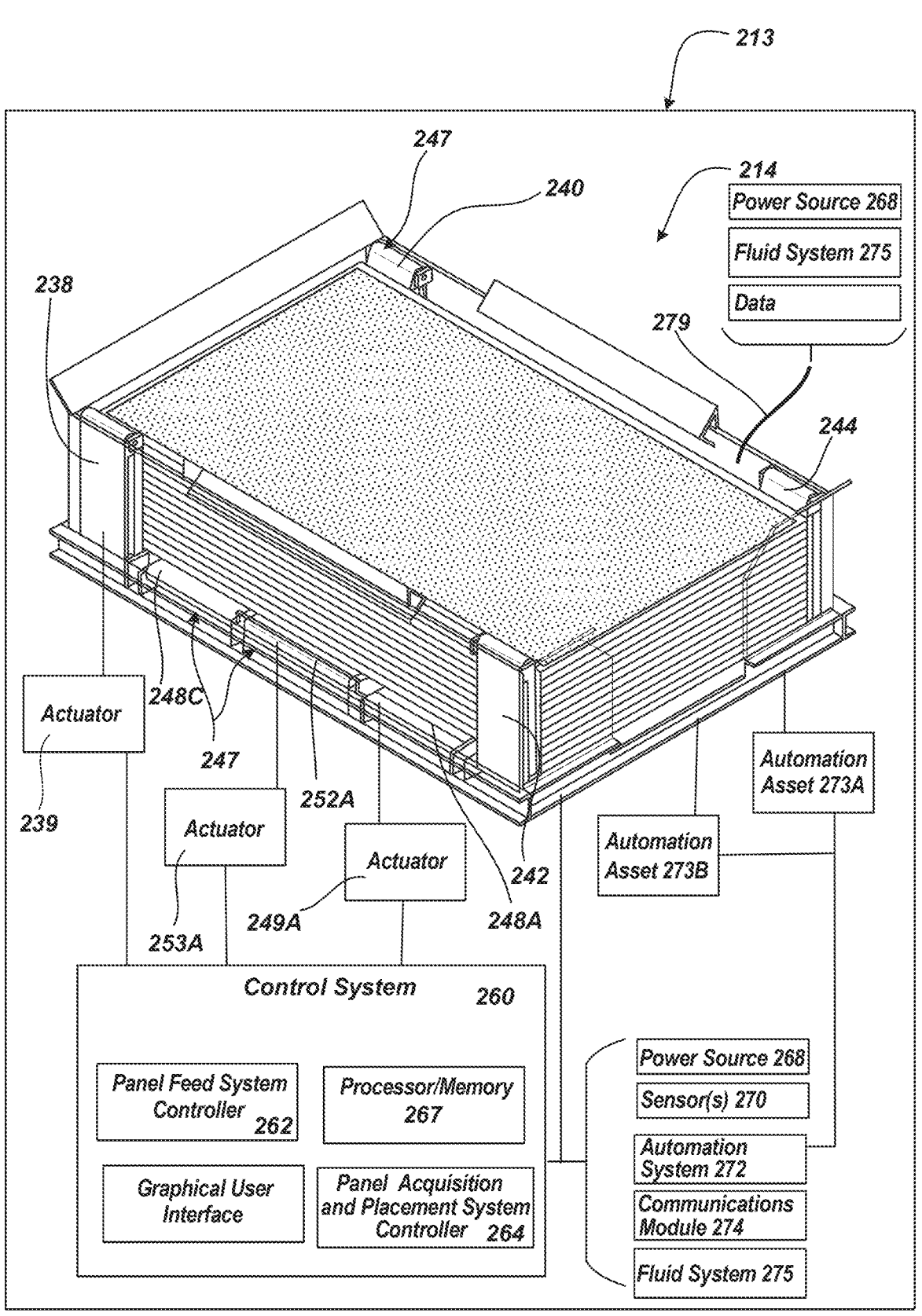
FIG. 4 illustrates a solar panel presentation system as part of a solar panel installation system, the solar panel presentation system comprising the solar panel dispensing hopper of FIG. 3, in accordance with an example of the present disclosure.

With reference to FIG. 4, and with continued reference to FIG. 3, illustrated is a solar panel presentation system 213 as part of a solar panel installation system (e.g., see 110 of FIG. 1). The solar panel presentation system 213 can comprise a solar panel dispensing hopper, such as the solar panel dispensing hopper 214 of FIG. 3 (with its panel feed system 237 and its panel acquisition and placement system 247), a control system 260, one or more power sources 268, one or more sensors 270, an automation system 272, and a communications module 274. The solar panel dispensing hopper 214 can be capable of receiving and housing therein one or more solar panels 1 (see plurality of solar panels 1 arranged in a horizontal stack). In one example, the control system 260, the one or more power sources 268, the communications module 274, the one or more sensors 270, and the automation system 272 can all be supported on and part of the solar panel dispensing hopper 214. In another example, these can all be supported on an installation vehicle operable with the solar panel dispensing hopper 214. In another example, some of these can be supported on and part of the solar panel dispensing hopper 214 with the others being supported on and part of the installation vehicle.

The control system 260 can comprise a panel feed system controller 262 as part of the panel feed system 237, the panel feed system controller 262 being configured to operate and control the one or more panel feed systems 237 of the solar panel dispensing hopper 214, for example belt drive mechanisms 238, 240, 242, and 244. In this example, the panel feed system controller 262 can be operably connected to an actuator 239, such as a motor, which is operable to power the belt drive mechanism 238 as controlled by the panel feed controller 262. Although not shown, each of the remaining belt drive mechanisms 240, 242, and 244 can be powered by a respective actuator, such as a motor, with each of these operably connected to the panel feed controller 262. In another example, one or more motors less in number than the total number of belt drive mechanisms can be used to power the various belt drive mechanisms 238, 240, 242, and 244 using an associated drive assembly that connects two or more of the belt drive mechanisms to the motor. For example, a single motor could be used with a drive or force transfer mechanism to power all of the belt drive mechanisms 238, 240, 242, and 244. This would ensure that each drive belt is actuated in sync with every other drive belt. Or, two motors with a drive or force transfer mechanism can be used to drive the four belt drive mechanisms 238, 240, 242, and 244. As will be appreciated, any number of motors and drive belts can be employed. It is noted that with separate motors, each individual drive belt of the plurality of belt drive mechanisms could be actuated independent of any other drive belt(s). This may be useful in some circumstances. Even with the use of individual motors associated with each of the belt drive mechanisms 238, 240, 242, and 244, the panel feed controller 262 can be configured to provide synchronous driving of each of the belt drive mechanisms 238, 240, 242, and 244.

The control system 260 can further comprise a panel acquisition and placement system controller 264 configured to operate and control the various moveable and actuatable arms, such as the flippers of the panel acquisition and placement system 247 (e.g., see flippers 248A and 248C; these being shown, with the two flippers on the other side of the solar panel dispensing hopper 214 being out of view, but present in the same way as flippers 248A and 248C) of the solar panel dispensing hopper 214. In this example, the panel acquisition and placement system controller 264 can be operably connected to an actuator 249A, such as a motor, which is operable to power the flipper 248A as controlled by the controller 264. Although not shown, each of the remaining flippers (i.e., flippers 248C and the two not shown) can be powered by a respective actuator, such as a motor, with each of these operably connected to the panel acquisition and placement system 264. In another example, the flippers can be actuated using a fluid actuator system, such as a hydraulic or pneumatic actuator system, comprising various actuators at each of the flippers that are operable with a valve and fluid delivery system comprising a pressure source for supplying pressurized fluid to each of the actuators. The fluid actuator system can be controlled by the panel acquisition and placement system controller 264, and configured to actuate each of the flippers independent of one another in order to facilitate the proper manipulation and dispensing of the solar panels to be installed.

The panel acquisition and placement system controller 264 can be configured to also operate and control the various pushers (see pusher 252A being shown) of the panel acquisition and placement system 247, with the other pusher on the other side of the solar panel dispensing hopper 214 being out of view, but present in the same way as pusher 252A of the solar panel dispensing hopper 214. In this example, the pusher 252A can be operably connected to an actuator 253A, such as pusher motor, which is operable to power the pusher 252A as controlled by the panel acquisition and placement system 264. Although not shown, each of the remaining pushers can be powered by a respective actuator, such as a motor, with each of these operably connected to the panel acquisition and placement system 264. In another example, the pushers can be actuated using a fluid actuator system, such as a hydraulic or pneumatic actuator system, comprising various actuators at each of the pushers that are operable with a valve and fluid delivery system comprising a pressure source for supplying pressurized fluid to each of the actuators. The fluid actuator system can be configured to actuate each of the pushers independent of one another in order to facilitate the proper manipulation, dispensing, and installation of the solar panels to be installed. It is noted that, although not necessary, the pushers 252A and the flippers 248A and 248C can be supported and arranged along a common axis within the hopper enclosure 216, as shown.

Although not shown, each of the flippers on the other side of the hopper enclosure 216 (flippers 248B and 248D) can be operably connected to an actuator (also not shown), which actuator can be operably connected to the panel acquisition and placement system 264. The flippers 248A and 248C can be actuated independent of the flippers on the other side of the hopper enclosure 216, and in some examples, they can be operated independent of each other. With the flippers (e.g., flippers 248A and 248C) on one side of the hopper enclosure 216 being actuatable independent of the flippers on the other side of the hopper enclosure 216, a lead solar panel being dispensed from the solar panel dispensing hopper 214 can be manipulated as needed to control the elevation of each side of the lead solar panel. Likewise, the pushers 252A and 252B can be connected to independent actuators (only actuator 253A being shown), and therefore operated independent of one another so that a lead solar panel being dispensed can be manipulated as needed. Indeed, a pusher on one side can be actuated by one actuator and caused to be rotated and to exert a force (e.g., a downward force) on one side of the solar panel, and the other pusher can be actuated by a different actuator and caused to be rotated and to exert a force on a different side of the solar panel. Of course, the flippers and the pushers can be operated independent of one another, but still in sync with one another, or out of sync.

The control system 260 can further comprise a computing device having one or more processors and memory (e.g., one or more memory devices) associated with the one or more processors, wherein these are operable to facilitate processing and storage of data and to execute instructions that facilitate the overall functionality of the control system 260 and the solar panel presentation system 213. Indeed, the control system 260 can comprise, or otherwise be operable with, one or more processors and one or more memory devices operatively coupled to or otherwise associated with at least one of the one or more processors and having instructions stored thereon that, when executed by at least one of the one or more processors, cause the components or elements of the solar panel dispensing hopper 214 and/or the solar power presentation system 213 described herein to perform one or more tasks related to the installation of solar panels 1 into a panel support assembly 2.

The solar panel presentation system 213 can further comprise or be associated with one or more power sources

268 configured to supply power to the solar panel dispensing hopper 214 and its various components, systems, subsystems, as well as to any other components, systems, mechanisms within the solar panel presentation system 213. The control system 260 can further be operably connected to the power source 268 to facilitate control and operation of the power source 268. In one example, the power source 268 can be on-board the solar panel dispensing hopper 214, such as a plurality of batteries. In another example, the power source 268 can be independent of and located away from the solar panel dispensing hopper 214, but operably connected to the solar panel dispensing hopper 214 using an umbilical 279 that carries, via a power distribution line, power from the power source to the solar panel dispensing hopper 214, or any other component or system within the solar panel presentation system 213, as controlled by the control system 260. For instance, the solar panel dispensing hopper 214 can be operably connected to a power source on the installation vehicle in support of the solar panel dispensing hopper 214 via the umbilical 279, and thus the solar panel dispensing hopper 214 can obtain its power from the installation vehicle.

The umbilical 279 can further be operable to carry at least one of power, data, or pressurized fluid to the solar panel presentation system 213 that is external to and independent of the solar panel presentation system 213. Specifically, the umbilical 279 can comprise a power distribution line configured and used to carry power to any of the actuators, the control system, etc. of the solar panel presentation system. The umbilical 279 can also comprise a data distribution line configured and used to carry data to and from the control system 260 or any other systems or components within the solar panel presentation system 213. The umbilical 279 can also comprise a fluid distribution line configured and used to carry pressurized fluid from a fluid actuator system 275 to and from the solar panel dispensing hopper 214 or any other systems or components within the solar panel presentation system 213 utilizing fluid control, such as a hydraulic or pneumatic fluid actuator.

The solar panel presentation system 213 can further comprise one or more sensors 270 configured to collect and gather information related to the solar panel dispensing hopper 214, the installation vehicle in support of the solar panel dispensing hopper 214, the installation process, the panel support assembly 2, and others. The control system 260 can be operably connected with the one or more sensors 270 that are part of or otherwise operable with the solar panel dispensing hopper 214. In other words, the control system 260 can be operable to control the various components within the solar panel presentation system 213, including the solar panel dispensing hopper 214, in a manual, semi-automated or fully automated manner, and to gather and process information from the one or more sensors 270 to facilitate operation of the solar panel presentation system within an operation environment using the data provided by the sensors 270. For example, the data from the sensors 270 can be used to monitor and measure actuator usage, forces acting on various components of or within the solar panel presentation system 213, be operable with the an automation system to produce combined images, stereo images, depth maps, or other images that can be processed and used by algorithms or software stored in the memory to allow, for instance, the installation vehicle supporting the solar panel dispensing hopper 214 to correctly align with a panel retention system, avoid collisions with objects or personnel in an operating environment, avoid restricted areas, interact with objects, or to move about the environment. The sensor (s) 270 can comprise a variety of types, and can be deployed in a variety of locations. The sensor(s) can be part of an automation system 272 that facilitates partial or fully automated installation of the solar panels 1 into the panel support assembly 2. One or more sensors 270 can further be associated with the belt drive mechanisms 238, 240, 242, 244 and/or their drive mechanisms, the pushers (see pusher 252A), the flippers (see flippers 248A, 248C), the various actuators controlling these (see actuators 239, 249A, 253A), other actuators within the solar panel dispensing hopper 214, the hopper enclosure 216, the support frame 246, or any other aspect of the solar panel dispensing hopper 214. Essentially, it is contemplated that one or more sensors 270 can be deployed to be associated with any of the components, devices, systems of the solar panel dispensing hopper 214 and/or the solar panel presentation system 213, as well as the solar panels 1 themselves.

The solar panel presentation system 213 can further comprise a computer automation system 272 that is operable to facilitate partial or fully automated installation of the solar panels 1 into the panel support assembly 2. The control system 260 can be operably connected with the computer automation system 272 that is part of or otherwise operable with the solar panel presentation system 213 in support of the solar panel dispensing hopper 214. The computer automation system 272 can comprise a number of automation assets in the form of sensors, such as one or more of the sensors 270, or other sensors and/or devices, that facilitate partial or fully automated installation of the solar panels 1 into the panel support assembly 2. In addition, the computer automation system can comprise a number of different types of automation assets, such as different types of sensors and/or devices. For example, the types of sensors that can be utilized in the computer automation system 272 include, but are not limited to imaging sensors (e.g., cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, and/or a structured light sensor, or any combination of these).

While some of the sensors of the automation system 272 discussed herein are identified as imaging sensors (e.g., cameras), it is to be understood that any of these can be sensors of any type and may be used to accomplish vision or other types of sensing by the solar panel presentation system 213. For example, the cameras/sensors can provide fluorescence imaging, hyperspectral imaging, or multispectral imaging. Furthermore, some of the sensors can be audio sensors (e.g., microphones, sonar, audio positioning sensors or others), chemical sensors, electromagnetic radiation sensors (e.g. antennas with signal conditioning electronics), magnetometers (single axis and multi-axis magnetometer) and radars. In short, any sensor, imager, recorder, or other device, and any combination of these, can be used in the configuration of the sensors 270 described herein. The computer automation 272 can further comprise one or more emitters, such as ultrasonic emitters, to assist in locating certain objects.

One or more computer automation assets or fiducials 273A and 273B, as part of the computer automation system 272, can be attached to the solar panel dispensing hopper 214 at any location. The automation assets 273A and/or 273B can comprise the computer automation system sensors and/or devices discussed above (e.g., an imaging system comprising one or more imaging sensors, such as one or more cameras), or any other types of sensors and/or other types of devices. The computer automation assets can gather and provide information, such as visual, audio or other information, to the control system 260. The control system 260 can utilize the information to assist the solar panel dispensing hopper 214 in any number of automated tasks. For example, the automation system 272 can be used to identify and locate in three-dimensional space the panel support assembly 2 and its various components. The automation system 272 can further be configured to facilitate the proper positioning, orienting, and dispensing of the solar panels 1 from the solar panel dispensing hopper 214 by locating and comparing the position and orientation of the solar panels 1 to be dispensed relative to the position and orientation of the solar panel retention system of the panel support assembly 2 into which a solar panel is to be installed. Of course, this is not intended to be limiting in any way as those skilled in the art will recognize that the automation system 272 can be configured to perform a number of different functions related to facilitating the automated dispensing and installing of the solar panels 1 onto the panel support assembly 2.

In one example, the computer automation system 272 can comprise one or more processors and memory for executing software code capable of facilitating the function of the automation system 272. Alternatively, the automation system 272 can be operably connected with the control system 260 having one or more processors and memory or a top-level control system (e.g., see top-level control system 113 of FIG. 1) having one or more processors and memory, or both.

The solar panel presentation system 213 can further comprise a communications module 274 operable to transmit and receive data, such as command signals, to and from the control system 260. The communications module 274 can comprise a wireless system, or a combination of wired and wireless systems. The control system 260 can be operably connected to the communications module 274 that is part of or otherwise operable with the solar panel dispensing hopper 214 and any other appropriate components, systems, mechanisms within the solar panel presentation system 213. The control system 260 can utilize the communications module 274 to transmit and receive data from the various components, devices, systems operating within the solar panel presentation system 213 using known protocols.

It is noted that the control system 260, with each of the individual controllers, 262, 264, and 266, respectively, and the processor(s)/memory 267, can be a local or standalone control system within the solar panel dispensing hopper 214 and/or the solar panel presentation system 213. In this example, the control system 260 can also be operably connected to a top-level control system (e.g., see top-level control system 112 of the solar panel installation system 110 of FIG. 1). Alternatively, the control system 260 can be an integral part of a top-level control system of the solar panel installation system (see top-level control system 112 of the solar panel installation system 110 of FIG. 1).

With reference to FIGS. 5A-5D, and with continued reference to FIGS. 3-4, illustrated are detailed views of the exemplary solar panel dispensing hopper 214 of the solar panel presentation system 213. As indicated above, the solar panel dispensing hopper 214 can comprise a panel feed system 237. In the example shown here, the panel feed system 237 comprises a plurality of belt drive mechanisms, such as first, second, third and fourth belt drive mechanisms 238, 240, 242, 244, which are positioned and supported within the hopper enclosure 216 so as to be able to act upon the solar panels 1. Each of the first, second, third and fourth belt drive mechanisms 238, 240, 242, 244 can be configured in the same way. As such, only the belt drive mechanism 244 is shown in detail, it being understood that the other belt drive mechanisms can comprise the same features, elements and functionality. The belt drive mechanism 244 can comprise a support chassis 281 configured to mount to a sidewall of the hopper enclosure 216 of the solar panel dispensing hopper 214, thereby facilitating the mounting of the belt drive mechanism 244 to the hopper enclosure 216. The belt drive mechanism 244 can further comprise a drive roller 282 and a passive roller 283 rotatably coupled to the support chassis 281 at an offset distance from one another. The drive roller 282 and the passive roller 283 can be operable to receive and support a drive belt 280. The drive belt 280 can be supported in tension, and the drive roller 282 and/or the passive roller 283 can be configured to be adjustable so as to permit adjustment of the offset spacing between these, and therefore the tension in the drive belt 280. The drive roller 282 can be operable with the actuator 239 that functions to actuate the movement and rotation of the drive roller 282, and therefore the drive belt 280 around the drive roller 282 and the passive roller 283. The actuator 239 can actively drive the drive roller 282, and therefore the drive belt 280, in a bi-directional manner, meaning in opposing directions (e.g., a clockwise of forward direction and a counterclockwise or reverse direction). In some examples, the actuator 239 can further be operable with the passive roller 283 to also drive the passive roller 283, wherein the passive roller 283 would be then referred to and function as a second drive roller.

Figures 5A, 5B, 5C, 5D:
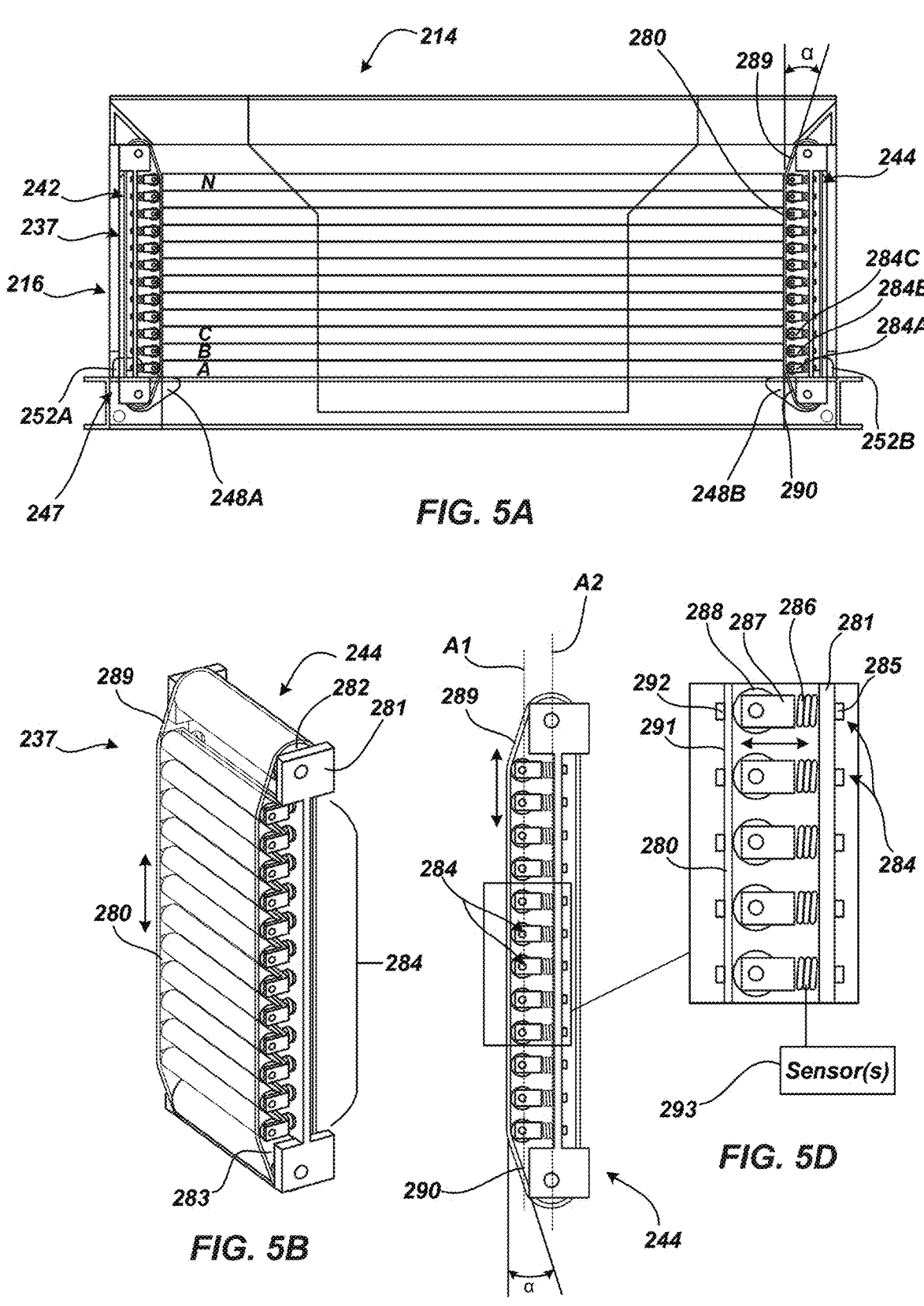
FIGS. 5A-5D illustrate various views of the solar panel dispensing hopper of FIG. 3, which is part of the solar panel presentation system of FIG. 4.

The panel feed system 237 can further comprise one or more force applicators operable to apply a force to one or more solar panels contained within the hopper enclosure 216 as the panel feed system is actuated. The applied force from the force applicators can function to maintain a vertical position of the solar panels within the hopper enclosure 216. The force applicators can further help to keep the solar panels aligned, and to assist in the advancement of the solar panels as the lead panel is dispensed. In this example, the panel feed system 237 comprises a plurality of force applicators that are part of each of the belt drive mechanisms. Using the belt drive mechanism 244 to illustrate, with the understanding that the other belt drive mechanisms can be similarly configured, the belt drive mechanism 244 can further comprise a plurality of force applicators 284 coupled to the chassis 281 between the drive roller 282 and the passive roller 283. The force applicators 284 can be configured to apply a force to the drive belt 280, as well as a solar panel in contact with the drive belt 280, as will be discussed in more detail below. Each of the force applicators 284 can comprise at least one post 285 in support of a roller carriage 287 and a force applicator roller 288. In the example shown, each force applicator 284 comprises two posts (see FIG. 5B showing first and second posts 285) supporting each end of each of the roller carriages 287 and the rollers 288, respectively, each of the posts 285 being mounted to the chassis 281 and slidable relative to the chassis 281 using sliding bearings, with the post(s) 285 extending away from a surface of the chassis 291 in a direction toward the drive belt 280. In this configuration, each end of each of the rollers 288 can be displaced independent of one another via the independent biasing member and post assembly in support of the respective rollers 288. Of course, this can be accomplished with a single post in support of each roller carriage and roller assembly. As shown, the length of the post(s) 285 can be sufficient so as to provide support to a biasing element or member, such as a coil or other type of spring (see coil spring 286) and the roller carriage 287 having a roller 288 rotatably supported thereby. The roller carriage 287 can be supported about an end of the post(s) 285 and the biasing member can be pre-loaded and supported about the post(s) 285 between the roller carriage 287 and the chassis 281 so as to bias the roller carriage 287 and the roller 288 (and also the drive belt 280) away from the chassis 281. The roller carriage 287 and the roller 288 can move in and out on the post(s) 285, with the spring(s) 286 operating to compress and to apply a biasing force to the roller carriage 287 to extend the roller carriage 287 and the roller 288. In this example, the individual force applicators 284 can be described or referred to as spring loaded rollers. Again, the primary purpose of the force applicators 284 is to apply a load to the individual solar panels within the stack of solar panels within the hopper enclosure 216 so as to hold each of the solar panels in a suspended vertical position (even if a lower solar panel of a given solar panel is not present). The force applied by the individual force applicators 284 can be accompanied by and can increase friction (static friction) present between the solar panels and the drive belt 280, which friction operates to hold the solar panels in a vertical suspended position within the hoper 216. The greater the biasing force applied by the force applicators 284 the greater the coefficient of static friction that will exist between the solar panels and the drive belt 280. As such, the coefficient of static friction can be tuned by tuning the biasing force within the force applicators 284 (e.g., in this case by varying the spring force within the biasing members). The force applicator rollers 288 of each force applicator can be passive rollers that rotate freely with the driving of the drive belt 280. Moreover, the rollers 288 can function to provide a shape and profile to the drive belt 280 by applying a force to the inside of the drive belt 280.

The plurality of force applicators 284 can be arranged along a common axis or reference plane A1, such as one that extends through the axis of rotation of each of the individual rollers 288. At the same time, the drive roller 282 and the passive roller 283 can also be supported along a common axis or reference plane A2, such as one that extends through the axis of rotation of each of these. The reference plane A1 and the reference plane A2 can be offset from one another, such that the reference plane A1 and the rotational axes of the respective rollers 288 are located further from the chassis 281 (e.g., outward and further away from the chassis) than the reference plane A2 and the rotational axes of the drive roller 282 and the passive roller 283. As configured, a portion of the drive belt 280 transitions from the drive roller 282 to the first force applicator 284 on an angle α as shown. In other words, the path of the drive belt 280 is altered by the force applicator 284 directly adjacent the drive roller 282 so as to produce an inclined portion 289 of the drive belt 280 between the drive roller and the force applicator 284 directly adjacent the drive roller 282. A similar inclined portion 290 of a portion of the drive belt 280 can be formed between the passive roller 283 and the force applicator 284 directly adjacent the passive roller 283.

The drive belt 280 can comprise a number of different configurations. In one example, the drive belt 280 can comprise a smooth outer contacting surface 291. In another example, the drive belt 280 can comprise a plurality of ridges or protrusions 292 extending upward from the surface

291. These ridges or protrusions 292 can be configured to be load bearing along an axis parallel to the contacting surface 291, such that they can support an object, such as a solar panel thereon. The protrusions 292 can engage a feature on the solar panel, such as holes or ledges. In this case, the protrusions 292 can bear some or all of the weight of the solar panel, thus allowing the friction between the drive belt 280 and the solar panels to be reduced to some extent as compared to a drive belt without such protrusions 292.

Each of the force applicators can further comprise one or more sensors (see sensor 293) operable to monitor the force being applied by the force applicators to the drive belt and any object in contact with the drive belt, such as a solar panel. The sensor(s) can comprise any suitable type capable of measuring a force or load, such as a load cell. The load cell can be supported between the roller 288 and the chassis 281.

FIG. 5A illustrates a cutaway end view of the solar panel dispensing hopper 214 showing the belt drive mechanism 242 and the belt drive mechanism 244 as installed and mounted within the hopper enclosure 216, such that they are aligned with and facing one another (the outer surfaces of the respective drive belts face one another). As indicated above, it is to be understood that the solar panel dispensing hopper 214 comprises two additional opposing (i.e., they are supported within the hopper enclosure so that the drive belts of each face one another) belt drive mechanisms that are not shown here, but that can be seen in FIGS. 3 and 4 (see belt drive mechanisms 238 and 240). The belt drive mechanisms 238 and 240 are also mounted within the hopper enclosure 216, such that they are aligned with and facing one another (the outer surface of the respective drive belts face one another), with the belt drive mechanism 238 operable to interface with and apply a force to a first edge or side of one or more solar panels 1 within the hopper enclosure 216. Likewise, the belt drive mechanism 240 can be operable to interface with and apply a force to an opposing or second edge or side of the one or more solar panels within the hopper enclosure 216. The application of opposing forces applied to the one or more solar panels can be sufficient to support the weight of the one or more solar panels, or in other words, to overcome any gravitational forces acting on the one or more solar panels so as to suspend the one or more solar panels within the hopper enclosure 216. The belt drive mechanisms 242 and 242 are located about a first end of the hopper enclosure 216, with the belt drive mechanisms 238 and 240 being located about a second end of the hopper enclosure 216. In these positions, the belt drive mechanisms 238, 240, 242, and 244 are positioned and configured to apply a force to the solar panels 1 loaded into the hopper enclosure 216. Indeed, as the solar panels 1 are loaded into the hopper enclosure 216, they are disposed within the interior volume 226 of the hopper enclosure 216 so as to be situated between the opposing pairs of belt drive mechanisms, wherein the belt drive mechanisms 238, 240, 242, and 244 are operable to apply a force to the solar panels 1 since the solar panels operate to displace or compress the individual force applicators of the respective belt drive mechanisms 238, 240, 242, and 244 as the solar panels comprise a width that is greater than a distance between opposing belt drive mechanisms. Moreover, as discussed above, the belt drive mechanisms 238, 240, 242, and 244 each comprise a plurality of individually supported force applicators 284. In one example, the individually supported force applicator 284 of each of the respective belt drive mechanisms 238, 240, 242, and 244 can be spaced apart from one another at a distance that equals a thickness of a solar panel to be loaded into the hopper enclosure 216. As such, with a stack of solar panels 1 loaded into the hopper enclosure 216, each of the force applicators 284 from each of the belt drive mechanisms 238, 240, 242, and 244 is configured to be aligned with a center or midpoint of a thickness of a respective solar panel (the midpoint being located between an upper and lower surface of the solar panel). For example, the force applicator 284A of the belt drive mechanism 244 can apply a force to the solar panel A from one side. Likewise, the counterpart force applicator 284a of the belt drive mechanism 242 can apply a similar but opposing force to the solar panel A from the opposite side of the solar panel A. The same can be said of the belt drive mechanisms 238 and 240. These opposing forces can be sufficient to manipulate the solar panel A upon actuation of the drive belts of the belt drive mechanisms 238, 240, 242, and 244. Similarly, the force applicators 284B can be configured to apply a force to solar panel B, and force applicators 284C can be configured to apply a force to solar panel C.

It is contemplated that in some cases the solar panels 1 can be slid along the respective drive belts 280 of the various belt drive mechanisms 238, 240, 242, and 244 as they are being loaded into the hopper enclosure 216. However, in some cases, it may not be possible or desirable to induce sliding between the solar panels 1 and the drive belts 280 of the belt drive mechanisms 238, 240, 242, and 244. In such a case, the belt drive mechanisms 238, 240, 242, and 244 can be actuated so as to cause the drive belts 280 to rotate upon the solar panels 1 coming into initial contact with the drive belts 280. With the solar panels 1 in contact with the respective drive belts 280 of the belt drive mechanisms 238, 240, 242, and 244 (most likely at or within the upper inclined portions 289), actuation of the belt drive mechanisms 238, 240, 242, and 244 can operate to draw the solar panels downward and into the hopper enclosure 216. In doing so, each of the respective force applicators 284 of the belt drive mechanisms 238, 240, 242, and 244 can be displaced and loaded (or additionally loaded beyond a preload) as the solar panels are caused to come into contact with them (indirectly through the drive belt 280) and to be moved past them. The solar panels 1 can be considered properly loaded in the hopper enclosure 216 when the bottom-most solar panel, also known as the lead solar panel, is disposed between the first set of force applicators 284 that are directly adjacent the passive rollers 283 of the belt drive mechanisms 238, 240, 242, and 244. This is shown clearly in FIG. 5A.

It is noted that the upper inclined portions 289 of each belt 280 of each of the belt drive mechanisms 238, 240, 242, and 244 can operate as a lead-in for a solar panel or stack of solar panels being loaded into the hopper enclosure 216, wherein the several inclined portions can help guide the solar panels into a proper loaded position within the hopper enclosure 216.

As shown, and as briefly discussed above, the solar panel dispensing hopper 214 can further comprise a panel acquisition and placement system 247 operable to acquire a lead solar panel (e.g., either directly from the hopper enclosure itself, or as presented by the panel feed system 237), to manipulate the lead solar panel into an installation position, and to install the solar panel into a panel retention system within a panel support assembly 2 such that the lead solar panel is retained in an installed position. The panel acquisition and placement system 247 can comprise a variety of different types of configurations, systems, mechanisms. In one example the panel acquisition and placement system 247 can comprise a first set of moveable and actuatable arms operable to position one or more panel capture assets. In the example shown, the first set of moveable arms can comprise two or more flippers rotatably supported within the hopper enclosure 216 proximate or about the exit opening of the hopper enclosure 216 (see flippers 248A and 248B in FIG. 5A with the understanding that the solar panel dispensing hopper 214 can comprise one or more additional flippers not shown), wherein the flippers can be configured to receive and support the lead solar panel, and to manipulate a position and orientation of the lead solar panel relative to the hopper enclosure 216. The panel acquisition and placement system 247 can further comprise a second set of moveable and actuatable arms that are configured to be operated in a coordinated manner with the first set of moveable arms. In the example shown, the second set of moveable arms can comprise two or more panel pushers (see pushers 252A and 252B) also rotatably supported within the hopper enclosure 216 proximate or about the exit opening of the hopper enclosure 216, the pushers being operable to apply a downward force to the lead solar panel. The flippers can each be rotatably coupled to the hopper enclosure 216 or the support frame 246 of the solar panel dispensing hopper 214, and configured to rotate about an axis of rotation. Moreover, the flippers can each be actuatable via a motor or other actuator, and controlled via a control system or module. The flippers can further comprise opposing planar surfaces. In one example, the opposing planar surfaces can taper and converge toward each other as the surfaces extend away from the axis of rotation of each flipper. The flippers can further comprise a transition surface, such as a rounded or cam surface extending between each of the opposing planar surfaces. Each of these is discussed more fully below.

It is noted that the specific panel feed system 237 and the panel acquisition and placement system 247 (with its first and second set of moveable arms in the form of flippers and panel pushers, respectively) shown in the drawings and discussed above are merely examples of such systems. Indeed, those skilled in the art will recognize other configurations operable to advance panels within a hopper to achieve the purposed intended, as discussed herein. Likewise, those skilled in the art will recognize other moveable arm configurations operable to manipulate a lead solar panel into an installation position, and to present the lead panel to and install the lead panel within a panel retention system of a panel support assembly. As such, those discussed herein and shown in the drawings are not intended to be limiting in any way.

Figure 6:
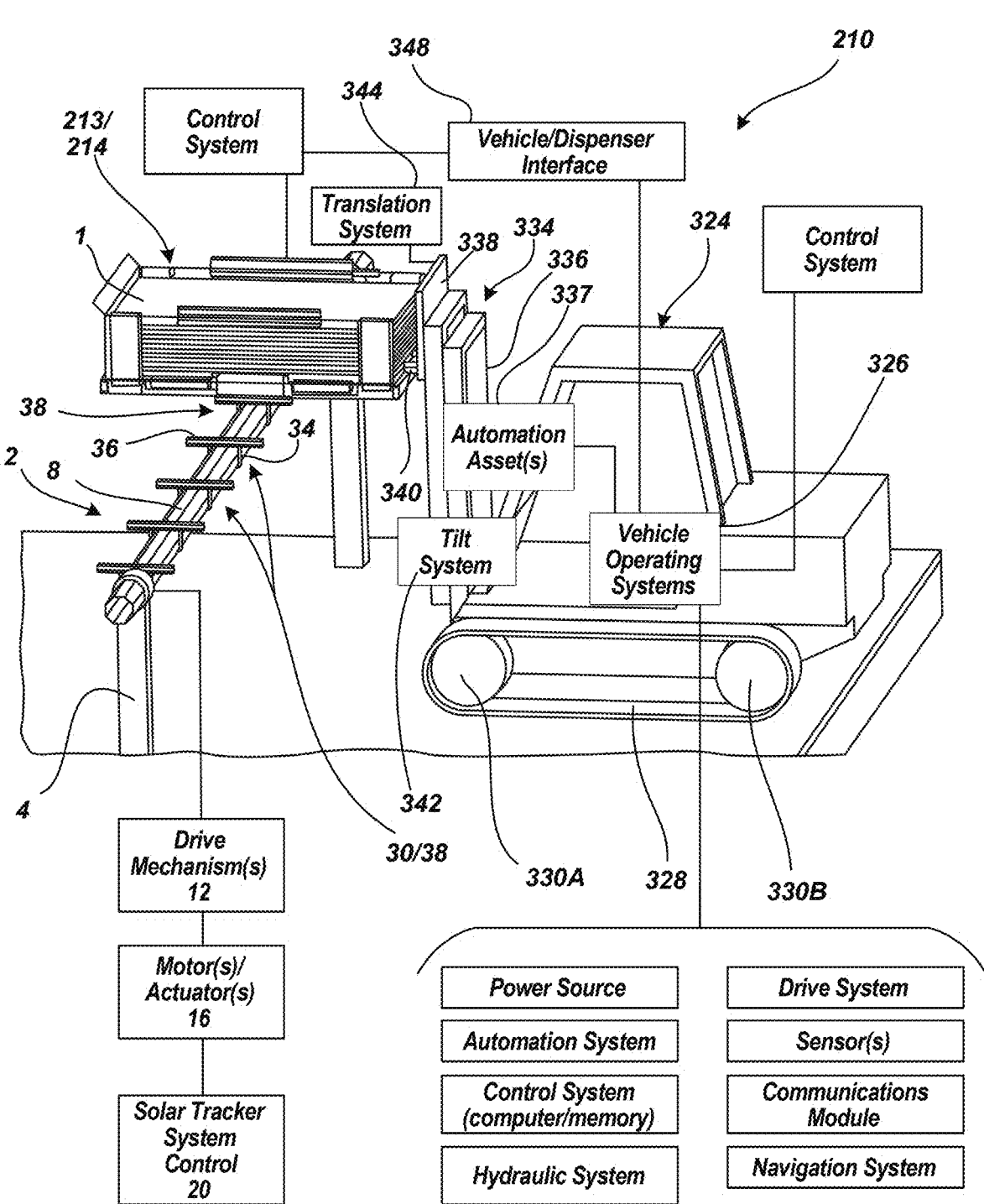
FIG. 6 illustrates a solar panel installation system in accordance with an example of the present disclosure, the example solar panel installation system comprising the solar panel presentation system of FIG. 4 with the solar panel dispensing hopper of FIGS. 3 and 5A-5D.

With reference to FIG. 6, illustrated is a solar panel installation system 210 operable to install a plurality of solar panels within a panel support assembly 2 in accordance with an example of the present disclosure. In this example, the solar panel installation system 210 can facilitate manual installation of solar panels, or fully or partially automated installation of solar panels. The panel support assembly 2 shown in this example comprises a type in the form of a solar tracking system. The panel support assembly 2 can comprise one or more ground supports 4 that are securely anchored to the ground or another surface or structure. In this example, the ground supports 4 are shown as posts anchored within the ground, but this is not intended to be limiting in any way. The panel support assembly 2 can further comprise a torque tube 8 that is rotationally supported by the ground supports 4, such that the torque tube 8 can rotate relative to the ground supports 4 and the ground. The panel support assembly 2 can further comprise or otherwise be operable with one or more drive mechanisms 12 operable with one or more motors or actuators 16, respectively. The panel support assembly 2 can further comprise or otherwise be operable with a solar tracking system control 20 that functions to control operation of the solar tracking system and its components.

The panel support assembly 2 can further comprise or be in support of a plurality of panel mount assemblies 30 configured in a manner as taught herein so as to facilitate overhead installation of solar panels from a solar panel dispensing hopper of a solar panel presentation system. The panel mount assemblies 30 can each comprise a torque tube clamp 34 that clamps or otherwise mounts or couples or attaches to the torque tube 8, and that supports and that is operable with a panel mount 36. The panel support assembly 2 can further comprise or be in support of one or more solar panel retention systems 38, each comprising one or more of the panel mount assemblies 30. In the example shown, each panel retention system 38 comprises two panel mount assemblies 30, each panel mount assembly 30 being operable to receive and retain one side of two adjacent solar panels. Moreover, in one example, the panel mounts 36 of the panel mount assemblies 30 can be supported by the torque tube 8 in an orientation so as to be transverse (e.g., orthogonal or otherwise transverse) to the torque tube 8. More specifically, each panel mount 36 can comprise one or more retaining features designed and configured to receive and capture and secure a portion (e.g., a side) of a solar panel therein. The retaining features can be oriented such that a longitudinal axis of the retaining features is oriented transverse (e.g., orthogonal or otherwise transverse) to the torque tube 8, or more particularly to the longitudinal axis of the torque tube 8. For example, a panel mount 36 comprising a channel for receiving an edge or side of a solar panel can comprise a longitudinal axis (an axis parallel to the edge of the solar panel retained within the channel) that is transverse to a longitudinal axis of the torque tube 8. This particular orientation can facilitate installation of solar panels within the various panel retention systems 38, each comprising one or more panel mount assemblies 30, in a direction along the longitudinal axis of the torque tube 8, rather than laterally from the side, such as with an solar panel installation system configured for and capable of overhead installation of solar panels, as will be discussed in greater detail below.

The solar panel installation system 210 can comprise the solar panel presentation system 213 having the solar panel dispensing hopper 214 of FIGS. 3-5C capable of receiving and housing therein one or more solar panels 1 (see plurality of solar panels 1 arranged in a horizontal stack), and a solar panel installation vehicle 324 operable to lift, carry and transport the solar panel dispensing hopper 214. The solar panel dispensing hopper 214 can be operable with the installation vehicle 324 to facilitate overhead installation of the solar panels 1 within the panel mount assemblies on the panel support assembly 2.

The installation vehicle 324 can comprise a variety of different types. In the example shown, the installation vehicle 324 comprises a utility or industrial vehicle similar to a forklift (or it can comprise a type of forklift). The installation vehicle 324 can be operated manually. In another example, the installation vehicle 324 can comprise a variety of different navigation and/or automation systems, such as navigation systems of various types, vision systems, and control systems, to facilitate semi-automated or fully automated operation and installation. In one example, the installation vehicle 324 can comprise an automated guided vehicle (AGV), in this case a forked automated guided vehicle, which can utilize radio waves, vision devices, magnets, or lasers for automated navigation. Indeed, the installation vehicle can utilize a number of different types of navigation systems depending upon the environment in which the solar panels are being installed. Example navigation systems include, but are not limited to wired, guide tape, laser target, inertial guidance systems, (gyroscopic), natural feature (natural target), vision guidance systems, Geoguidance systems, precision satellite-based radio navigation systems, such as a global navigation satellite systems (GNSS), and more specifically Global Positioning Systems (GPS), robotic mapping systems, or any combination of these. The installation vehicle can utilize any one of these or other systems, along with various associated automation assets 337 associated with the installation vehicle 324, the solar panel dispensing hopper 214, the panel support assembly 2, or any combination of these. The automation assets 337 can include, but are not limited to, various sensors and sensor types, detection assets, emission assets (e.g., ultrasonic emitter(s), laser(s)), imaging systems and assets, and others. Indeed, it is contemplated that any assets needed to facilitate operation of the specific one or more navigation systems deployed to enable semi-automated or fully automated installation of the solar panels 1 can be part of the solar panel installation system (see 110 of FIG. 1).

The installation vehicle 324 can be equipped with a number of operating systems 326 that facilitate and enable both the maneuvering and operation of the installation vehicle itself, and, the installation of solar panels into the panel support assembly. These can include, but are not limited to, at least one of one or more power sources, a drive system or subsystem, an automation system or subsystem with its one or more automation assets (e.g., imaging devices, detectors, emitters) mounted on or otherwise supported by the installation vehicle 324, a control system or subsystem, a communications system or subsystem, a hydraulic system or subsystem, one or more sensors, a navigation system for automated or semi-automated navigation, or others.

The drive system or subsystem can facilitate and enable locomotion and various movements of the installation vehicle 324 within an environment and during an installation period. The drive system or subsystem will not be discussed in detail herein, but can comprise any of the components, systems, mechanisms, and computer control necessary for the installation vehicle 324 to drive, turn or steer, and to otherwise move about a ground or other surface or structure. The drive system or subsystem can be operable with one or more actuators and/or power sources (e.g., batteries and one or more electric motors, a gas internal combustion engine, a liquid petroleum gas (LPG) engine, a hydrogen fuel cell engine, or any combination of these), and can comprise various types of ground contacting elements (e.g., wheels, endless tracks, omnidirectional wheels, or any combination of these), any type of drivetrain or other systems or mechanisms operable to facilitate the power source being able to actuate and power the ground contacting elements, as well as other systems, devices, components (e.g., a transmission). In the example shown, the ground contacting elements comprise an endless track 328 supported by wheel assemblies 330A and 330 B, at least one of which can comprise a drive wheel in connection with the one or more power sources. This same arrangement can be provided on the other side of the installation vehicle 324. As such, the installation vehicle 324 can be configured to maneuver about the ground using differential speed control, much like a skid-steer.

The operating systems 326 of the installation vehicle 324 can further comprise a lift system 334 operable to lift and support the solar panel dispensing hopper 214, and to facilitate installation of the solar panels 1 into the panel support assembly 2. In the example shown, the lift system 334 can comprise a vertical mast or hoist 336, a carriage 338 moveably mounted to the mast 336, and a pair of forks 340 that are supported by the carriage 338. As discussed above, the solar panel dispensing hopper 214 can comprise a support frame 246 operable to interface with an installation vehicle. In the example shown, the support frame 246 can comprise one or more channels sized and configured to receive the forks 340 of the installation vehicle 324, wherein the installation vehicle 324 can be caused to insert the forks 340 within the one or more channels within the support frame 246 of the solar panel dispensing hopper 214. Once the forks 340 are inserted properly, the installation vehicle 324 can be further operated to actuate the carriage 338 and the mast 336 to lift the solar panel dispensing hopper 214, whereby the installation vehicle 324 can carry the solar panel dispensing hopper 214 and the solar panels 1 as it maneuvers within an environment for the purpose of locating the solar panel dispensing hopper 214 at one or more installation sites on the panel support assembly 2 where the solar panels 1 can be dispensed from the solar panel dispensing hopper 214 and installed into the panel support assembly 2. The lift system 334 can be configured to move in one or more translational degrees of freedom to move the mast 336, the carriage, and/or the forks 340, and thus the solar panel dispensing hopper 214 and the housed solar panels 1, along one or more axes to change the position and/or orientation of the solar panel dispensing hopper 214 (and the solar panels 1) relative to ground and the panel support assembly 2. In one example, using one or more actuators, one or more components of the lift system 334 can be configured to move in a first degree of freedom along a first translational axis. In another example, using one or more actuators, the one or more components of the lift system 334 can be configured to move in a second degree of freedom along a second translational axis. In another example, using one or more actuators, one or more components of the lift system 334 can be configured to move in a third degree of freedom along a third translational axis. In another example, the lift system 334 can be configured to move in all three translational axes.

The installation vehicle 324 can be equipped with a tilt system 342 comprising various joints and associated actuators (e.g., hydraulic actuators, pneumatic actuators, motors, etc.) operable within the mast 336, the carriage 338, and/or the forks 340 that enable the mast to move in one or more rotational degrees of freedom to move the mast 336 and the forks 340, and thus the solar panel dispensing hopper 214 and the housed solar panels 1, about one or more axes to change the position and/or orientation of the solar panel dispensing hopper 214 (and the solar panels 1) relative to ground and the panel support assembly 2. In one example, using one or more tilt actuators, the mast can be configured to move (e.g., rotate) in a first degree of freedom about a first pitch axis to alter a pitch of the mast 336 and the forks 340. In another example, using one or more tilt actuators, the mast can be configured to move (e.g., rotate) in a second degree of freedom about a second roll axis to alter a roll angle of the mast 336 and the forks 340. In another example, using one or more actuators, the mast 336 can be configured to move (e.g., rotate) in a third degree of freedom about a third yaw axis to alter a yaw angle of the mast 336 and the forks 340. In another example, the mast 336 can be configured to move about all three of the pitch, roll, and yaw axes.

In addition to the degrees of freedom discussed above, the forks 340 themselves can be configured to be moveable in one or more translational degrees of freedom via a translation system 344 comprising various joints and associated actuators (e.g., hydraulic actuators, pneumatic actuators, motors, etc.). In one example, the forks 340 can be supported by a rail system, and powered and configured to move laterally relative to one another along the rails of the rail system to alter the spacing between the forks 340. In another example, the forks 340 can be supported by a rail system, and powered and configured to move longitudinally together or relative to one another along the rails of the rail system to alter the distance of the forks 340 from the carriage 338.

The installation vehicle 324 itself can be configured to move in one or more degrees of freedom. Indeed, the driving of the installation vehicle 324 can provide movement in at least one, and in some cases two, translational degrees of freedom. Being able to steer can enable the installation vehicle 324 to move in a rotational degree of freedom.

The installation vehicle 324 can be configured to move in any one or more of the degrees of freedom discussed above for the purpose of not only maneuvering and operating the vehicle 324 itself about the ground or other surface, but also for at least one of positioning/repositioning, orienting/reorienting, or locating/relocating the solar panel dispensing hopper 214 (and the solar panels 1) in any needed or desired position and/or orientation relative to the panel support assembly 2, and particularly the various panel retention systems 38 (with their respective panel mount assemblies 30), such that the solar panel dispensing hopper 214 can subsequently be operated and controlled to dispense and install the solar panels 1 within the panel retention systems 38.

With reference to FIGS. 4 and 6, the installation vehicle 324 can not only lift and carry the solar panel dispensing hopper 214, but it can also be connected to the solar panel presentation system 213 and the solar panel dispensing hopper 214 in one or more ways, such as via an electrical connection, a power connection, a fluid connection, or any combination of these. This can be achieved via one or more vehicle/dispenser interfaces (see vehicle/dispenser interface 348) that can be configured to facilitate at least one of an electrical connection, a power connection, or a fluid connection between the installation vehicle 324 and the solar panel presentation system 213 including the solar panel dispensing hopper 214. For example, the solar panel dispensing hopper 214 can be equipped with its own power source. This can be located and supported on the solar panel dispensing hopper 214 or elsewhere. However, in an example embodiment where the solar panel presentation system 213 does not have its own power source, it can receive whatever power is needed from the installation vehicle 324 via the vehicle/dispenser interface 348, which can comprise an electrical umbilical or cable along with one or more power connectors. In another example, the solar panel presentation system 213 may not have its own control system, or a it may have a control system limited in capabilities. In this case, the solar panel presentation system 213 can be configured to receive data from and transfer data to the installation vehicle 324 or to a top-level control system via the vehicle/dispenser interface 348, which can comprise a wired or wireless connection arrangement with all of the needed hardware/software. In still another example, the solar panel presentation system 213, namely the solar panel dispensing hopper 214, may comprise one or more hydraulic systems/actuators, but may not have its own system for supplying and regulating hydraulic fluid to/from the actuators. In this case, the solar panel presentation system 213 can be configured to receive pressurized fluid from and return pressurized fluid to the installation vehicle 324 via the vehicle/dispenser interface 348, which can comprise all of the needed components, systems, controllers, etc. to achieve hydraulic operation of the hydraulic actuators.

It is noted that not all configurations of the solar panel presentation system 213 or the installation vehicle 324 can be or are discussed herein. It is contemplated that the solar panel presentation system 213 with its solar panel dispensing hopper 214 can comprise all of the components, elements, systems, devices, mechanisms needed to operate and facilitate installation of solar panels. Likewise, it is contemplated that the solar panel presentation system 213 with the solar panel dispensing hopper 214 can comprise only some of the components, elements, systems, devices need to install solar panels, and that the installation vehicle 324 can comprise some of the other components, elements, systems, devices needed by the solar panel presentation system 213 to install solar panels, and that whatever components, elements, systems, devices needed by the solar panel installation system 213 that are on the installation vehicle 324 can be obtained via a suitable interface between the installation vehicle 324 and the solar panel dispensing hopper 214. Moreover, the solar panel presentation system 213 and the installation vehicle 324 can be connected to components, elements, systems, devices that are external to either of these. For example, power to the solar panel dispensing hopper 214 can be obtained via an umbilical from a power source located in suitable proximity to the panel support assembly 2.

As shown, the installation vehicle 324 can maneuver within the environment about the panel support assembly 2 so as to locate the solar panel dispensing hopper 214 in an overhead position above and relative to a solar panel retention system 38 at an installation site within the panel support assembly 2. In this example, the installation vehicle 324 is oriented such that a forward driving direction along a forward driving axis is orthogonal or otherwise transverse to the torque tube 8 with the hopper enclosure 216 in a proper position above a panel retention system 38 for dispensing the solar panels contained therein. This is not intended to be limiting in any way, as it is contemplated that the lift system 334 can be supported about or from a side of the installation vehicle 324 rather than about or from the front of the installation vehicle 324 as shown. Doing this would allow the installation vehicle 324 to be oriented such that a forward driving direction along a forward driving axis is parallel or substantially parallel to the torque tube 8 with the hopper enclosure 216 in a proper position above a panel retention system 38 for dispensing the solar panels contained therein. The process of dispensing and installing a solar panel from this position will now be discussed.

Figure 7A:
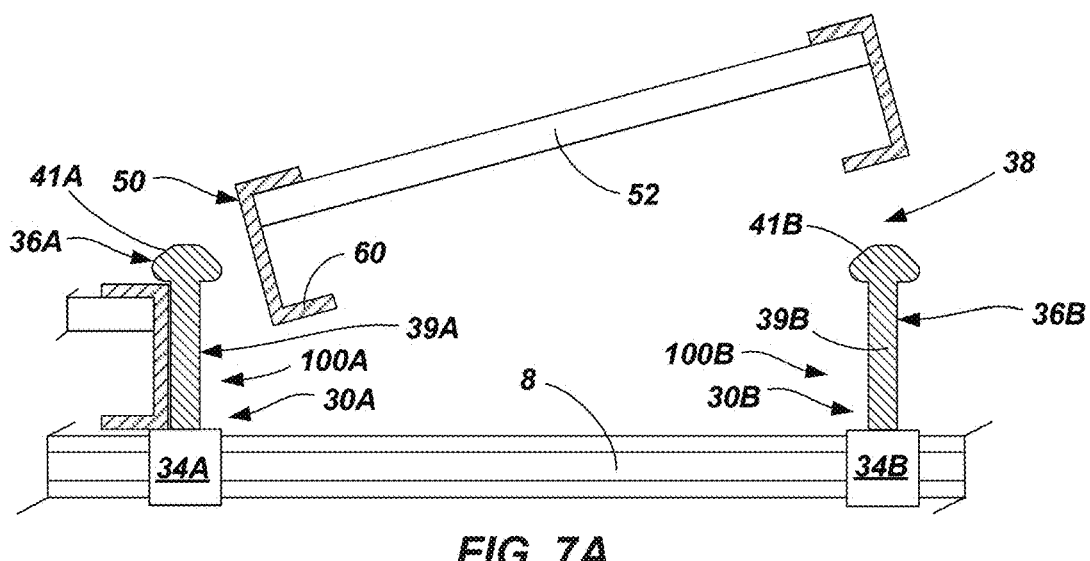
FIGS. 7A-7C illustrate various views of an example solar panel retention system as part of a solar panel installation system supported on a torque tube, as well as the example framed solar panel of FIG. 2B and example processes of installing this within the example panel retention system in accordance with an example of the present disclosure.
Figure 7B:
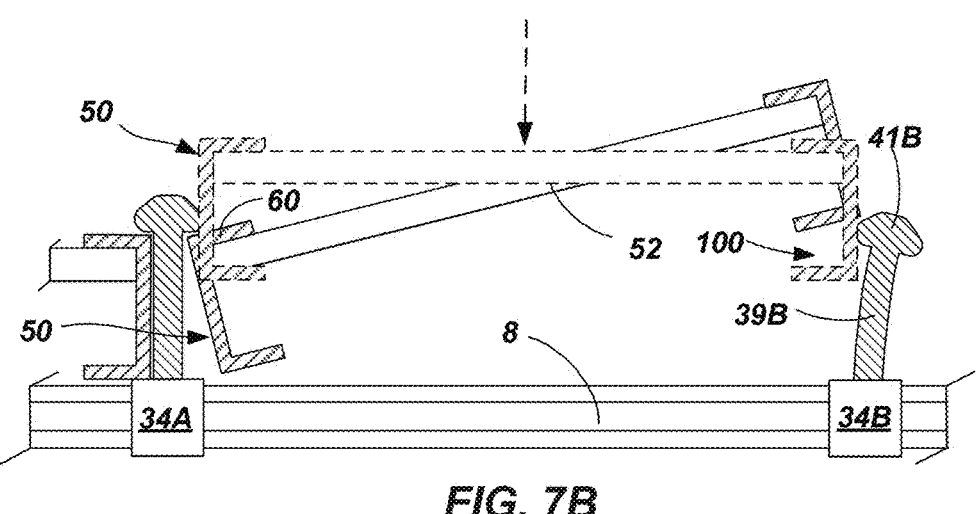
Figure 7C:
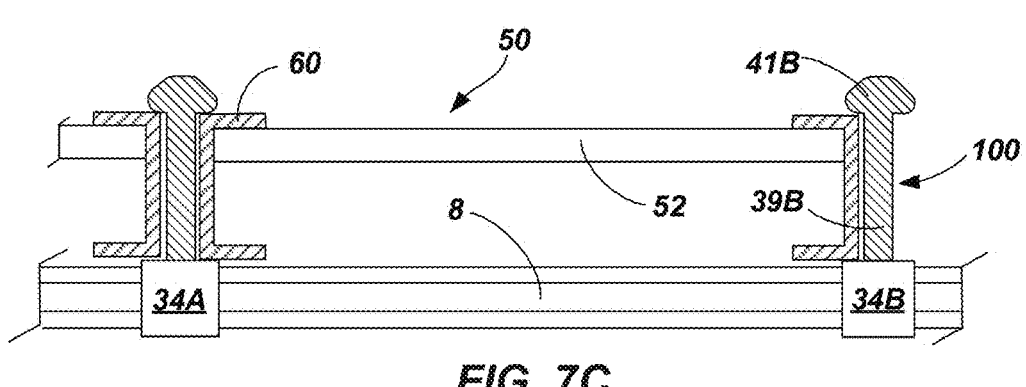

With reference to FIGS. 7A-7C, and continued reference to FIG. 6, the example solar panel retention system 38 of FIG. 6 is shown in more detail, which solar panel retention system 38 is part of a solar panel installation system, as well as various steps in the process of installing a solar panel 50 as dispensed from the solar panel dispensing hopper 214 of FIG. 6. In this example, two panel mount assemblies 30A and 30B are shown, each of which comprises a panel mount 36 and a torque tube clamp 34. The panel mounts 36A and 36B include flexible features to allow for overhead insertion of the solar panel 50 from the solar panel dispensing hopper 214 in either a straight-down or top-down manner, or in a manner that involves rotation of the solar panel as it is dispensed and caused to be installed within the solar panel retention system 38 within and between the panel mount assemblies 30A and 30B. As with other examples, the solar panel 50 may include a solar panel element 52 mounted on a panel support, which in this instance is a support frame 60, but could be support rails 62 in the case of a frameless solar panel. The flexible features of the respective panel mounts 36A and 36B in this example may include a retaining feature with a flexible structure or portion (see flexible portions 39A and 39B) and a retaining button (see retaining buttons 41A and 41B). The panel mounts 36A and 36 B and its flexible retaining features in this example are attached to respective torque tube clamps 34A and 34B, thus forming panel mount assemblies 30A and 30B, which are mounted on a torque tube 8. In the example shown in FIG. 7A, a previously installed solar panel is present and installed at a previous installation site, which solar panel is pressed firmly up against the panel mount 36A as shown, preventing the panel mount 36A from flexing in a direction toward the previously installed solar panel. Thus, when installing the next solar panel 50 from above, the solar panel 50 may be inserted at a slight angle into the panel mount assemblies 30A and 30B, as shown in FIG. 7B, where the panel mount 30B that is not currently supporting a solar panel can be flexed in an outward direction relative to the solar panel 50 to allow for insertion of the other side of the solar panel 50 into the panel mount 30A, as shown in FIG. 7C. Once the solar panel 50 is fully seated between both panel mounts 36A and 36B and installed within the respective retaining channels 100A and 100B formed by the panel mount assemblies 30A and 30B, the next solar panel may be installed (not shown) at the next installation site (also not shown) by relocating, repositioning, and reorienting the solar panel dispensing hopper 214 at the next installation site using the installation vehicle 324, which can be used to provide the initial high-level or macro locating, positioning and orienting of the solar panel dispensing hopper 214 at any installation site. Thus, in the example shown, a first retaining feature of the panel mount 36A, a second retaining feature of the panel mount 36B, or both may be flexible and include respective retaining buttons 41A and 41B positioned to receive and retain a support frame or a support rail of the solar panel 50. The retaining buttons 41A and 41B can be positioned to retain the support frame 60 above the solar panel 50, as shown in FIGS. 7A-7C.

FIGS. 7B-7C alternatively illustrate that the solar panel 50 (see the version of the solar panel shown in dotted lines) can be installed from an overhead position without using a rotation motion. Indeed, due to the flexibility of the panel mounts 36A and 36B, the solar panel dispensing hopper 214 can dispense the solar panel 50 in a downward direction without inducing a rotation in the solar panel 50. The solar panel dispensing hopper 214 can be configured to apply a downward force to the solar panel 50 in a direction along an axis normal to the solar panel 50, wherein the solar panel 50 simultaneously or near simultaneously comes into contact with each of the panel mounts 36A and 36B shown. As one of the panel mounts 36A is already in support of and retaining the previously installed solar panel it is not likely to flex, but may flex to some degree depending upon tolerances. In this case, the open panel mount 36B can be caused to flex to allow the solar panel 50 to be pushed downward further until the solar panel 50 clears the respective buttons 41A and 41B of each of the panel mounts 36A and 36B, and is fully seated between both panel mounts 36A and 36B and installed within the respective retaining channels 100A and 100B formed by the panel mount assemblies 30A and 30B.

With reference to FIGS. 8A-8I and with continued reference to FIGS. 3-7C, illustrated is an example process of dispensing a solar panel A from the example solar panel dispensing hopper 214 and installing it within the example panel retention system 38 as supported about the torque tube 8 of the panel support assembly 2. As shown here and in FIG. 6, the solar panel dispensing hopper 214 is located in an overhead position above the panel support assembly 2, namely the solar panel retention system 38 at a current installation site. An already installed solar panel 1 is shown as being installed in an adjacent retention system at an adjacent installation site. It is noted that the solar panel dispensing hopper 214 has been properly positioned and oriented, such as by the installation vehicle 324, so as to be aligned with the retention system 38, wherein the solar panel dispensing hopper 214 is ready to present and dispense a lead solar panel A (in a stack of solar panels (see solar panels A, B, C . . . N) for installation.

The solar panels can be loaded into the hoper 216 between the first, second, third and fourth belt drive mechanisms 238, 240, 242, 244 so as to come to rest on the flippers (flippers 248A and 248B being the only two of the four shown, but the others, namely flippers 248C and 248D being viewable in FIGS. 3, 4 and 6). The flippers are actuatable and can support the stack of solar panels within the hopper enclosure 216 until they are ready to be dispensed. The flippers are configured so that a distance between respective ends of opposing flippers is less than a width of the solar panels within the stack (see lead solar panel A resting on the flippers with the flippers in their original, non-actuated positions), thus the flippers are able to function as temporary rests for the stack of solar panels, and thus preventing the solar panels from inadvertently exiting the open bottom 225 of the hopper enclosure 216.

Figure 8A:
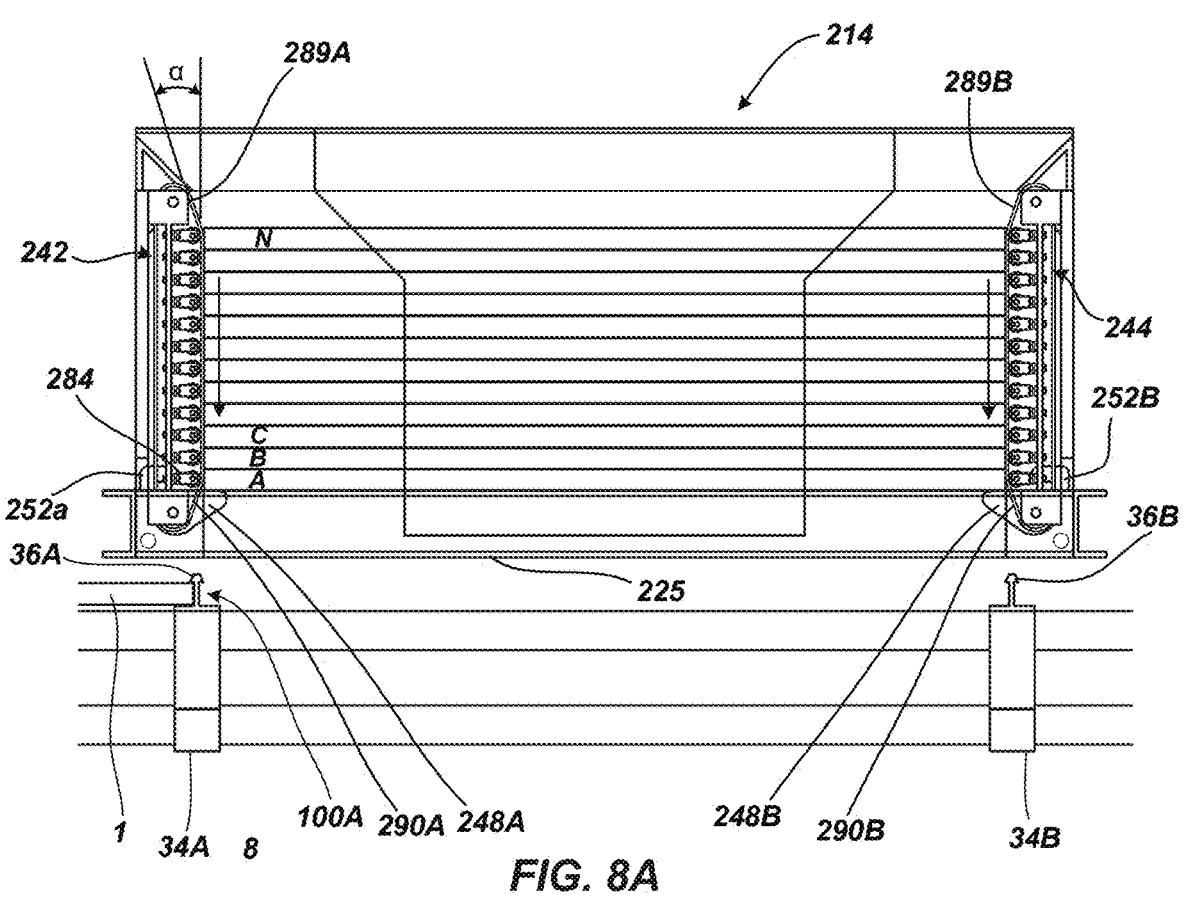
FIGS. 8A-8I illustrate various views of an example process of dispensing a solar panel A from the example solar panel dispensing hopper of FIGS. 3 and 5A-5D as part of the panel presentation system of FIG. 4, and installing the solar panel within the example panel retention system of FIGS. 7A-7C, in accordance with an example of the present disclosure.

With the solar panel dispensing hopper 214 in the position shown in FIG. 8A, the flippers can be actuated so as to rotate them in a downward direction (e.g., flipper 248A (and flipper 248C) is actuated so as to rotate in a clockwise direction, and flipper 248B (and flipper 248D) is actuated so as to rotate in a counterclockwise direction). They each can be rotated to a position (shown in FIG. 8B as being rotated about 45 degrees from their original position in FIG. 8A) so that the distance between the respective ends of two opposing flippers (e.g., see the distance between flippers 248A and 248B, the same being true for opposing flippers 248C and 248D) is still less than a width of the solar panel A, thus the flippers are in a position so as to still be able to support the solar panel A. Depending upon the amount of force applied to the lead solar panel A by the belt drive mechanisms 238, 240, 242, 244, and namely by the respective individual force applicators acting on the lead solar panel A (force applicators 284A and 284B being the only ones shown), the lead solar panel A can be separated from the adjacent solar panel in the stack, namely solar panel B, while still being supported by the flippers. If the forces from the individual force applicators acting on the lead solar panel A are not sufficient to prevent the lead solar panel A from separating from the adjacent solar panel B under the influence of gravity, then the lead solar panel A will move in a downward direction away from the adjacent solar panel B under the influence of gravity as the flippers are rotated downward. In this example, the remaining individual force applicators acting on the remaining solar panels in the stack (solar panels B-N) can be caused to be sufficient to overcome any gravitational forces acting on the remaining solar panels B-N so that they do not move. One or more sensors, such as one or more load cells, can be associated with each of the individual force applicators to monitor and control the amount of force being applied to the various solar panels within the hopper enclosure 216 so as to facilitate retention and release of the solar panels when needed. One or more sensors, such as a torque sensor, a position sensor, or both, can also be associated with the drive wheel and/or the passive wheel of the belt drive mechanisms 238, 240, 242, 244.

If the individual force applicators acting on the lead solar panel A, as well as the other solar panels within the stack, are sufficient to overcome gravitational forces so that the lead solar panel A does not move downward with the rotation of the flippers, then simultaneously with the rotation of the flippers, the belt drive mechanisms 238, 240, 242, 244 can be actuated to cause the drive belts of each to rotate in respective directions so as to move the solar panel stack in a downward direction. This coordinated motion will cause the lead solar panel A, while still being in contact with the flippers to avoid a sudden drop of the lead solar panel A, to release from the belt drive mechanisms 238, 240, 242, 244 due to the lead solar panel A being released from its individual force applicators (the lowermost force applicators of each of the belt drive mechanisms 238, 240, 242, and 244) and moved to a position below the lowermost force applicators where the drive belt transitions away from the solar panel stack such that the distance between opposing drive belts along the belt within this transition segment progressively increases until it is greater than a width of the lead solar panel A. In other words, the belt drive mechanisms 238, 240, 242, 244 each comprise an inclined portion (see inclined portions 290A and 290 B of respective belt drive mechanisms 242 and 244, the others not shown in this view, but viewable in FIGS. 3 and 4). Two opposing inclined portions, such as inclined portions 290A and 290 B function to increase the distance between the respective drive belts at those locations, such that the corresponding drive belt mechanisms (see, for example, drive belt mechanisms 242 and 244 as shown) are no longer able to apply a force to the lead solar panel A. As such, the solar panel A can be caused to move downward under the influence of gravitational forces as the flippers are also rotated downward. Again, the actuation of the belt drive mechanisms 238, 240, 242, 244 can be coordinated with the rotation of the flippers so that the lead solar panel A remains in contact with the flippers and does not experience a sudden drop onto the flippers, which may occur in the event that the flippers have been rotated too far too soon. The coordination of the actuation of the belt drive mechanisms 238, 240, 242, 244 with the actuation of the flippers can be controlled via the control system.

Figure 8B:
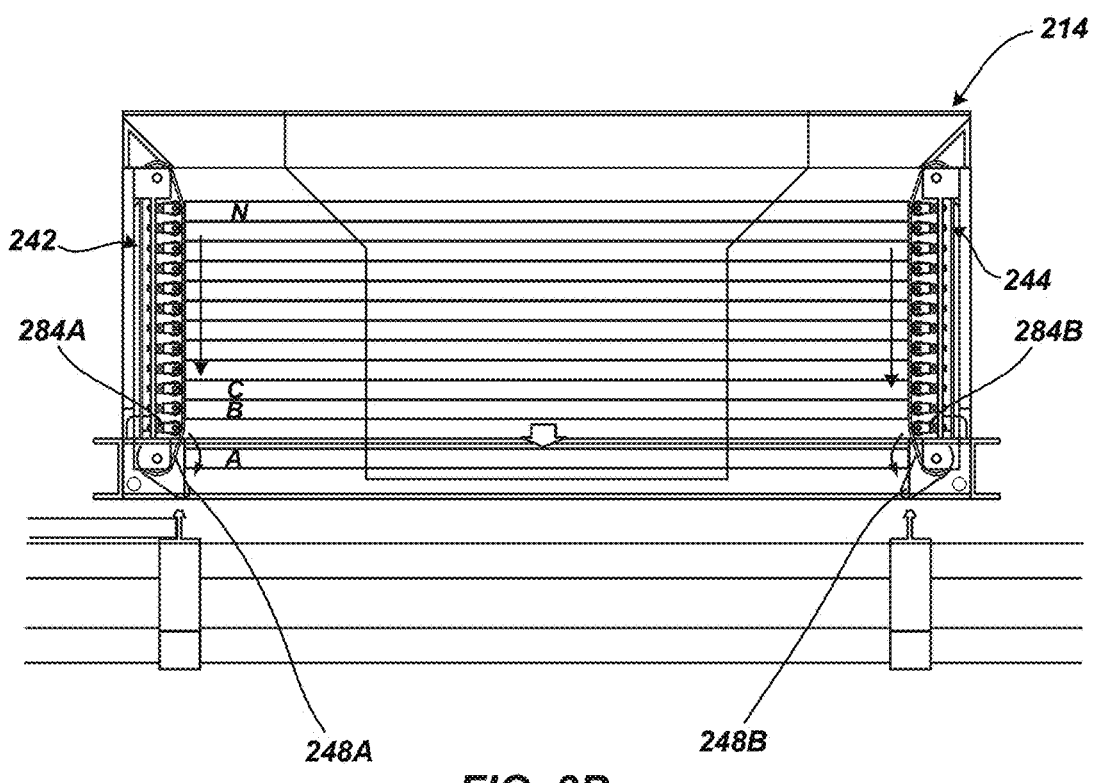
Figures 8C, 8D:
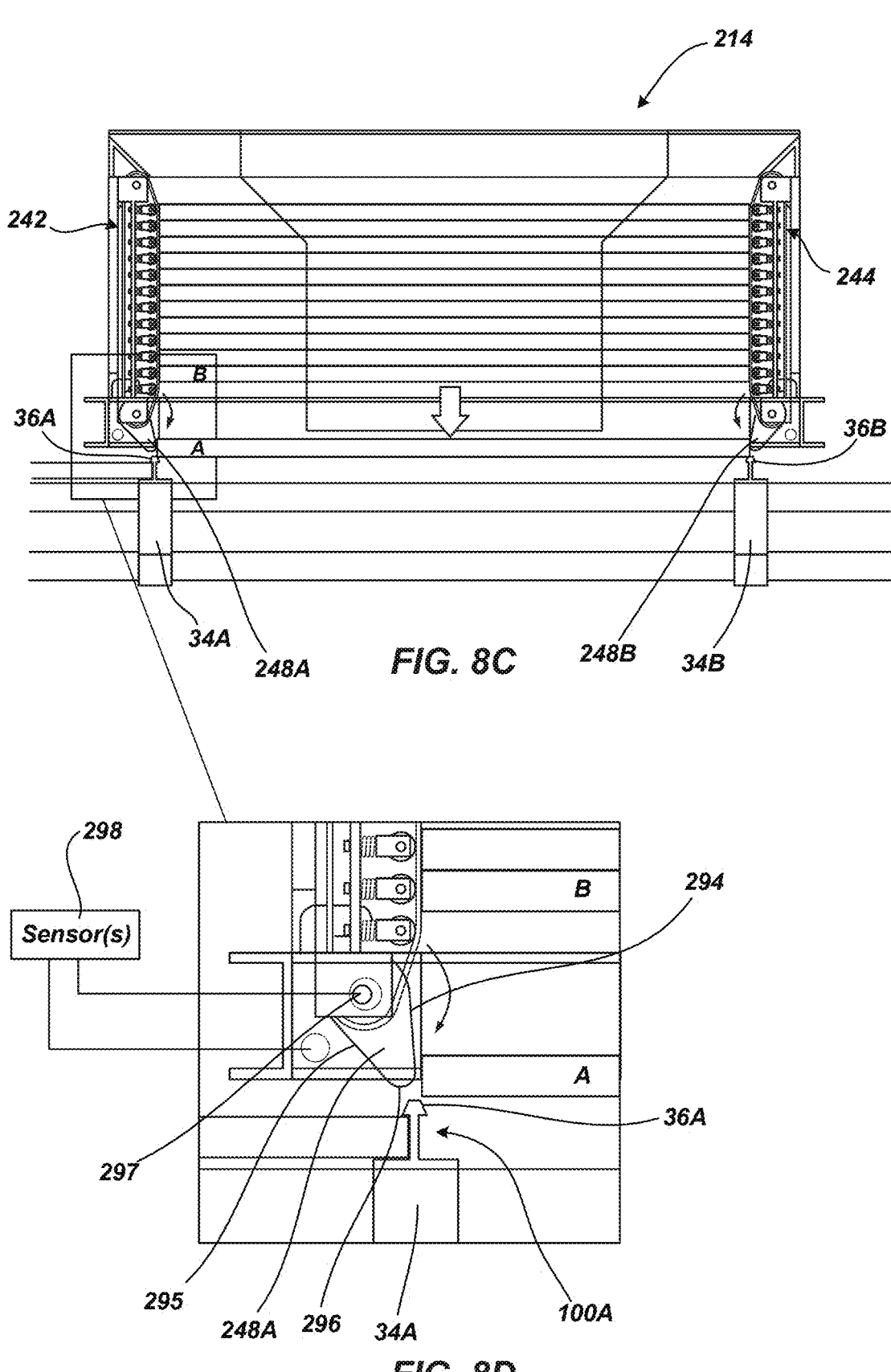

As indicated above, the flippers can each comprise a first surface 294 and an opposing second surface 295. The first and second surfaces 294 and 295 can each comprise a tapering configuration, such that the first and second surfaces 294 and 295 converge towards one another as they extend away from the axis of rotation 297 of the flippers. The flippers can further comprise a transition surface 296 that extends between each of the first and second surfaces 294 and 295 at an end of the flippers. The transition surface 296 can comprise a rounded configuration, a cam configuration, or any other type of configuration. In the example shown, the transition surfaces of the flippers comprise a rounded configuration so as to provide a smooth, non-edge transition between the first and second surfaces. As the flippers are caused to be further rotated downward (see FIGS. 8C and 8D), the lead solar panel A will begin to slide along the respective first surfaces of the flippers (FIGS. 8C and 8D show the first surface of the flippers being almost parallel with the side edge of the lead solar panel A, thus the flippers are no longer in a position to support and function as a rest for the lead solar panel A). One or more sensors 298, such as torque sensors, can be associated with the flippers to monitor and control the amount of force being applied to the lead solar panel A so as to facilitate the sliding of the lead solar panel A relative to the flippers as the flippers rotate, as well as to control the stabilizing force being applied to the lead solar panel A by the flippers, should one be needed. As the lead solar panel A slides further down the first surfaces and approaches the end of the flippers, it can come into contact with the rounded transition surfaces of each of the flippers. Providing rounded transition surfaces enables more surface area of the flippers to be in contact with the lead solar panel A as opposed to a different configuration of flippers having an edge (e.g., a 70-90 degree edge between the first and second surfaces). The flippers, while permitting sliding of the lead solar panel A, can also be actuated so as to apply a force to the sides of the lead solar panel (see FIGS. 8C and 8D). This can help to stabilize the lead solar panel A as it is being dispensed from the solar panel dispensing hopper 214. The controlled rotation of the flippers can facilitate the controlled downward descent or downward movement of the lead solar panel A until it is caused to come into contact with the panel mounts 36A and 36B of the solar panel retention system 38.

It is noted that any one or more of the flippers can be controlled to at least one of rotate at the same time, rotate at the same rate, rotate the same number of degrees of rotation, or apply the same force to the lead solar panel A as compared to any one or more of the other flippers. Alternatively, any one or more of the flippers can be controlled so as to at least one of rotate at a different time, rotate at a different rate, rotate a different number of degrees of rotation, or apply a different force to the lead solar panel A as compared to any one or more of the other flippers. This can depend upon a number of things, such as the stability of the solar panel A, whether the solar panel A remains properly aligned, positioned, and/or oriented relative to the hoper 216 and/or the panel support assembly 2 and its components, or other factors.

Once the lead solar panel A is in contact with and either resting on the panel mounts 36A and 36B or being held in position shown in FIGS. 8C and 8D at the panel mounts 36A and 36B by the flippers (e.g., see flippers 248A and 248B), or both, and while still being stabilized by the flippers, first and second pushers 252A and 252B of the solar panel dispensing hopper 214 can be actuated. In this example, each of the pushers 252A and 252B can be rotatably coupled to the hopper enclosure 216, and can comprise an arm (e.g., see arm 256) extending from an axis of rotation (e.g., see axis of rotation 255). The arm can further comprise an end portion (see end portion 257) configured to contact the lead solar panel. In this example, the arm 256 comprises a bend and terminates at the end 257. The end 257 can comprise a rounded surface so as to increase the amount of surface area in contact with a solar panel, and to facilitate sliding of the pusher along the surface of the solar panel. A rubber or other compliant bumper 258 can be disposed on the end of the pusher to soften the impact and the interface between the pusher and the solar panel. The pushers 252A and 252B are exemplary of only one type and configuration, and these are not intended to be limiting in any way. Indeed, other types, configurations are contemplated and will be recognized by those skilled in the art. The pushers 252A and 252B can be rotated independent of one another, or together by a common actuator. With each pusher 252A and 252B being configured to be rotatable independent of the other using two respective and separate actuators, each pusher can be controlled the same as or in a different manner from the other pusher. This can be in terms of the degree of rotation, the applied force, the rate of rotation, etc. The actuation of the pushers 252A and 252B can be synchronized, or they can be controlled different from one another as needed or desired.

Figures 8E, 8F:
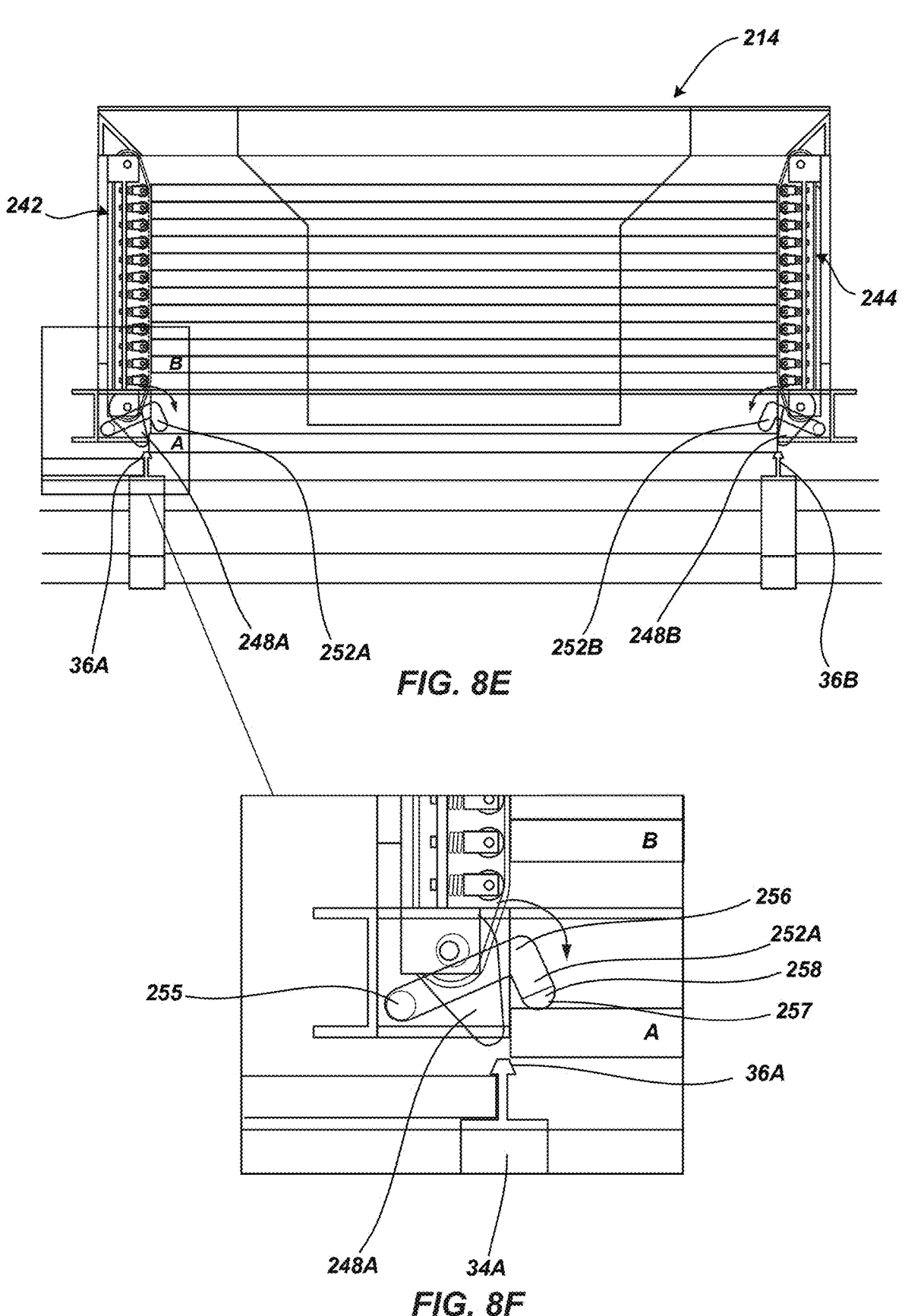

The pushers 252A and 252B can be actuated and caused to rotate downward from an initial upright position until they come in contact with the upper surface of the lead solar panel A, and preferably a support frame of the solar panel A (see FIGS. 8E and 8F). The pushers 252A and 252B can be further actuated to continue to rotate downward. As this occurs, the pushers 252A and 252B can be caused to exert a downward force on the lead solar panel A. As discussed above with respect to FIGS. 7A-7C, all or a portion of the panel mounts 36A and 36B can comprise a degree of flexibility. Specifically, the flexible portions 39A and 39B can facilitate flexing of the panel mounts 36A and 36B as the lead solar panel A is caused to exert a force on these. Moreover, the retaining buttons 41A and 41B of the panel mounts 36A and 36B can comprise inclined lead-in surfaces that initially receive and contact the lead solar panel A and that support, at least in part, the lead solar panel A just prior to the lead solar panel A being inserted into the solar panel retention system 38 defined by the first and second panel mount assemblies 30A and 30B. The lead-in surfaces can be configured to comprise an incline angle that facilitates the flexing of the panel mounts 36A and 36B under the applied load of the lead solar panel A (see FIGS. 7A-7C) as the lead solar panel A is being forced downward by the first and second pushers 252A and 252B. The panel mounts 36A and 36 B can be configured to flex under an applied load that is greater than an applied load by the solar panel A under nothing more than gravitational forces. In other words, the panel mounts 36A and 36B can be configured not to flex or give way to an applied load less than or equal to from a solar panel resting thereon under its own weight.

The force applied to the lead solar panel A by the pushers 252A and 252B can be increased by actuating the pushers 252A and 252B to further rotate downward until the lead solar panel A moves downward into the panel mounts 36A and 36B. This will cause one or more of the panel mounts 36A and 36B to displace (in this case flex) to accommodate the lead solar panel A (see FIG. 7B). Once the one or more panel mounts 36A and 36B have sufficiently displaced, the pushers 252A and 252B can be even further rotated so as to push the lead solar panel A into the retaining channels 100A and 100B defined the respective panel mount assemblies 30A and 30B (with panel mount assembly 30A comprising panel mount 36A and torque tube clamp 34A, and panel mount assembly 30B comprising panel mount 36B and torque tube clamp 34B) (see FIGS. 7C and 8G-8H). With the lead solar panel A seated within the retention channels 100A and 100B formed by the panel mount assemblies 30A and 30B, the panel mounts 36A and 36B return to an unflexed position intended to retain the solar panel. Also, with the lead solar panel A seated within the retaining channels 100A and 100B formed by the panel mount assemblies 30A and 30B, and thus retained within the panel retention system 38, the solar panel A can be considered to be in its installed position.

It is noted that any one or more of the pushers can be controlled to at least one of rotate at the same time, rotate at the same rate, rotate the same number of degrees of rotation, or apply the same force to the lead solar panel A as compared to any one or more of the other pushers. Alternatively, any one or more of the pushers can be controlled so as to at least one of rotate at a different time, rotate at a different rate, rotate a different number of degrees of rotation, or apply a different force to the lead solar panel A as compared to any one or more of the other pushers. This can depend upon a number of things, such as the stability of the solar panel A, whether the solar panel A remains properly aligned, positioned, and/or oriented relative to the hoper 216 and/or the panel support assembly 2 and its components, or other factors. This is primarily contemplated when one side of the lead solar panel A requires a greater amount of force to be pushed into a panel mount assembly as compared to another side of the solar panel being inserted into a different panel mount assembly. For instance, in the example shown, the pusher 252A may be actuated to apply a greater force to the lead solar panel A than the pusher 252B due to the fact that the panel mount 36A will not flex as much, if at all, compared to the panel mount 36B due to the panel mount assembly 30A currently retaining an already installed adjacent solar panel on its opposing side.

Figures 8G, 8H:
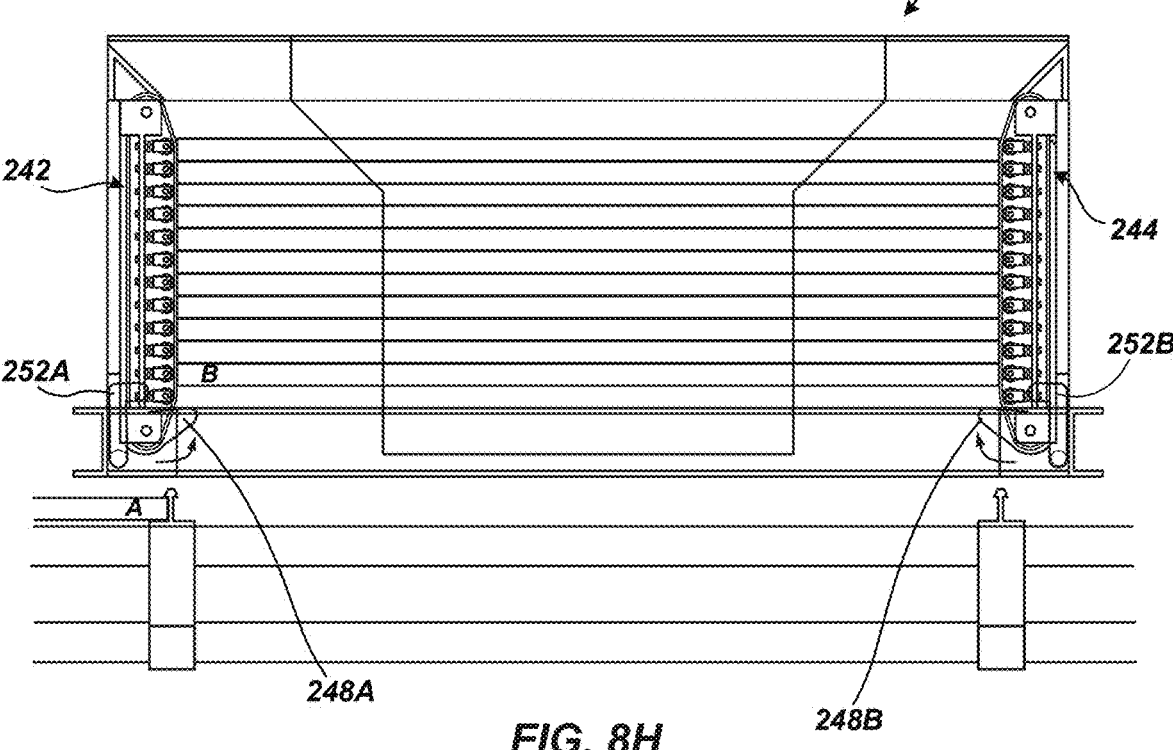
Figure 8I:
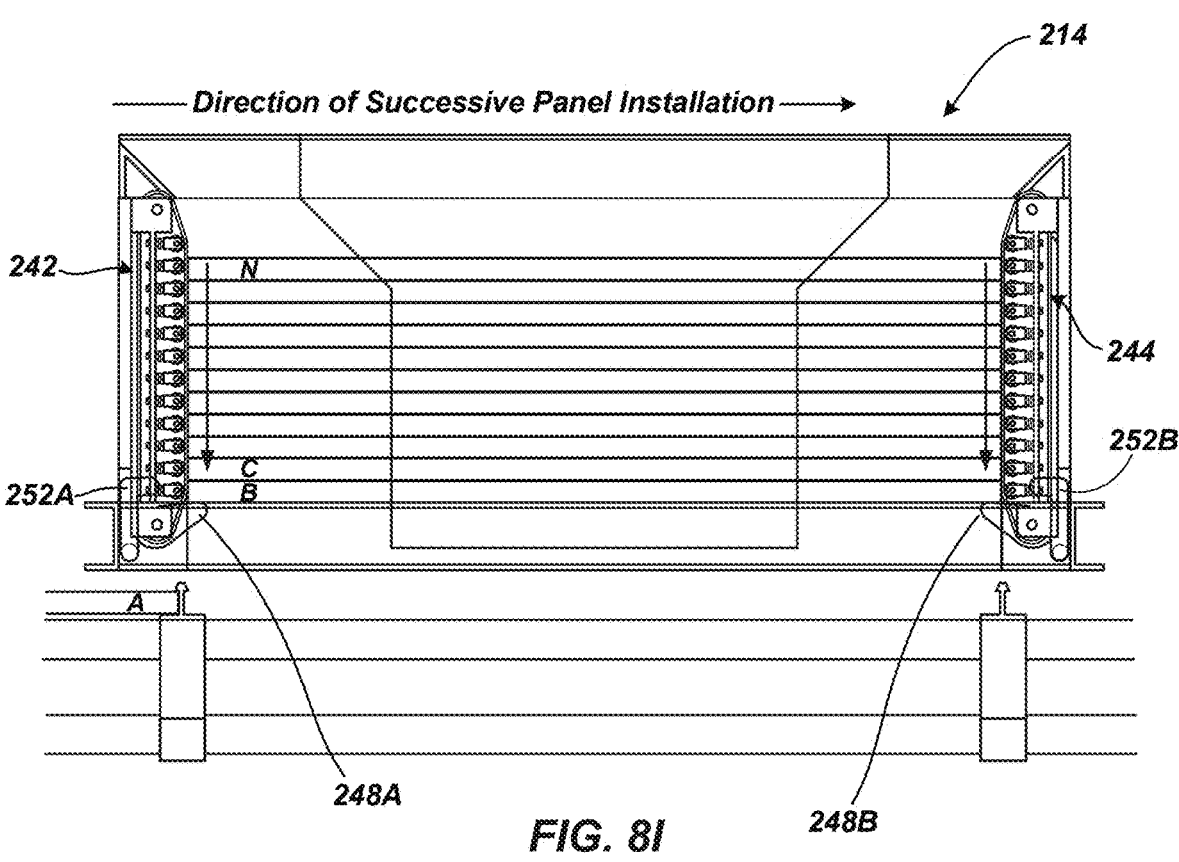

Once the lead solar panel A is installed, the pushers 252A and 252B and the flippers (e.g., see flippers 248A and 248B) can be actuated to rotate in the opposite direction and to return to their initial starting positions (as shown in FIGS. 8A and 8H). The belt drive mechanisms 238, 240, 242, 244 can then be actuated to cause the entire solar panel stack to move downward so that each solar panel is positioned in a new position within the hopper enclosure 216. Each new position can correspond to each solar panel being aligned with the next lowest force applicator relative to the force applicator that they were previously aligned with. As the belt drive mechanisms 238, 240, 242, 244 are actuated in to move the solar panel stack downward, solar panel B is caused to be seated against the flippers, and becomes the new lead solar panel (see FIG. 8I). The solar panel dispensing hopper 214 can then be relocated to a new installation site and moved into a position over an empty panel retention system where the above process can be repeated to install the new lead solar panel B within the panel retention system. FIG. 8I illustrates the new installation site being directly adjacent the previous installation site where solar panel A was installed.

Figure 9:
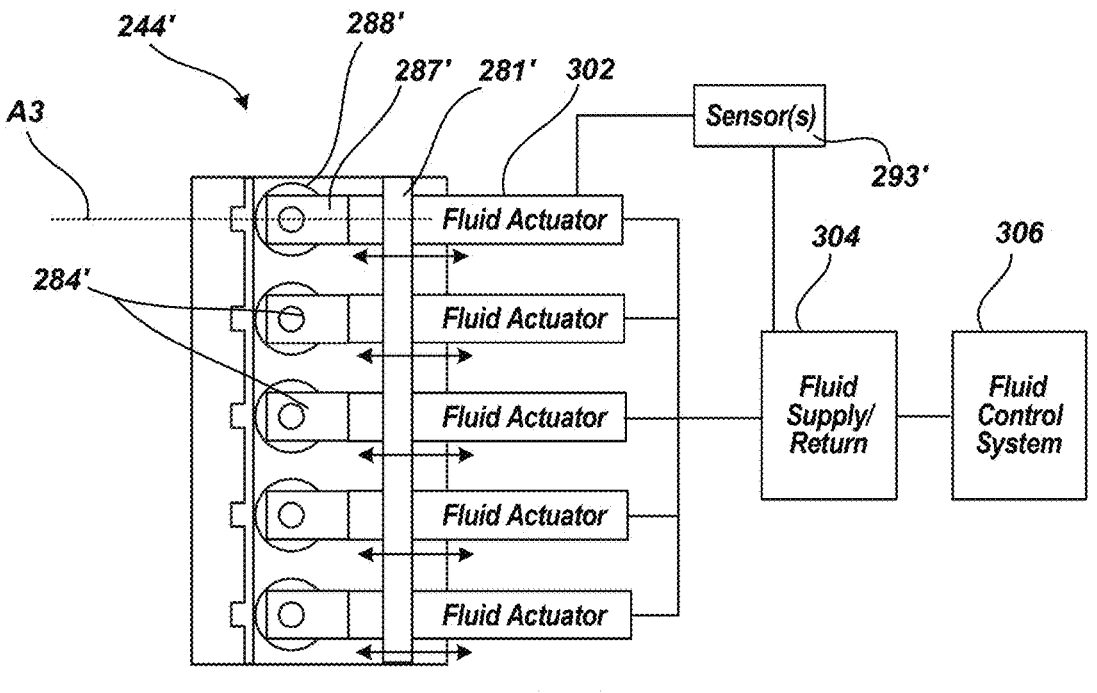
FIG. 9 illustrates an alternative example of a belt drive mechanism of the solar panel dispensing hopper of FIGS. 3 and 5A-5D, in accordance with an example of the present disclosure.

FIG. 9 illustrates an alternative example of a belt drive mechanism different from the ones previously described. In this example, each of the belt drive mechanisms 238, 240, 242, and 244 (only one being shown, namely detail of belt drive mechanism 244 labeled as 244') can comprise a plurality of force applicators 284' similar in function to those described above. However, in this example, each of the force applicators 284' are operable with a fluid system, such as a hydraulic system, configured to actuate the individual force applicators 284' to apply a force to the drive belt, and thus respective solar panels in contact with the drive belt, as discussed and explained above. Each of the force applicator 284' can comprise a fluid actuator 302 coupled to the roller carriage 287' to displace the roller carriage 287' and the force applicator roller 288' supported in the roller carriage 287' in a bi-directional manner along the axis A3. The fluid actuator 302 can be supported by the chassis 281', and can be fluidly connected to a fluid supply/return system 304, which can be selectively controlled and operated by a fluid control system 306. One or more sensors 293' can be associated with the fluid actuators 302 and/or the fluid supply/return 304 to measure a force being exerted by the force applicators 284'.

One notable difference between the force applicators 284' compared with the force applicators 284 discussed above that comprise a biasing member is that the force applicators 284' operable with the fluid system can be controlled to apply a force or deactivated so as to remove the force. On the other hand, the force applicators 284 with the biasing member apply a constant force to due to the presence of the biasing member. Besides this, those skilled in the art will recognize that the belt drive mechanism 244' can function for a similar purpose as the belt drive mechanism 244 discussed above, and as such, this will not be repeated here.

Figure 10A:
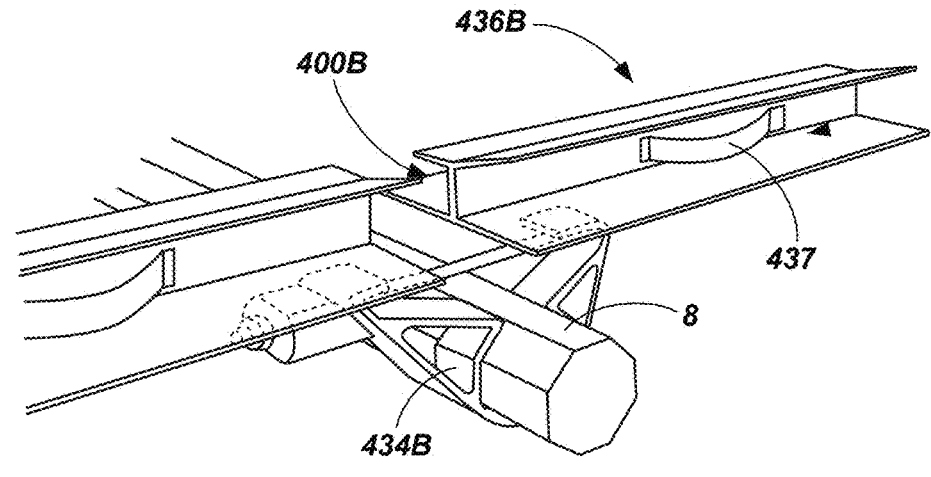
FIGS. 10A-10C illustrate various views of an example solar panel retention system as part of a solar panel installation system supported on a torque tube, as well as the example framed solar panel of FIG. 2B and example processes of installing this within the example panel retention system in accordance with an example of the present disclosure.
Figure 10B:
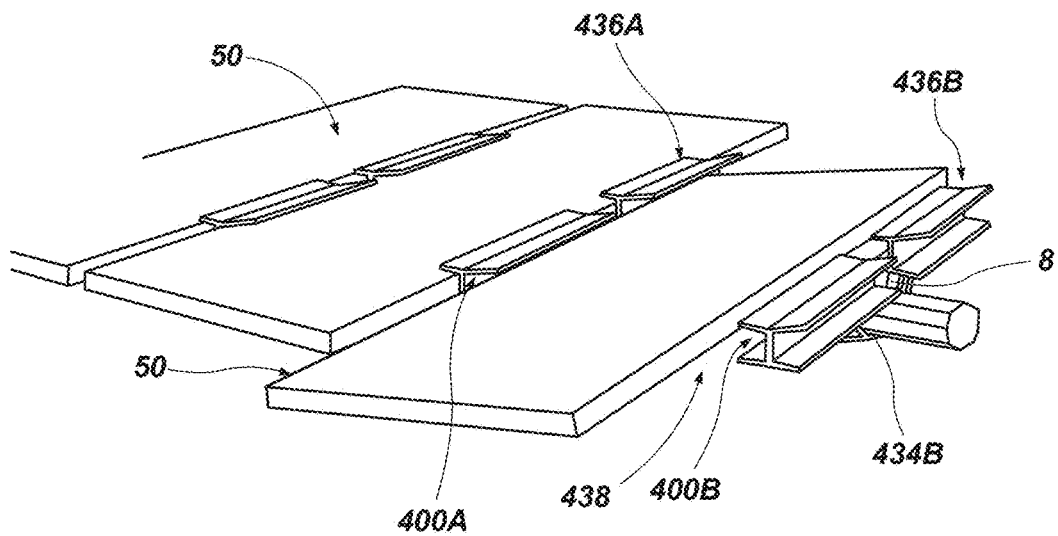
Figure 10C:
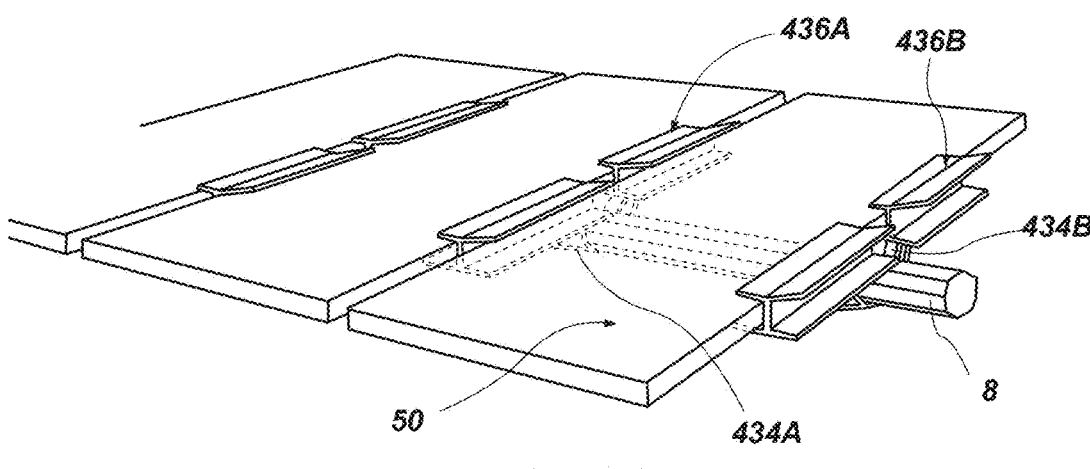

With reference to FIGS. 10A-10C, and continued reference to FIG. 6, similar to the one shown in FIG. 6 is shown here in detail, as well as various steps in the process of installing a solar panel as dispensed from the solar panel dispensing hopper 214 of FIG. 6. In the example shown in FIG. 10B, a previously installed solar panel is present and installed at a previous installation site, which solar panel is pressed firmly up against the panel mount 436A as shown. As shown, panel mounts 436A and 336B can include retaining features, which in this instance, are retaining channels 400A and 400B. The panel mounts in this example are attached to or are attachable to torque tube clamps 434A and 434B, respectively, that are coupled to the torque tube 8. Notably, a single panel mount (e.g., panel mount 436A) can include multiple retaining features, one for retaining one solar panel and another for retaining another adjacent solar panel. In further detail, as shown, a solar panel can be inserted into a first retaining channel 400A of the panel mount 436A and then placed into a second retaining channel 400B of a different panel mount, such as panel mount 436B. Note that in this example, the first retaining channel is in the form of a C-channel, with the first retaining channel being defined to include three channel walls, e.g., a lower channel wall oriented orthogonally relative to a rear channel wall and an upper channel wall angled at greater than about 95° relative to the rear channel wall. The second retaining channel, on the other hand, is also a C-channel, but is shallower and its upper channel wall is essentially parallel with its lower channel wall (both being orthogonal relative to its rear channel wall.) In this configuration, the upper channel wall and deeper C-channel are configured to receive a solar panel 50 from overhead at an angle of insertion greater than about 5° relative to the orientation of the first channel wall. In this example, the solar panel is shown as a monolithic structure, but it is understood that the panel shown would typically be a solar panel element mounted on a support rail(s) or a support frame, as shown in FIGS. 2A and 2B, respectively. In this example, when the first and second panel mounts 436A and 436B are mounted on a torque tube 8 via the first and second torque tube clamps 434A and 434B, respectively, the first and second panel mounts 436A and 436B are oriented transverse (e.g., orthogonal or otherwise transverse) to the torque tube 8. In this example, more specifically the first retaining feature (a channel) of the first panel mount 436A faces the second retaining feature (a channel) of the second panel mount 436B, and the first and second retaining features are oriented transverse (e.g., orthogonally or otherwise transverse) relative to the torque tube 8. Furthermore, in this example, at least one of the first panel mount 436A or the second panel mount 436B is configured for either overhead or lateral insertion of a solar panel while the torque tube clamps 434A and 434B are immovably installed on the torque tube 8. Also shown in this example, the first retaining channel is shown as including a biasing member 437 to provide outward mechanical pressure against the solar panel, enhancing the fit of the solar panel between the first and second panel mounts. The biasing member(s) described herein, for example, can be positioned at least partially within a panel support channel and can provide a bias between two adjacent panel supports when a solar panel is installed therebetween. Example biasing members include a spring, a resilient material, a compliant member, or other spring-like member, mechanism, system. Once the solar panel is fully seated between both panel mounts 436A and 436B and installed within the respective retaining channels 400A and 400B formed by the panel mount assemblies 400A and 400B, the next solar panel may be installed (not shown) at the next installation site (also not shown) by relocating, repositioning, and reorienting the solar panel dispensing hopper 214 at the next installation site using the installation vehicle 324, which can be used to provide the initial high-level or macro locating, positioning and orienting of the solar panel dispensing hopper 214 at any installation site.

With reference to FIGS. 11A-11J and with continued reference to FIGS. 3-6 and 10A-10C, illustrated is an example process of dispensing a solar panel A from the example solar panel dispensing hopper 214 and installing it within the example panel support assembly 2 comprising the solar panel retention system 438 as supported about the torque tube 8. It is noted that the panel retention system 38 shown in FIGS. 7A-7C can also be used with the process to be described below where solar panels are dispensed form the solar panel dispensing hopper 214 using controlled rotation of the solar panels. As shown here and similarly in FIG. 6, the solar panel dispensing hopper 214 is located in an overhead position above the panel support assembly 2, namely the solar panel retention system 438 with its first and second panel mount assemblies 423A and 432B, at a current installation site. An already installed solar panel 1 is shown as being installed in an adjacent retention system at an adjacent installation site. It is noted that the solar panel dispensing hopper 214 has been properly positioned and oriented, such as by the installation vehicle 324, so as to be aligned with the retention system 438, wherein the solar panel dispensing hopper 214 is ready to present and dispense a lead solar panel A (in a stack of solar panels (see solar panels A, B, C . . . N) for installation. Various adjustments in alignment and position of the solar panel dispensing hopper 214 relative to the panel retention system 438 can be made by the installation vehicle 324 as needed or desired.

Figure 11A:
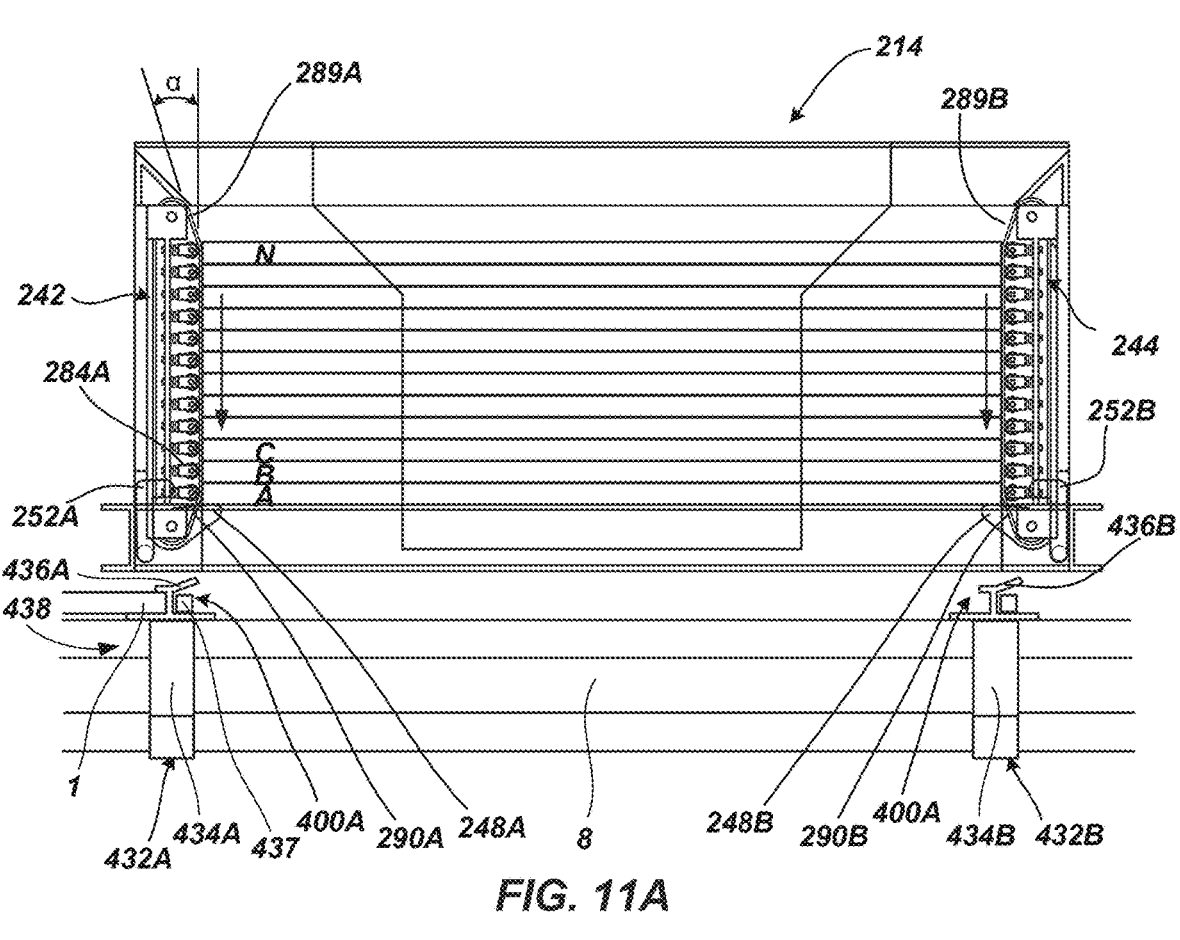
FIGS. 11A-11J illustrate various views of an example process of dispensing a solar panel A from the example solar panel dispensing hopper of FIGS. 3 and 5A-5D as part of the panel presentation system of FIG. 4, and installing the solar panel within the example panel retention system of FIGS. 10A-7C, in accordance with an example of the present disclosure.
Figure 11B:
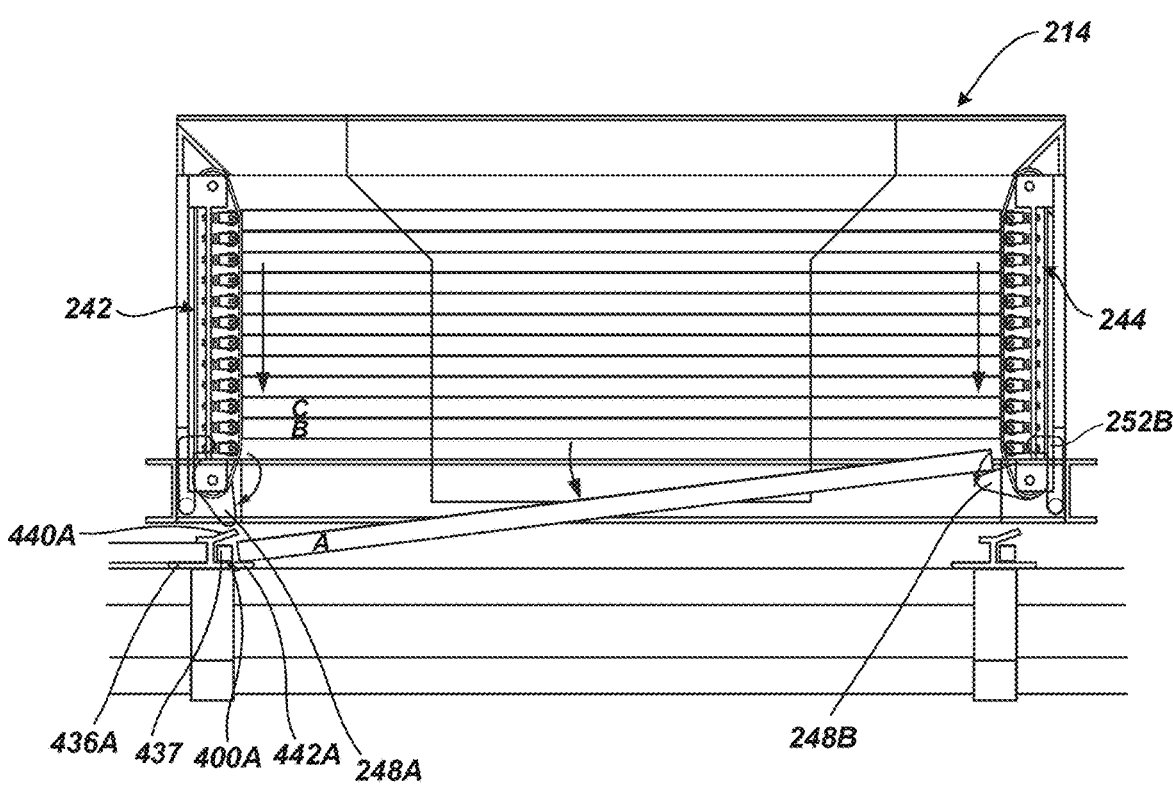
Figures 11C, 11D:
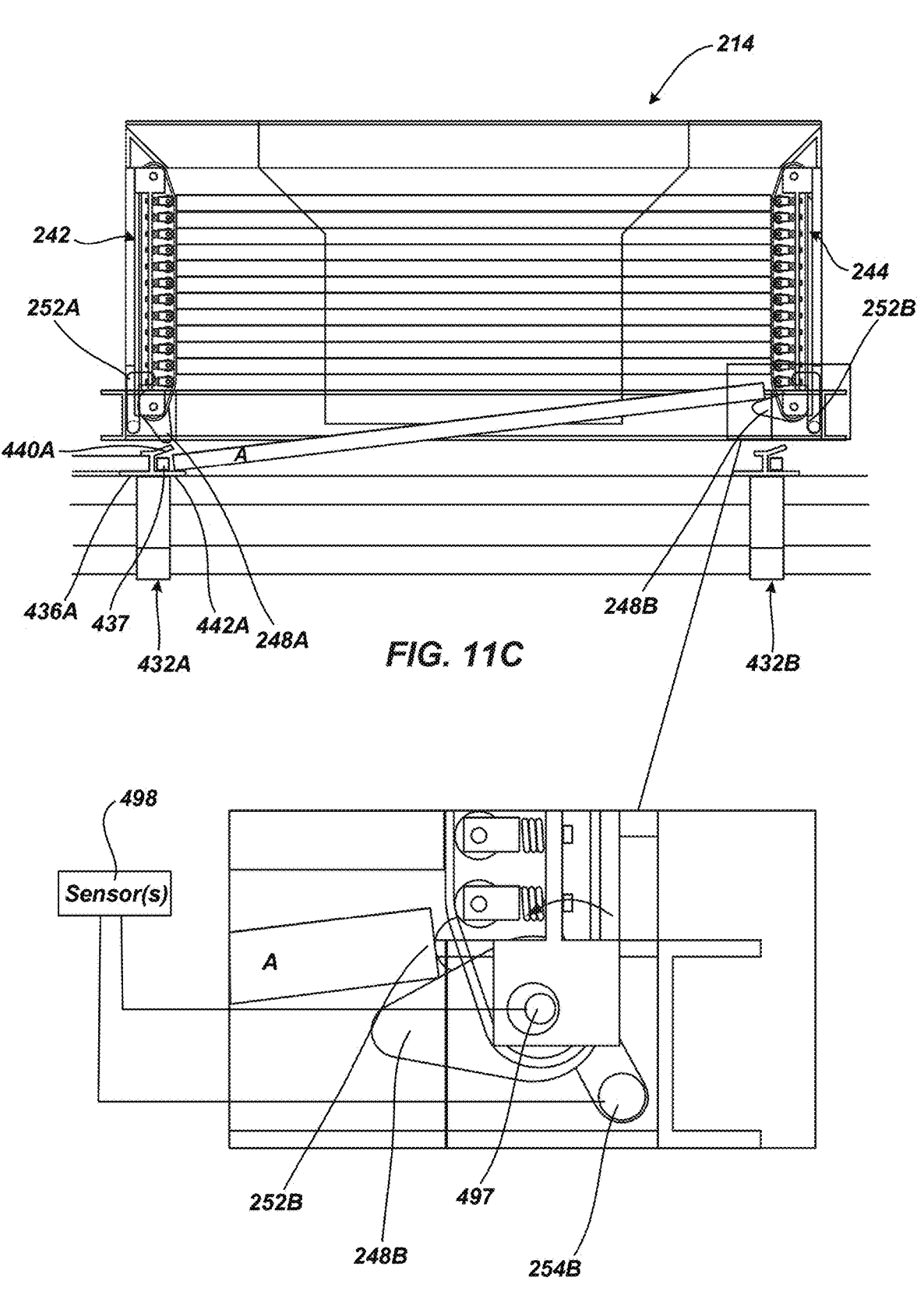
Figure 11E:
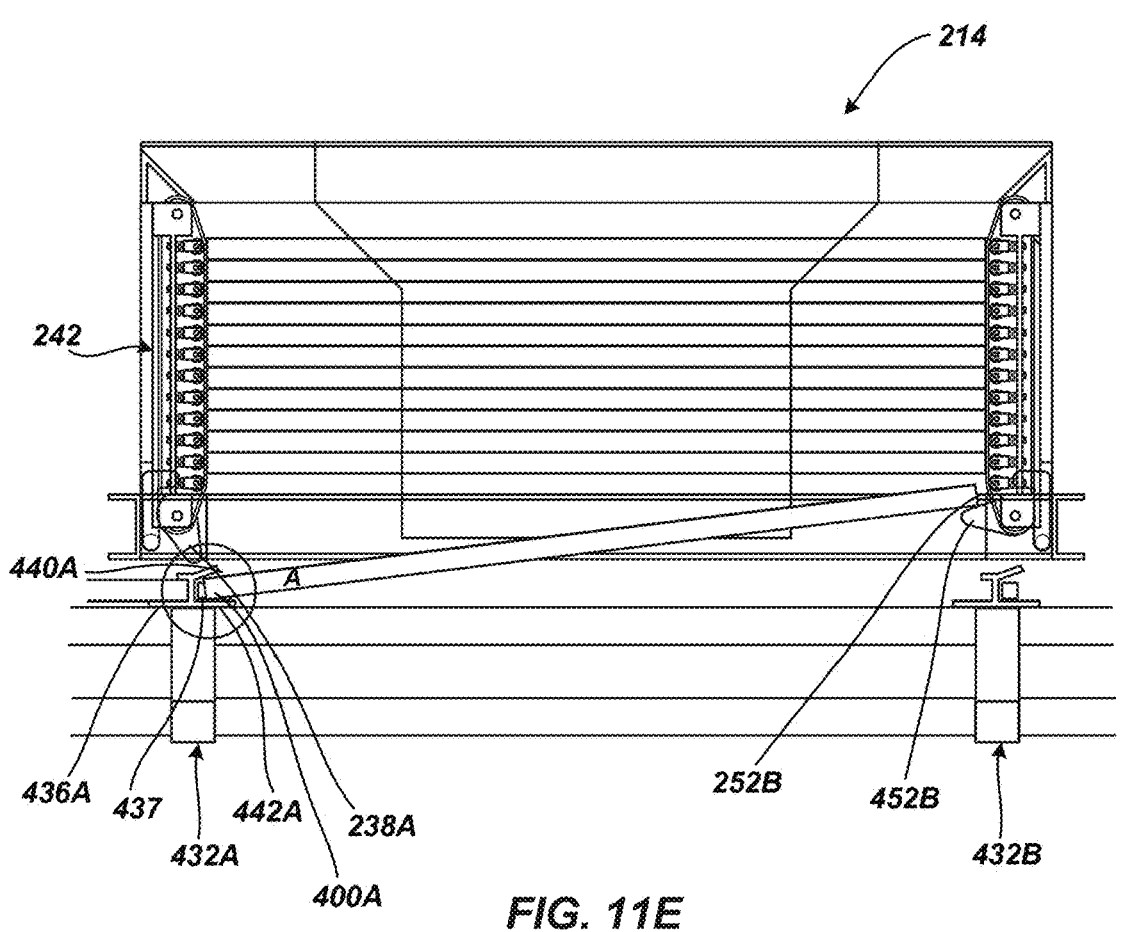
Figure 11F:
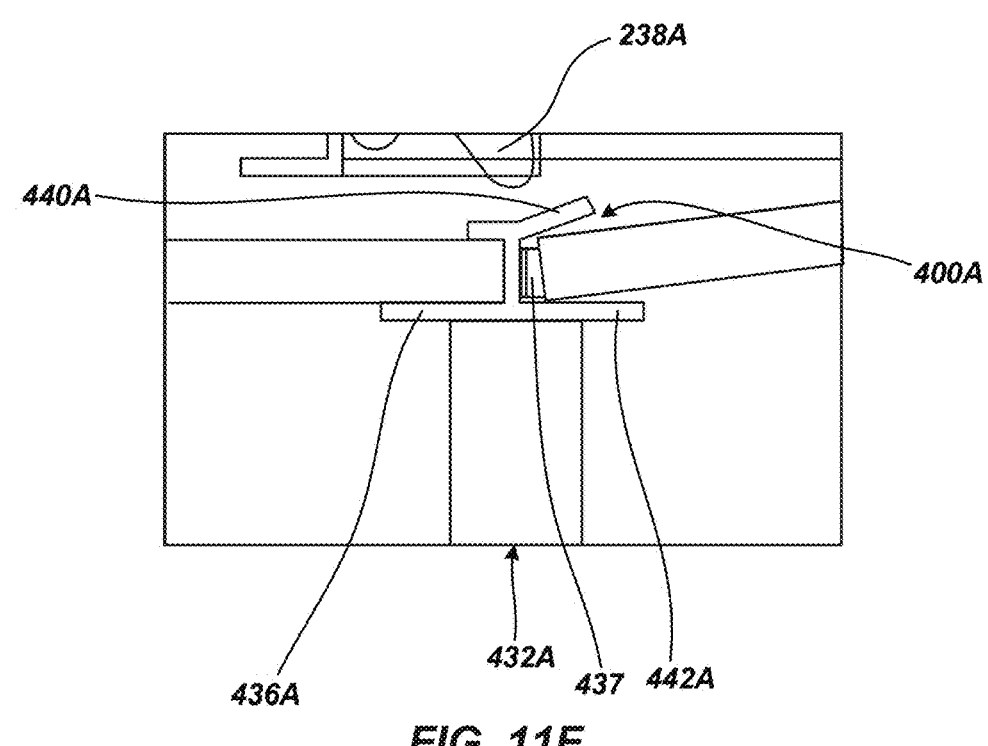

With the solar panel dispensing hopper 214 and the loaded solar panels in the position shown in FIG. 11A, which shows lead solar panel A in a similar to the position of the solar panel A after the steps shown in FIGS. 8A and 8B discussed above (as such these steps are not repeated here), the panel feed system (see belt drive mechanisms 238, 240, 242, 244) and the panel installation systems (see flippers 248A and 248B and the panel pushers 252A and 252B) can be subsequently actuated in a coordinated manner to dispense and install the lead solar panel A into the panel support assembly, and namely the panel retention system 438, which includes the panel mount assemblies 432A and 432B. Specifically, the flipper 248A can be actuated so as to rotate downward until the first edge of the lead solar panel A clears the top rail 440A of the panel mount 436A of the panel mount assembly 423A and comes to rest on the lower rail 442A (see FIG. 11B) of the panel mount 436A. At the same time, or after this, the flipper 248B can be caused to rotate until the upper surface of the flipper 248B in support of the second edge of the lead solar panel A is parallel with the upper surface of the lead solar panel A. This is not required, but functions to eliminate a line contact between the flipper 248B and the solar panel A, thus distributing the forces across a greater area. The pusher 252B can also be actuated and caused to rotate to cause the pusher 252B to come into contact with the lead solar panel A resting on the flipper 248B (see FIGS. 11C and 11D). With the pusher 252B in contact with the lead solar panel A, the pusher 252B can be caused to further rotate to case the lead solar panel A to move into the retaining channel 400A (see FIG. 11E). The flipper 238B can also be rotated as needed to still support the second edge of the lead solar panel A. The pusher 252B can be rotated a sufficient distance and with sufficient torque to cause the lead solar panel A to be inserted fully into the retaining channel 400A of the panel mount 436A of the panel mount assembly 432A, and to compress the biasing member 437 (see FIGS. 11E and 11F). Alternatively, or consecutively, the entire solar panel dispensing hopper 214 can be moved in one or more ways to insert the lead solar panel A into the retaining channel 400A and to compress the biasing member, as well as to maintain the lead solar panel A in this position within the retaining channel 400A. This can be accomplished using any degrees of freedom of movement available in the solar panel displacement device 214, or by moving the installation vehicle 324. The biasing member 437 can be any type, such as a spring, compliant material, and others. As the lead solar panel A is retained in the first retaining channel 400A and compressing the biasing member, the biasing member 437 will exert a force against the lead solar panel A in a direction away from the retaining channel 400A of the panel mount 436A. As such, the pusher 252B can be used to counter such force and maintain the position of the lead solar panel A within the retaining channel 400A of the panel mount assembly 423A.

Figure 11G:
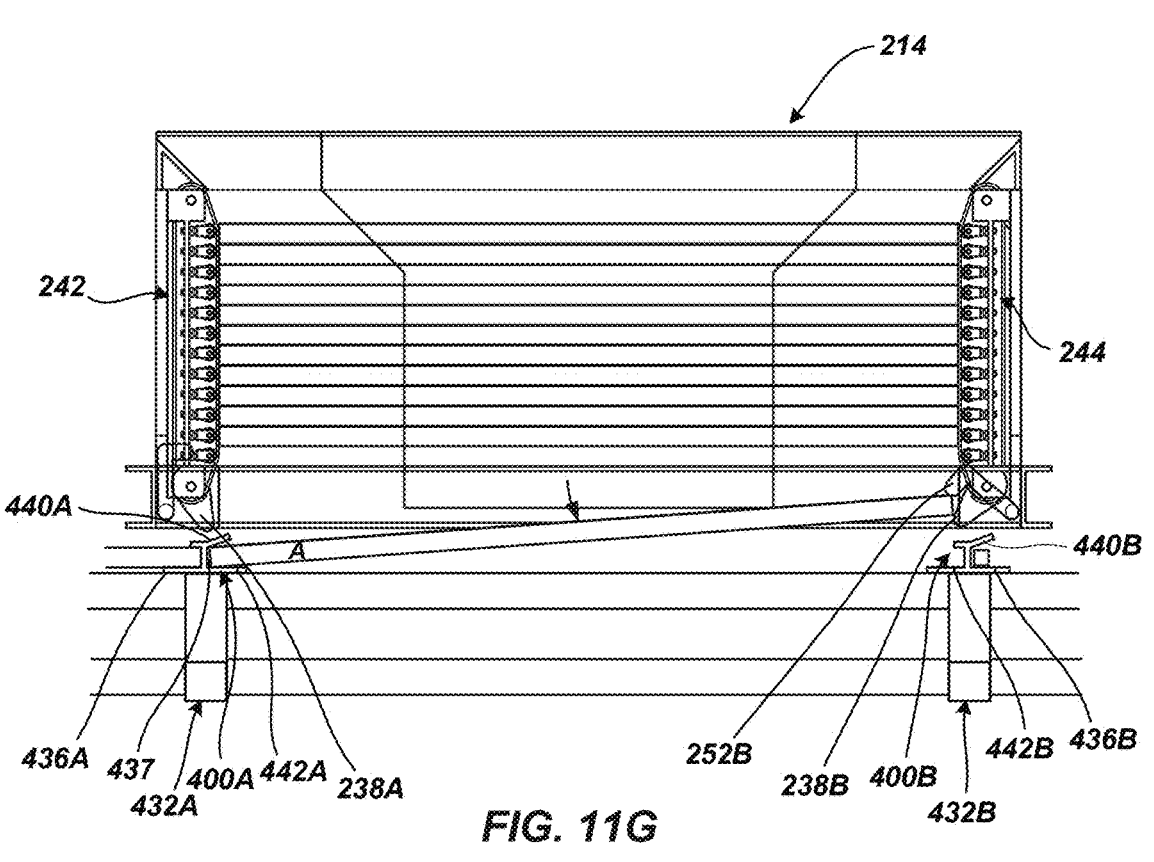
Figure 11H:
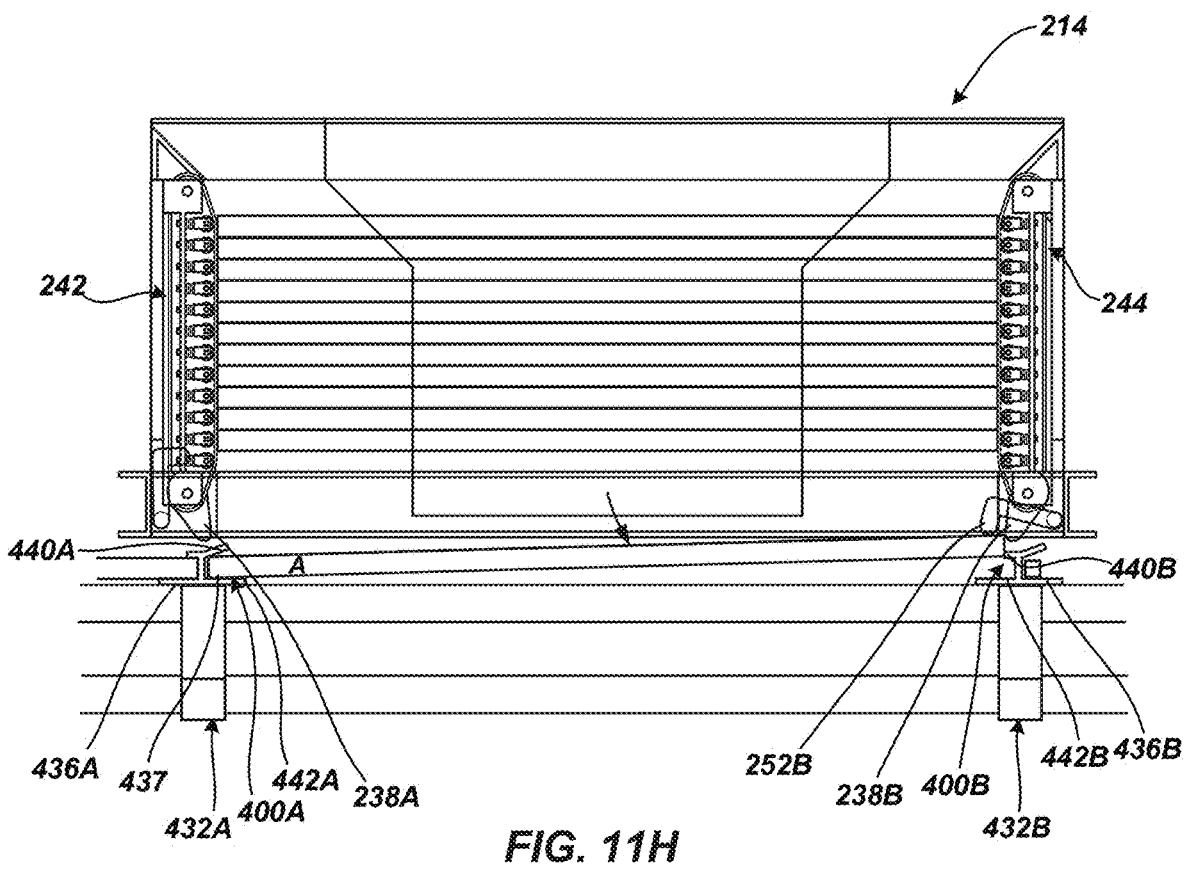
Figures 11I, 11J:
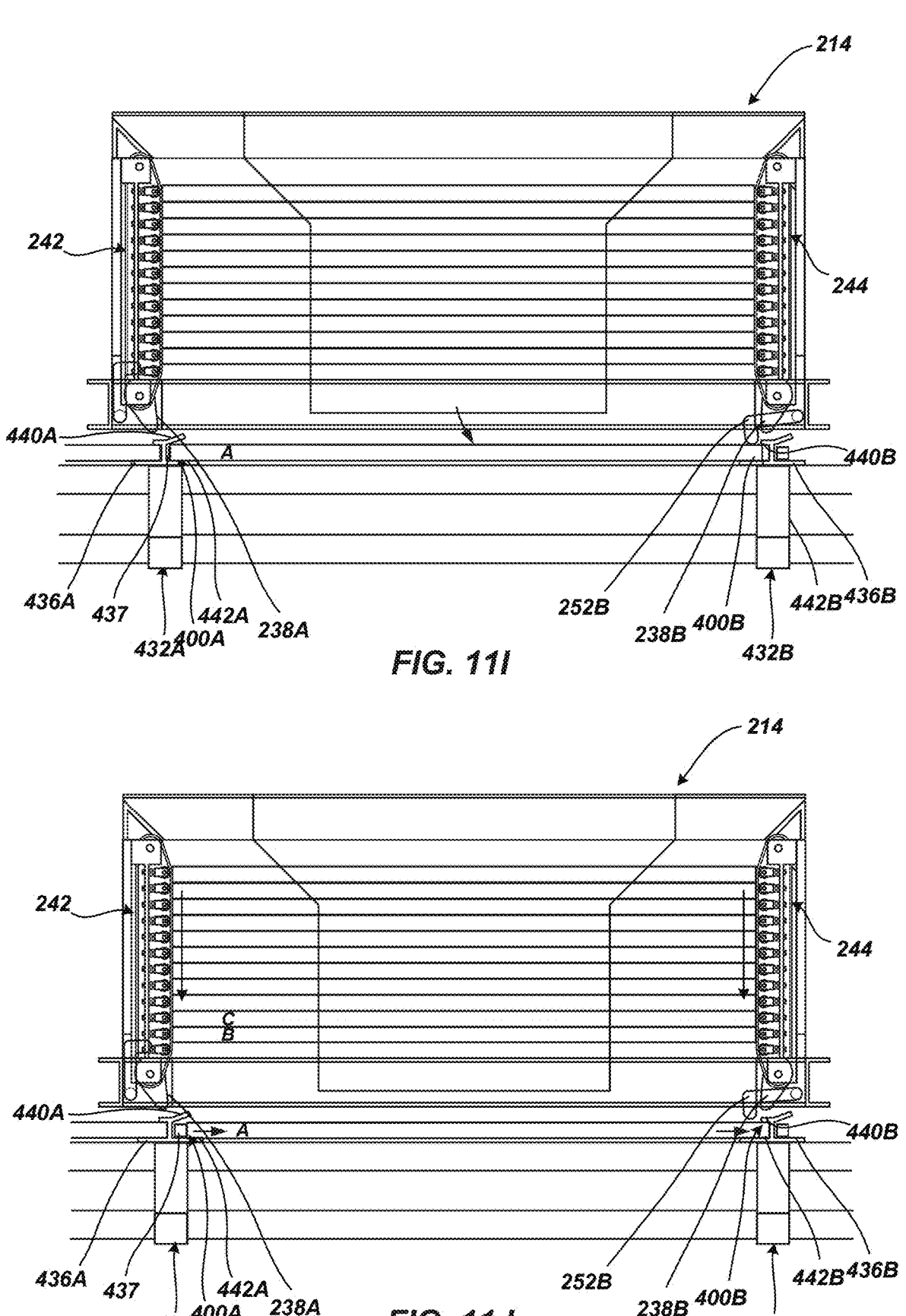
Figure 12A:
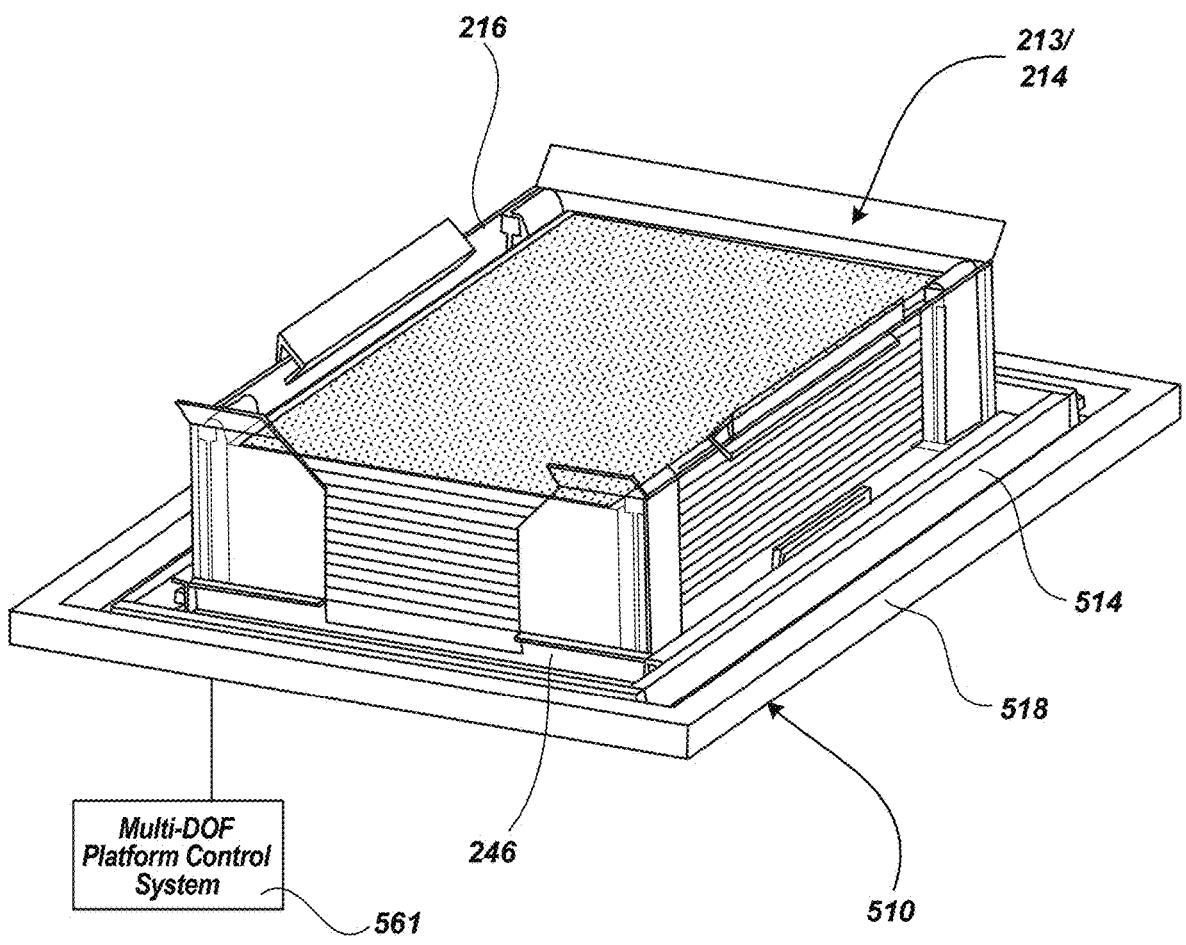
FIGS. 12A-12D illustrate various views of an example multi-degree of freedom platform as part of the panel presentation system of FIG. 4, and operable with the example solar panel dispensing hopper of FIGS. 3 and 5A-5D, in accordance with an example of the present disclosure.
Figures 12B, 12C:
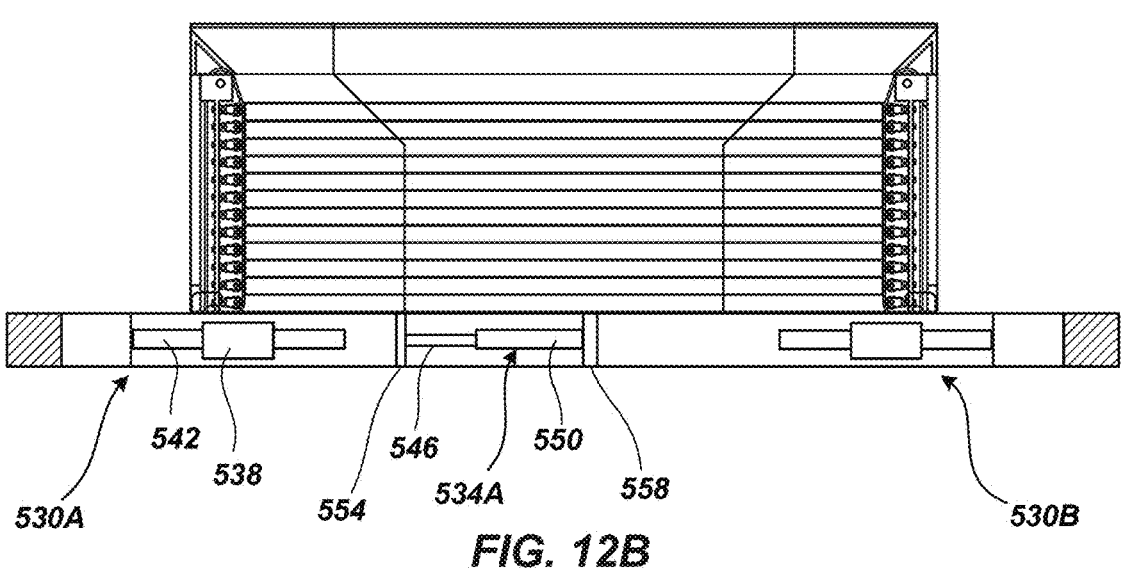
Figure 12D:
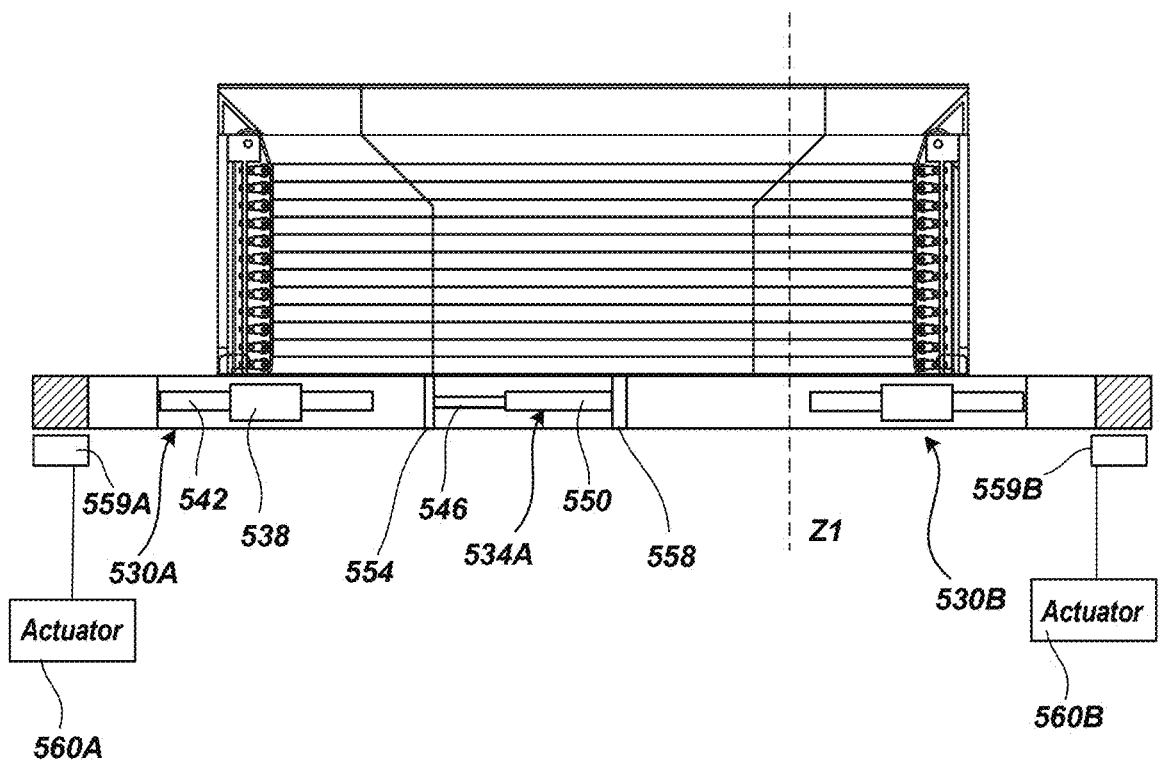

The actuation of the flipper 238B and the pusher 252B can be coordinated to rotate the second edge of the lead solar panel A downward toward the panel retention system 438, and particularly toward the second panel mount assembly 432B (see FIG. 11G). The pusher 252B can continue to exert or maintain a force on the lead solar panel A to cause it to remain seated within the retention channel 400A and to compress the biasing member 437. As the coordinated rotation of the flipper 238B and the pusher 252B continues, and particularly as the flipper 238B rotates further, the second edge of the lead solar panel A can slide along the top surface and rounded end of the flipper 238B to the position shown in FIG. G. In addition, the pusher 252B can be caused to apply a force to the upper surface of the lead solar panel A, also as shown in FIG. G. In this position, the pusher 252B can be actuated to rotate further to apply a downward force on the upper surface of the lead solar panel A, which causes the lead solar panel A to continue to slide down the flipper 238B and to move closer to the second panel mount assembly 432B, and particularly to the panel mount 436B. At this point, the flipper 238B can be used to counter the force from the biasing member 437 as the side of the solar panel A is now in contact with the upper surface of the flipper 238B (see FIG. 11G, and also FIG. 11H). Maintaining a force on the second edge of the lead solar panel A that counters the force exerted on the first edge of the lead solar panel A allows the solar panel A to be properly aligned so as to be able to clear the top rail 440B of the panel mount 436B as the pusher 252 is caused to further rotate and to push the lead solar panel A further down towards the retaining channel 400B (see FIG. 11H). The pusher 252B can be further actuated so as to exert a downward force on the lead solar panel A until it clears the top rail 440B and is seated on the lower rail 442B within the retaining channel 400B (see FIG. 11I). Once this happens, there is no counter force acting on the solar panel from the solar panel dispensing hopper 214, namely from the flipper 238B or the pusher 252B. As such, the biasing member 437 can cause the lead solar panel A to move further into the retaining channel 400B of the panel mount assembly 432B until an equilibrium is reached, which will typically be when the biasing member 437 is fully decompressed, or when the lead solar panel A comes into contact with the back surface of the retaining channel 400B. In any case, at this point the lead solar panel A can be considered to be fully installed and in an installed position within the panel retention system 438 of the panel support assembly 2 (see FIG. 11 J).

As shown in FIGS. 8H and 8I, thus these steps are not repeated here, once the lead solar panel A is installed, the pushers 252A and 252B and the flippers (e.g., see flippers 248A and 248B) can be actuated to rotate in the opposite direction and to return to their initial starting positions. The belt drive mechanisms 238, 240, 242, 244 can then be actuated to cause the entire solar panel stack to move downward so that each solar panel is positioned in a new position within the hopper enclosure 216. Each new position can correspond to each solar panel being aligned with the next lowest force applicator relative to the force applicator that they were previously aligned with. As the belt drive mechanisms 238, 240, 242, 244 are actuated in to move the solar panel stack downward, solar panel B is caused to be seated against the flippers, and becomes the new lead solar panel. The solar panel dispensing hopper 214 can then be relocated to a new installation site and moved into a position over an empty panel retention system where the above process can be repeated to install the new lead solar panel B within the next panel retention system.

With reference to FIGS. 12A-12D, and with continued reference to FIGS. 3 and 4, the solar panel installation system 210, and in this case the solar panel presentation system 213, can further comprise a multi-degree of freedom platform/stage supported between the solar panel dispensing hopper 214 and an installation vehicle (or a torque tube spanning bridging support member) to enable the solar panel dispensing hopper 214 to move in one or more translational degrees and/or rotational of freedom relative to the installation vehicle as discussed above. In the example shown, which is not intended to be limiting in any way, the solar panel installation system 210 can further comprise a multi-degree of freedom platform/stage that is part of or in support of the support frame 246 and the hopper enclosure 216 of the solar panel dispensing hopper 214. The multi-degree of freedom platform 510, which can be referred to as an X-Y platform or table, can be configured to provide the solar panel dispensing hopper 214, namely the hopper enclosure 216, with the capability to move in one or more degrees of freedom relative to a ground or other surface, as well as relative to an installation vehicle in support of the solar panel dispensing hopper 214 (e.g., installation vehicle 324 of FIG. 6), a torque tube spanning bridging support member, a panel support assembly, or any combination of these. In other words, the multi-degree of freedom platform 510 can facilitate one or more movements in one or more degrees of freedom of the hopper enclosure 216 (and any solar panels contained therein) for one more purposes, such as, to facilitate loading of the solar panels into the hopper enclosure 216, to adjust a dispensing position and/or orientation of the solar panel displacement device (and thus an installation position of a lead solar panel being dispensed from the solar panel dispensing hopper 214), and others. The multi-degree of freedom platform 510 allows for fine movements and adjustments (e.g., movements measured in inches or centimeters, such as, but not limited to, between 0 and 1 inches, between 0 and 2 inches, between 0 and 3 inches, between 0 and 5 inches, between 0 and 10 inches, and between 0 and 18 inches) of the position and orientation of the hopper enclosure 216 (and any solar panels within the hopper enclosure 216). In one example, components that are the same as or similar to those in the multi-degree of freedom platform 510 can be integrally formed with and part of the hopper enclosure 216. In another example, the multi-degree of freedom platform 510 can be a separate component or system that can couple (i.e., removably couple) to the hopper enclosure 216. In the example shown, the multi-degree of freedom platform 510 comprises an X-Y table comprising a separate structural component that is coupled to the hopper enclosure 216 by being coupled to the support frame 246 of the solar panel dispensing hopper 214 (which can be separate or part of the hopper enclosure 216). Specifically, the support frame 246 can be moveably coupled (coupled in a manner that facilitates relative movement between two coupled components (e.g., in a sliding, rolling, gliding manner) to an inner frame member 514 of the multi-degree of freedom platform 510. The inner frame member 514 of the multi-degree of freedom platform 510 can be sized and configured to interface with the support frame 246, such as to be able to be inserted into a channel formed in the support frame 246. The inner frame member 514 can be sized so as to be somewhat larger than the support frame 246 along a lateral axis X1. On the other hand, the inner frame member 514 can be sized so as to facilitate movement of the support frame 246 (and the hopper enclosure 216 and any solar panels therein) in a bi-directional manner relative to the inner frame member 514 along a longitudinal axis Y1. As shown, a gap or space between the inner frame member 514 and the support frame 246 exists along the ends of the support frame 246 and the inner frame member 514 along the axis Y1 (depending upon the position of the support frame 246 relative to the inner frame member 514) so that the support frame 246 (and the hopper enclosure 216 and any solar panels contained therein) can move towards and away from the respective ends of the inner frame 514 in a first translational degree of freedom along the axis Y1. The length L1 (as measured in a direction along the axis Y1) between outside surfaces of the ends of the support frame 246 relative to the length L2 between inside surfaces of the ends of the inner frame member 514 can define the total gap distance between them. A first lateral side of the support frame 246 can be moveably coupled (e.g., in a sliding, rolling, gliding manner) to the inner frame member 514 via one or more inner coupling mechanisms (see inner sliding coupling mechanisms 522A and 522B). A second lateral side of the support frame 246 can be moveably coupled (e.g., in a sliding, rolling, gliding manner) to the inner frame member 514 via one or more inner coupling mechanisms (see inner sliding coupling mechanisms 522C and 522D). An actuator, such as a linear actuator, a motor, a pneumatic actuator, a hydraulic actuator, a rotary actuator can be coupled between the inner frame member 514 and the support frame 246 on each of the first and second lateral sides (e.g., see linear actuators 526A and 526B) to facilitate movement or displacement of the inner frame member 514 and the support frame 246 relative to one another in a first translational degree of freedom along the Y1 axis. In the example shown, the actuators 526A and 526B each comprise a linear actuator, such as a pneumatic actuator, a hydraulic actuator, a solenoid, or others. However, this is not intended to be limiting in any way. Indeed, a rotary actuator and a linkage mechanism that converts rotational input from the rotary actuator to a linear output could be employed to facilitate actuation.

Likewise, the inner frame member 514 can be moveably coupled (again, coupled in a manner that facilitates relative movement between two coupled components) to an outer frame member 514 of the multi-degree of freedom platform 510. The inner frame member 514 of the multi-degree of freedom platform 510 can be sized and configured to interface with the outer frame member 518, such that the inner frame member 514 can move within the outer frame member 518. The outer frame member 518 can be sized so as to be somewhat larger than the inner frame member 514 along the longitudinal axis X1. On the other hand, the outer frame member 518 can be sized so as to facilitate movement of the inner frame member 514 (and the support frame 246 and the solar panel dispensing hopper 214) in a bi-directional manner along the lateral axis X1. As shown, a gap or space between the outer frame member 518 and the inner frame member 514 exists along the sides of the inner frame member 514 and the outer frame member 518 (depending upon a position of the inner frame member 514 relative to the outer frame member 518) along the axis X1 so that the inner frame member 514 (and the support frame 246 and the hopper enclosure 216 and any solar panels contained therein) can move towards and away from the respective sides of the outer frame member 518 in a second translational degree of freedom along the axis X1. The width W1 between outside surfaces of the sides of the inner frame member 514 (measured along the axis X1) relative to the width W2 between inner surfaces of the sides of the outer frame member 518 can define the total gap distance between them. A first longitudinal end of the inner frame member 514 can be moveably coupled (e.g., in a sliding, rolling, gliding manner) to a first longitudinal end of the outer frame member 518 via one or more outer coupling mechanisms (see outer sliding mechanisms 530A and 530B). A second longitudinal end of the inner frame member 514 can be moveably coupled to a second longitudinal end of the outer frame member 518 via one or more outer sliding coupling mechanisms (see outer sliding mechanisms 530C and 530D). An actuator, such as a linear actuator, a motor, a pneumatic actuator, a hydraulic actuator, a rotary actuator can be coupled between the inner frame member 514 and the outer frame 518 on each of the first and second longitudinal ends (e.g., see linear actuators 534A and 534B) to facilitate movement or displacement of the inner frame member 514 and the outer frame member 518 relative to one another in a second translational degree of freedom along the X1 axis. In the example shown, the actuators 534A and 534B each comprise a linear actuator, such as a pneumatic actuator, a hydraulic actuator, a solenoid, or others. However, this is not intended to be limiting in any way. Indeed, a rotary actuator and a linkage mechanism that converts rotational input from the rotary actuator to a linear output could be employed to facilitate actuation.

The inner and outer coupling mechanisms can comprise any mechanism or system that allows two component parts to be coupled to one another in a manner so to as to facilitate the relative movement of the component parts relative to one another along an axis. One of the coupling mechanisms, namely outer sliding coupling mechanism 530A, is described in more detail herein, with it being understood that all of the other sliding coupling mechanisms in the multi-degree of freedom platform 510 can comprise a similar configuration. The sliding coupling mechanism 530A can comprise a first member 538 coupled or otherwise joined and supported by the outer frame member 518, and a second member 542 coupled to or otherwise joined and supported by the inner frame member 514. Any sliding interface between the first and second members 538 and 542 is contemplated. In this example, the sliding coupling mechanism 530A can comprising a sliding bearing, wherein the first member 538 can comprise a receiving channel formed therein, and wherein the second member 542 can comprise an elongate rod or protrusion having a length longer than the first member, which rod or protrusion is disposed within the receiving channel. The first member 538 and the second member 542 are configure to slide relative to one another.

As indicated, the inner and outer coupling mechanisms can comprise any mechanism or system that allows two component parts to be coupled to one another in a manner so to as to facilitate the relative movement of the component parts relative to one another along an axis. In another example, although not shown, the various coupling mechanisms can comprise rollers supported between the various frame members or components to facilitate relative movement between these.

With respect the actuators in the multi-degree of freedom platform 510, one will be described, namely the actuator 534A, with it being understood that the remaining actuators can comprise a similar configuration. The actuator 534A can comprise a linear actuator having a piston 546 disposed within a cylinder 550. The piston 546 can be supported at one end within the cylinder 550, and mounted at an end distal from the cylinder 550 to a mounting plate 554 that is mounted to the outer frame member 518. The cylinder 550 can be mounted to a mounting plate 558 mounted to the inner frame member 514. Each of the other sliding coupling mechanisms, actuators, and mounting arrangements for these can be similar to the outer sliding mechanism 530A, the actuator 534A, and the mounting configurations or arrangements for these as described herein, with the exception that some of these will be between the inner frame member 514 and the support frame 246 of the hopper enclosure 216. It is noted that movements of the hopper enclosure 216 in the first and second degrees of freedom can be achieved independent of one another by actuating the various actuators as needed or desired.

The multi-degree of freedom platform 510 can further comprise, or otherwise be associated with as a separate system or component, one or more lifts operable with the outer frame member 518 to facilitate lift or movement of the outer frame member 518, the inner frame member 514, and the support frame 246 (along with the solar panel dispensing hopper 214) in one or more degrees of freedom. A single lift can be used to simultaneously lift both sides of the multi-degree of freedom platform 510 in a translational degree of freedom along the Z1 axis (see FIG. 12D). In another example, multiple lifts, such as first and second lifts 559A and 559B can be used to impart rotation (e.g., tilt) of the multi-degree of freedom platform 510 about one or more rotational axes. The lift or lifts 559A and 559B can be powered by an actuator (e.g., see actuators 560A and 560B associated with respective lifts 559A and 559B). The lift(s) can comprise a number of different configurations and mechanisms or systems, such as a scissor lift system, fluid actuators (e.g., pneumatic, hydraulic), screw thread system, leadscrew system, jacks, rack and pinion system, a lift table, and others. The lift(s) can be coupled to the outer frame member 518 (or any other structural component of the multi-degree of freedom platform 510) and utilized along with the other components of the multi-degree of freedom platform 510 to provide the solar panel dispensing hopper 214 with the capability to be moved in one or more translational degrees of freedom and/or one or more rotational degrees of freedom. In another example, the lift(s) can be interfaced and coupled directly to the support frame 246 of the solar panel dispensing hopper 214 without any X-Y platform components present, thus providing the solar panel dispensing hopper 214 with movement in only a single translational degree of freedom using a single lift, or in one or more rotational degrees of freedom using lifts 559A and 559B.

In one example, the multi-degree of freedom platform 510, and particularly the various actuators discussed above, can be controlled and operated by a multi-degree of freedom platform control system 561 comprising one or more processors and memory, which control system 561 can be a stand-alone dedicated control system, or it can be a control system that is part of an overall, higher-level control system, such as the control system 260 of FIG. 4, or the top-level control system 112 of FIG. 1.

In another example, actuation of one or more of the moveable components in the available degrees of freedom within the multi-degree of freedom platform 510 can be accomplished manually by an operator. Indeed, relative movement between the inner frame member 514 and the support frame 246 can be achieved manually by an operator exerting a force on one or each of these. Likewise, relative movement between the outer frame member 518 and the inner frame member 514 can be achieved manually by an operator exerting a force on one or each of these. And, relative movement by the lift 559 can be achieved manually. Alternatively, the actuators can be present, but themselves actuated manually by an operator rather than through a control system. Nonetheless, providing actuators to actuate the various degrees of freedom can facilitate at least partial and even full automation of the multi-degree of freedom platform 510, the lift 559 (if a separate system) of the solar panel installation system 210.

It is noted that in one example, the multi-degree of freedom platform 510 can be a separate system from the solar panel dispensing hopper 214, wherein the multi-degree of freedom platform 510 can be removably coupled to the solar panel dispensing hopper 214. In another example, the multi-degree of freedom platform 510 can be integrally formed with and part of the solar panel dispensing hopper 214.

With specific reference to FIGS. 13A-13J, and with continued reference to FIGS. 3-4, and 6, illustrated is a solar panel installation system 610 that is similar to the solar panel installation system 210 illustrated in FIG. 6, and discussed above. Again, the solar panel installation system 610 can facilitate manual installation of solar panels, or fully or partially automated installation of solar panels. The solar panel installation system 610 can comprise the solar panel presentation system 213 having the solar panel dispensing hopper 214 of FIGS. 3-5C (with example methods of operation being shown in FIGS. 7A-8I and 10A-11J) capable of receiving and housing therein one or more solar panels 1 (see plurality of solar panels 1 arranged in a horizontal stack). Unlike the solar panel installation system 210 of FIG. 6, the solar panel installation system 610 in this example can comprise a torque tube spanning bridging support member 612 (referred to hereinafter as bridging support member 612) operable to provide support to the solar panel dispensing hopper 214, and particularly the hopper enclosure 216, and to facilitate lifting, carrying or otherwise supporting the solar panel dispensing hopper 214. The solar panel installation system 610 can further comprise a plurality of solar panel installation vehicles operable to lift, carry and transport the solar panel dispensing hopper 214 via the bridging support member 612. The solar panel presentation system 213 with its solar panel dispensing hopper 214 can be operable with the plurality of installation vehicles and the bridging support member 612 to facilitate overhead installation of the solar panels 1 within the panel mount assemblies on the panel support assembly 2. This can include operably connecting each of the first and second installation vehicles 324A and 324B with the solar panel presentation system 213 via the vehicle/dispenser interface 348 which can comprise mechanical connections or couplings, electrical connections or couplings, fluid connections or couplings, data connections or couplings, and any combination of these.

The solar panel installation system 610 can further comprise first and second installation vehicles (see installation vehicles 324A and 324B) operable to engage and carry the bridging support member 612 along with the solar panel dispensing hopper 214 (and any solar panels contained therein). In the example shown, the installation vehicles 324A and 324B can be the same type and configuration of installation vehicle 324 discussed above and shown in FIG. 6. However, unlike the orientation of the installation vehicle 324 of the solar panel installation system of FIG. 6 relative to the torque tube 8, by using the bridging support member 612 shown here, the installation vehicles 324A and 324B can be oriented such that a forward driving direction along a forward driving axis is parallel or substantially parallel to the torque tube 8 with the hopper enclosure 216 in a proper position above a panel retention system 38 for dispensing the solar panels contained therein. This can facilitate more efficient installation of the solar panels from the solar panel dispensing hopper 214 and the hopper enclosure 216 as the installation vehicles 324A and 324B are not required to make as many maneuvers about the ground or another surface in order to position, orient, and locate the solar panel dispensing hopper 214 (and the solar panels) in a needed or desired position and/or orientation relative to the panel support assembly 2, and particularly the various panel retention systems 38 (with their respective panel mount assemblies 30), such that the solar panel dispensing hopper 214 can subsequently be operated and controlled to dispense and install the solar panels 1 within the panel retention systems 38. Moreover, with the addition of a second installation vehicle (see installation vehicle 324B), and by using the bridging support member 612, the solar panel dispensing hopper 214, and particularly the hopper enclosure 216 with the solar panels as contained therein, can be continuously maintained in an overhead position above the torque tube 8 and the various panel retention systems 38 as the two installation vehicles 324A and 324B position, orient, and locate the solar panel dispensing hopper 214 (and the solar panels) at an installation site, the then reposition, reorient, and relocate the solar panel dispensing hopper 214 at various other installation sites, such as successive installation sites along a torque tube 8. By being in a continuously overhead position, the degree to which the solar panel dispensing hopper 214 needs to be located, positioned and oriented at each installation site is reduced as compared to solar panel installation system where there is only a single vehicle that is not capable of maintaining the solar panel dispensing hopper 214 in an overhead position relative to the torque tube 8.

The solar panel installation system 610 is operable with a panel support assembly 2, which can be the same panel support assembly shown in FIG. 6, or one that is similarly configured. The panel support assembly 2 is not discussed again in detail here (but see the discussion above relative to FIG. 6). Suffice it to say, the panel support assembly 2 can comprise a torque tube 8 supported about a ground surface, and can be in support of a plurality of panel retention systems 38, each comprising one or more panel mount assemblies 30, the panel mount assemblies each being comprised of a panel mount 36 and a torque tube clamp 34. The panel support assembly 2 can further comprise a drive mechanism 12, an actuator 16, and a control system 20 to facilitate operation of the panel support assembly, namely driving of the torque tube 8 and the installed solar panel array.

The bridging support member 612 can comprise a structural support or an arrangement of a plurality of structural supports sized and configured to provide a platform for supporting the solar panel dispensing hopper 214. In one example, the bridging support member 612 can comprise a framework 614 comprising a plurality of structural support members. The bridging support member 612 can comprise an elongate primary support 615, as well as a first vehicle capture interface 618A supported by the primary support 615 proximate a first end of the primary support 615, and a second vehicle capture interface 618B supported by the primary support 615 proximate a second end of the primary support 615. The primary support 615 can comprise different sized and configurations, however, the primary support 615 is to comprise a suitable size, configuration so as to be able to support and bear the weight of the solar panel dispensing hopper 214 and any solar panels contained therein as the bridging support member 612 extends between the first and second solar panel installation vehicles 324A and 324B. The first and second vehicle capture interfaces 618A and 618B can facilitate the first and second installation vehicles 324A and 324B being able to engage and capture each of these, respectively, and thus engage and carry the bridging support member 612. Each of the first and second vehicle capture interfaces 618A and 618B can comprise any number of different types and configurations. In the example shown, the first and second vehicle capture interfaces 618A and 618B each comprise one or more capture channels 622A and 622B, respectively. In one example, as shown, the capture channels 622A and 622B are defined by tubular structures or tube-like structures 621A and 621B, respectively, coupled to the primary support 615, each comprising two or more sidewalls and at least one opening leading to the capture channels 622A and 622B. The capture channels 622A and 622B can extend along the width of the primary support 615 any distance suitable to enable the complete and proper capture of the bridging support member 612 by the first and second installation vehicles 324A and 324B, respectively. In this example, each of the first and second installation vehicles 324A and 324B are equipped with a set of forks 340 as part of the lift system 334. Each of the forks of the first installation vehicle 324A can be inserted into the capture channels 622A of the first vehicle capture interface 618A. Likewise, each of the forks of the second installation vehicle 324B can be inserted into the capture channels 622B of the second vehicle capture interface 618B. Once the forks from each of the installation vehicles 324A and 324B are inserted into the respective capture channels, the bridging support member 612 can be considered captured, and subsequently lifted (along with the solar panel dispensing hopper 214 as supported thereon) by the coordinated operation of the respective lift systems 334 of the first and second installation vehicles 324A and 324B. Coordinated operation of the first and second vehicles 324A and 324B and/or their respective lift system 334 can be ongoing to locate, position, and orient the bridging support member 612 and the solar panel dispensing hopper 214 as needed or desire. Indeed, the first and second installation vehicles 324A and 324B can facilitate movement of the bridging support member 612, and thus the solar panel dispensing hopper 214, in multiple degrees of freedom, such as tilting or rotating along three different rotational axes, as well as translating along three translational axes. Depending upon the configuration of the first and second vehicles, the number of degrees of freedom capable of being imparted to the solar panel dispensing hopper 214 can be different. As stated in FIG. 6, the installation vehicle 324, and by extension the first and second installation vehicles 324A and 324B, can comprise any number of different configurations, including different ground contacting elements (e.g., wheels, endless tracks, omnidirectional wheels, etc.), control systems, drive systems, etc. In addition, the lift systems can comprise any number of different configurations. The first and second installation vehicles 324A and 324B are merely examples of one type.

The bridging support member 612 can be sized and configured so as to permit the first installation vehicle 324A to be located and operated along a first side of the torque tube 8 and the second installation vehicle 324B to be located and operated along a second side of the torque tube 8 during installation of the solar panels into the panel retention systems 38 supported by the panel support assembly 2. In other words, the first and second installation vehicles 324A and 324B can straddle the torque tube 8, with the bridging support member 612 spanning the torque tube 8 (i.e., extending across the torque tube 8 along a lateral axis orthogonal to the torque tube 8) between the first and second installation vehicles 324A and 324B at a location above the torque tube 8. As such, the length of the bridging support member 612 can be sized to facilitate this installment arrangement with the first and second installation vehicles 324A and 324B. With the installation vehicles 324A and 324B and the bridging support member 612 in this arrangement, the solar panel dispensing hopper 214 as supported by the bridging support member 612, can also be located in a position overhead the torque tube 8 to facilitate and enable overhead installation of solar panels, wherein the solar panel dispensing hopper 214 may also be considered as spanning the torque tube 8. The bridging support member 612 can comprise a clearance, such as an opening in the primary support 615, sized and configured so as to allow a lead solar panel being dispensed from the solar panel dispensing hopper 214 to pass through the bridging support member 612 without coming into contact with any portion of the bridging support member 612.

The bridging support member 612 can further comprise a solar panel dispensing hopper interface sized and configured to receive and interface with the solar panel dispensing hopper 214 to facilitate support of this. In one example, the bridging support member 612 can be integrally formed with and part of the solar panel dispensing hopper 214. In one contemplated configuration, the bridging support member 612 can be part of the support frame 246 of the solar panel dispensing hopper 214. In another example, the bridging support member 612 can be separate from the solar panel dispensing hopper 214, wherein the solar panel dispensing hopper 214 can be removably coupled to the bridging support member 612. One example removable coupling arrangement can comprise the support frame 214 of the solar panel dispensing hopper 214 removably coupled to the bridging support member 612 via one or more fasteners (see FIG. 13D). In this example, one of the structural supports on a first side of the framework 614 can be sized and configured to be inserted into and seated within the channel of the support frame 246 on a first side of the support frame 246. Likewise, one of the structural supports on a second side of the framework 614 can be sized and configured to be inserted into and seated within the channel of the support frame 246 on a second side of the support frame 246. One or more fasteners, such as one or more bolts (e.g., see bolt 629), can be used to couple the framework of the bridging support member 612 to the support frame 246 of the solar panel dispensing hopper, thereby removably coupling and securing the solar panel dispensing hopper 214 to the bridging support member 612.

With the solar panels loaded into the hoper 216, with the solar panel dispensing hopper 214 coupled or otherwise joined to the bridging support member 612, and with the bridging support member 612 captured by the first and second installation vehicles 324A and 324B, the first and second installation vehicles 324A and 324B can be operated in a coordinated manner to locate the solar panel dispensing hopper 214 in an overhead position above the torque tube 8, and at an installation site where the solar panel dispensing hopper 214 can be operated as explained above with reference to FIGS. 7A-11J, which operations are not repeated here.

The solar panel installation system 610 can further comprise a multi-degree of freedom platform supported between the solar panel dispensing hopper 214 and the bridging support member 612 (see FIGS. 13E and F) such that the solar panel dispensing hopper 214, and particularly the hopper enclosure 216, is movable in one or more degrees of freedom relative to the bridging support member 612. The multi-degree of freedom platform can be configured in a number of different ways to comprise a number of different degrees of freedom of movement. In the example show, the multi-degree of freedom platform comprises the same or a similarly configured multi-degree of freedom platform 510 as taught above and as shown in FIGS. 12A-12D. As such, the multi-degree of freedom platform 510 can be configured to facilitate translational movement in at least two degrees of freedom along two axes (the multi-degree of freedom platform 510 comprising an X-Y platform), and in some examples three degrees of freedom (by utilizing a lift to facilitate movement in a z direction in addition to the X-Y platform). Components the same as or similar to those in the multi-degree of freedom platform 510 can be integrally formed with and part of, or removably coupled to, the bridging support member 612 in the same or in a similar manner as components the same or similar as the multi-degree of freedom platform 510 can be integrally formed with and part of, or removably coupled to, the support frame 246 of the solar panel dispensing hopper 214, as discussed above. For instance, in one example, the components and features of the multi-degree of freedom platform 510 can be incorporated into the bridging support member 612, such that some of the structural members making up the framework 614 are moveably coupled to one another and actuatable via one or more actuators so as to be able to move relative to one another in one or more degrees of freedom. In another example, the multi-degree of freedom platform 510 can be a separate system that is coupled to, joined, or otherwise carried by the bridging support member 612. This is the arrangement and configuration in the example shown in FIGS. 13E and 13F. The multi-degree of freedom platform 510 can facilitate fine movements and adjustments (e.g., movements measured in inches or centimeters) of the position and orientation of the hopper enclosure 216 (and any solar panels within the hopper enclosure 216) as explained above, which explanation is not repeated here. The multi-degree of freedom platform 510 can be controlled and operated via the multi-degree of freedom platform controller or control system, which can be a stand-alone controller, or part of a higher-level control system.

If adjustments to the location, position and/or orientation of the solar panel dispensing hopper 214 and/or a lead solar panel to be or being dispensed are needed, these can be made by manipulating at least one of the first installation vehicle 324A, the second installation vehicle 324B, the multi-degree of freedom platform 510, the solar panel dispensing hopper 214, or the bridging support member 612.

The solar panel installation system 610 can further comprise a vehicle alignment system 640 (see FIGS. 13E-13G) configured and operable to align (and correct misalignment of) the first and second vehicles 324A and 324B, and more particularly the solar panel dispensing hopper 214, relative to the torque tube 8 and the panel retention systems 38 (with one or more panel mount assemblies 30) supported on the torque tube 8 at the various installation sites along the torque tube 8 as the first and second vehicles 324A and 324B travel along the torque tube 8 to reach the various installation sites. The vehicle alignment system 640 can be supported by and operable with at least one of the support frame 246, the hopper enclosure 216, the bridging support member 612, the multi-degree of freedom platform 510, or one or both of the installation vehicles 324A and/or 324B. In the example shown, the system 640 is supported by and operable with the bridging support member 612, with alignment fiducials extending both forward and rearward of the bridging support member 612. However, this is not intended to be limiting in any way. Typically, the vehicle alignment system 640 will be associated with (i.e., supported by and operable with) whatever device, system, installation vehicle, that most appropriately locates the vehicle alignment system 640 relative to the torque tube 8 for its intended purpose.

In one example, as shown, which is not intended to be limiting in any way, the vehicle alignment system 640 can comprise alignment fiducials in the form of a first leading guide arm 641 having a tracking portion 643 and a lead-in portion 645. The vehicle alignment system 640 can comprise a second leading guide arm 651 having a tracking portion 653 and a lead-in portion 655. The first and second leading guide arms 641 and 651 can be located and supported on the bridging support member 612, and specifically on a lower surface of the bridging support member 612 so as to extend away from a leading or forward-facing portion of the bridging support member 612 (the leading or forward-facing portion being that portion of the bridging support member 612 that faces in or toward a forward direction of travel (see arrow in FIG. 13F). The first and second leading guide arms 641 and 651 can be spaced apart a distance that is greater than a length of the panel mounts 36 as supported on the torque tube 8 so that as the first and second installation vehicles 324A and 324B travel in a forward direction (see arrow in FIG. 13F) along the torque tube carrying the bridging support member 612 (and the solar panel dispensing hopper 214), the panel mounts 36 are caused to be initially received within the opening defined by the lead-in portions 645 and 655, respectively, of the first and second leading guide arms 641 and 651, then received between and into the area defined by the lead-in portions 645 and 655, and then subsequently received between and into the area defined by the tracking portions 643 and 653 as the installation vehicles 324A and 324 continue to travel in the forward direction along the torque tube 8. The panel mounts 36 can be caused to exit the first and second leading guide arms 641 and 651 through an opening defined by the terminating ends of the tracking portions 643 and 653 as the first and second installation vehicles 324A and 324B continue to travel in the forward direction of travel along the torque tube 8. The first and second leading guide arms 641 and 651 can be referred to as lateral leading guide arms as they contact the sides of the panel mounts 36. In addition, the first and second leading guide arms 641 and 651 can be configured to provide a sliding interface with the panel mounts 36 without damaging the panel mounts 36.

The lead-in portions 645 and 655 are configured to be on an incline relative to the tracking portions 643 and 653, with the lead-in portion 645 extending outward and away from the tracking portion 643 of the first leading guide arm 641 in a first direction, and the lead-in portion 655 extending outward and away from the tracking portion 653 of the second leading guide arm 651 in a second direction, such that the terminating ends of the two lead-in portions 645 and 655 define an opening or spacing between the first and second leading guide arms 641 and 651 that is greater than a spacing between the tracking portions 643 and 653. The outwardly tapering configuration of the lead-in portions 645 and 655 allow the alignment of the vehicles 324A and 324B to be off slightly relative to the torque tube 8 and still capture the next panel mount 36 supported on the torque tube 8 as the first and second installation vehicles 324A and 324B advance.

The lead-in portions 645 and 655 and the tracking portions 643 and 653 can be sized and configured so as to ensure that the first and second leading guide arms 641 and 651 (lateral guide arms) are caused to be in contact with and to capture the sides or side surfaces of the panel mounts 36. Furthermore, the first and second leading guide arms 641 and 651 can be sized and configured so as to be in contact with and have captured therebetween at least one panel mount 36. In some cases, the first and second leading guide arms 641 and 651 can be configured to be in contact with and have captured therebetween two panel mounts 36, thus preventing undesired rotation of the first and second leading guide arms 641 and 651 (and therefore the first and second installation vehicles 324A and 324B and the solar panel dispensing hopper 214) about a single panel mount 36 in or about an axis normal to an uppermost surface of the torque tube 8 (e.g., which axis can often also be normal to ground in the event the ground is level with the torque tube 8), and therefore misalignment of the first and second installation vehicles 324A and 324B and the solar panel dispensing hopper 214 relative to the torque tube 8 and the panel retention systems 38 (with the panel mount assemblies 30) at one or more installation sites along the torque tube 8.

In one example, the first and second leading guide arms 641 and 651 can be rigidly mounted to the bridging support member 612. In this example, the first and second leading guide arms 641 and 651 are configured to be rigid themselves, and therefore they can function as opposing mechanical constraints by physically contacting and engaging the captured panel mounts 36 and sliding past them as the first and second installation vehicles 324A and 324B advance in the forward direction of travel. The first and second installation vehicles 324A and 324B can be aligned via the mechanical constraint provided by the first and second leading guide arms 641 and 651 as they capture two or more panel mounts 36.

Figures 13A, 13B, 13C:
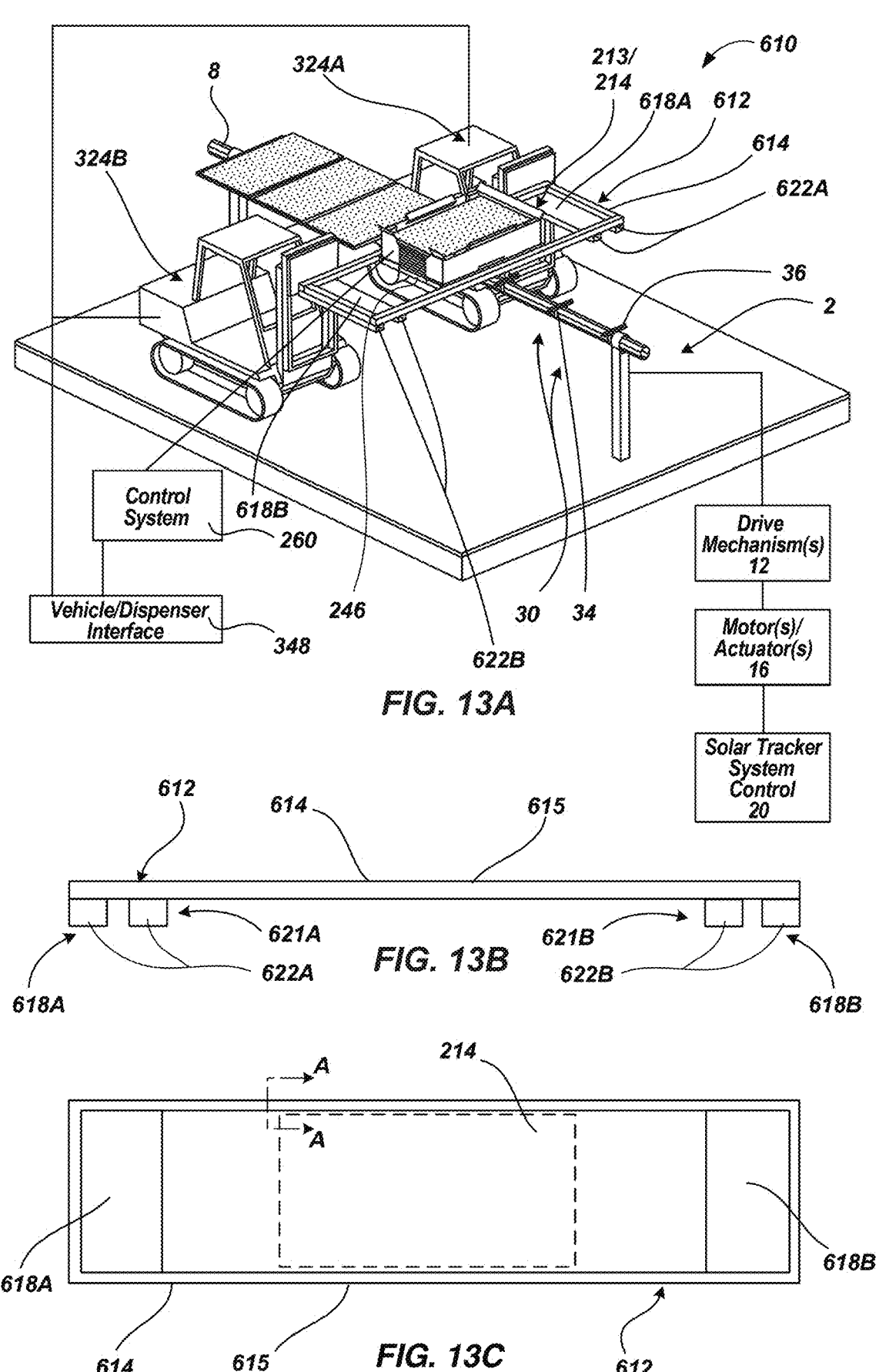
Figures 13D, 13E:
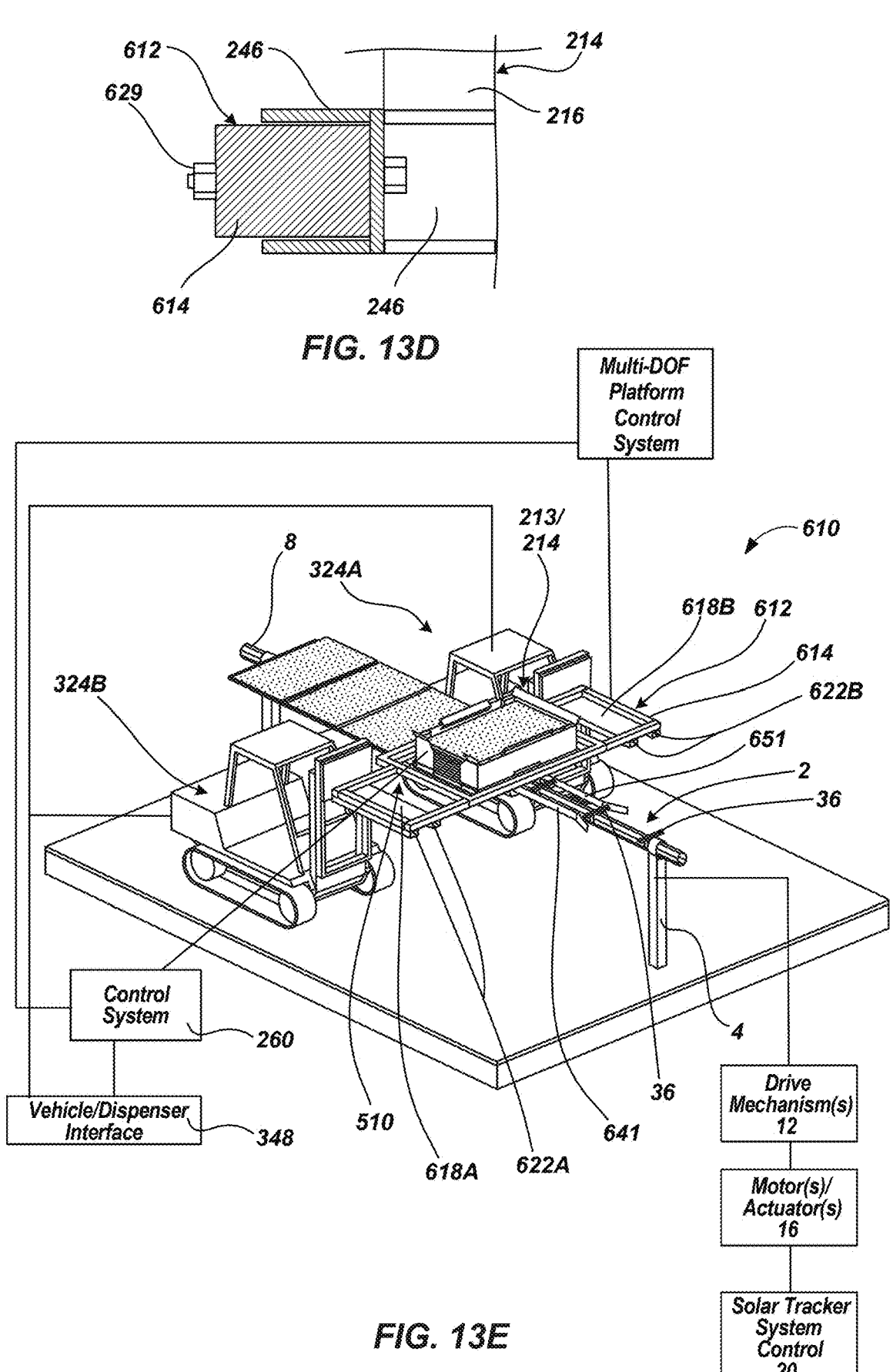
Figures 13F, 13G:
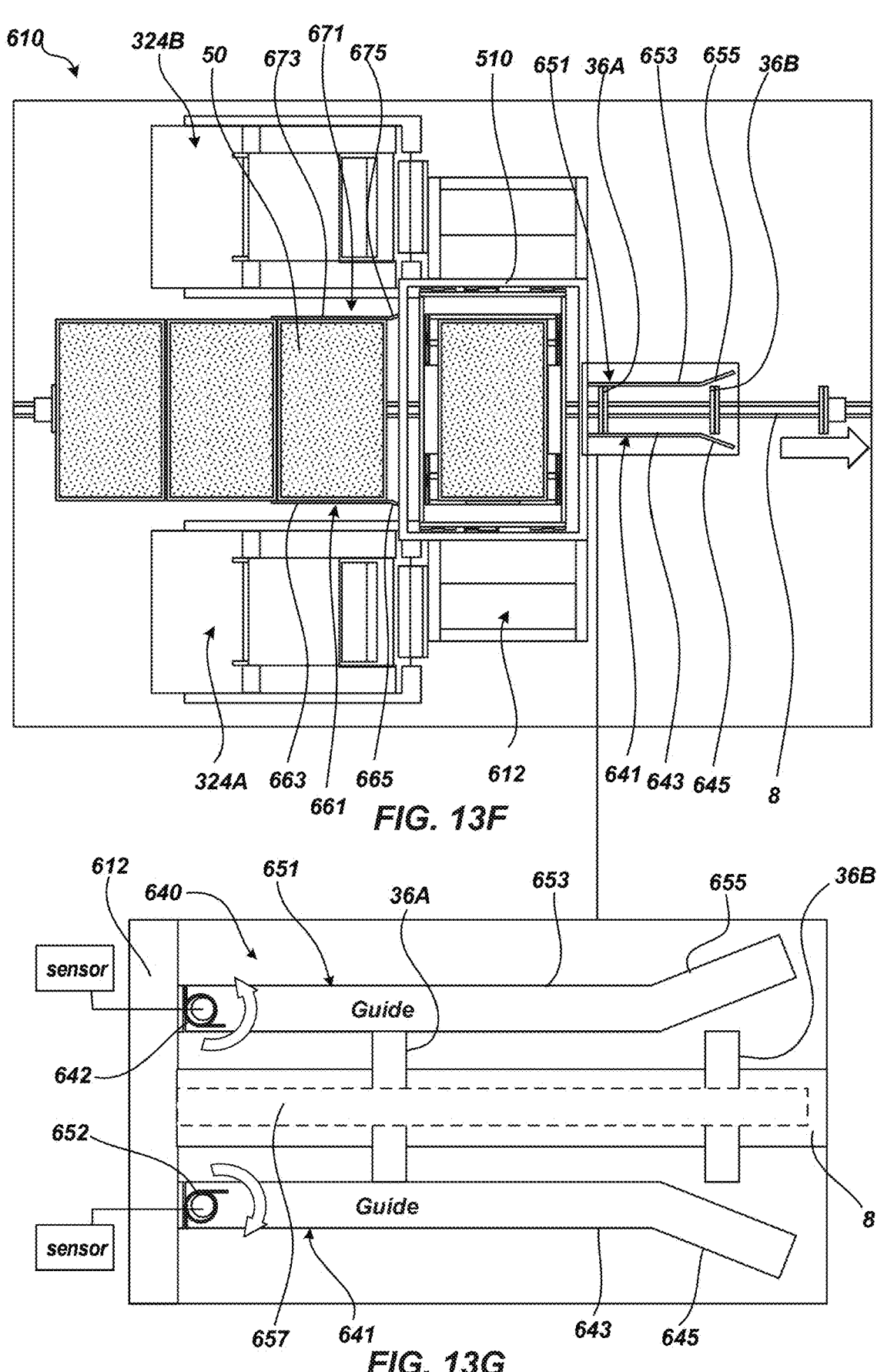

In another example, the first and second leading guide arms 641 and 651 (while still rigid themselves) can be flexibly or pivotally mounted to the bridging support member 612 (see FIG. 13G). In this example, the vehicle alignment system 640 can further comprise biasing members 642 and 652 (e.g., torsional or other type of spring operable with rotating or pivoting members) associated with each of the first and second guide arms 641 and 651, respectively, which biasing members are operable to maintain the first and second leading guide arms 641 and 651 against the panel mounts 36. Each of the first and second leading guide arms 641 and 651 can comprise a default or normal position where the first and second leading guide arms 641 and 651 are limited in their rotation so as to prevent inward rotation of these towards one another past a certain rotational position. This can be accomplished in any number of ways (e.g., stopper, rotation limiting joint, etc.). One or more sensors can be provided with each of the first and second leading guide arms 641 and 651 that monitor the position of the first and second leading guide arms 641 and 651 relative to the panel mounts 36. The first and second leading guide arms 641 and 651 and the sensors can provide an alignment feedback system that relies on the mechanical contact of the first and second leading guide arms 641 and 651 with the panel mounts 36. When one or more captured panel mounts 36 operate to cause rotation or flexing within one or both of the first and second leading guide arms 641 and 651 that overcomes the biasing member and that causes the first and second leading guide arms 641 and 651 to flex or rotate, the degree of rotation or flex can be measured and detected by the respective sensors associated with the first and second guide arms 641 and 651, and the input can be sent to the control system where the data can be compared to stored data corresponding to acceptable operating parameters. If the measured rotational position of either one of the first and second leading guide arms 641 and 651 is outside of an acceptable pre-determined range, then this means that the first and second installation vehicles 324A and 324B have deviated from a correct path or direction of travel and that a correction is needed. In this case, the path or direction of travel of the first and second installation vehicles 324A and 324B can be corrected (e.g., the first and/or second installation vehicles 324A and 324B can be turned) by the control system (either manually or automatically) to bring one or both of the first and second leading guide arms 641 and 651 back into an acceptable rotational position within the acceptable range. In one example, the sensors associated with the first and second leading guide arms 641 and 651 can comprise rotary position sensors associate with the axes of rotation. In another example, the sensors associated with the first and second leading guide arms 641 and 651 can comprise linear position sensors in contact with the first and second leading guide arms 641 and 651 and located offset from the pivot or axis of rotation of the first and second guide arms 641 and 651.

Although not shown, in another example, the first and second leading guide arms 641 and 651 can be configured to be operable with and to capture the torque tube clamps 34 of the panel mount assemblies 30 rather than the panel mounts 36. The configuration of the first and second leading guide arms 641 and 651 can be the same, and they can function in a similar manner as discussed above.

In another example, the vehicle alignment system 640 can comprise a third overhead or superior leading guide arm (see guide arm 657 shown in dotted lines in FIG. 13G). The overhead guide arm 657 can function similar to the lateral first and second leading guide arms 641 and 651 discussed above, except that the overhead leading guide arm 657 can be configured and operable to contact a top surface of the panel mounts 36 so as to facilitate a proper height of the solar panel dispensing hopper 214 relative to the panel mounts 36 and the torque tube 8 so as to facilitate a proper height position of the solar panel dispensing hopper 214 at an installation site.

The vehicle alignment system 640 can further comprise alignment fiducials in the form of a first trailing guide arm 661 having a tracking portion 663 and a lead-in portion 665. The vehicle alignment system 640 can comprise a second trailing guide arm 671 having a tracking portion 673 and a lead-in portion 675. These can be similar in form and function as the leading guide arms, except that they are configured to engage installed solar panels. The first and second trailing guide arms 661 and 671 can be located and supported on the bridging support member 612, and specifically on a lower surface of the bridging support member 612 so as to extend away from a trailing or rearward facing portion of the bridging support member 612 (the trailing or rearward facing portion being that portion of the bridging support member 612 that faces toward the first and second installation vehicles 324A and 324B in the view shown, and toward a rearward direction opposite a forward direction of travel (see arrow in FIG. 13F showing the forward direction of travel), or in other words, on the rear facing side of the bridging support member 612). The first and second trailing guide arms 661 and 671 can be spaced apart a distance that is greater than a length (or width depending upon the installation orientation of the solar panels) of the installed solar panels 50 as installed and supported within the panel mount assemblies 30 so that as the first and second installation vehicles 324A and 324B travel in a forward direction (see arrow in FIG. 13F) along the torque tube 8 carrying the bridging support member 612 (and the solar panel dispensing hopper 214), the one or more solar panel 50 as just installed by the solar panel dispensing hopper 214 are caused to be initially received within the opening defined by the lead-in portions 665 and 675, respectively, of the first and second trailing guide arms 661 and 671, then received between and into the area defined by the lead-in portions 665 and 675, and then subsequently received between and into the area defined by the tracking portions 663 and 673 as the installation vehicles 324A and 324 continue to travel in the forward direction along the torque tube 8. The solar panels 50 can be caused to exit the first and second trailing guide arms 661 and 671 through an opening defined by the terminating ends of the tracking portions 663 and 673 as the first and second installation vehicles 324A and 324B continue to travel in the forward direction of travel along the torque tube 8. The first and second trailing guide arms 661 and 671 can be referred to as lateral trailing guide arms as they contact the sides of the installed solar panels 50. In addition, the first and second trailing guide arms 661 and 671 can be configured to provide a sliding interface with the solar panels 50 without damaging the solar panels 50.

The lead-in portions 665 and 675 are configured to be on an incline relative to the tracking portions 663 and 673, with the lead-in portion 665 extending outward and away from the tracking portion 663 of the first trailing guide arm 661 in a first direction, and the lead-in portion 675 extending outward and away from the tracking portion 673 of the second trailing guide arm 671 in a second direction, such that the terminating ends of the two lead-in portions 665 and 675 define an opening or spacing between the first and second trailing guide arms 661 and 671 that is greater than a spacing between the tracking portions 663 and 673. The outwardly tapering configuration of the lead-in portions 665 and 675 to provide a wider opening allow the alignment of the vehicles 324A and 324B to be off slightly relative to the torque tube 8 and still capture the next solar panel 50 installed in the panel mount assemblies 30 a supported on the torque tube 8 as the first and second installation vehicles 324A and 324B advance.

The lead-in portions 665 and 675 and the tracking portions 663 and 673 can be sized and configured so as to ensure that the first and second trailing guide arms 661 and 671 (lateral guide arms) are caused to be in contact with and to capture the sides or side surfaces of the solar panels 50. Furthermore, the first and second trailing guide arms 661 and 671 can be sized and configured so as to be in contact with and have captured therebetween at least two solar panels at all times, thus preventing undesired rotation of the first and second trailing guide arms 661 and 671 (and therefore the first and second installation vehicles 324A and 324B and the solar panel dispensing hopper 214) about a single solar panel 50 in or about an axis normal to an uppermost surface of the torque tube 8 (e.g., which axis can often also be normal to ground in the event the ground is level with the torque tube 8), and therefore misalignment of the first and second installation vehicles 324A and 324B and the solar panel dispensing hopper 214 relative to the torque tube 8 and the panel retention systems 38 (with the panel mount assemblies 30) at one or more installation sites along the torque tube 8.

In one example, the first and second trailing guide arms 661 and 671 can be rigidly mounted to the bridging support member 612. In this example, the first and second trailing guide arms 661 and 671 are configured to be rigid themselves, and therefore they can function as opposing mechanical constraints by physically contacting and engaging the captured solar panels 50 and sliding past them as the first and second installation vehicles 324A and 324B advance in the forward direction of travel. The first and second installation vehicles 324A and 324B can be aligned via the mechanical constraint provided by the first and second trailing guide arms 661 and 671 as they capture two or more solar panels 50.

In another example, the first and second trailing guide arms 661 and 671 (while still rigid themselves) can be flexibly or pivotally mounted to the bridging support member 612 (see FIG. 13G). In this example, the vehicle alignment system 640 can further comprise biasing members similar to biasing members 642 and 652 discussed above (e.g., torsional or other type of spring operable with rotating or pivoting members) associated with each of the first and second trailing guide arms 661 and 671, respectively, which biasing members are operable to maintain the first and second trailing guide arms 661 and 671 against the solar panels 50. Each of the first and second trailing guide arms 661 and 671 can comprise a default or normal position where the first and second trailing guide arms 661 and 671 are limited in their rotation so as to prevent inward rotation of these towards one another past a certain rotational position. This can be accomplished in any number of ways (e.g., stopper, rotation limiting joint, etc.). One or more sensors can be provided with each of the first and second trailing guide arms 661 and 671 that monitor the position of the first and second trailing guide arms 661 and 671 relative to the solar panels 50. The first and second trailing guide arms 661 and 671 and the sensors can provide an alignment feedback system that relies on the mechanical contact of the first and second trailing guide arms 661 and 671 with the solar panels 50. When one or more captured solar panels 50 operate to cause rotation or flexing within one or both of the first and second trailing guide arms 661 and 671 that overcomes the biasing member and that causes the first and second trailing guide arms 661 and 671 to flex or rotate, the degree of rotation or flex can be measured and detected by the respective sensors associated with the first and second trailing guide arms 661 and 671, and the input can be sent to the control system where the data can be compared to stored data corresponding to acceptable operating parameters. If the measured rotational position of either one of the first and second trailing guide arms 661 and 671 is outside of an acceptable pre-determined range, then this means that the first and second installation vehicles 324A and 324B have deviated from a correct path or direction of travel and that a correction is needed. In this case, the path or direction of travel of the first and second installation vehicles 324A and 324B can be corrected (e.g., the first and/or second installation vehicles 324A and 324B can be turned) by the control system to bring one or both of the first and second trailing guide arms 661 and 671 back into an acceptable rotational position within the acceptable range. In one example, the sensors associated with the first and second trailing guide arms 661 and 671 can comprise rotary position sensors associate with the respective axes of rotation. In another example, the sensors associated with the first and second trailing guide arms 661 and 671 can comprise linear position sensors in contact with the first and second trailing guide arms 661 and 671 and located offset from the pivot or axis of rotation of the first and second trailing guide arms 661 and 671.

The first and second leading guide arms 641 and 651 can be deployed alone or in combination with the first and second trailing guide arms 661 and 671, and vice versa. Using the first and second leading guide arms 641 and 651 simultaneously with the first and second trailing guide arms 661 and 671 can further enhance the alignment capabilities of the solar panel installation system 610 over using the leading or trailing guide arms alone.

It is noted that while the first and second leading guide arms 641 and 651 and the first and second trailing guide arms 661 and 671 are shown as being part of the solar panel installation system 610, they can be part of or included in any of the solar panel installation systems discussed and disclosed herein, as well as any solar panel installation system formed in accordance with the present disclosure. For example, the present disclosure sets forth and discusses a number of different example types and configurations of installation vehicles. Likewise, the present disclosure sets forth and discusses a number of different example types of solar panel presentation systems/devices with different types of solar panel dispensing hoppers. Likewise, the present disclosure sets forth and discusses a number of different example types of bridging support members. The vehicle alignment system 640 discussed herein can be implemented with any one or all of these.

FIGS. 13H-13J illustrate other example support frames, or features that can be implemented into a support frame to achieve movement within the support frames in one or more additional degrees of freedom over the bridging support member 612 of FIGS. 13A-D. FIGS. 13H and 13I illustrate an alternatively configured bridging support member 612' wherein the bridging support member 612' comprises a first lift system 623A coupled and supported between the framework 614' and the vehicle capture interface 618A'. Likewise, the bridging support member 612' comprises a second lift system 623B coupled and supported between the framework 614' and the vehicle capture interface 618B'. The lift systems 623A and 623 can comprise a number of different types providing a number of different degrees of freedom of movement. In the example shown, the lift systems 623A and 623B each comprise a scissor lift system comprising a linkage mechanism and an actuator to move the linkage mechanism to raise and lower the framework 614' (and a solar panel presentation system supported by the bridging support member 612'). The lift systems can comprise other types of lift systems or mechanisms, such as fluid actuators (e.g., pneumatic, hydraulic), screw thread systems, lead-screw systems, jacks, rack and pinion systems, lift tables, and others. The lift systems 623A and 623B can be operated together as a single system, or they can be independent of one another capable of being operated independently of one another. Upon being actuated, the lift systems 623A and 623B can be configured to at least one of tilt (i.e., rotate) or level (i.e., raise or lower along the Z1 axis) the framework 614' of the bridging support member 612' relative to the vehicle capture interfaces 618A' and 618B'.

FIG. 13J illustrates an alternatively configured bridging support member 612" wherein the bridging support member 612" comprises various moveable components that facilitate movement of a solar panel dispensing hopper 214 supported by the bridging support member 612" in multiple translational degrees of freedom (e.g., two translational degrees of freedom, namely translation in or along the X1 and Y1 axes) relative to the vehicle capture interfaces 618A" and 618B". This example is similar to the bridging support member 612 in support of the multi-degree of freedom platform 510 shown in FIGS. 13E and 13F, except that various components of the multi-degree of freedom platform 510 are integrated into the bridging support member 612". As shown, the bridging support member 612" can comprise an inner frame member 681" operable to receive the support a solar panel dispensing hopper 214, wherein the inner frame member 681' is moveably coupled to an outer frame member 682", such that the inner frame member 681 (and the solar panel dispensing hopper 214) is moveable in a first translational degree of freedom along the X1 axis. The outer frame member 682" can be moveably coupled to the framework 614", such that both the outer frame member 682" and the inner frame member 681" (and the solar panel dispensing hopper 214) are moveable in a second translational degree of freedom along the Y1 axis. As such, the bridging support member 612" can be said to comprise an X-Y translational movement stage.

It is noted that the lift systems 623A and 623B of the bridging support member 612' of FIGS. 13H and 13I can be combined with the bridging support member 612" of FIG. 13J to comprise still another example of a bridging support member providing translational movement to a solar panel dispensing hopper 214 in all three translational degrees of freedom (translation along axes X1, Y1, and Z1), as well as rotational movement depending upon whether or not the lift systems 623A and 623B are independently actuated.

Figure 14A:
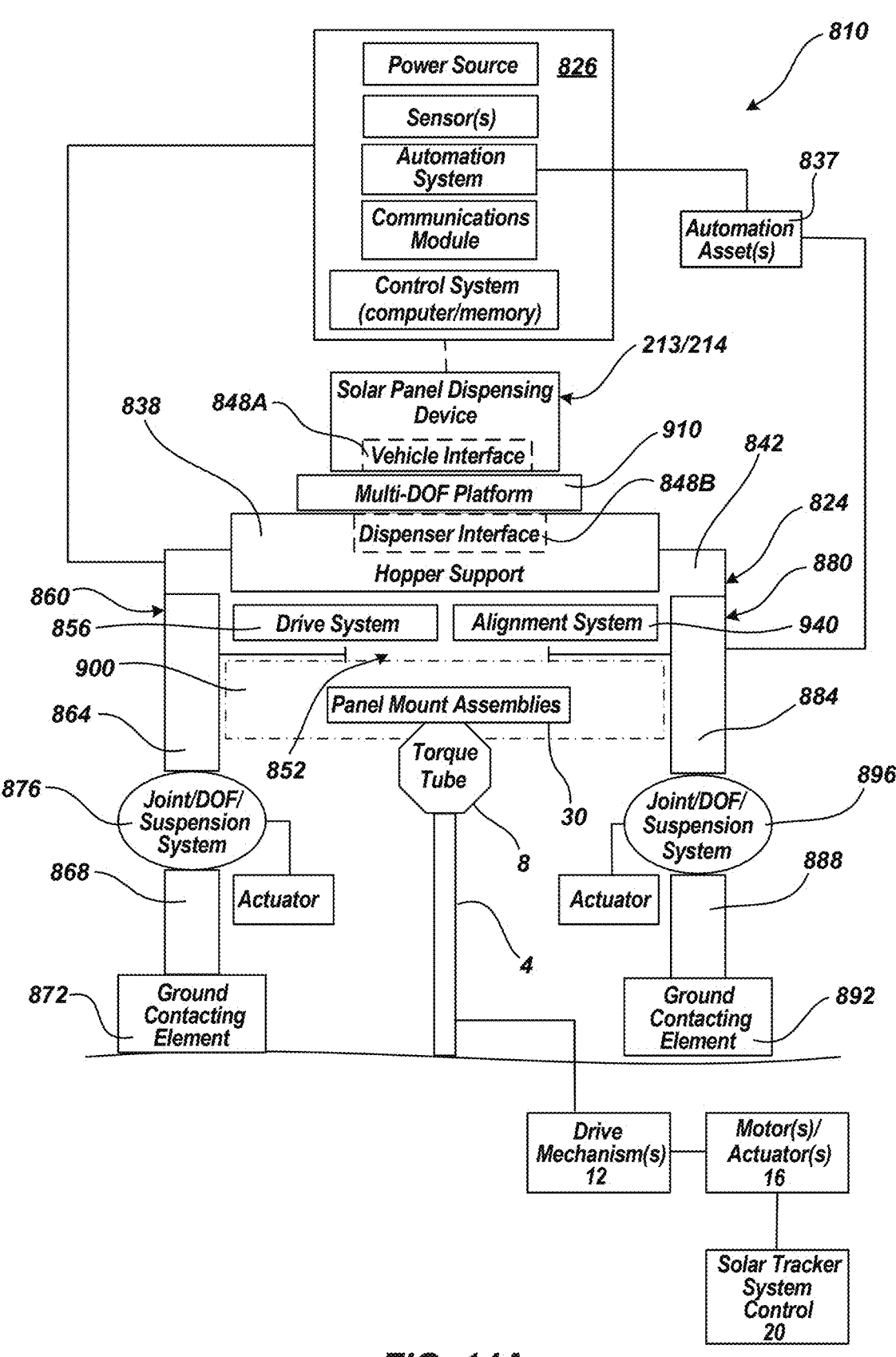
FIGS. 14A-14D illustrate various views of a solar panel installation system in accordance with an example of the present disclosure, the example solar panel installation system comprising the solar panel presentation system of FIG. 4 with the solar panel dispensing hopper of FIGS. 3 and 5A-5D, with some examples having the multi-degree of freedom platform of FIGS. 12A-12D.
Figure 14B:
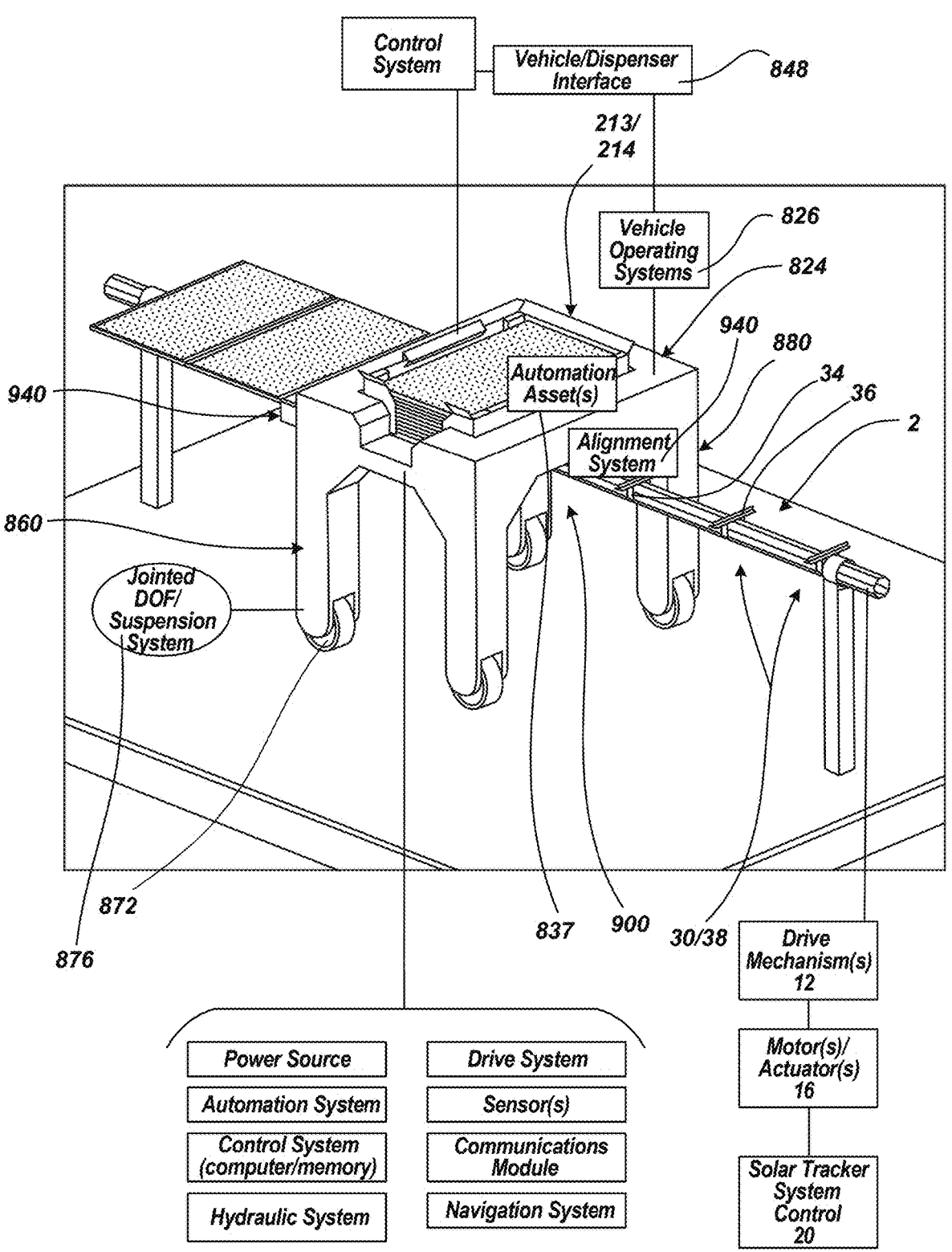
Figure 14C:
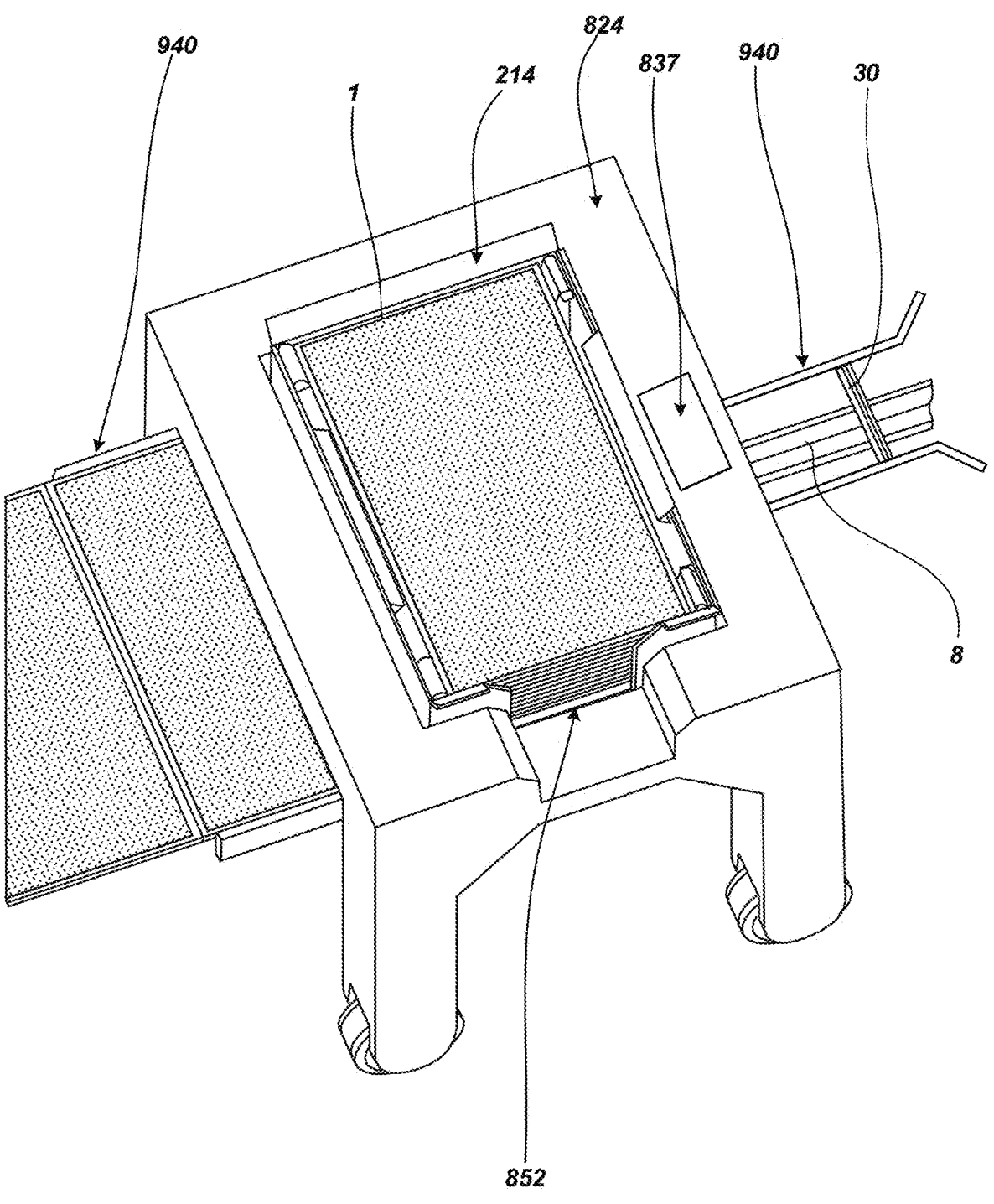
Figure 14D:
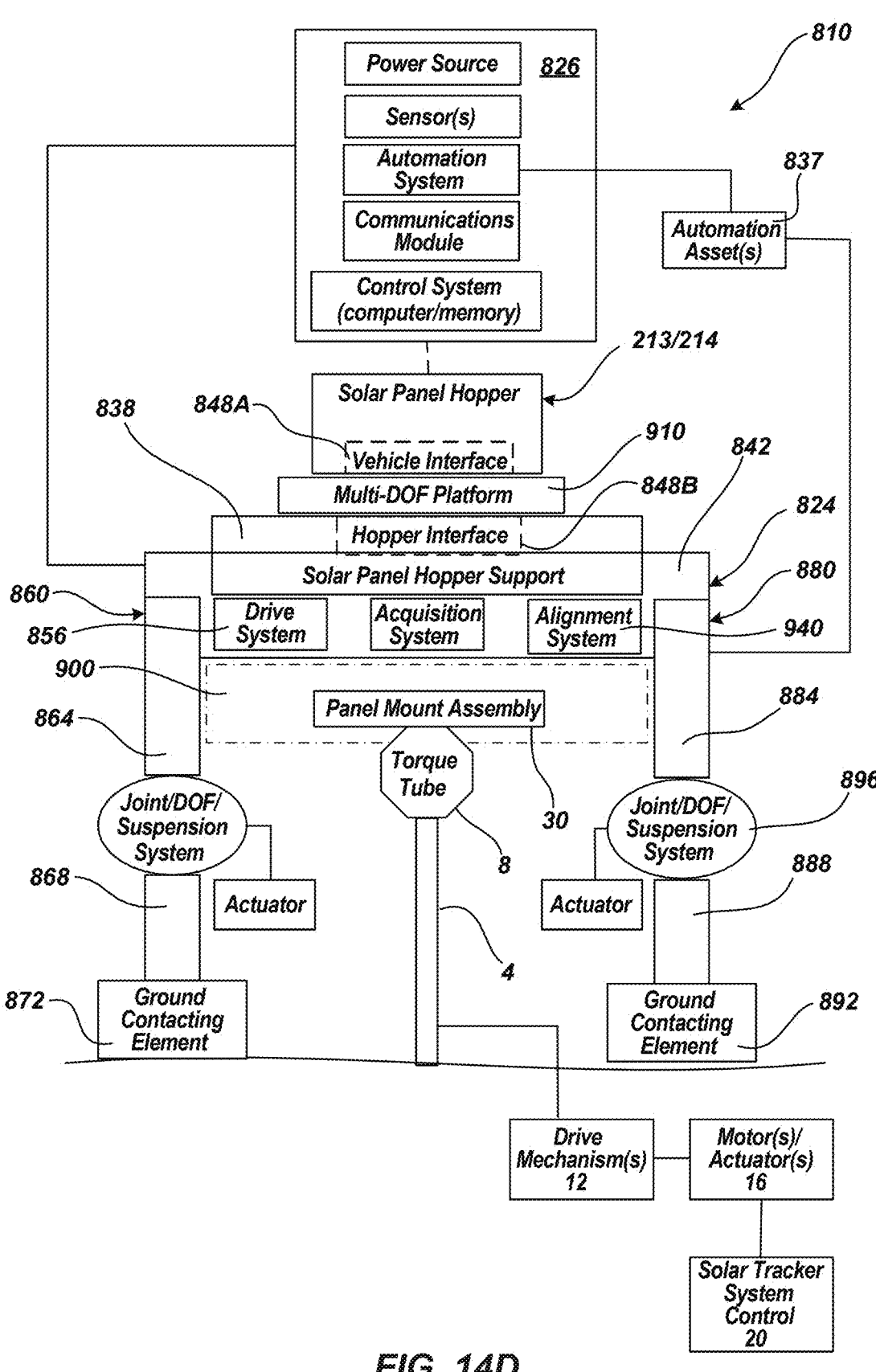

With reference to FIGS. 14A-14C, and with continued reference to FIGS. 3-4, and 6, illustrated is a solar panel installation system 810 operable to install a plurality of solar panels within a panel support assembly 2 from an overhead position in accordance with an example of the present disclosure for the purpose of providing a working solar tracking system. In this example, the solar panel installation system 810 can facilitate manual installation of solar panels, or partially or fully automated installation of solar panels depending on the specific configuration of the solar panel installation system 810. The panel support assembly 2 shown in this example comprises a type used in a solar tracking system. The panel support assembly 2 can comprise one or more ground supports 4 that are securely anchored to the ground or another surface or structure. In this example, the ground supports 4 are shown as posts anchored within the ground, but this is not intended to be limiting in any way. The panel support assembly 2 can further comprise a torque tube 8 that is rotationally supported by the ground supports 4, such that the torque tube 8 can rotate relative to the ground supports 4 and the ground. The panel support assembly 2 can further comprise or otherwise be operable with one or more drive mechanisms 12 operable with one or more motors or actuators 16, respectively. The panel support assembly 2 can further comprise or otherwise be operable with a solar tracking system control 20 that functions to control operation of the solar tracking system and its components.

The panel support assembly 2 can further comprise or be in support of a plurality of panel mount assemblies 30 configured in a manner as taught herein so as to facilitate overhead installation of solar panels from a solar panel dispensing hopper of a solar panel presentation system. The panel mount assemblies 30 can each comprise a torque tube clamp 34 that is clamped or otherwise coupled to the torque tube 8 and that is operable with a panel mount 36. The panel support assembly 2 can further comprise or be in support of one or more solar panel retention systems 38, each comprising one or more of the panel mount assemblies 30. In the example shown, each panel retention system comprises two panel mount assemblies 30, each panel mount assembly being operable to receive and retain a respective side of two adjacent solar panels.

The solar panel installation system 810 can comprise the solar panel presentation system 213 comprising the solar panel dispensing hopper 214 of FIGS. 3-5C (with example methods of operation being shown in FIGS. 7A-8I and 10A-11J) capable of receiving and housing therein one or more solar panels 1 (see plurality of solar panels 1 arranged in a horizontal stack). The solar panel installation system 810 can further comprise a solar panel installation vehicle 824 operable to carry and transport the solar panel dispensing hopper 214. The solar panel presentation system 213 with its solar panel dispensing hopper 214 can be operable with the installation vehicle 824 to facilitate overhead installation of the solar panels 1 within the panel mount assemblies 30 on the panel support assembly 2. This can include operably connecting the installation vehicle 824 with the solar panel presentation system 213 via the vehicle interface 848A and the panel dispenser interface 848B, each of which can comprise a mechanical interface (e.g., various structures, structural supports, mechanical connections, mechanical couplings, or any other component or system facilitating a mechanical interface), an electrical interface (e.g., electrical connectors or other connections, electrical couplings, or any other component or system facilitating an electrical interface), a fluid interface (e.g., fluid connections or couplings, fluid piping or hoses, valves and valve systems, or any other component or system facilitating a fluid interface), a data interface (e.g., data connections or couplings, wired or wireless transmission systems, or any other component or system facilitating a data interface), a power interface (e.g., power connections or couplings, power cables or cords, or any other component or system facilitating a power interface), and/or any combination of these.

In one example, the installation vehicle 824 can comprise a hopper support 838, which can comprise a structure or structural assembly operable to support the solar panel dispensing hopper 214, and which can be part of or can comprise the dispenser interface 848B, operable and configured to receive and at least one of mechanically, fluidly, or electronically interface and couple with the solar panel dispensing hopper 214 via the vehicle interface 848A of the solar panel dispensing hopper 214. In one example, the solar panel dispensing hopper 214 can comprise a self-contained system, meaning that the solar panel dispensing hopper 214 is not an integral part of the solar panel installation vehicle 834, rather that it is a module having its own housing or frame unit, and that it is removable or removably operable with one or a variety of different solar panel installation vehicles, such as the installation vehicle 824, that are designed to receive the solar panel dispensing hopper 214 (the device 214 being a type of plug-in or module), wherein the solar panel dispensing hopper 214 is interchangeable with other solar panel dispensing hoppers. This also means that some or all of the components, systems or other elements needed to carry out an installation task of inserting a solar panel into a panel support assembly are part of or on-board the solar panel dispensing hopper 214 (e.g., control system 260, communications module 274, sensor(s) 270, automation system 272, etc.). In this example, the vehicle interface 848A of the solar panel dispensing hopper 214, that is inclusive of the support frame 246 of the solar panel dispensing hopper 214, can be used to mechanically interface with and couple to a suitable support structure or structural assembly as part of the dispenser interface 848B of the hopper support 838 of the installation vehicle 824. In one example, the solar panel dispensing hopper 214 can be coupled to the installation vehicle 824 by coupling or otherwise joining the support frame 246 (or another structural component) of the solar panel dispensing hopper 214 to a suitable mechanical interface of the dispenser interface comprising a support structure or structural assembly of the installation vehicle 824, and particularly of the hopper support 838, using one or more fasteners. A suitable mechanical interface of the dispenser interface support structure of the installation vehicle 824 and the hopper support 838 can comprise a platform, a framework, a housing, a structural element comprising a recess or bay, or any other structural assembly or arrangement. In a specific example, the installation vehicle 824, namely the hopper support 838, can comprise a support structure having a bay or recess formed therein that is sized and configured to receive the solar panel dispensing hopper 214 therein, wherein the recess or bay comprises a recess surface, a shoulder or other structure upon which the support frame 246 can be seated, or to which it can be coupled. Additional securing means, such as fasteners, straps, brackets, or other types can be used to secure the solar panel dispensing hopper 214 to the vehicle 824 after it is seated within the recess or bay. In addition to providing a mechanical interface with mechanical connections or couplings, the vehicle interface 848A and the dispenser interface 848B can further comprise at least one of electrical, fluid, power, data, or other connections as mentioned.

In another example, the solar panel dispensing hopper 214 can be integrally formed with and part of the installation vehicle 834, such that the vehicle interface 848A and the dispenser interface 848B (comprising at least one of mechanical, fluid, or electrical interfaces) are also integrally formed with one another.

The solar panel installation system 810 can further comprise a multi-degree of freedom platform (or stage) 910 supported between the solar panel dispensing hopper 214 and the installation vehicle 824 and operable to enable the solar panel dispensing hopper 214 to move in one or more translational and/or rotational degrees of freedom relative to the installation vehicle 824 and the panel assembly 2. The multi-degree of freedom platform 910 can be part of at least one of the vehicle interface 848A or the dispenser interface 848B. In one example, the multi-degree of freedom platform 910 can comprise the multi-degree of freedom platform 510 as discussed above and shown in FIGS. 12A-12D (with some of its components configured as an X-Y platform, and in some examples comprising one or more lifts, such as a single lift or the lifts 559A and 559B). In one example, the multi-degree of freedom platform 510 can comprise a separate structural system coupled between the solar panel dispensing hopper 214 and the installation vehicle 824, or in another example, one or more components of the multi-degree of freedom platform 510 can be integrally formed with and part of at least one of the solar panel dispensing hopper 214 or the installation vehicle 824. Depending upon how it is configured, the multi-degree of freedom platform 910 can be configured to provide between 1 and 6 degrees of freedom of movement to the solar panel dispensing hopper 214 supported on the multi-degree of freedom platform 910. The discussion of the multi-degree of freedom platform 510 set forth above can be referred to for additional details.

The installation vehicle 824 can comprise a type in the form of a torque tube spanning installation vehicle that is operable about ground, and is configured to span the torque tube 8 to facilitate operation of the installation vehicle 824 about the torque tube 8, with a portion of the installation vehicle 824 being positioned to facilitate installation of the solar panels within the solar panel dispensing hopper 214 into a panel retention system supported on the torque tube 8 from the overhead position (e.g., the portion of the installation vehicle 824 can be located at a position above or below the torque tube 8). The solar panel dispensing hopper 214 can be supported by the installation vehicle 824, such that it can be located in an overhead position relative to the torque tube 8 upon the installation vehicle 824 being driven along the torque tube 8. By "span" it is meant that at least a portion of the installation vehicle 824 (e.g., at least a portion of the chassis 842 of the installation vehicle 824) is in a position relative to the torque tube 8, such that the portion extends laterally in different directions along an axis transverse or crosswise with respect to the torque tube 8. The installation vehicle 824 can comprise a torque tube spanning chassis 842, or in other words a chassis 842 sized and configured to be positioned relative to the torque tuber 8, such that at least a portion of the chassis 842, referred to herein as a torque tube spanning portion of the chassis 842, spans the torque tube 8. The chassis 842 can be configured to provide support to the solar panel dispensing hopper 214, as well as the other elements, components, systems of or operable with the installation vehicle 824 and/or the solar panel dispensing hopper 214. The chassis 842 can comprise a number of different sizes, shapes and configurations. In one example, the chassis 842 can comprise a framework or frame-like structural configuration, wherein a number of different structural elements or components are coupled to one another to make up the chassis 842. In another example, the chassis 842 can comprise a housing, body, or other more solid structural configuration. No matter how it is configured, the chassis 842 can further comprise structure or an arrangement of structural members, such as a receiver or platform, designed and configured to receive and support the solar panel dispensing hopper 214 (see FIG. 14B). This can be referred to as the hopper support 838 and the dispenser interface 848B can be part of or otherwise associated with the hopper support 838.

The chassis 842 can further comprise a clearance 852 formed therein and aligned with the opening of the solar panel dispensing hopper 214 to facilitate overhead or top-down installation of solar panels. The clearance 852 can be defined by one or more structural elements of the chassis 842, and can be sized and configured to permit a lead solar panel to be dispensed from the solar panel dispensing hopper 214 and to pass through the clearance of the chassis 842. In one example, the clearance 852 of the chassis 842 can be an opening in the chassis 842 (e.g., an opening formed in a frame-like chassis, an opening in a housing or body-type chassis, etc.). In another example, the clearance 852 can be a portion of the chassis 842 defining a void or devoid of structural elements or components (e.g., a portion of a frame-like structure where no frame elements exist, or where certain structural members define an opening). The clearance 852 can comprise a perimeter defined by one or more structural elements of the chassis 842. In any case, the clearance 852 can be sized and configured so as to ensure that a lead solar panel being dispensed from the solar panel dispensing hopper 214 passes therethrough and clears (i.e., does not come into contact with) any structural elements or components of the chassis 842 so that the lead solar panel can be properly installed into the one or more panel mount assemblies 30 of a panel retention system at a given installation site.

The installation vehicle 824 can further comprise a first chassis support 860 operable to support a first side or part of the torque tube spanning portion of the chassis 842 relative to ground, with the first chassis support 860 being configured to be located or positioned and operable on a first side of the torque tube 8. The installation vehicle 824 can further comprise a second chassis support 880 operable to support a second side or part of the torque tube spanning portion of the chassis 842 relative to ground, with the second chassis support 880 being configured to be located or positioned and operable on an opposing or second side of the torque tube 8. As shown in this example, the installation vehicle 824, with its chassis 842 and first and second chassis supports 860 and 880, can be sized and configured to straddle the torque tube 8 as the installation vehicle is caused to be driven along the torque tube 8. The first and second chassis supports 860 and 880 and the chassis 842 can be sized and configured to support the chassis 842 at a height above ground sufficient to locate at least a torque tube spanning portion of the chassis 842 (and the solar panel dispensing hopper 214 supported by the chassis 842) in an overhead position relative to a panel support assembly 2 and any of its components, namely the panel mount assemblies 30 as the installation vehicle 824 straddles the torque tube 8. Indeed, the installation vehicle 824 can further be configured to straddle the torque tube 8, meaning that the first chassis support 860 can be sized and configured to be located on the first side of the torque tube 8 and the second chassis support 880 can be sized and configured to be located on the other or the second side of the torque tube 8, with at least a portion (e.g., a torque tube spanning portion) of the chassis 842 spanning (i.e., extending between) these from a position overhead the torque tube 8, as shown. The first and second chassis supports 860 and 880 comprise a height relative to ground so as to be able to locate a torque tube spanning portion of the chassis 842 and the solar panel dispensing hopper 214 in an overhead position relative to the torque tube 8 and the panel mount assemblies 30 of the panel retention systems supported thereon. In one example, the first and second chassis supports 860 and 880 can be integrally formed with and part of the chassis 842. In other words, the chassis 842 can comprise first and second chassis supports 860 and 880. In another example, the first and second chassis supports 860 and 880 can be separate structural members that couple to the chassis 842 and that support the chassis 842 relative to ground.

Furthermore, the first and second chassis supports 860 and 880 and the chassis 842 can be sized and configured so that the first and second chassis supports 860 and 880 are spaced far enough apart from one another laterally (relative to the torque tube 8) (i.e., the installation vehicle 824 comprises a suitable width) such that the first and second chassis supports 860 and 880 provide sufficient clearance for the panel mount assemblies 30 of the panel retention systems 38 as well as one or more installed solar panels as the installation vehicle 824 travels along the torque tube 8 from one installation site to another installation site. In other words, the installation vehicle 824 can be configured so as to define and provide a clearance along the installation vehicle 824 that permits the installation vehicle 824 to travel along the torque tube 8 without contacting the panel retention systems 38 or any installed solar panels within these (i.e., while clearing these). In one example, the clearance can comprise a throughput channel 900 extending along the installation vehicle, such as from a front or otherwise forward-facing portion of the installation vehicle 824 (the portion facing in a direction of travel) to a rear or rearward-facing portion of the installation vehicle 824, the throughput channel 900 being sized and configured to receive one or more panel mount assemblies 30 of a panel retention system 38 through an entrance therein as the installation vehicle 824 travels along the torque tube 8, to receive a lead solar panel as it is dispensed from the solar panel dispensing hopper 214 and installed at an installation site within the panel retention system 38 comprising the one or more panel mount assemblies 30, and to accommodate and facilitate the exit of one or more installed solar panels from an exit of the throughput channel 900 as the installation vehicle continues to travel along the torque tube 8. The throughput channel 900 can be located beneath the chassis 842 and between the first and second chassis supports 860 and 880, and can be defined by a volume boundary extending between the chassis 842 and the first and second chassis supports 860 and 880. In some examples, the solar panel dispensing hopper 214 can be supported by the chassis 842 in a manner so as to extend at least partially through the clearance 852 in the chassis 842 and into the throughput channel 900.

In one example, the first chassis support 860 can comprise one or more structural components extending between a first side or part of the torque tube spanning portion of the chassis 842 and a ground contacting member 872 (see FIGS. 14B and 14C, which illustrate two legs on a first side of the chassis 842 with each leg being operable with a ground contacting member in the form of a wheel). In this example, the first chassis support 860 can comprise a passive support in that the first chassis support 860 (i.e., the individual legs) are configured to be rigid without any jointed members or any associated degrees of freedom of movement. The second chassis support 880 can be similarly configured to comprise one or more structural components extending between the chassis 842 and a ground contacting member 892 (e.g., see FIGS. 14B and 14C, which illustrate two legs on a second side of the chassis 842 with each leg being operable with a ground contacting member in the form of a wheel). The ground contacting member 892 can comprise wheels, an endless track, omnidirectional wheels, or others.

In another example, the first chassis support 860 can comprise a first structural member 864 and a second structural member 868 and a joint 876 (or other connection type) that facilitates the first structural member 864 and the second structural member 868 to be moveable relative to one another in a first degree of freedom (e.g., see jointed degree of freedom at 876). The first and second structural members 864 and 868 can extend between a torque tube spanning portion of the chassis 842 and the ground contacting member 872. The joint and jointed degree of freedom at 876 can be provided by a suspension system operable to isolate to some degree the chassis 842 (and the supported solar panel dispensing hopper 214) from movements induced in the installation vehicle 824 as a result of the installation vehicle 824 traversing over the ground, which can comprise uneven terrain. The suspension system can comprise a number of different types and configurations, and the details of the suspension system are not discussed herein. Additional structural members and additional joints are contemplated. The first chassis support 860 can comprise a plurality of legs or other structural members, each comprising two or more jointed structural members (e.g., each of the legs of the installation vehicle 824 shown in FIGS. 14B and 14C can comprise two or more jointed structural members). Moreover, the jointed structural members 864 and 868 can be actuatable, such that the relative movement and relative distance between the first structural member 864 and the second structural member 868 can be controlled. Although the jointed structural members 864 and 868 can be configured to move relative to one another in a translational degree of freedom about a longitudinal axis, this can provide the installation vehicle 824 with a rotational degree of freedom that can operate to induce tilt within the installation vehicle 824 and also the solar panel dispensing hopper 214 (and any solar panels being dispensed) as the first side of the chassis 842 is raised and lowered. The second chassis support 880 can be similarly configured to comprise two or more jointed structural members (e.g., see first structural member 884 and second structural member 888 moveably connected by a joint 896 (or other connection type) that facilitates the first structural member 884 and the second structural member 888 to be moveable relative to one another in a first degree of freedom (e.g., see jointed degree of freedom at 896)), such as legs, each extending between the chassis 842 and a ground contacting member 892. The jointed structural members 884 and 888 can be actuatable, such that the relative movement between the first structural member 884 and the second structural member 888 can be selectively controlled. Upon being configured with controllable jointed structural members, movement of the first and second chassis supports 860 and 880 within the provided degrees of freedom can facilitate an associated movement within the platform 842 and the solar panel dispensing hopper 214. For example, one or both of the first and second chassis supports 860 and 880 can be actuated (e.g., independent of one another, or in a coordinated manner one with another) to induce a tilt within the installation vehicle 824 and the solar panel dispensing hopper 214. Providing one or more degrees of freedom within each of the first and second chassis supports 860 and 880 can assist in positioning, orienting the solar panel dispensing hopper 214 to be able to properly install a lead solar panel within a panel retention system supported by the panel support assembly 2.

It is noted that the first and second chassis supports 860 and 880 can comprise a number of different structural configurations, joints, actuators, systems, etc. and that those described herein and shown in the drawings are not intended to be limiting in any way. For example, one or more chassis supports in the form of legs is not intended to be limiting as a chassis support can comprise any other structural configuration other than an elongate, high-aspect ratio member referred to as a "leg." For example, a chassis support can comprise a lattice or framework of structural members. Moreover, the installation vehicle 824 can be configured to comprise any desired number of degrees of freedom of movement. The degrees of freedom of movement can be provided by at least one of the configuration and operation of the ground contacting members 872 and 892, the configuration and operation of the first and second chassis supports 860 and 880, the configuration and operation of the hopper support 838, the configuration and operation of the multiple degree of freedom system 910, or the configuration and operation of the solar panel dispensing hopper 214.

The solar panel installation system 810, and particularly the installation vehicle 824, can further comprise a vehicle alignment system 940 that can the same as or similar to the vehicle alignment system 640 of the solar panel installation system 610 of FIGS. 13E-13G. As such, the discussion above is not repeated here, but can be referenced. The vehicle alignment system 840 can be part of or otherwise associated with the installation vehicle 824, and can be configured and operable to physically interface with and engage at least one of a panel mount assembly 30 or an installed solar panel for the purpose of aligning (and correcting misalignment of) the installation vehicle 824, and more particularly the solar panel dispensing hopper 214, relative to the torque tube 8 and the panel retention systems 38 (with one or more panel mount assemblies 30) supported on the torque tube 8 at the various installation sites along the torque tube 8 as the installation vehicle 824 travels along the torque tube 8 to reach the various installation sites. The vehicle alignment system 840 can be supported by and operable with at least one of the support frame 246, the solar panel dispensing hopper 214, the multi-degree of freedom platform 510, or the installation vehicle 824. In this case, the vehicle alignment system 840 can be supported about the installation vehicle 824, and can comprise at least one of forward or rearward alignment fiducials or assets, such as leading and/or trailing guide arms, which, in some examples, can be rotatably coupled to the chassis 842, rotationally biased with a biasing member (e.g., a torsional spring), and operable with one more sensors. The details of the alignment system 840 are disclosed and discussed above with respect to the vehicle alignment system 640 as these can be the same or similar in form and function. In one example, the solar panel installation system 810 can comprise an alignment system 940 supported by and operable with the installation vehicle 824, with alignment fiducials extending both forward and rearward of the installation vehicle 824. However, this is not intended to be limiting in any way. Similar to the vehicle alignment system 640 discussed above, the vehicle alignment system 840 can comprise alignment fiducials in the form of a first leading guide arm having a tracking portion and a lead-in portion, and a second leading guide arm having a tracking portion and a lead-in portion. The first and second leading guide arms can be located and supported on the installation vehicle 824 so as to extend away from a leading or forward-facing portion of the installation vehicle 824 (the leading or forward-facing portion being that portion of the installation vehicle 824 that faces toward a forward direction of travel. The first and second leading guide arms can be configured to receive and engage the panel retention systems 38, in this example the panel mount assemblies 30, supported on the torque tube 8. The vehicle alignment system 840 can further comprise alignment fiducials in the form of a first trailing guide arm having a tracking portion and a lead-in portion. The vehicle alignment system 640 can comprise a second trailing guide arm having a tracking portion and a lead-in portion. The first and second trailing guide arms can be located and supported on the installation vehicle 824, and specifically on a lower surface of the installation vehicle 824, so as to extend away from a trailing or rearward facing portion of the installation vehicle 824. The first and second trailing guide arms can be configured to receive and engage one or more installed solar panels as the installation vehicle 824 advances along the torque tube 8.

In one example, the installation vehicle 824 can be operated manually. In another example, the installation vehicle 824 can be semi-automated or fully automated. As such, the installation vehicle 824 can be equipped with a number of operating systems, components, devices (e.g., see operating systems 826) that facilitate and enable both the maneuvering and operation of the installation vehicle 824 itself, and the installation of solar panels onto the panel support assembly 2 in at least one of a manual manner, a semi-automated manner, or in a fully automated manner. The operating systems 826 can include, but are not limited to, at least one of: one or more power sources, a drive system or subsystem, an automation system or subsystem with its one or more automation assets (e.g., imaging devices, detectors, emitters) mounted on installation vehicle 824, a control system or subsystem, a communications system or subsystem, a hydraulic system or subsystem, one or more sensors, a navigation system for facilitating automated or semi-automated navigation, or others. These can be configured to be operable with the installation vehicle 824 alone, with the solar panel dispensing hopper 214, with any multi-degree of freedom platforms or stages, or any combination of these. With respect to navigation and automation of the installation vehicle 824 and/or the solar panel dispensing hopper 214, the operating systems 826 can include, but are not limited to, a variety of different navigation and/or automation systems 826, such as navigation systems of various types, vision systems, and control systems to facilitate semi-automated or fully automated operation of the installation vehicle 824 and installation of the solar panels by the installation vehicle 824 and the solar panel dispensing hopper 214. In one example, the installation vehicle 824 can utilize a navigation system in the form of a precision global positioning system (GPS) to navigate. In another example, the installation vehicle 824 can comprise an automated guided vehicle (AGV), which can utilize radio waves, vision devices, magnets, or lasers for automated navigation. Indeed, the installation vehicle 824 can utilize a number of different types of navigation systems depending upon the environment in which the solar panels are being installed and other factors. Example navigation systems include, but are not limited to wired, guide tape, laser target, inertial guidance systems, (gyroscopic), natural feature (natural target), vision guidance systems, Geoguidance systems, precision satellite-based radio navigation systems, such as a global navigation satellite systems (GNSS), and more specifically Global Positioning Systems (GPS), robotic mapping systems, or any combination of these. The installation vehicle 824 can utilize any one of these or other systems, along with various associated automation assets 837 associated with the installation vehicle 824, the solar panel dispensing hopper 214, the panel support assembly 2, or any combination of these. The automation assets 837 can include, but are not limited to, those discussed herein with respect to FIG. 1, such as various sensors and sensor types, detection assets, emission assets (e.g., ultrasonic emitter(s), laser(s)), imaging systems and assets, and others. Indeed, it is contemplated that any assets needed to facilitate operation of the specific one or more navigation and/or automation systems deployed to enable manual, semi-automated or fully automated installation of the solar panels 1 can be part of the solar panel installation system 810 (see 110 of FIG. 1). For example, an imaging system comprising automation assets in the form of one or more cameras can be mounted or otherwise supported at a front of the installation vehicle 824 (see asset 837 in FIG. 14C representative of one or more cameras), wherein the cameras can be used to capture visual data related to the torque tube 8. Using the cameras, and a control system having a computer with one or more processors and memory as well as software operable to process the data received from the cameras, the alignment of the torque tube 8 relative to the installation vehicle 824 can be monitored and corrections or adjustments made to the direction of travel of the installation vehicle 824 in the event of misalignment.

The drive system or subsystem can facilitate and enable locomotion and various movements of the installation vehicle 824 within an environment and during an installation period. The drive system or subsystem will not be discussed in detail herein, but can comprise any of the components, systems, mechanisms, and computer control necessary for the installation vehicle 824 to drive, turn or steer, and to otherwise move about a ground or other surface or structure. The drive system or subsystem can be operable with a motor and/or one or more power sources (e.g., one or more electric motors powered by one or more batteries or hydrogen fuel cells (or a combination of these), a gas internal combustion engine, a liquid petroleum gas (LPG) engine, a natural gas engine, or a combination of these), and can comprise ground contacting elements (e.g., wheels, endless tracks, omnidirectional wheels, or any combination of these), and any type of drivetrain or other systems or mechanisms operable to facilitate the motor and/or power source being able to actuate and power the ground contacting elements, as well as other systems, devices, components (e.g., a transmission). In the example shown (see FIGS. 14B and 14C), the ground contacting elements are shown as comprising wheels. At least one of the wheels can be configured to be an active wheel operable within the drive system and powered by a motor and/or power source for driving propulsion of the installation vehicle 824. In some examples, all of the wheels can be active and actuatable to facilitate propulsion of the installation vehicle 824. In addition, at least two of the wheels can be configured to facilitate steering of the installation vehicle 824. In one example all four wheels can be configured to facilitate steering of the installation vehicle 824. As such, the installation vehicle 824 can be configured to maneuver about the ground as needed or desired.

The installation vehicle 824 can be equipped with a number of different structural elements, components or systems that are moveable relative to one or more other structural elements, components or systems in one or more degrees of freedom via one or more joints or other interface connections that facilitate such relative movement for the purpose of locating, positioning, and orienting the hopper support and/or the solar panel dispensing hopper 214 supported by the hopper support of the installation vehicle 824 as needed to properly dispense and install into an installed position a lead solar panel into a panel retention system 38 at an installation site along the torque tube 8 and within the panel support assembly 2. The available degrees of freedom can be achieved by moving the installation vehicle 824 about the ground and/or by causing movement within the one or more structural elements, components or systems capable of being actuated in one or more degrees of freedom. These structural elements, components or systems can be associated with one or more actuators (e.g., hydraulic actuators, pneumatic actuators, motors, etc.) that can be selectively actuated to facilitate the relative movement. Movement of one or more structural elements, components or systems of the installation vehicle 824 within one or more degrees of freedom can operate to move the solar panel dispensing hopper 214 and the housed solar panels 1 about one or more axes to change the location, position and/or orientation of the solar panel dispensing hopper 214 (and the solar panels 1) relative to ground and the panel support assembly 2. In one example, using one or more actuators, one or more structural elements, components or systems of the installation vehicle 824 can be configured to move in a first degree of freedom to alter a pitch of the solar panel dispensing hopper 214 about a first rotational or pitch axis. In another example, using one or more actuators, one or more structural elements, components or systems of the installation vehicle 824 can be configured to move in a second degree of freedom to alter a roll angle of the solar panel dispensing hopper 214 about a second rotational or roll axis. In another example, using one or more actuators, one or more structural elements, components or systems of the installation vehicle 824 can be configured to move in a third rotational degree of freedom to alter a yaw angle of the solar panel dispensing hopper 214 about a third rotational or yaw axis. In addition to these, the installation vehicle 824 itself can be turned or steered to alter a yaw angle of the solar panel dispensing hopper 214. In another example, the installation vehicle 824 can be configured to selectively move about all three of the pitch, roll, and yaw axes. For instance, each of the four legs making up the first and second chassis supports 860 and 880, respectively, can comprise one or more structural members moveable relative to one or more other structural members (e.g., telescoping, rotating, etc.) via one or more joints (e.g., see structural members 864, 868, and joint 876 (providing a jointed degree of freedom) of the example leg of the first chassis support 860 of FIG. 14A; and see structural members 884, 888 and joint 896 of the example leg of the second chassis support 880 of FIG. 14A). Each of the legs of the first and second chassis supports 860 and 880 can be selectively and independently actuated to cause the chassis 842, and thus the supported solar panel dispensing hopper 214, to tip and/or tilt to position and/or orient the solar panel dispensing hopper 214 (and any solar panels loaded therein) as needed relative to a panel retention system 38 in the panel support assembly 2. At the same time, or in addition to this, the installation vehicle 824 itself can be selectively driven, steered or otherwise maneuvered about the ground to effectuate needed movement of the solar panel dispensing hopper 214. For example, the installation vehicle 824 can be equipped with four-wheel steering where each of the wheels operable with the legs of the first and second chassis supports 860 and 880, respectively, can be turned and driven to cause the entire installation vehicle 824 to rotate (e.g., about an axis normal to ground (a yaw axis) assuming a level ground surface).

The installation vehicle 824 can further be configured to move in one or more degrees of freedom to alter a position of the hopper support and the solar panel dispensing hopper 214 along one or more translational axes. In one aspect, this can be accomplished by maneuvering the installation vehicle 824 itself about the ground or other surface along one or more translational axes. Alternatively, or in addition to this, one or more structural elements, components or systems of the installation vehicle 824, or a combination of these, can be configured to move in one or more translational degrees of freedom to alter a position of the solar panel dispensing hopper 214 along one or more translational axes.

In the event that the needed location, position and/or orientation of the hopper support and the solar panel dispensing hopper 214 cannot be achieved by maneuvering the installation vehicle 824 relative to the ground and/or manipulating the orientation of the installation vehicle 824 relative to the ground, then additional degrees of freedom within the installation vehicle 824 can be provided and actuated. For instance, with the installation vehicle 824 having located, positioned and/or oriented the solar panel dispensing hopper 214 as best it could, and with the solar panel dispensing hopper 214 still not in a proper location, position and/or orientation to install a lead solar panel, one or more degrees of freedom provided by the multi-degree of freedom platform 910 (e.g., a multi-degree of freedom platform or its components as associated with the solar panel dispensing hopper 214) can be actuated to achieve still further locating, positioning and/or orienting of the solar panel dispensing hopper 214 relative to the panel retention system 38 at an installation site so that it is able to dispense a lead solar panel in the proper installation position and at the correct installation angle. As such, the installation vehicle 824 can be configured to provide a variety of degrees of freedom of movement to the solar panel dispensing hopper 214 supported thereon.

The installation vehicle 824 can be configured to move in any one or more of the degrees of freedom discussed above for the purpose of not only maneuvering and operating the vehicle itself about the ground or other surface, but also for at least one of positioning/repositioning, orienting/reorienting, or locating/relocating the hopper support and the solar panel dispensing hopper 214 (and the solar panels 1) in any needed or desired position and/or orientation relative to the panel support assembly 2, and particularly the various panel retention systems 38 (with their respective panel mount assemblies 30), such that the solar panel dispensing hopper 214 can subsequently be operated and controlled to dispense and install the solar panels 1 within the panel retention systems 38.

The installation vehicle 824 can not only carry or support the solar panel dispensing hopper 214, but it can also be connected to the solar panel presentation system 213 and the solar panel dispensing hopper 214 in one or more ways, such as via an electrical connection, a power connection, a fluid connection, or any combination of these. This can be achieved via one or more vehicle and dispenser interfaces (see vehicle interface 848A and dispenser interface 848B) that can be configured to facilitate at least one of an electrical connection, a power connection, or a fluid connection between the installation vehicle 824 and the solar panel presentation system 213 including the solar panel dispensing hopper 214. For example, the solar panel dispensing hopper 214 can be equipped with its own power source. This can be located and supported on the solar panel dispensing hopper 214 or elsewhere. However, in an example embodiment where the solar panel presentation system 213 does not have its own power source, it can receive whatever power is needed from the installation vehicle 824 via the vehicle and dispenser interfaces 848A and 848B, which can comprise an electrical umbilical or cable along with one or more power connectors. In another example, the solar panel presentation system 213 may not have its own control system, or a it may have a control system limited in capabilities. In this case, the solar panel presentation system 213 can be configured to receive data from and transfer data to the installation vehicle 824 or to a top-level control system (see top-level control system of FIG. 1) via the vehicle and dispenser interfaces 848A and 848B, which can comprise a wired or wireless connection arrangement with all of the needed hardware/software. In still another example, the solar panel presentation system 213, namely the solar panel dispensing hopper 214, may comprise one or more fluid systems/actuators (e.g., hydraulic or pneumatic), but may not have its own system for supplying and/or regulating fluid to/from the actuators. In this case, the solar panel presentation system 213 can be configured to receive pressurized fluid from and return fluid to the installation vehicle 824 via the vehicle and dispenser interfaces 848A and 848B, which can comprise all of the needed components, systems, controllers, etc. to achieve operation of the fluid actuators.

It is noted that not all configurations of the solar panel presentation system 213 or the installation vehicle 824 can be or are discussed herein. It is contemplated that the solar panel presentation system 213 with its solar panel dispensing hopper 214 can comprise all of the components, elements, systems, devices, mechanisms needed to operate and facilitate installation of solar panels. Likewise, it is contemplated that the solar panel presentation system 213 with the solar panel dispensing hopper 214 can comprise only some of the components, elements, systems, devices need to install solar panels, and that the installation vehicle 824 can comprise some of the other components, elements, systems, devices needed by the solar panel presentation system 213 to install solar panels, and that whatever components, elements, systems, devices needed by the solar panel installation system 213 that are on the installation vehicle 824 can be obtained via a suitable interface between the installation vehicle 824 and the solar panel presentation system 213 and the solar panel dispensing hopper 214. Moreover, the solar panel presentation system 213 and the installation vehicle 824 can be connected to components, elements, systems, devices that are external to either of these. For example, power to the solar panel dispensing hopper 214 can be obtained from a power source located in suitable proximity to the panel support assembly 2.

As shown, the installation vehicle 824 can maneuver within the environment about the panel support assembly 2 so as to straddle the torque tube 8 and to locate the hopper support and the solar panel dispensing hopper 214 supported thereby in an overhead position above and relative to a solar panel retention system 38 at an installation site within the panel support assembly 2. In this example, the installation vehicle 824 is oriented such that a forward driving direction along a forward driving axis is parallel or substantially parallel to the torque tube 8 with the hopper enclosure 216 in a proper position above a panel retention system 38 for dispensing the solar panels contained therein.

Figure 15A:
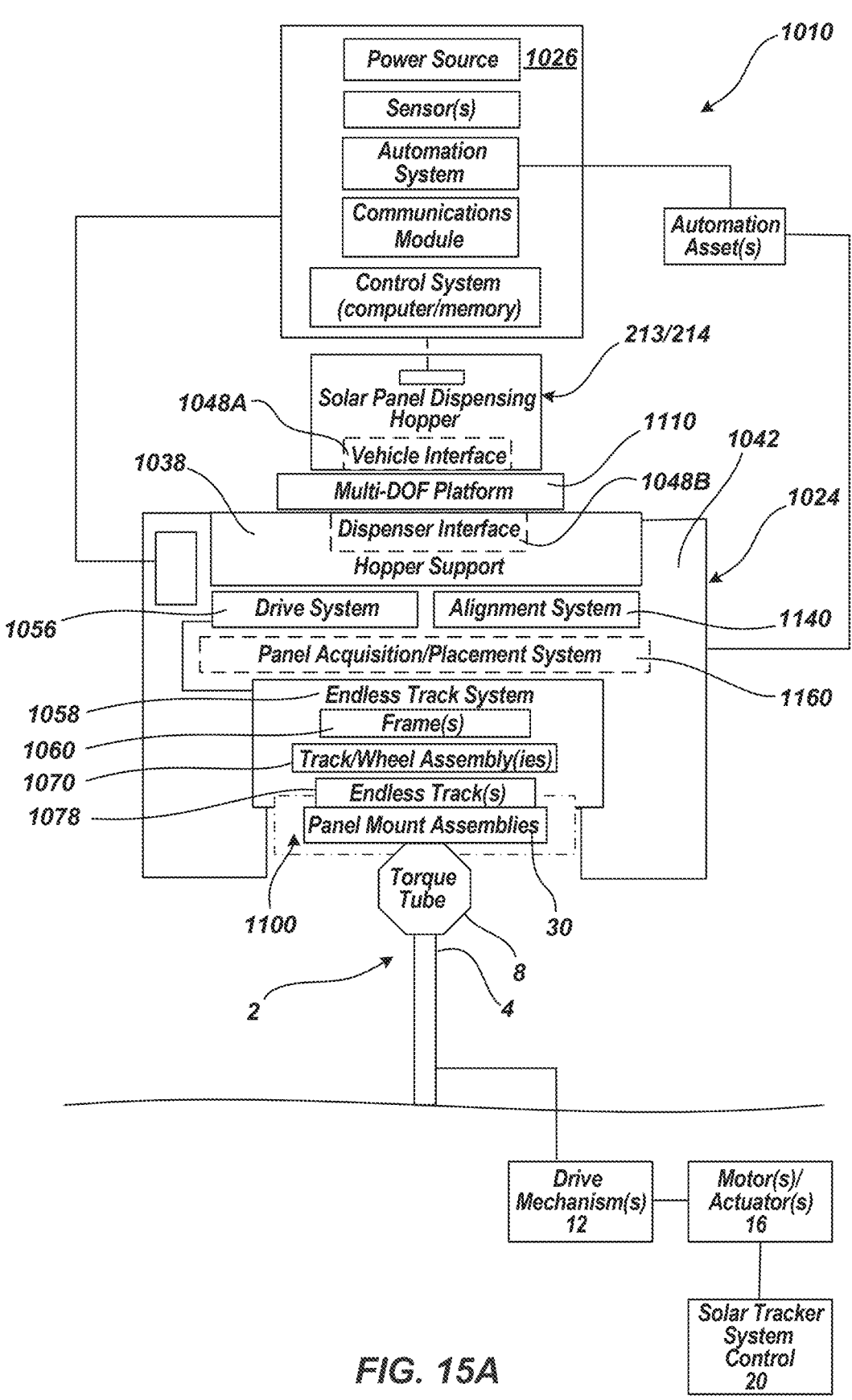
FIGS. 15A-15O illustrate various views of a solar panel installation system in accordance with an example of the present disclosure, the example solar panel installation system comprising the solar panel presentation system of FIG. 4 with the solar panel dispensing hopper of FIGS. 3 and 5A-5D.

With reference to FIGS. 15A, and with continued reference to FIGS. 3-4, illustrated is a solar panel installation system 1010 operable to install a plurality of solar panels within a panel support assembly 2 from an overhead position in accordance with an example of the present disclosure for the purpose of providing a working solar tracking system. In this example, the solar panel installation system 1010 can facilitate manual installation of solar panels, or partially or fully automated installation of solar panels depending on the specific configuration of the solar panel installation system 1010. The panel support assembly 2 shown in this example comprises a type used in a solar tracking system. The panel support assembly 2 can comprise one or more ground supports 4 that are securely anchored to the ground or another surface or structure. In this example, the ground supports 4 are shown as posts anchored within the ground, but this is not intended to be limiting in any way. The panel support assembly 2 can further comprise a torque tube 8 that is rotationally supported by the ground supports 4, such that the torque tube 8 can rotate relative to the ground supports 4 and the ground. The panel support assembly 2 can further comprise or otherwise be operable with one or more drive mechanisms 12 operable with one or more motors or actuators 16, respectively. The panel support assembly 2 can further comprise or otherwise be operable with a solar tracking system control 20 that functions to control operation of the solar tracking system and its components.

The panel support assembly 2 can further comprise or be in support of a plurality of solar panel retention systems 38, each comprising one or more panel mount assemblies 30, configured in a manner as taught herein so as to facilitate overhead installation of solar panels from a solar panel dispensing hopper of a solar panel presentation system. The panel mount assemblies 30 can each comprise a torque tube clamp 34 that is clamped or otherwise coupled to the torque tube 8 and that is operable with a panel mount 36. In the example shown, each panel retention system 38 comprises two (first and second) panel mount assemblies 30, each panel mount assembly 30 being operable to receive and retain a respective side of one or more solar panels.

Figure 15B:
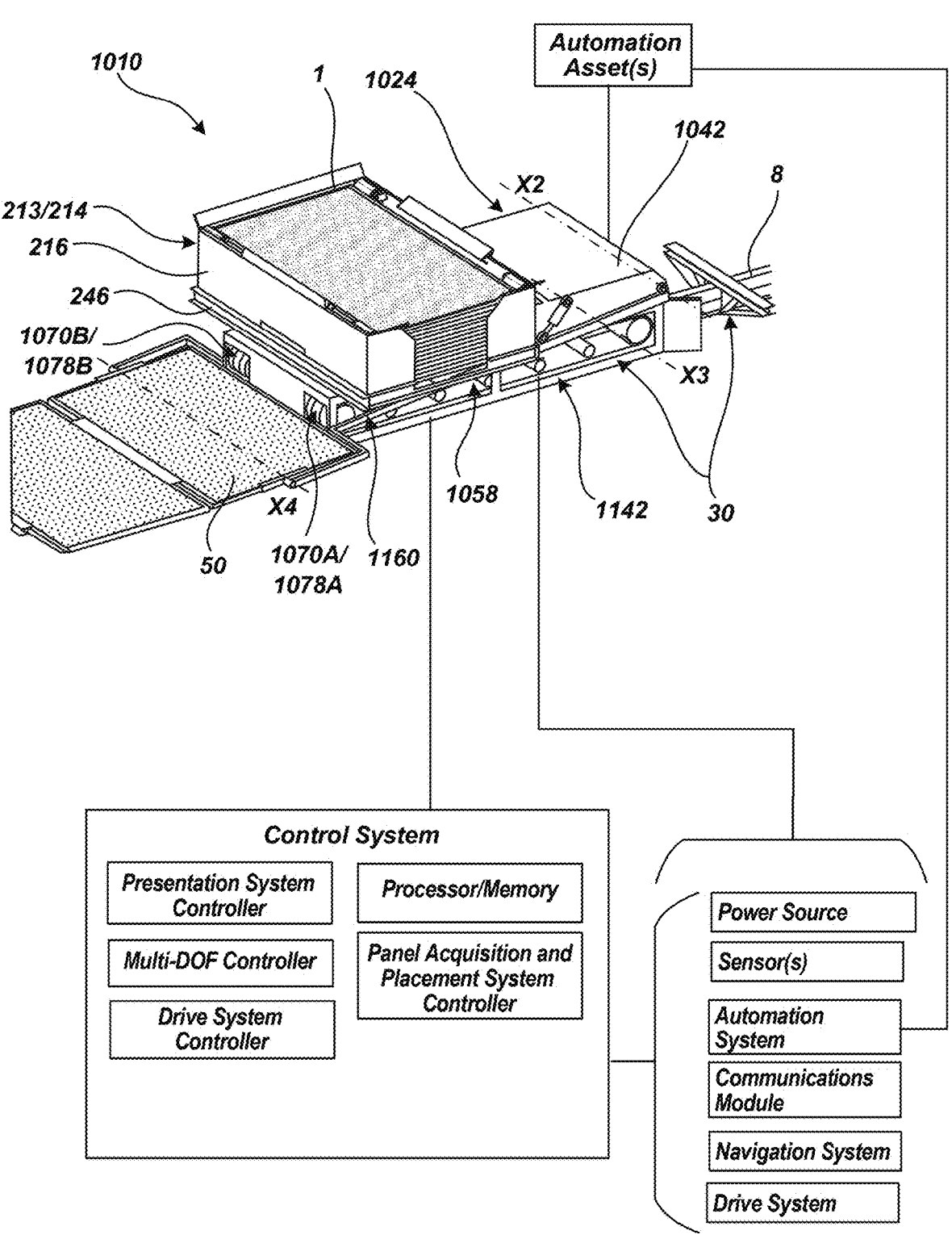
Figure 15C:
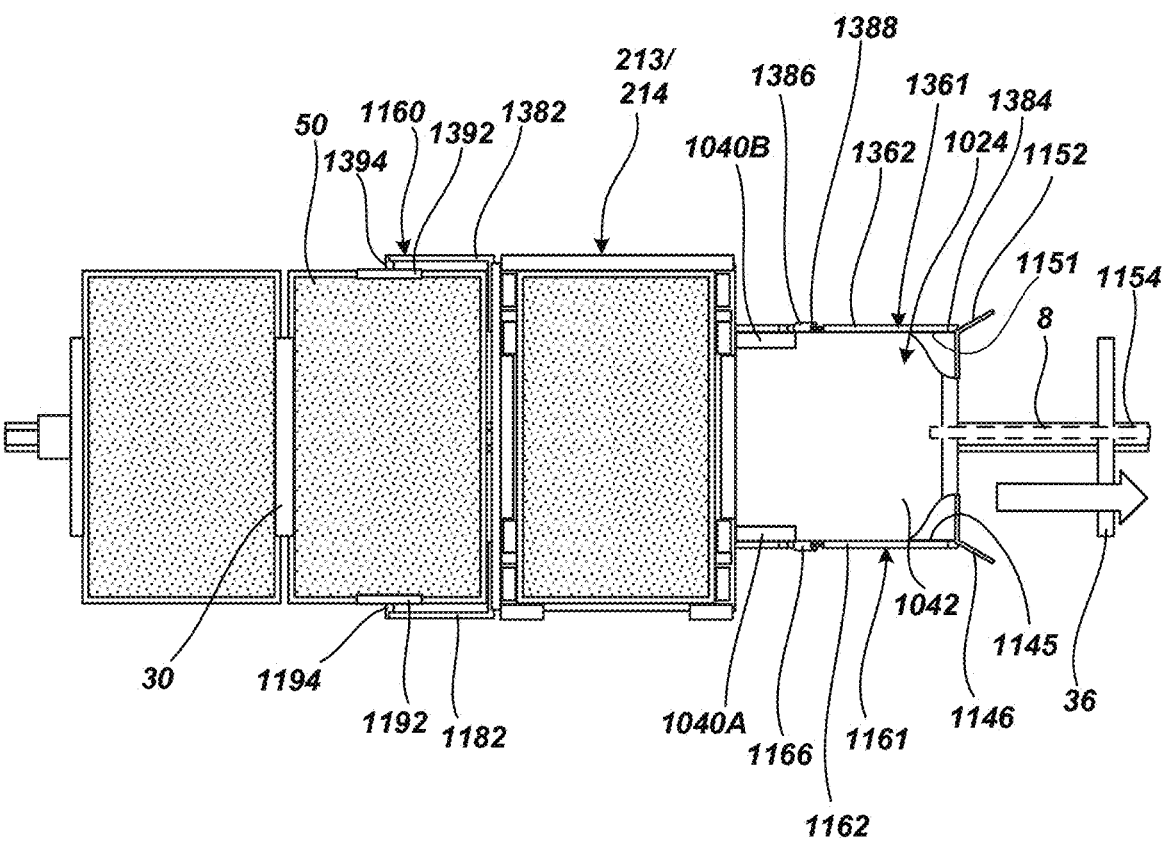
Figure 15D:
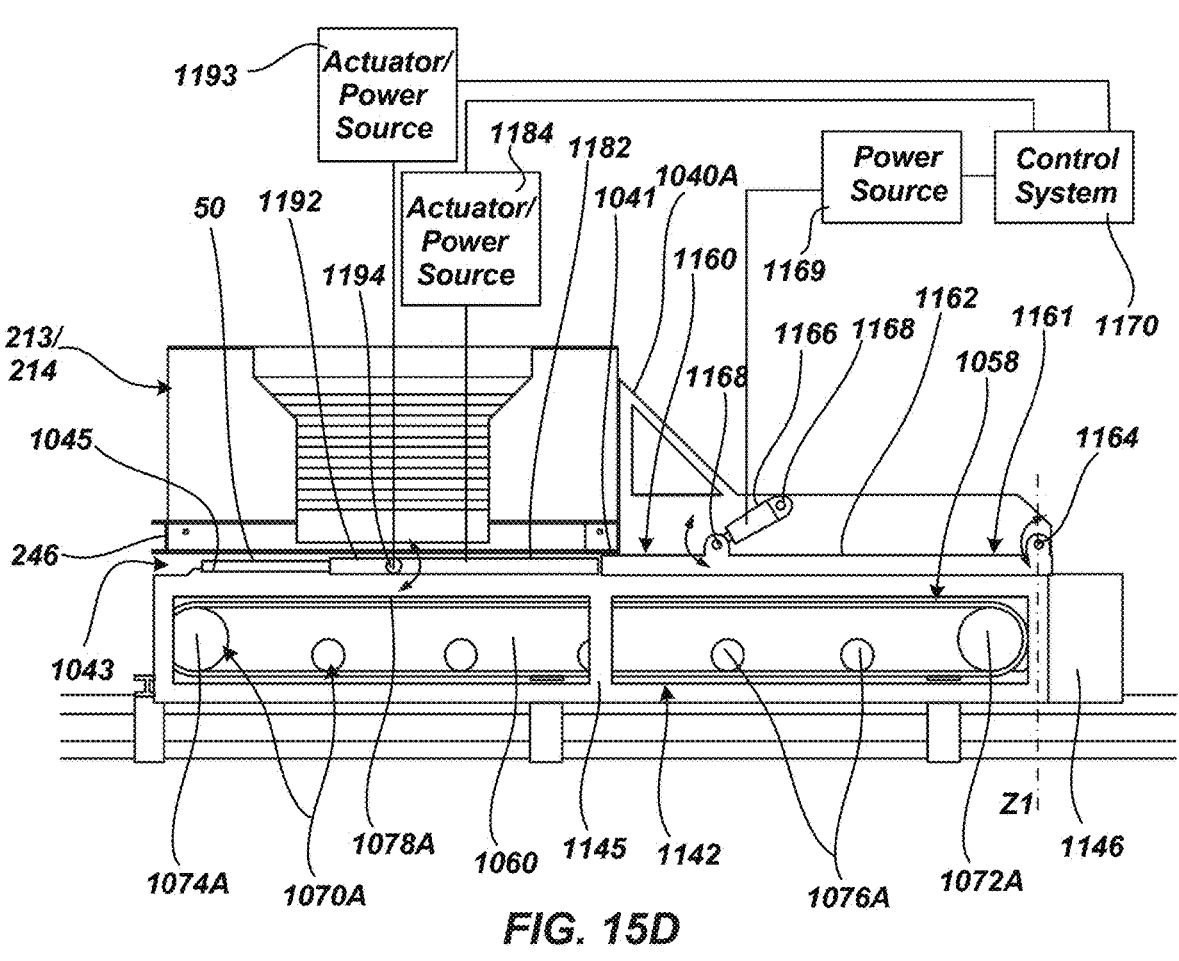
Figure 15E:
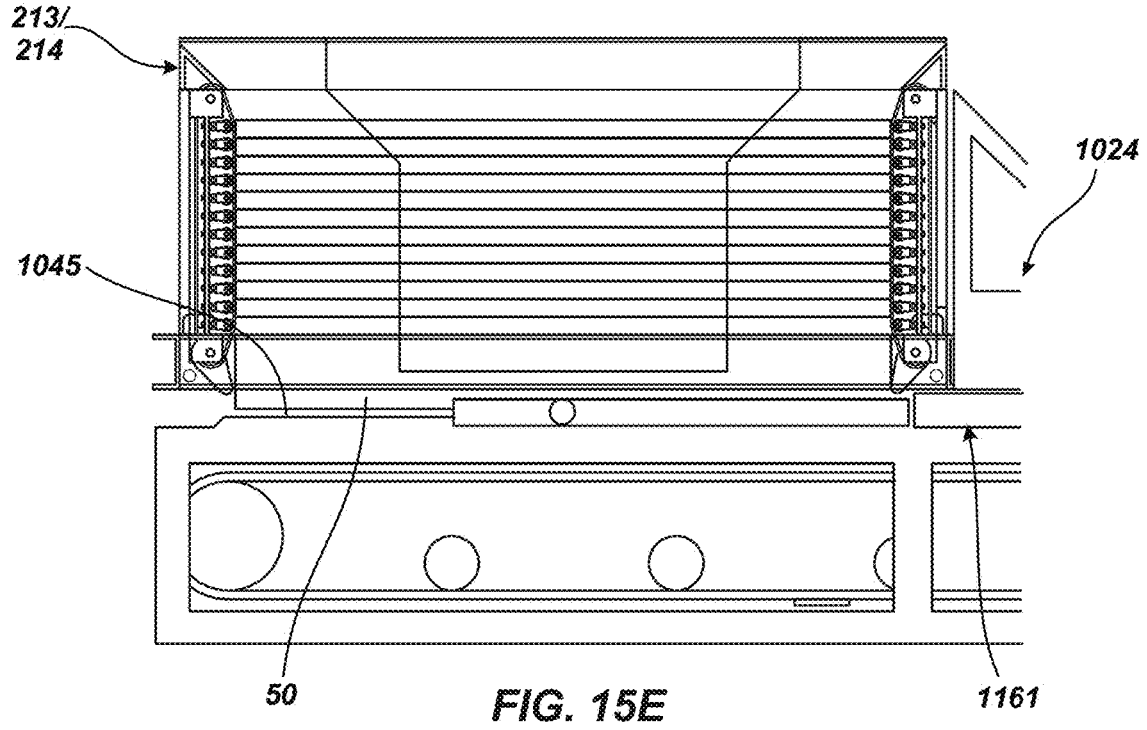
Figure 15F:
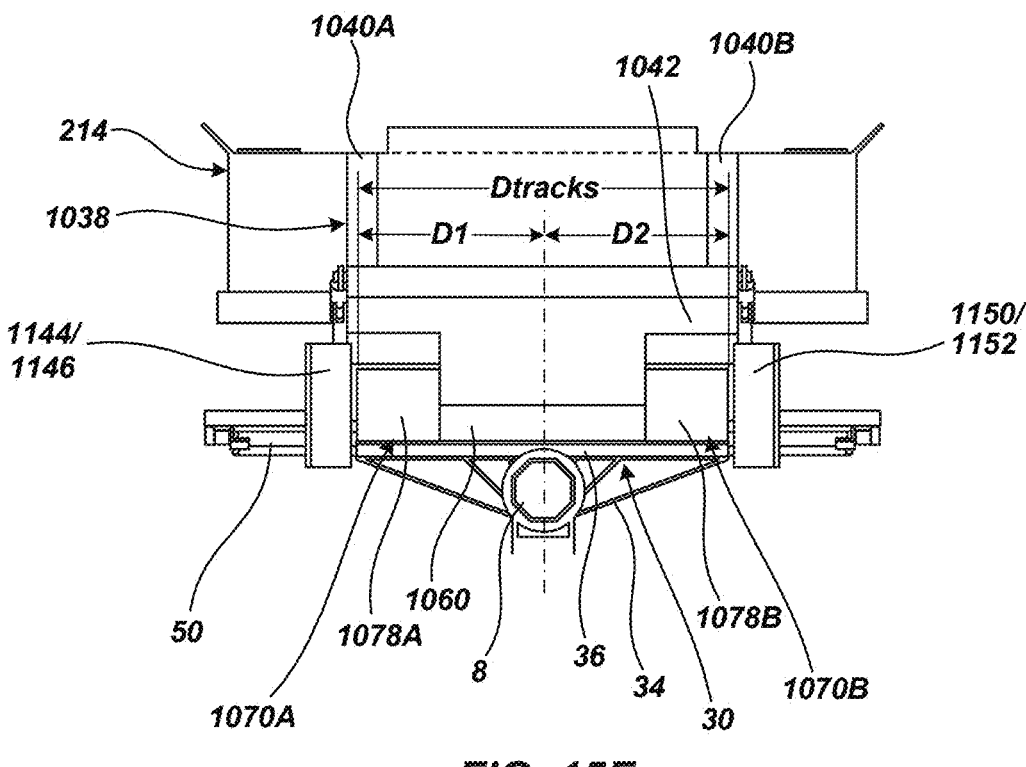
Figure 15G:
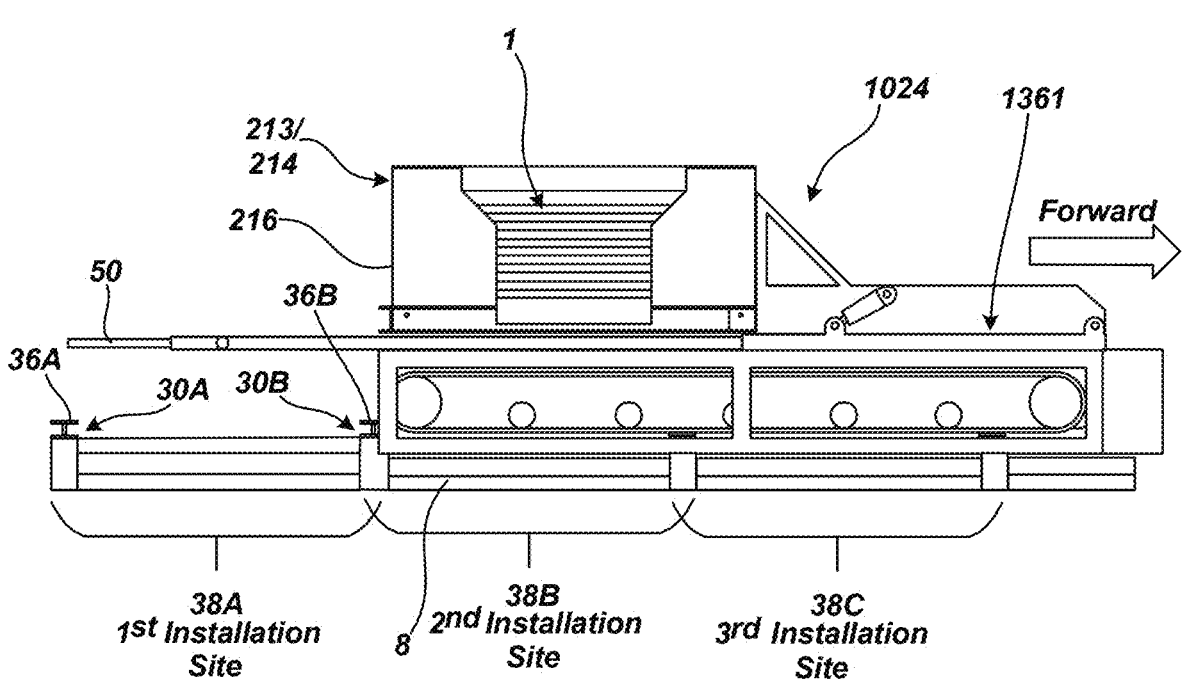
Figure 15H:
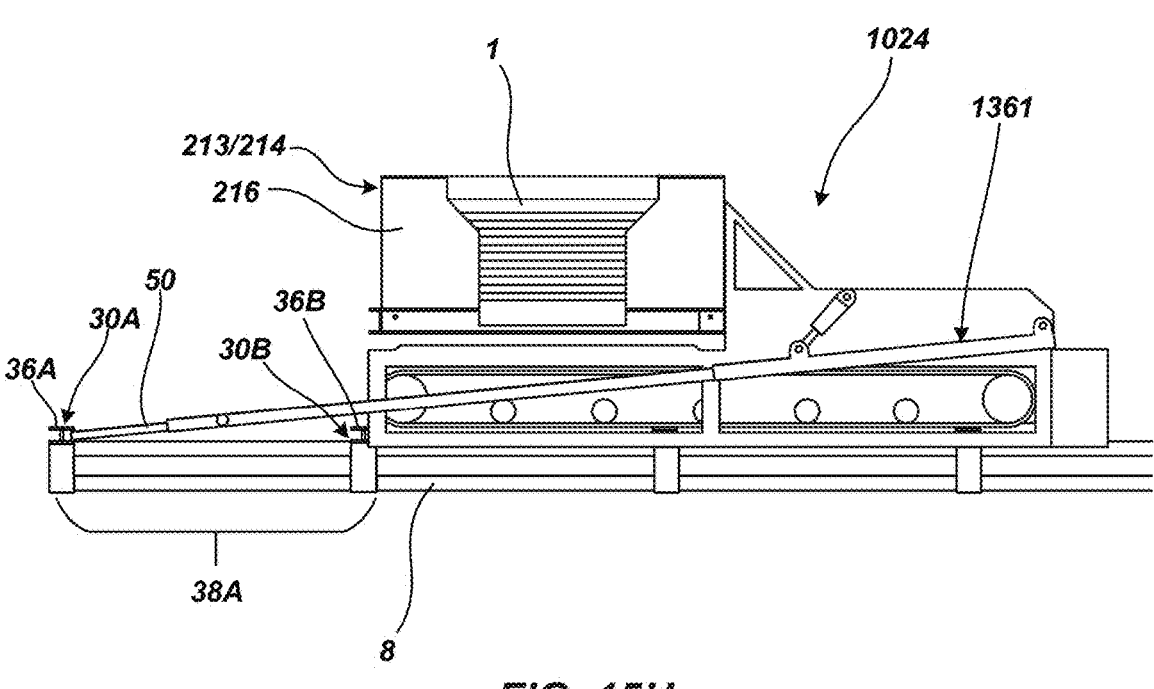
Figure 15I:
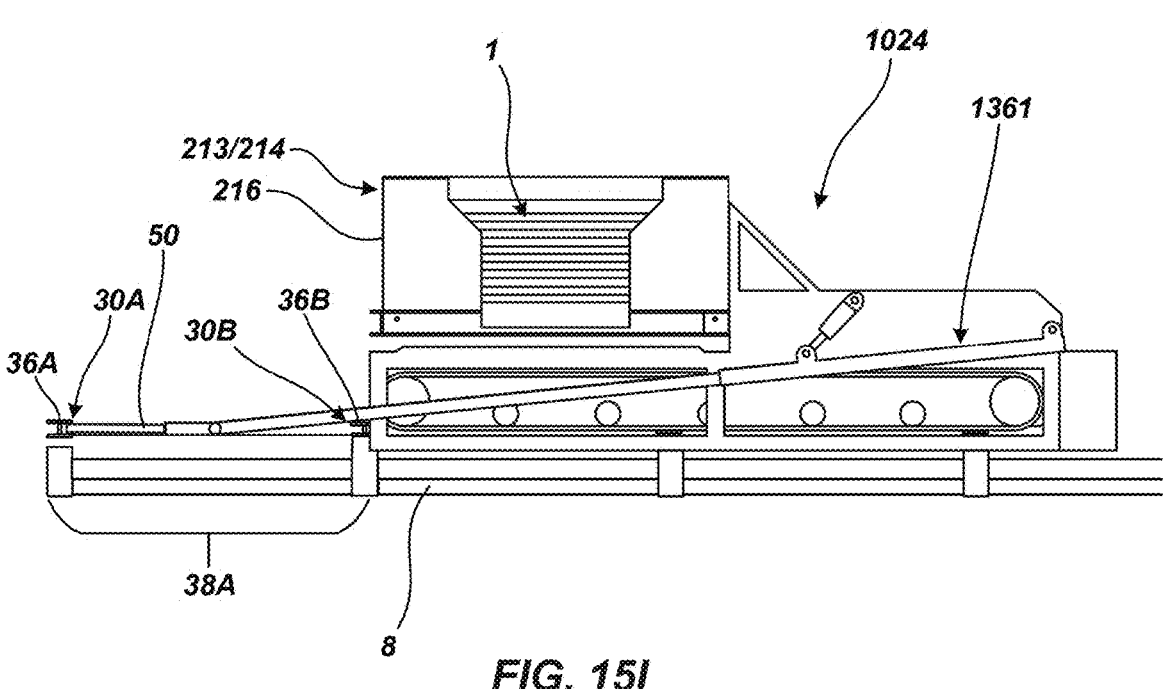
Figure 15J:
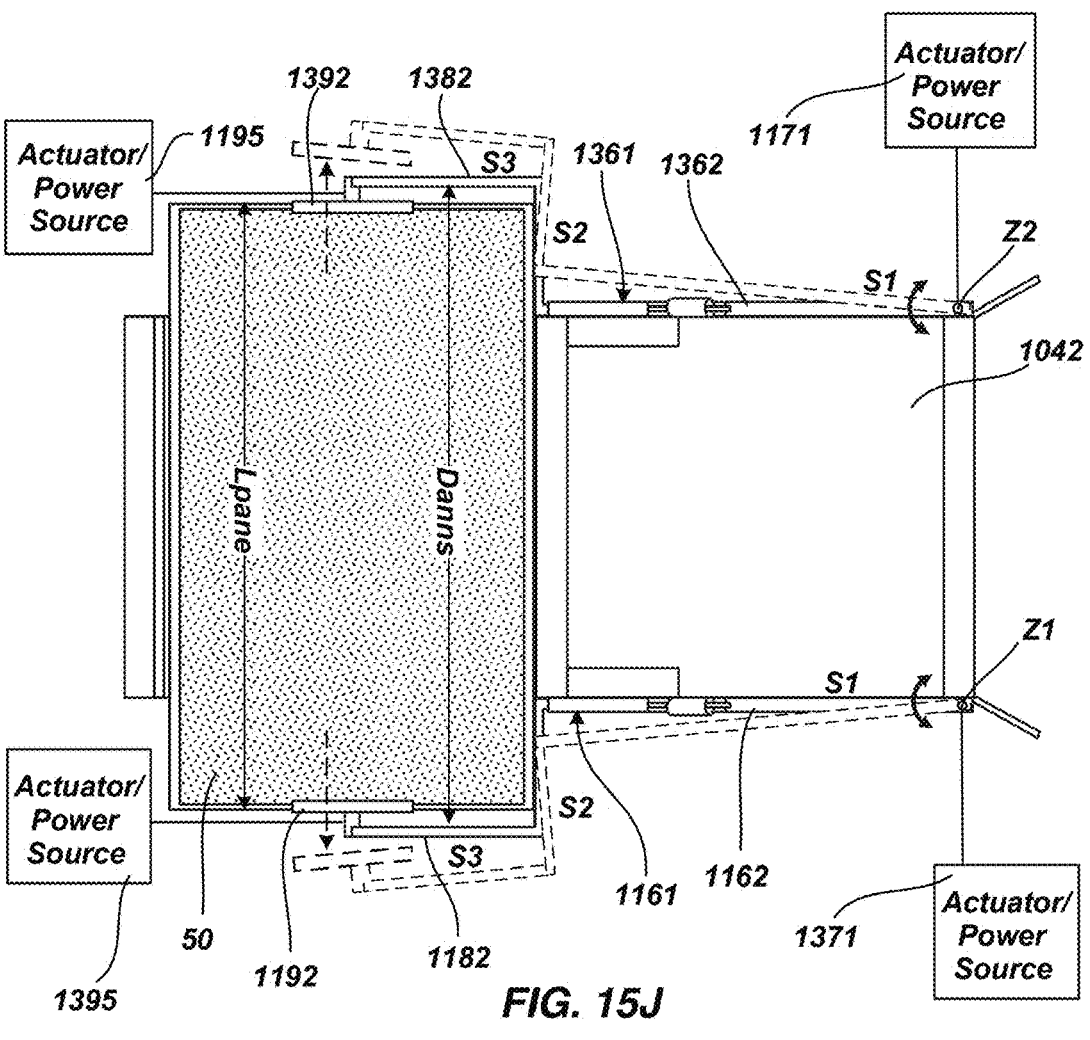
Figure 15K:
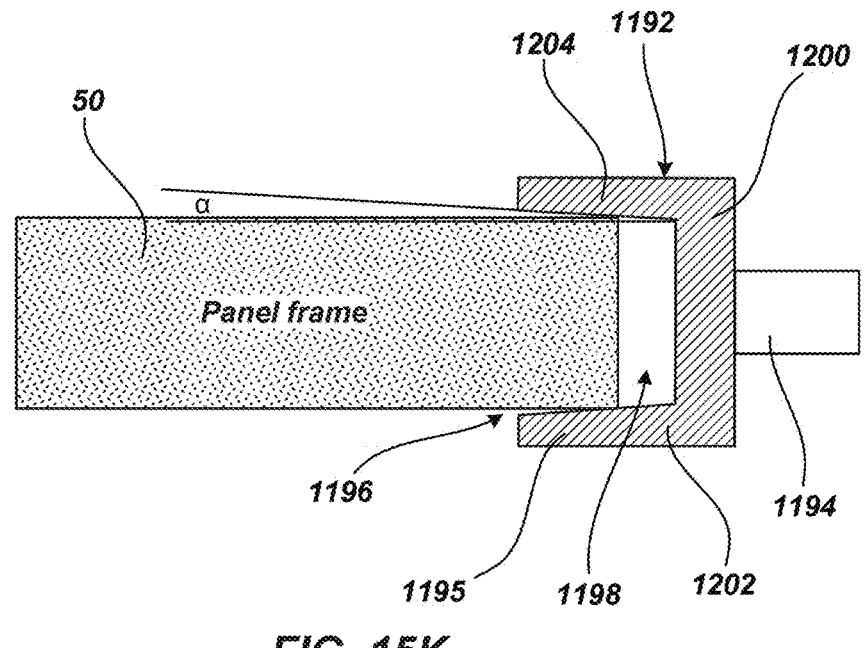
Figure 15L:
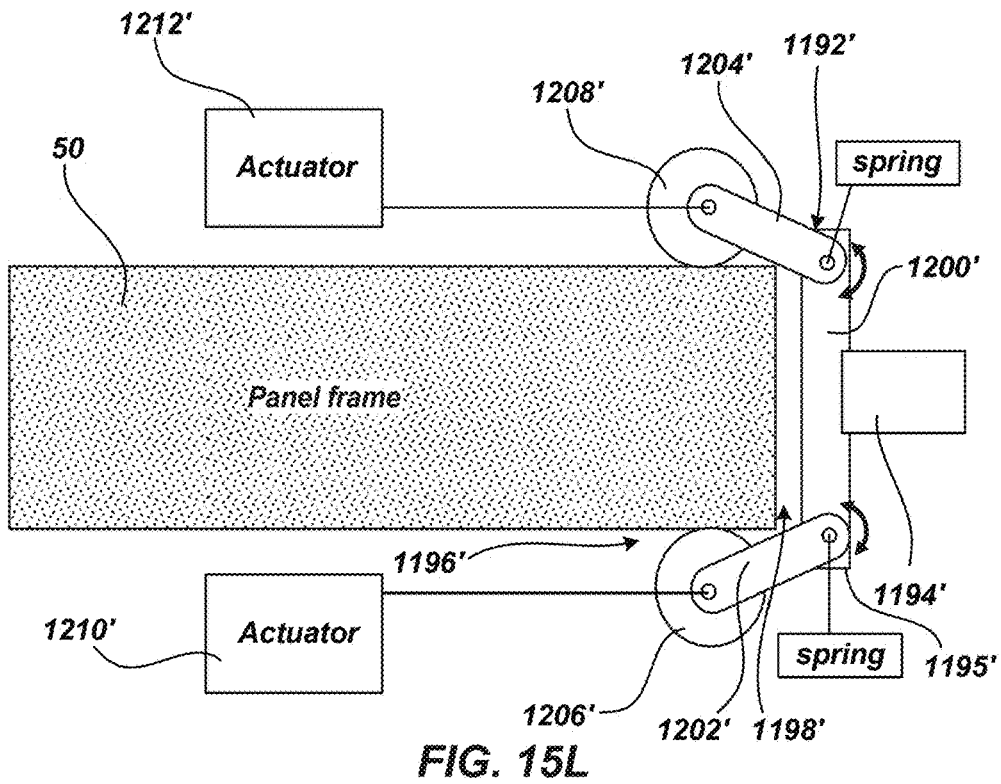
Figure 15M:
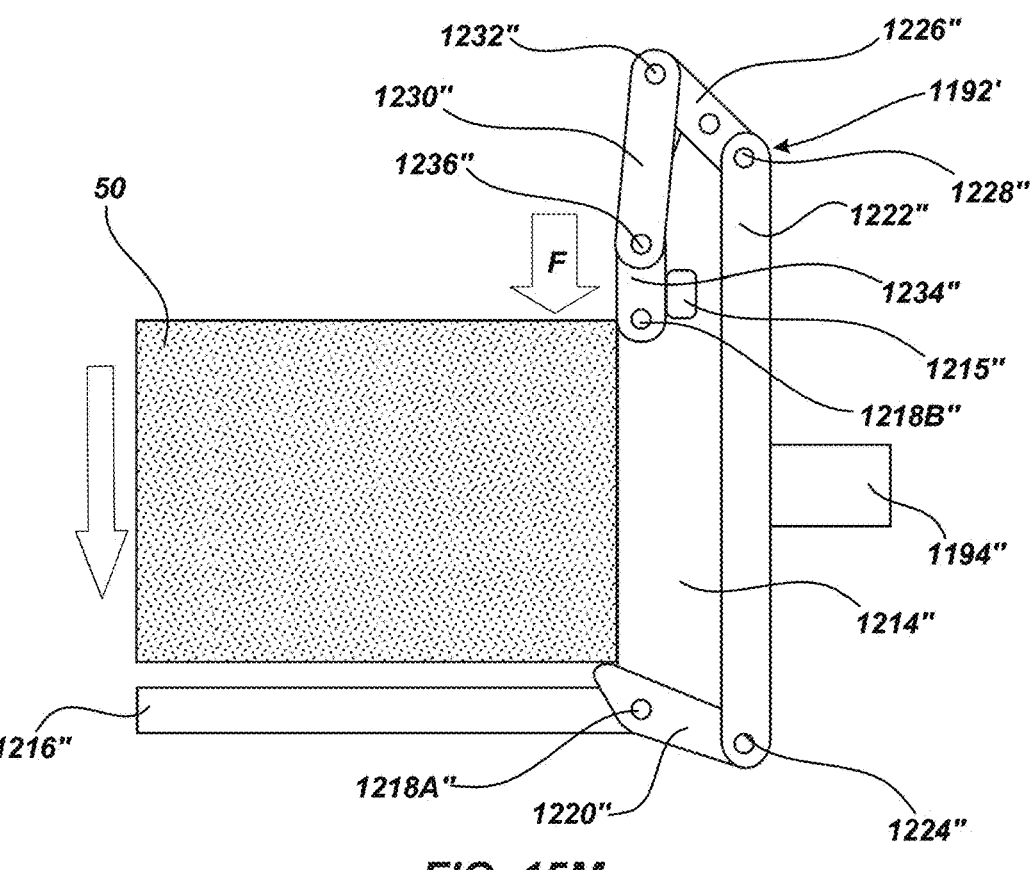
Figure 15N:
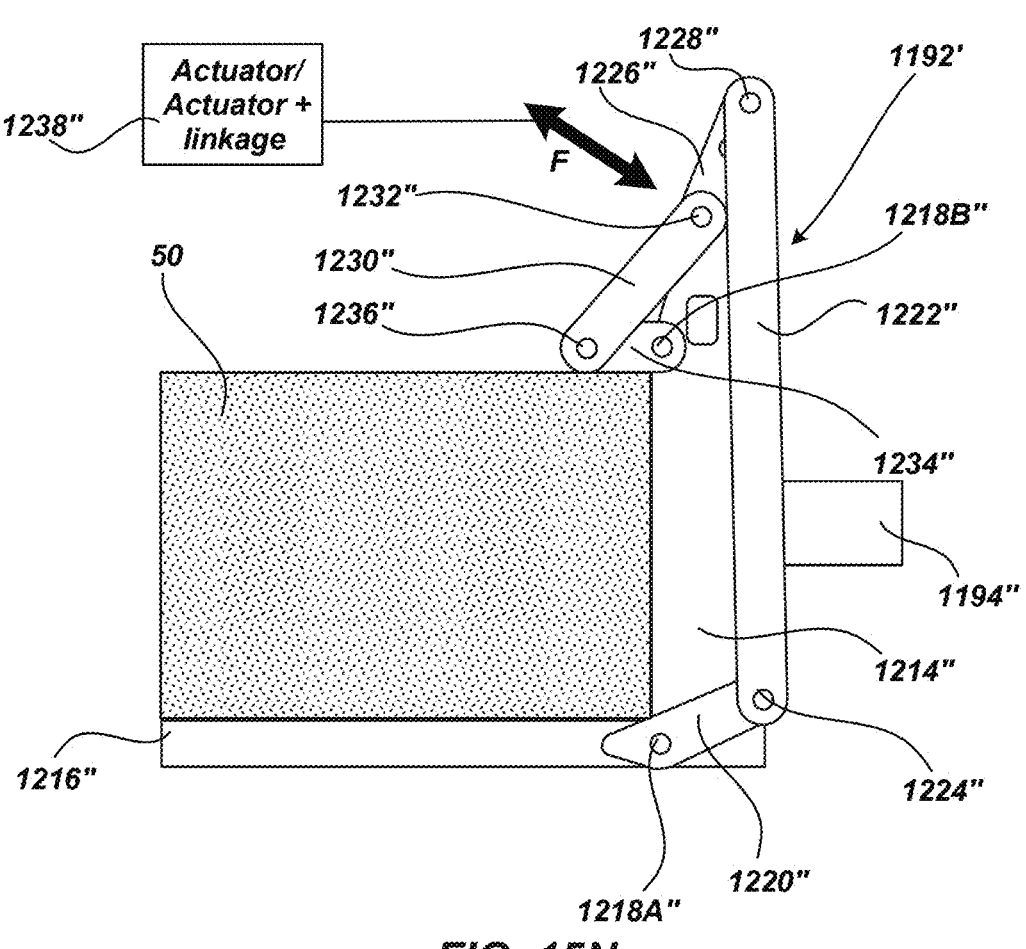
Figure 15O:
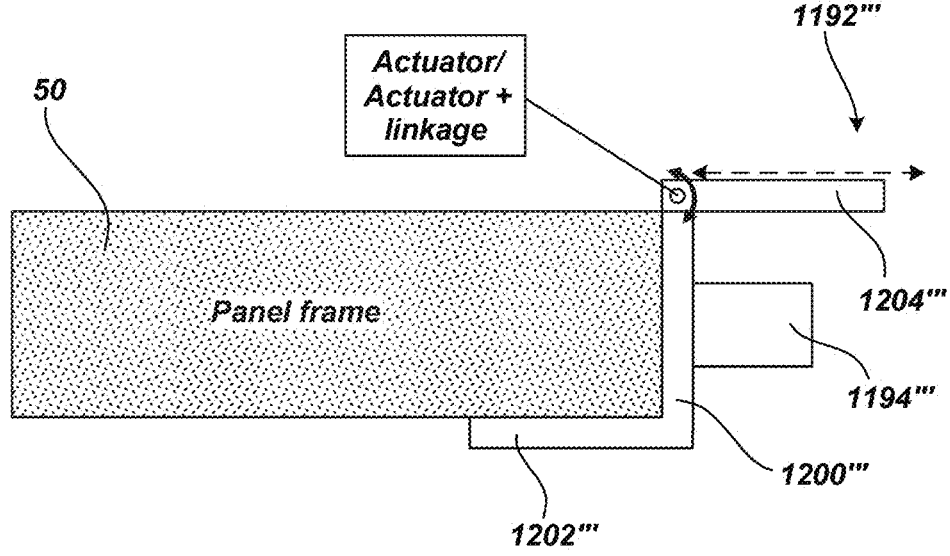

FIGS. 15B-15O illustrate one specific example of the solar panel installation system 1010 of FIG. 15A. Therefore, with reference to FIGS. 15B-15O, and with continued reference to FIGS. 3-4 and 15A, the solar panel installation system 1010 can comprise the solar panel presentation system 213 comprising the solar panel dispensing hopper 214 of FIGS. 3-5C (with example methods of operation being shown in FIGS. 7A-8I and 10A-11J) capable of receiving and housing therein one or more solar panels 1 (see plurality of solar panels 1 arranged in a horizontal stack). The solar panel installation system can further comprise a solar panel installation vehicle 1024 operable to carry and transport the solar panel dispensing hopper 214. The solar panel presentation system 213 with its solar panel dispensing hopper 214 can be operable with the installation vehicle 1024 to facilitate overhead installation of the solar panels 1 into the panel mount assemblies 30 on the panel support assembly 2. This can include operably connecting the installation vehicle 1024 with the solar panel presentation system 213 via the vehicle interface 1048A and the panel dispenser interface 1048B, which can comprise mechanical connections or couplings, electrical connections or couplings, fluid connections or couplings, data connections or couplings, and any combination of these.

The installation vehicle 1024 can comprise a hopper support 1038 that is itself supported by a chassis 1042 of the installation vehicle 1024, which hopper support 1038 can comprise a structure or structural assembly operable to support the solar panel dispensing hopper 214 on or as part of the installation vehicle 1024, and which can be part of or can comprise the dispenser interface 1048B operable and configured to receive and at least one of mechanically, fluidly, or electronically interface and couple with the solar panel dispensing hopper 214 via the vehicle interface 1048A of the solar panel dispensing hopper 214. The hopper support 1038 can be supported by, or can be part of, the chassis 1042 and positioned so as to locate the center of gravity of the installation vehicle 1024 (with the solar panel dispensing hopper 214 and any installed or loaded solar panels 1) in a position that enables the installation vehicle 1024 to ride along the tops of the panel mount assemblies 30 supported on the torque tube 8. In the example shown, the hopper support 1038 comprises a first anchor 1040A and a second anchor 1040B, each extending up from the chassis 1042 and securing to a sidewall of the hopper enclosure 216. The hopper support 1038 further comprises a structural support defining a shoulder 1041 sized and configured to receive and support a portion of the support frame 246 of the solar panel dispensing hopper 214. The first and second anchors 1040A and 1040B and the shoulder 1041 operate to secure the solar panel dispensing hopper 214 in a cantilevered manner so as to provide a gap 1043 between the bottommost surface of the solar panel dispensing hopper 214 (in this case the support frame 246) and a panel support surface 1045 of the chassis 1042 just below the solar panel dispensing hopper 214, which panel support surface 1045 is shown as being over and covering the endless track system 1058. The hopper support 1038 operates to locate the solar panel dispensing hopper 214 at a rear of the installation vehicle 1024, with a front of the installation vehicle comprising other components (e.g., one or more power sources, such as batteries, electronics (e.g., for a control system, communications module and others), and any other components). The chassis 1042, the hopper support 1038 and all of the other components of the installation vehicle 1024 can be designed to place the center of gravity of the installation vehicle in an acceptable, workable position to allow the installation vehicle 1024 to be sufficiently balanced and to be operated as intended.

In one example, the solar panel dispensing hopper 214 can comprise a self-contained system, meaning that the solar panel dispensing hopper 214 is not an integral part of the solar panel installation vehicle 1024, rather that it is a module having its own housing or frame unit, and that it is removable or removably operable with one or a variety of different solar panel installation vehicles, such as the installation vehicle 1024 (or any of the other installation vehicles discussed herein), that are designed to receive the solar panel dispensing hopper 214 (the device 214 being a type of plug-in or module). This also means that some or all of the components, systems or other elements needed to carry out an installation task of inserting a solar panel into a panel support assembly are part of or on-board the solar panel dispensing hopper 214 (e.g., control system 260, communications module 274, sensor(s) 270, automation system 272, etc.). In this example, the vehicle interface 1048A of the solar panel dispensing hopper 214, that is inclusive of the support frame 246 of the solar panel dispensing hopper 214, can be used to mechanically interface with and couple to a suitable support structure or structural assembly as part of the dispenser interface 1048B of the hopper support 1038 of the installation vehicle 1024. In one example, the solar panel dispensing hopper 214 can be coupled to the installation vehicle 1024 by coupling or otherwise joining the support frame 246 (or another structural component) of the solar panel dispensing hopper 214 to a suitable support structure of the installation vehicle 1024, and particularly to the hopper support 1038, such as by using one or more fasteners. A suitable support structure of the installation vehicle 1024 and the hopper support 1038 can comprise a platform, a framework, a housing, a structural element comprising a recess or bay, or any other structural assembly or arrangement. In a specific example, the installation vehicle 1024 can comprise a hopper support 1038 configured to comprise a bay or recess formed therein that is sized and configured to receive the solar panel dispensing hopper 214 therein, wherein the recess or bay comprises a shoulder or other structure upon which the support frame 246 can be seated, or to which it can be coupled. Additional securing means, such as fasteners, straps, brackets, and others can be used to secure the solar panel dispensing hopper 214 to the vehicle 1024 after it is seated within the recess or bay. In addition to providing a mechanical interface with mechanical connections or couplings, the vehicle interface 1048A and the dispenser interface 1048B can further comprise at least one of electrical connections or fluid connections. In another example, the solar panel dispensing hopper 214 can be integrally formed with and part of the installation vehicle 1024, such that the vehicle interface 1048A and the dispenser interface 1048B (comprising at least one of mechanical, fluid, or electrical interfaces) are also integrally formed with one another. In this example, the solar panel dispensing hopper 214 can be considered a dedicated, non-interchangeable component of the installation vehicle 1024.

The solar panel installation system 1010 can further comprise a multi-degree of freedom platform (or stage) 1110 supported between the solar panel dispensing hopper 214, namely the hopper enclosure 216, and the installation vehicle 1024 that is operable to facilitate movement of the solar panel dispensing hopper 214 in one or more translational and/or rotational degrees of freedom relative to the chassis 1042 of the installation vehicle 1024 and the panel support assembly 2 (specifically the panel mount assemblies 30 as supported on the torque tube 8). The multi-degree of freedom platform 1110 can be part of at least one of the vehicle interface 1048A or the dispenser interface 1048B, and can comprise a clearance sized and configured to permit the passage of a solar panel therethrough. In one example, the multi-degree of freedom platform 1110 can comprise the multi-degree of freedom platform 510 as discussed above and shown in FIGS. 12A-12D (with some of its components configured as an X-Y platform, and in some examples comprising one or more lifts, such as a single lift or the lifts 559A and 559B operable with the X-Y platform to provide movement in one or more additional translational and/or rotational degrees of freedom). In one example, the multi-degree of freedom platform 1110 can comprise a separate structural system coupled between the solar panel dispensing hopper 214 and the installation vehicle 1024, or in another example, one or more components of the multi-degree of freedom platform 1110 can be integrally formed with and part of at least one of the solar panel dispensing hopper 214 or the installation vehicle 1024. Depending upon how it is configured, the multi-degree of freedom platform 1110 can be configured to provide between 1 and 6 degrees of freedom of movement to the solar panel dispensing hopper 214 supported on the multi-degree of freedom platform 1110. The discussion of the multi-degree of freedom platform 510 set forth above can be referred to for additional details.

The installation vehicle 1024 can comprise a type in the form of a torque tube riding installation vehicle that is operable to be supported and to ride upon the panel support assembly 2 above ground, and is configured to span the torque tube 8 to facilitate overhead installation of the solar panels within the solar panel dispensing hopper 214. In this example, the installation vehicle 1024 is configured to be supported and ride on various panel mount assemblies 30 that are supported on the torque tube 8 once these are coupled or otherwise secured to the torque tube 8. The installation vehicle 1024 will generally be configured to be supported by at least two panel mount assemblies at all time as it rides along the torque tube 8.

The installation vehicle 1024 can comprise a chassis 1042, at least a portion of which is sized and configured to span the torque tube 8. The chassis 1042 comprises support structures configured to provide direct or indirect support to the various components, elements, systems, mechanisms, etc. of the installation vehicle 1024 as well as to the solar panel dispensing hopper 214, and any other components or systems operable with or within these (e.g., multi-degree of freedom platform(s), and others). The chassis 1042 can comprise a number of different sizes, shapes and configurations. In one example, the chassis 1042 can comprise a framework or frame-like structural configuration, wherein a number of different structural elements or components are coupled with one another to make up the chassis 1042. In another example, the chassis 1042 can comprise a housing or other more solid structural configuration. The chassis 1042 can comprise a receiver or platform configured to receive and support the solar panel dispensing hopper 214 (see FIG. 14B). This can be referred to as the hopper support 1038 and the dispenser interface 1048B can be part of the hopper support 1038.

The chassis 1042 can be sized and configured to support the solar panel dispensing hopper 214 at a position and height above the torque tube 8 sufficient to locate the solar panel dispensing hopper 214 as supported by the chassis 1042 in an overhead position relative to a panel support assembly 2 and any of its components, namely the panel mount assemblies 30 as the installation vehicle 1024 spans the torque tube 8. Indeed, the installation vehicle 1024 can further be configured to span the torque tube 8, meaning that the chassis 1042 can be sized and configured to extend in a first direction away from the first side of the torque tube 8 and in a second direction away from the second side of the torque tube 8, wherein the chassis 1042 spans the torque tube 8, as shown. The chassis 1042 can comprise a size and configuration, as well as a position relative to an upper surface of the panel mount assemblies 30, so as to be able to locate the solar panel dispensing hopper 214 in an overhead position relative to the torque tube 8 and the panel mount assemblies 30 supported thereon.

The installation vehicle 1024 can further comprise a drive system 1056 supported by the chassis 1042, and operable to facilitate support and locomotion of the installation vehicle 1024 on the torque tube 8 itself. As such, the drive system 1056 can more specifically comprise a torque tube interface assembly comprising various components that engage and interface with the torque tube 8, and that enable the installation vehicle 1024 to ride on and to drive along the torque tube 8. Specifically, the torque tube interface assembly can comprise any components, elements, and/or systems that operate to support the chassis 1042 (and the panel dispensing hopper 214 supported on the chassis 1042, as well as any solar panels 1 within the panel dispensing hopper 214) in an overhead position above the torque tube 8 and the various panel mount assemblies 30 of the panel retention systems 38 (each panel mount assembly 30 comprising a torque tube clamp 34 and a panel mount 36), as well as to facilitate controlled locomotion of the installation vehicle 1024 along the torque tube 8, particularly as the torque tube interfacing system engages and interfaces with the panel mount assemblies 30 of the panel retention systems 38 supported on the torque tube 8, therefore facilitating the installation vehicle 1024 to ride on (e.g., atop) the panel mount assemblies 30 as supported on the torque tube 8. In one example, the torque tube locomotion assembly can be in the form of an endless track system 1058. The endless track system 1058 can comprise one or more frames (e.g., see frame 1060), one or more endless track assemblies 1070 (e.g., see endless track assemblies 1070A and 107B) operable with and supported by the one or more frames, wherein the one or more endless track assemblies each comprise a wheel assembly (comprising a plurality of wheels) or other support members rotatably coupled to the frame(s); and an endless track supported by each respective wheel assembly (e.g., see endless tracks 1078A and 1078B supported on endless track assemblies 1070A and 1070B, respectively). The endless track system 1058 can comprise a number of different types and/or configurations. For example, the wheel assembly of each of the endless track assemblies 1070A and 107B can comprise a variety of different types, sizes, shapes, arrangements, and functions so as to facilitate support and operation of an endless track (e.g., endless tracks 1078A and 1078B). Generally speaking, a wheel assembly in support of an endless track can include at least one drive wheel assembly, at least one idler wheel assembly, and one or more support wheel assemblies. Likewise, the endless track itself can comprise a variety of different types, sizes, shapes, and arrangements. The endless track system 1058 can further comprise other components, systems that can be part of a drive system of the installation vehicle 1024 for operating one or more endless tracks. For example, the endless track system 1058 can comprise drivetrain components, a transmission, suspension components, or any other components, systems operable to couple or otherwise connect the endless track system 1058 to an actuator and/or power source operable to drive the one or more drive wheels and the endless track. In one example, the endless track system 1058 can comprise and be operably coupled to one or more actuators, such as one or more electric motors, each of which can be coupled to or otherwise associated with a power source (e.g., one or more batteries, hydrogen fuel cells, or a combination of these). In another example, the endless track system 1058 can comprise and be operably coupled to or otherwise associated with a power source in the form of a combustion engine (e.g., a gas internal combustion (IC) engine, a liquid petroleum gas (LPG) engine, a natural gas engine, or any combination of these). In another example, the endless track system 1058 can be powered using a hybrid approach, such as by both electric and combustible fuel power. The actuator and/or power source can further be connected to and operable with, and the endless track system 1058 can comprise, a control system operable to control operation of the actuator and/or power source and the endless track system 1058.

As indicated above, the endless track system 1058 can comprise one or more frames 1060. In one example, the one or more frames 1060 can comprise a multi-member frame, where the various members are coupled or otherwise secured to one another (e.g., via fasteners, welds, rivets, or others). In another example, the one or more frames 1060 can comprise a unitary structural configuration (i.e., a single structural component). Each frame 1060 can be operable to support a wheel assembly and thus an endless track of the endless track system 1058. The frame(s) 1060 can be made of a high strength steel or other material. Moreover, the frames 1060 can comprise a number of different configurations, sizes, shapes, and/or functions. In one aspect, the one or more frames 1060 can be coupled to or otherwise secured to the chassis 1042. In another aspect, the one or more frames 1060 can be integrally formed with the chassis 1042.

The endless track system 1058 can comprise a plurality of track assemblies 1070, each supported by a common frame (see frame 1060) or individual frames. In addition, each of the plurality of track assemblies 1070 can comprise different configurations, sizes, shapes, types, etc. In one example, as shown, the endless track system 1058 comprises a first track assembly 1070A operable on one side of the installation vehicle 1024 and a second track assembly 1070B operable on an opposing side of the installation vehicle 1024. The first and second track assemblies 1070A and 1070B are shown as being supported by a common frame 1060, but this is not intended to be limiting in any way as the first and second track assemblies 1070A and 1070B can each be supported by their own frame.

The first track assembly 1070A can comprise a plurality of individual wheel assemblies. In the example shown, the first track assembly 1070A can comprise a drive wheel assembly 1072A supported by and from a first end of the frame 1060, and operatively connected to a driving axle (not shown) of the drive system 1056 and a power source (see power source as part of the operating system 1026) of the installation vehicle 1024. As so connected, the drive wheel assembly 1072A functions to drive the endless track and to facilitate locomotion of the installation vehicle 1024. The drive wheel assembly 1072A can be configured to bear at least some of the weight of the installation vehicle 1024. The drive wheel assembly 1072A can comprise engaging members (i.e., protrusions, such as teeth or teeth-like structures) (not shown) disposed on the outer circumference or perimeter of the drive wheel assembly 1072A. The drive wheel assembly 1072A defines, between each of two adjacent engaging members, recesses. The engaging members and the recesses are adapted, as will be described in greater detail below, to engage with central lugs provided on an inner surface of the endless track. It is contemplated that in other examples, the configuration of the drive wheel assembly 1072A can differ without departing from the scope of the present technology.

The endless track system 1058 and the first track assembly 1070A can further comprise an idler wheel assembly 1074A supported by and from a second end of the frame 1060. The idler wheel assembly 1074A, while not a drive wheel and while doing no work to drive the endless track, can operate to change the direction of the rotating endless track, and can be configured to bear at least some of the weight of the installation vehicle 1024. The idler wheel assembly 1074A can comprise engaging members (i.e., protrusions, such as teeth or teeth-like structures) (not shown) disposed on the outer circumference or perimeter of the idler wheel assembly 1074A. The idler wheel assembly 1074A defines, between each of two adjacent engaging members, recesses. The engaging members and the recesses are adapted, as will be described in greater detail below, to engage with central lugs provided on an inner surface of the endless track. It is contemplated that in other examples, the configuration of the idler wheel assembly 1074A can differ without departing from the scope of the present technology. Moreover, although not shown, it is contemplated that the idler wheel assembly 1074A can be connected to the frame 1060 via a tensioning system, which can be operable to adjust a tension in the endless track by selectively moving the idler wheel assembly 1074A toward or away from the frame 1060.

The endless track system 1058 and the first track assembly 1070A can further comprise one or more support wheel or road wheel assemblies 1076A. The support wheel assemblies 1076A can comprise non-powered wheels positioned between the drive wheel assembly 1072A and the idler wheel assembly 1074A. The support wheel assemblies 1076A can be configured to support at least some of the weight of the installation vehicle 1024. In some examples, the support wheel assemblies 1076A can further comprise a suspension system. It is contemplated that in some examples, the support wheel assemblies 1076A can be connected to the frame 1060 via support structures enabling a pivotal movement of the support wheel assemblies 1076A about a longitudinally extending axis. The first track assembly 1070A can comprise a plurality of support wheel assemblies 1076A that are spaced apart from one another a given distance. In this case, as the installation vehicle 1024 is intended to ride along the top surfaces of the several panel mount assemblies 30 as supported on the torque tube 8, and as the panel mount assemblies 30 comprise only a relatively small width as compared to a length of the first track assembly 1070A, the first track assembly 1070A can comprise any number of support wheel assemblies 1076A, and these can be spaced apart from one another, so as to minimize or prevent deforming of the endless track out of plane along the panel mount assemblies 30. The size, configuration and material makeup, as well as the tension, of the endless track can also be optimized to minimize or prevent this.

In one example, the idler wheel assembly 1074A and the one or more support wheel assemblies 1076A can comprise two laterally spaced or offset wheels. In another example, the idler wheel assembly 1074A and the one or more support wheel assemblies 1076A can comprise a single wheel defining a central recess configured to receive the central lugs of the endless track therebetween.

The endless track system 1058 and the first track assembly 1070A can further comprise an endless track 1078A, which can be sized and configured to extend around the drive wheel assembly 1072A, the idler wheel assembly 1074A, and the support wheel assemblies 1076A. The endless track 1078A can comprise any number of different sizes, shapes, and configurations, and can comprise any material makeup. In one example, the endless track 1078A can comprise a series of lugs supported or formed on an inside surface of the endless track 1078A. The inside surface of the endless track 1078A can be configured to interface with an outer surface of the various wheel assemblies set forth above. In addition, the series of lugs on the inside surface of the endless track 1078A can be configured to engage or be received within the recesses formed or otherwise existing on the outer surfaces of the various wheel assemblies discussed above, such as the drive wheel assembly 1072A and the idler wheel assembly 1074A. Of course, the endless track 1078A and the wheel assembly interfaces can be configured differently than this. With regards to the outer surface of the endless track 1078A, this can be configured as needed or desired to provide an optimal interaction with the upper surfaces of the various panel mount assemblies 30 with which the endless track 1078A will be engaged. Indeed, the endless track 1078A can be configured with any number of different surface configurations and can be configured to comprise any type of material makeup. In one example, the panel mount assemblies 30 can be made of metal. As such, the material makeup of the endless track 1078A can be selected so as to provide a high degree of traction on a metal surface (i.e., the coefficient of friction between the endless track 1078A and a metal panel mount assembly 30 is optimized).

It is noted that the second track assembly 1070B of the endless track system 1058 can comprise the same elements and configuration as the first track assembly 1070A. For example, the second track assembly 1070B can comprise a drive wheel assembly, an idler wheel assembly, and one or more support wheel assemblies, each of which can be the same and can comprise the same function as their respective counterparts in the first track assembly 1070A. As such, the second track assembly 1070B with its elements and configuration is not described in detail herein.

The first and second track assemblies 1070A and 1070B can be actuated and driven to propel the installation vehicle 1024 along the panel support assemblies 30 supported on the torque tube 8. Moreover, the first and second track assemblies 1070A and 1070B can be configured to interface with, engage, and ride on the top of the panel mount assemblies 30 as supported on the torque tube 8. In one example, the first and second track assemblies 1070A and 1070B can comprise a length greater than a distance between two adjacent panel mount assemblies 30, such that each of the first and second track assemblies 1070A and 1070B is engaged with two panel mount assemblies 30 at a time while traveling along the torque tube 8, thus providing stabilization and balance to the installation vehicle 1024. In another example, the first and second track assemblies 1070A and 1070B can comprise a length such that each of the first and second track assemblies 1070A and 1070B is engaged with three or more panel mount assemblies 30 at a time while traveling along the torque tube 8. Moreover, the first and second track assemblies 1070A and 1070B can be spaced apart from one another a distance so that they are both properly engaged with and riding on the top of the panel mount assemblies 30 on opposing sides of the torque tube 8. In the example shown, the first and second track assemblies 1070A and 1070B are spaced apart from one another a distance $D_{tracks}$ such that an outer edge of each of the endless tracks of the respective first and second track assemblies 1070A and 1070B aligns with (i.e., is flush with) an end of the panel mount assemblies 30 (see FIG. 15F). In other words, the first and second track assemblies 1070A and 1070B can be spaced apart from one another a suitable distance so as to ride along and engage respective ends of the panel support assemblies 30. Although not required, the spacing distance D1 of the first track assembly 1070A from a center of the torque tube 8 can be equal to a spacing distance D2 of the second track assembly 1070B from the center of the torque tube 8.

The first and second track assemblies 1070A and 1070B can also be operated independent of one another. More specifically, each of the respective endless tracks of the first and second track assemblies 1070A and 1070B can be driven at different speeds so as to facilitate steering of the installation vehicle 1024.

One skilled in the art will recognize that the endless track system 1058 can comprise a number of different configurations. For example, it is contemplated that in other examples, the endless track system 1058 could include a different number of and/or type of wheel assemblies and/or a different type of endless track than those shown and as discussed herein. In another example, a single track assembly is contemplated for use with the installation vehicle, with the endless track comprising a greater width than the endless track 1078A shown and discussed herein. In this example, the track assembly can be configured to be supported about a frame such that a midline of the endless track along a longitudinal axis is aligned with a midline of the torque tube 8 along a longitudinal axis.

To facilitate locomotion of the installation vehicle 1024 along the torque tube 8, and particularly to facilitate proper alignment of the installation vehicle 1024 as it drives along the torque tube on top of the panel mount assemblies 30, the installation vehicle 1024 can further comprise a vehicle alignment system 1140 in the form of a guide frame 1142 supported about the chassis 1042. The guide frame 1142 can be configured and operable to align (and correct misalignment of) the installation vehicle 1024, and more particularly the solar panel dispensing hopper 214, relative to the torque tube 8 and the panel retention systems 38 (with one or more panel mount assemblies 30) supported on the torque tube 8 at the various installation sites along the torque tube 8 as the installation vehicle 1024 travels along the torque tube 8 to reach the various installation sites. In one example, as shown, which is not intended to be limiting in any way, the guide frame 1142 can comprise alignment fiducials in the form of a first guide arm 1144 having a tracking portion 1145 and a lead-in portion 1146. The guide frame 1142 can comprise a second guide arm 1150 having a tracking portion 1151 and a lead-in portion 1152. The first and second guide arms 1144 and 1150 can be located and supported on the chassis 1042, and specifically on and along opposing sides of the chassis 1042 so as to extend down from the chassis 1042 a distance below the first and second track assemblies 1070A and 1070B, and to terminate below an upper surface of the panel mounts 36. The first and second guide arms 1144 and 1150 can be spaced apart a distance that is greater than a length of the panel mounts 36 as supported on the torque tube 8 so that as the installation vehicle 1024 travels in a direction (see arrow in FIG. 15C indicating a forward direction) along the torque tube 8, the panel mounts 36 are caused to be initially received within the opening defined by the lead-in portions 1146 and 1152, respectively, of the first and second guide arms 1144 and 1150, then received between and into the area defined by the lead-in portions 1146 and 1152, and then subsequently received between and into the area defined by the tracking portions 1145 and 1151 as the installation vehicle 1024 continues to travel in the forward direction along the torque tube 8. The panel mounts 36 can be caused to exit the first and second guide arms 1144 and 1150 through an opening defined by the terminating ends of the tracking portions 1145 and 1151 as the installation vehicle 1024 continues to travel in the forward direction of travel along the torque tube 8. The first and second guide arms 1144 and 1150 can be referred to as lateral guide arms as they contact the sides of the panel mounts 36. In addition, the first and second guide arms 1144 and 1150 can be configured to provide a sliding interface with the panel mounts 36 without damaging the panel mounts 36. The installation vehicle 1024 can be configured so as to define and provide a throughput channel 1100 extending from a front or otherwise forward-facing portion of the installation vehicle 1024 (the portion facing in a direction of travel) to a rear or rearward-facing portion of the installation vehicle 1024, the throughput channel 1100 being sized and configured to receive one or more panel mount assemblies 30 through an entrance therein as the installation vehicle 1024 travels along the torque tube 8, and to facilitate the exit of the panel mount assemblies 30 from an exit of the throughput channel 900. The throughput channel 900 can be located beneath the chassis 1042, beneath the track assemblies 1070A and 1070B, and between the first and second guide arms 1144 and 1150, and can be defined by a volume boundary extending between the first and second guide arms 1144 and 1150, and along a plane just at or below the first and second track assemblies 1070A and 1070B. In some examples, the solar panel dispensing hopper 214 can be supported by the chassis 1042 in a manner such that at least a portion of the solar panel dispensing hopper 214 (e.g., certain components thereof, such as the flippers and/or pushers) can extend through a clearance 1052 in the chassis 1042 (or other structure or structural assembly in support of the solar panel dispensing hopper 214 (e.g., a hopper support 1038)) and into the throughput channel 1100 (e.g., upon actuating the flippers and/or pushers).

The lead-in portions 1146 and 1152 are configured to be on an incline relative to the tracking portions 1145 and 1151, with the lead-in portion 1146 extending outward and away from the tracking portion 1145 of the first guide arm 1144 in a first direction, and the lead-in portion 1152 extending outward and away from the tracking portion 1151 of the second leading guide arm 1150 in a second direction, such that the terminating ends of the two lead-in portions 1146 and 1152 define an opening or spacing between the first and second guide arms 1144 and 1150 that is greater than a spacing between the tracking portions 1145 and 1151. The outwardly tapering configuration of the lead-in portions 1146 and 1152 allow the alignment of the installation vehicle 1024 to be off slightly relative to the torque tube 8 and still capture the next panel mount 36 supported on the torque tube 8 as the installation vehicle 1024 advance.

The lead-in portions 1146 and 1152 and the tracking portions 1145 and 1151 can be sized and configured so as to ensure that the first and second guide arms 1144 and 1150 (lateral guide arms) are caused to be in contact with and to capture the sides or side surfaces of the panel mounts 36. Furthermore, the first and second guide arms 1144 and 1150 can be sized and configured so as to be in contact with and have captured therebetween at least one panel mount 36. In some cases, the first and second guide arms 1144 and 1150 can be configured to be in contact with and have captured therebetween two panel mounts 36, thus preventing undesired rotation of the first and second guide arms 1144 and 1150 (and therefore the installation vehicle 1024 and the solar panel dispensing hopper 214) about a single panel mount 36 in or about an axis normal to an uppermost surface of the torque tube 8 (e.g., which axis can often also be normal to ground in the event the ground is level with the torque tube 8), and therefore misalignment of the installation vehicle 1024 and the solar panel dispensing hopper 214 relative to the torque tube 8 and the panel retention systems 38 (with the panel mount assemblies 30) at one or more installation sites along the torque tube 8.

In one example, the first and second guide arms 1144 and 1150 can be rigidly mounted to the chassis 1042. In this example, the first and second guide arms 1144 and 1150 are configured to be rigid themselves, and therefore they can function as opposing mechanical constraints by physically contacting and engaging the captured panel mounts 36 and sliding past them as the installation vehicle 1024 advances in the forward direction of travel. The first and second guide arms 1144 and 1150 can be aligned via the mechanical constraint provided by the first and second guide arms 1144 and 1150 as they capture two or more panel mounts 36.

In another example, the first and second guide arms 1144 and 1150 (while still rigid themselves) can be flexibly or pivotally mounted to the chassis (similar to the first and second leading guide arms 641 and 651 discussed above and shown in FIG. 13G). In this example, the vehicle alignment system 1140 can further comprise biasing members (e.g., torsional or other type of spring operable with rotating or pivoting members) associated with each of the first and second guide arms 1144 and 1150, respectively, which biasing members are operable to maintain the first and second guide arms 1144 and 1150 against the panel mounts 36. Each of the first and second guide arms 1144 and 1150 can comprise a default or normal position where the first and second guide arms 1144 and 1150 are limited in their rotation so as to prevent inward rotation of these towards one another past a certain rotational position. This can be accomplished in any number of ways (e.g., stopper, rotation limiting joint, etc.). One or more sensors can be provided with each of the first and second guide arms 1144 and 1150 that monitor the position of the first and second guide arms 1144 and 1150 relative to the panel mounts 36. The first and second guide arms 1144 and 1150 and the sensors can provide or be part of an alignment feedback system that relies on the mechanical contact of the first and second guide arms 1144 and 1150 with the panel mounts 36. When one or more captured panel mounts 36 operate to cause rotation or flexing within one or both of the first and second guide arms 1144 and 1150 that overcomes the biasing member and that causes the first and second guide arms 1144 and 1150 to flex or rotate, the degree of rotation or flex can be measured and detected by the respective sensors associated with the first and second guide arms 1144 and 1150, and the input can be sent to the control system where the data can be compared to stored data corresponding to acceptable operating parameters. If the measured rotational position of either one of the first and second guide arms 1144 and 1150 is outside of an acceptable pre-determined range, then this means that the installation vehicle 1024 has deviated from a correct path or direction of travel and that a correction is needed. In this case, the path or direction of travel of the installation vehicle 1024 can be corrected (e.g., steered or turned) by the control system (either manually or automatically) to bring one or both of the first and second guide arms 1144 and 1150 back into an acceptable rotational position within the acceptable range. In one example, the sensors associated with the first and second guide arms 1144 and 1150 can comprise rotary position sensors associate with the axes of rotation. In another example, the sensors associated with the first and second guide arms 1144 and 1150 can comprise linear position sensors in contact with the first and second guide arms 1144 and 1150 and located offset from the pivot or axis of rotation of the first and second guide arms 1144 and 1150.

Although not shown, in another example, the first and second guide arms 1144 and 1150 can be configured to be operable with and to capture the torque tube clamps 34 of the panel mount assemblies 30 rather than the panel mounts 36. The configuration of the first and second guide arms 1144 and 1150 can be the same, and they can function in a similar manner as discussed above.

In another example, the vehicle alignment system 1140 can comprise a third overhead or superior leading guide arm (see guide arm 1154 shown in dotted lines in FIG. 15C) supported by the chassis 1042 and extending outward from the chassis in a direction parallel to a forward direction of travel of the installation vehicle 1024. The overhead guide arm 1154 can function similar to the lateral first and second guide arms 1144 and 1150 discussed above, except that the overhead leading guide arm 1154 can be configured and operable to contact a top surface of the panel mounts 36 so as to facilitate achieving a proper elevation (e.g., height) of the solar panel dispensing hopper 214 relative to the panel mounts 36 and the torque tube 8 at an installation site.

The vehicle alignment system 1140 can comprise and deploy other types of systems, such as a computer vision system as part of an automation system, with the computer vision system comprising one or more assets (e.g., imaging systems, emitters, detectors, etc.) mounted on the installation vehicle 1024, the solar panel dispensing hopper 214 or both of these.

The installation vehicle 1024 can further comprise a panel acquisition and placement system 1160 operable to acquire a lead solar panel 50 upon being at least partially (and in some cases fully) dispensed and presented by the solar panel dispensing hopper 214 into a suitable position for subsequent acquisition and installation of the lead solar panel 50 by the panel acquisition and placement system 1160. Once the lead solar panel 50 is acquired, the panel acquisition and placement system 1160 can place or install the solar panel into a panel retention system 38 (comprising one or more panel mount assemblies 30) supported by the torque tube 8, such that the lead solar panel 50 is in an installed position.

The panel acquisition and placement system 1160 can comprise a number of different configurations, some examples of which are described herein, but which examples are not intended to be limiting in any way. In the example shown, the panel acquisition and placement system 1160 can comprise a first moveable arm in the form of a first installation arm 1161 comprising a first stabilizing arm 1162, a first acquisition arm 1182, and a first panel capture asset 1192.

The first stabilizing arm 1162 can be rotatably coupled to and supported by the chassis 1042 at a first side of the chassis 1042, the first stabilizing arm 1162 being operable to rotate relative to the chassis 1042 about a point of rotation 1164 and a rotational axis X2. The first stabilizing arm 1162 can further be coupled (e.g., rotatably) to an actuator (e.g., see linear actuator 1166), which actuator 1166 can be coupled (e.g., rotatably) to the chassis 1042 at a point of rotation 1168 having a rotational axis X3. The first stabilizing arm 1162 can be caused to rotate in a selective, bi-directional manner about the point of rotation 1164 by actuating the actuator 1166, such that the first stabilizing arm 1162 rotates along the side of the chassis 1042. Actuating the actuator 1166 to rotate the stabilizing arm 1162 operates to change the incline or angle of the first stabilizing arm 1162 and the entire installation arm 1161 relative to the chassis 1042, as well as relative to the torque tube 8. The actuator 1166 can comprise or be operably connected to a power source 1169 and a control system 1170. The control system 1170 can comprise a stand-alone control system, or it can be part of another control system (e.g., see the control system in the vehicle operating systems 1026, which can be a stand-alone control system or part of a high-level control system (e.g., see control system 112 of FIG. 1)). The first stabilizing arm 1162 can comprise an elongate body and an extension arm interface that facilitates the moveable (e.g., slidable or sliding) coupling of the first stabilizing arm 1162 to the first acquisition arm 1182.

As indicated, the first installation arm 1161 of the panel acquisition and placement system 1160 can further comprise the first acquisition arm 1182 moveably coupled at a first end to the first stabilizing arm 1162, such that the first acquisition arm 1182 is configured and operable to move in at least one degree of freedom relative to the first stabilizing arm 1162. The movement of the first acquisition arm 1182 and the first stabilizing arm 1162 relative to one another can be achieved using an actuator 1184, which can comprise or be in connection with a power source. The actuator/power source 1184 can further be connected to the control system 1170 that facilitates control of the actuator 1184. In one example, the first acquisition arm 1182 can comprise an elongate body and a stabilizing arm interface that engages or otherwise interfaces with the acquisition arm interface on the first stabilizing arm 1162 so as to allow or facilitate the relative movement between the first stabilizing arm 1162 and the first acquisition arm 1182. In the example shown, which is not intended to be limiting in any way, the first acquisition arm 1182 can be slidably coupled (i.e., coupled in a sliding manner) to the first stabilizing arm 1162, such that the first acquisition arm 1182 can slide in a bi-directional manner in a translational degree of freedom along a translational axis relative to the first stabilizing arm 1162. The acquisition arm interface and the stabilizing arm interface can comprise any structural configuration or mechanism (e.g., a rail mechanism, a telescoping mechanism, or others) that allows the first acquisition arm 1182 to be moveably coupled to the first stabilizing arm 1162, in this example in a sliding manner.

The panel acquisition and placement system 1160 and the first installation arm 1161 can further comprise a first panel capture asset 1192 sized and configured to engage and capture a portion (e.g., a first side) of the lead solar panel 50. The first panel capture asset 1192 can be supported about a second end of the first acquisition arm 1182 of the first installation arm 1161. In one example, the panel capture asset 1192 can be rotatably coupled to the second end of the first acquisition arm 1182, such that the first panel capture asset 1192 can be selectively controlled and rotation induced in a rotational degree of freedom about a rotational point and a rotational axis X4 relative to the first acquisition arm 1182, which rotational degree of freedom can alter a pitch of the first panel capture asset (and a captured lead solar panel 50) relative to the torque tube 8 with the installation vehicle 1024 in an overhead position on the torque tube 8. The first panel capture asset 1192 can be operable with an actuator and/or a power source 1193 (e.g., an electric motor) to effect rotation of the first panel capture asset 1192. The first panel capture asset 1192 can comprise a number of different sizes and configurations. In one example, the first panel capture asset 1192 can comprise a support base 1194 that is rotatably coupled to the first acquisition arm 1182 and that supports a channel structure 1195 having an opening 1196 and a channel 1198 formed by a support beam 1200 and first and second flanges 1202 and 1204 extending away from the support beam 1200 (see FIG. 15K). The support base 1194 can comprise or otherwise be associated with an actuator, such as an electric motor. Alternatively, the support base 1194 can comprise a structural member that is operable with an actuator, such as the actuator 1193. The opening 1196 and channel 1198 can be sized and configured to receive and engage a first edge of the lead solar panel 50 at a first side of the lead solar panel 50. The first and second flanges 1202 and 1204 can each comprise an inner surface formed on an incline, such that the respective inner surfaces of the first and second flanges 1202 and 1204 are non-parallel and converge towards one another from the opening 1196 in a direction towards the support beam 1200. In other words, the channel 1198 is widest at the opening 1196, with the width of the channel being the narrowest at the support beam 1200. The angle of incline a of the inner surfaces can be between 0.5 and 20 degrees. Being configured with first and second flanges 1202 and 1204 having non-parallel, converging inner surfaces, the first panel capture asset 1192 can more securely capture the edge of the lead solar panel 50 (as compared to parallel inner surfaces) as the lead solar panel 50 is caused to wedge within the channel 1198 defined by the first and second flanges 1202 and 1204 upon being inserted into the channel 1198. The further the lead solar panel 50 is caused to be inserted into the channel 1198, the greater the opposing forces exerted on the lead solar panel 50 by the first and second flanges 1202 and 1204.

In another example, the first panel capture asset 1192' can comprise a support base 1194' that is rotatably coupled to the first acquisition arm 1182 and that supports a channel structure 1195' having an opening 1196' and a channel 1198' formed by a support beam 1200' and first and second rotating arms 1202' and 1204', each of which are rotatably coupled to the support beam 1200' and extend away from the support beam 1200' (see FIG. 15L). In this example, the first and second rotating arms 1202' and 1204' can be configured to rotate in a bi-directional manner relative to the support beam 1200', meaning that they can rotate in two rotational directions (i.e., in a clockwise and counterclockwise manner as viewed from the perspective in FIG. 15L). The first and second rotating arms 1202' and 1204' can comprise any size, length and/or configuration. The first panel capture asset 1192' can further comprise one or more biasing members associated with at least one of the first and second rotating arms 1202' and 1204'. In one aspect, a biasing member can be associated with each of the first and second rotating arms 1202' and 1204'. In another aspect, a biasing member can be associated with only one of the first or second rotating arms 1202' or 1204'. The biasing member can comprise a spring (e.g., a torsional spring, a coil spring, or other type of spring), a compliant member or mechanism, or any other device or system capable of providing a biasing force to the first and/or second rotating arms 1202', 1204'. The biasing member can operate to bias at least one of the first or second rotating arms 1202', 1204' towards one another (i.e., in a direction to close the opening 1196') so as to apply a force to the lead solar panel 50 once captured and received within the channel 1198', thereby securing the solar panel 50 within the first panel capture asset 1192'. The first panel capture asset 1192' can further comprise a first roller 1206' rotatably coupled to the first rotatable arm 1202', and a second roller 1208' rotatably coupled to the second rotatable arms 1204'. In one aspect, the first and second rollers 1206' and 1208' can be passive in that they can freely rotate relative to the first and second rotatable arms 1202' and 1204'. In another aspect, the first and second rollers 1206' and 1208' can be associated with an actuator and can be selectively actuatable about a rotational axis to provide a rotational degree of freedom. Each of the first and second rollers 1206' and 1208' can be operable with an actuator 1210' and 1212', respectively, that can comprise or be operable with a power source (e.g., an electric motor) operable to facilitate selective actuation and rotation of either one or both of the first and second rollers 1206' and 1208'. By being actuatable, the first and second rollers 1206' and 1208' can provide different functions. For example, one or both of the first and second rollers 1206' and 1208' can be actuated to draw the captured solar panel 50 further into the channel 1198' if necessary, to ensure capture of the lead solar panel 50. One or both of the first and second rollers 1206' and 1208' can be actuated to prevent passive rotation (i.e., to brake the rotation) of the first and second rollers 1206' and 1208' to keep the captured lead solar panel 50 from inadvertently releasing or escaping from the first panel capture asset 1192'. One or both of the first and second rollers 1206' and 1208' can further be actuated to provide fine movements and positioning of the lead solar panel 50 relative to the panel mount assemblies 30 of the panel retention system 38 into which the lead solar panel 50 is being installed. Indeed, at least one of the first and second rollers 1206' and 1208' can be actuated to move the lead solar panel 50 back and forth within the channel 1202'. The first and second rollers 1206' and 1208' any material, but in one example, these can be made of a compliant material so as to not damage the solar panel 50. The material can also be configured or selected to provide a coefficient of friction between the first and second rollers 1206' and 1208' and the lead solar panel 50 such that the first and second rollers 1206' and 1208' grip the surface(s) of the lead solar panel 50 to some degree or extent, thus minimizing slippage between these.

In still another example, the first panel capture asset 1192" can comprise a support base 1194" that is rotatably coupled to the first acquisition arm 1182, and that can support a six-bar over-center linkage assembly comprising an assembly of bars or linkages that are pivotally connected to one another (see FIGS. 15M-15N), with the over-center linkage assembly being coupled to various supports. In the example shown, the first panel capture asset 1192" can comprise supports in the form of a support column 1214" and a support base 1216" in support of the moving linkages of the over-center linkage assembly (the support base 1216" comprising a ground linkage). A first panel capture asset with an over-center linkage assembly different from that shown here (e.g., one having a different number of bars or linkages) is contemplated. Indeed, in other examples, the over-center linkage can comprise a four bar over center linkage assembly, which is defined as three (or more) rotatable bars and the fixed structure, e.g. the support column 1214" and the support base 1216". In other examples, the over-center linkage can be part of a differently configured six bar linkage assembly, which is defined as five (or more) rotatable bars and the fixed structure. Specifically, as shown herein, the first panel capture asset 1192" can comprise two pivots 1218A" and 1218B" (ground pivots), wherein the pivot 1218A" is associated with the support column 1214" and the pivot 1218B" is associated with the support base 1216" of the first panel capture asset 1192". Additionally, the first panel capture asset 1192" can comprise a first linkage in the form of an extended lever arm 1220" pivotally coupled to the support column 1214" at the pivot 1218A". The extended lever arm 1220" can be sized and configured to engage and to come into contact with a lower surface of the lead solar panel frame 50 as the first panel capture asset 1192" acquires and captures the lead solar panel 50 from the solar panel dispensing hopper 214. In this example, the first panel capture asset 1192" with its over-center linkage assembly is configured to engage and capture the solar panel 50 from the bottom of the solar panel 50. The first panel capture asset 1192" can further comprise a linkage 1222" pivotally coupled to the extended lever arm 1220" at pivot 1224", a first over-center linkage 1226" pivotally coupled to the linkage 1222" at pivot 1228", a second over-center linkage 1230" pivotally coupled to the first over-center linkage 1226" at over-center pivot 1232", and a linkage 1234" pivotally coupled to the linkage 1230" at pivot 1236". The linkage 1234" can also be pivotally coupled to the support column 1214" at the pivot 1218B". Moreover, a hard stop 1215" can be formed into or coupled to the support column 1214", which can function to prevent rotation of the linkage 1234" beyond a certain rotational degree. The term "ground" in this example refers to the pivots and linkages that ground the balance of the over center linkage assembly to the first panel capture asset 1192". As the panel acquisition and placement system 1160 is actuated and the first panel capture asset 1192" caused to engage the lead solar panel 50, the lead solar panel 50 is caused to engage the extended lever arm 1220" at an end (the end opposite the end that is pivotally coupled to the linkage 1222") of the extended lever arm 1220" and at position offset from the pivot 1218A". Indeed, the extended lever arm 1220" comprises a structural portion that extends beyond the pivot 1218A" so as to provide a "lever." As the first panel capture asset 1192" is moved towards the lead solar panel 50, a force F is applied to the extended lever arm 1220" by the lead solar panel 50, which causes the extended lever arm to rotate about pivot 1218A". This rotation of the extended lever arm 1220" operates to cause a rotational movement of the movable linkages of the over-center linkage assembly to put the over-center linkage assembly in a position for engaging an upper surface of the solar panel 50, and for subsequently locking the solar panel 50 in place. The solar panel 50 is moved towards the support base 1216" until coming to rest on the support base 1216". This stops the rotation of the extended lever arm 1220" and places the over-center linkage assembly in the position for locking the solar panel 50 in place. With the solar panel 50 seated against the support base 1216", a latching force can be applied by an actuator 1238" to the over-center linkage assembly at or about the over-center pivot 1232" so that the first and second over-center linkages 1226" and 1230" can be rotated beyond alignment (i.e., over-center) until one of the first and second over-center linkages 1226" and 1230", or both of these, come in contact with another linkage or come to rest against the support column 1214" (see FIG. 15N), these operating as a stopper. In this position, the over-center linkage is in a locked, over-center position or state against the support column 1214", thus locking the solar panel 50 between at least one linkage of the over-center linkage assembly and the support base 1216" of the first panel capture asset 1192". To unlock the over-center linkage assembly, such as once the solar panel 50 is placed into an installed position within the panel retention system 38, the same or a different actuator can be used to apply a releasing force to the over-center linkage assembly at or about the over-center pivot 1232", thereby releasing the first and second over-center linkages 1226" and 1230" and allowing the first panel capture asset 1192" to release and disengage from the solar panel 50. It is noted that the second over-center linkage 1230" can be configured to be supported on an incline with the over-center linkage assembly in an unlocked state. Specifically, the over-center linkage assembly can be configured such that the second over-center linkage 1230" is supported on an incline prior to the first panel capture asset 1192" capturing a lead solar panel 50. With the second over-center linkage 1230" in this position, it can function as a lead-in for the solar panel 50, wherein the second over-center linkage 1230" operates to receive, interface with and at least partially guide the lead solar panel 50 into position within the first panel capture asset 1192".

In still another example, the first panel capture asset 1192" can comprise a support base 1194" that is rotatably coupled to the first acquisition arm 1182 and that can comprise a channel structure 1195" having an opening 1196" and a channel 1198" formed by a support beam 1200" and first and second flanges 1202''' and 1204''' extending away from the support beam 1200" (see FIG. 15O). At least one of the first and second flanges 1202''' and 1204''' can be moveably coupled to the support beam 1200" to vary the opening 1196" (i.e., expand and reduce the size of the opening). In this example, the second flange 1204''' can be moveably coupled to the support beam 1200". In one aspect, the second flange 1204''' can be rotatably coupled to the support beam 1200", such that the second flange 1204''' can rotate in a first direction (e.g., clockwise as viewed from FIG. 15O) to a position rearward of the support beam 1200''', thus moving clear of the support beam 1200" and expanding the opening 1196" to facilitate receipt of the lead solar panel 50 into the channel 1198". Once the solar panel 50 is received into the channel 1198", the second flange 1204''' can be rotated in a different direction (e.g., counterclockwise) to a forward position relative to the support beam 1200''', wherein the second flange 1204''' is positioned in a similar manner as the first flange 1202''' relative to the support beam 1200''', namely to extend away from the support beam 1200''' in the same direction as the first flange 1202''', but at a position offset from the first flange 1202'''. In this position, the first and second flanges 1202''' and 1204''' both define in part the channel 1198''', and operate to secure the solar panel 50 within the first panel capture asset 1192''' where it can then be further manipulated and placed into an installed position within the panel retention system 38. In some examples, the second flange 1204''' can be actuated so as to apply a force to the upper surface of the solar panel 50 once it is properly seated on the first flange 1202''' within the channel 1198'''. The opening 1196''' and channel 1198''' can be sized and configured to receive and engage a first edge of the lead solar panel 50 at a first side of the lead solar panel 50. The second flange 1204''' can be operably coupled to an actuator configured to rotate the second flange 1204''' in a bi-directional manner. To release the solar panel 50, such as once the solar panel 50 is placed into the installed position within the panel retention system 38, the second flange 1204''' can again be actuated to move to a rearward position relative to the support beam 1200''', wherein the first panel capture asset 1192''' can release and disengage from the solar panel 50. In another aspect, the second flange 1204''' can be slidably coupled to the support beam 1200''' (see dotted lines representing a sliding motion), such that the second flange 1204''' can slide in a first direction to a position rearward or substantially rearward of the support beam 1200''', thus moving clear of the support beam 1200''' and expanding the opening 1196''' to facilitate receipt of the lead solar panel 50 into the channel 1198'''. The second flange 1204''' can be actuated to slide in a different direction to a forward position relative to the support beam 1200''', such as to secure the lead solar panel 50 within the first panel capture asset 1192''' in a similar manner as discussed above. With the second flange 1204''' in this position, as shown, it is positioned in a similar manner as the first flange 1202''' relative to the support beam 1200''', namely to extend away from the support beam 1200''' in the same direction as the first flange 1202''', but at a position offset from the first flange 1202'''. The first and second flanges 1202''' and 1204''' both define in part the channel 1198'''. The second flange 1204''' can be actuated and moved via an actuator, such as a linear actuator (e.g., solenoid), or a rotary actuator (e.g., electric motor) operable with a linkage that converts rotational motion into linear motion.

It is noted that the several panel capture assets discussed above are merely examples, and not intended to be limiting in any way. It is contemplated that other panel capture assets can be designed and configured different from those shown herein for the purpose of engaging, acquiring and installing a lead solar panel from the solar panel dispensing hopper 214, and that can be used with the panel acquisition and placement system 1160.

The panel acquisition and placement system 1160 can further comprise a second moveable arm in the form of a second installation arm 1361 (see FIGS. 15B, 15C, 15F, and 15J), which can be sized and configured the same as, or similar to, the first installation arm 1161, and which can function in the same or a similar manner as the first installation arm 1161, except that the second installation arm 1361 can be coupled to and operable about the opposite side of the chassis 1042 of the installation vehicle 1024 to engage and interface with a side of the lead solar panel 50 opposite the side with which the first installation arm 1161 engages. As such, a detailed discussion of the second installation arm 1361 is not provided herein. Suffice it to say, the second installation arm 1361 can comprise a second stabilizing arm 1362, a second acquisition arm 1382, and a second panel capture asset 1392.

The second stabilizing arm 1362 can be operable about a second side of the chassis 1042 opposite the first side of the chassis 1042. The second stabilizing arm 1362 can comprise a similar configuration and chassis coupling arrangement as the first stabilizing arm 1162. Indeed, the second stabilizing arm 1362 can be rotatably coupled to and supported by the chassis 1042 at a second side of the chassis 1042, the second stabilizing arm 1362 being operable to rotate relative to the chassis 1042 about a point of rotation 1384 and the rotational axis X2. The second stabilizing arm 1362 can further be coupled (e.g., rotatably) to an actuator 1386 (e.g., see linear actuator), which actuator 1386 can be coupled (e.g., rotatably) to the chassis 1042 at a point of rotation 1388 and which can rotate about the rotational axis X3. The second stabilizing arm 1362 can be caused to rotate in a selective, bi-directional manner about the point of rotation 1384 by actuating the actuator 1386, such that the second stabilizing arm 1362 rotates along the second side of the chassis 1042. Actuating the actuator 1386 to rotate the second stabilizing arm 1362 operates to change the incline or angle of the second stabilizing arm 1362 and the entire installation arm 1361 relative to the chassis 1042, as well as relative to the torque tube 8. The actuator 1386 can be operably connected to a power source and a control system, which can be the same power source and control system to which the first installation arm 1361 is connected. The second stabilizing arm 1362 can comprise an elongate body and an extension arm interface that facilitates the moveable (e.g., slidable or sliding) coupling of the second stabilizing arm 1362 to the second acquisition arm 1382.

The second installation arm 1361 of the panel acquisition and placement system 1160 can further comprise a second acquisition arm 1382 moveably coupled at a first end to the second stabilizing arm 1362, such that the second acquisition arm 1382 is configured and operable to move in at least one degree of freedom relative to the second stabilizing arm 1362. The second acquisition arm 1382 can be sized and configured the same as, or similar to, the first acquisition arm 1182, and can function in the same or a similar manner as the first installation arm 1182, except that the second acquisition arm 1382 can be coupled to and operable with the second stabilizing arm 1362. The movement of the second acquisition arm 1382 and the second stabilizing arm 1362 relative to one another can be achieved using an actuator 1384 (see FIG. 15F), which can comprise or be in connection with a power source. The actuator/power source 1384 can further be connected to the control system 1170 that facilitates control of the actuator 1384. In one example, the second acquisition arm 1382 can comprise an elongate body and a stabilizing arm interface that engages or otherwise interfaces with the acquisition arm interface on the second stabilizing arm 1362 so as to allow or facilitate the relative movement between the second stabilizing arm 1362 and the second acquisition arm 1382. In the example shown, which is not intended to be limiting in any way, the second acquisition arm 1382 can be slidably coupled (i.e., coupled in a sliding manner) to the second stabilizing arm 1362, such that the second acquisition arm 1382 can slide in a bi-directional manner in a translational degree of freedom along a translational axis relative to the second stabilizing arm 1362. The acquisition arm interface and the stabilizing arm interface can comprise any structural configuration or mechanism (e.g., a rail mechanism, a telescoping mechanism, or others) that allows the second acquisition arm 1382 to be moveably coupled to the second stabilizing arm 1362, in this example in a sliding manner.

The panel acquisition and placement system 1160 and the second installation arm 1361 can further comprise a second panel capture asset 1392 sized and configured to engage and capture a portion (e.g., a second side opposite the first side)

of the lead solar panel 50. The second panel capture asset 1392 can be supported about a second end of the second acquisition arm 1382 of the second installation arm 1361. In one example, the second panel capture asset 1392 can be rotatably coupled to the second end of the second acquisition arm 1382, such that the second panel capture asset 1392 can be selectively controlled and rotation induced in a rotational degree of freedom about a rotational point and a rotational axis X4 relative to the second acquisition arm 1382, which rotational degree of freedom can alter a pitch of the second panel capture asset 1392 (and a captured lead solar panel 50) relative to the torque tube 8 with the installation vehicle 1024 in an overhead position on the torque tube 8. The second panel capture asset 1392 can be operable with an actuator and/or a power source 1393 (e.g., an electric motor) to effect rotation of the second panel capture asset 1392. The second panel capture asset 1392 can comprise a number of different sizes and configurations, such as those shown in FIGS. 15K-15O), which are merely examples, and not intended to be limiting in any way. In one example, the second panel capture asset 1392 can comprise a support base 1394 that is rotatably coupled to the second acquisition arm 1382.

The first and second acquisition arms 1182 and 1382 can be configured so that they do not interfere with the manipulation of the lead solar panel 50 by the panel acquisition and placement system 1160. In one example, and depending upon their configuration, respective first segments S1 of each of the first and second acquisition arms 1182 and 1382 can be moveably coupled to the first and second stabilizing arms 1162 and 1362, respectively. Respective second segments S2 of each of the first and second acquisition arms 1182 and 1382 can extend laterally from the first segments S1 along an axis transverse to a longitudinal axis of the first and second stabilizing arms 1162 and 1362. Respective third segments S3 of each of the first and second acquisition arms 1182 and 1382 can extend from the second segments S2 along an axis transverse to a longitudinal axis of the second segments S2. In one example, the first and third segments S1 and S3 can be parallel to one another, and the second segments S2 can be orthogonal to the first and third segments S1 and S3, but this is not necessary, nor is it to be limiting in any way. The third segments S3 of the respective first and second acquisition arms 1182 and 1382 can be spaced apart from one another (particularly the distance between these at their respective second ends) a greater distance (see distance D_{arms} in FIG. 15J) than a length (see L_{panel} in FIG. 15J) of the lead solar panel 50 (see FIGS. 15C and 15J). In addition, the third segments S3 can comprise any suitable length (e.g., a length that is greater than one half of the width of the solar panel 40 in the example shown), and the second segments S2 can extend from the third segments S3 at any location along the length of the third segments S3, such that the second segments S2 do not interfere with or contact the solar panel 50 upon the solar panel 50 being acquired and/or upon a pitch of the solar panel 50 being changed by the solar panel acquisition and placement system 1160. This allows the lead solar panel 50 to be rotated and a pitch of the lead solar panel 50 changed without the lead solar panel 50 impacting or otherwise coming into contact with any part of the first and second installation arms 1161 and 1361.

In some examples, depending upon the type of panel capture assets used, the panel acquisition and placement system 1160, namely the first and second installation arms 1161 and 1361, can further be additionally rotatably coupled to the chassis 1042 of the installation vehicle 1024, such that the first and second installation arms 1161 and 1361 are able to move in a second rotational degree of freedom along respective axes (see for example, axes Z1 and Z2) relative to the chassis 1042, which essentially allows the first and second installation arms 1161 and 1361, namely the first and second stabilizing arms 1162 and 1362, the first and second acquisition arms 1182 and 1392, and the first and second panel capture assets 1192 and 1392, to move (e.g., rotate) laterally in and out (toward and away from) relative to the chassis 1042 of the installation vehicle 1024 (see FIGS. 15D and 15J), as well as relative to the lead solar panel 50 as presented by the solar panel dispensing hopper 214. This degree of freedom of movement allows the first and second panel capture assets 1192 and 1392 to be moved to a position prior to capture of the lead solar panel 50 where the first and second panel capture assets 1192 and 1392 are positioned to be clear of the solar panel 50 as presented by the solar panel dispensing hopper 214. Indeed, the first and second acquisition arms 1182 and 1382 can be extended a given distance so as to place the first and second panel capture assets 1192 and 1392 in a proper position relative to the lead solar panel 50. Once a proper extension distance has been achieved, the first and second installation arms 1161 and 1361 can be actuated and rotated inward toward the chassis 1042 of the installation vehicle 1024, wherein the first and second panel capture assets 1192 and 1392 can be caused to engage and capture respective opposing edges of the lead solar panel 50. The first and second installation arms 1161 and 1361 can each be associated with an actuator and a power source (e.g., see actuator/power sources 1171 and 1371, respectively) that can be selectively actuated to achieve the active, bi-directional rotation of the first and second installation arms 1161 and 1361. Alternatively, rather than rotatably coupling the first and second installation arms 1161 and 1361 to the installation vehicle 1024 to rotate about the axis Z1, the first and second panel capture assets 1192 and 1392 can be linearly coupled to the first and second acquisition arms 1182 and 1382, respectively (in addition to being rotatably coupled as discussed above), such that the first and second panel capture assets 1192 and 1392 can move (e.g., translate) laterally in a linear degree of freedom along the axis (see axis X4 and FIGS. 15B and 15J), or in other words, in and out (toward and away from) relative to the first and second acquisition arms 1182 and 1382, respectively, relative to the chassis 1042, as well as relative to the lead solar panel 50 as presented by the solar panel dispensing hopper 214 (the linear movement being represented by the dotted arrowed lines in FIG. 15J). In this example, a similar effect is achieved by this degree of freedom, namely to allow the first and second acquisition arms 1182 and 1382 and the first and second panel capture assets 1192 and 1392 to be moved to a position prior to capture of the lead solar panel 50 where the first and second panel capture assets 1192 and 1392 are positioned to be clear of the solar panel 50 as presented by the solar panel dispensing hopper 214. Indeed, the first and second acquisition arms 1182 and 1382 can be extended a given distance so as to place the first and second panel capture assets 1192 and 1392 in a proper position relative to the lead solar panel 50. Once a proper extension distance has been achieved, the first and second panel capture assets 1192 and 1392 can be actuated and translated inward toward the chassis 1042 of the installation vehicle 1024, wherein the first and second panel capture assets 1192 and 1392 can be caused to engage and capture the respective edges of the lead solar panel 50. In one aspect, the first and second panel capture assets 1192 and 1392 can comprise the respective support bases 1194 and 1394 that are linearly (and rotatably)

coupled to the first and second acquisition arms 1182 and 1382, respectively. The support bases 1194 and 1394 can comprise any structure, mechanism, or any combination of these that can be linearly coupled, or that can facilitate linear coupling, to the respective first and second acquisition arms 1182 and 1392, and that each comprise or that are operable with an actuator, such as the respective actuators 1195 and 1395. The actuators 1195 and 1395 can be operably connected to a control system for selectively controlling the actuators 1195 and 1395.

The first and second installation arms 1161 and 1361 can comprise other designs and configurations. For example, although not shown, the first and second installation arms 1161 and 1361 can comprise a robotic arm in support of a panel capture asset, which in some cases can comprise a gripper or other mechanism or system for grasping and acquiring the lead solar panel 50. The robotic arm can comprise multiple degrees of freedom of movement, with one or more degrees of freedom being associated with an actuator and being selectively actuatable. A robotic arm, for instance, can include between 1-2 degrees of freedom, between 1-3 degrees of freedom, between 1-4 degrees of freedom, between 1-5 degrees of freedom, between 1-6 degrees of freedom, or between 1-7 degrees of freedom. The robotic arm can comprise a plurality of structural segments that are interconnected via a plurality of respective joints. The joints and the structural members at each degree of freedom can be configured to at least one of rotate or translate. Moreover, each actuator can comprise or be associated with a power source, and can be in connection with a computerized controller having one or more processors and associated memory for carrying out the operation of the actuators. In addition, the robotic arm can comprise various sensors for detecting movements of the robotic arm, properties of the robotic arm, operational parameters of the robotic arms, and others.

The first and second installation arms 1161 and 1361 can be operated independently of one another, or they can be operated at the same time, or in synch with one another. In any event, operation of the first and second installation arms 1161 and 1361 can be coordinated so as to acquire the lead solar panel 50 from the solar panel dispensing hopper 214, and to install the lead solar panel into a panel retention system 38 at a select installation site along the torque tube 8. A discussion on the operation of the solar panel installation system 1010, including the installation vehicle 1024, the solar panel dispensing hopper 214, and the panel acquisition and placement system 1160 follows.

The solar panel installation system 1010 can further comprise or be associated with a number of operating systems that facilitate and enable both the maneuvering and operation of the installation vehicle 1024 itself, as well as the various systems supported on the installation vehicle 1024 and within the solar panel installation system 1010 (e.g., the drive system, the presentation system, the multi-degree of freedom platform, the panel acquisition and placement system, and any others). These operating systems can include, but are not limited to, at least one of one or more power sources and controllers for such power sources, a drive system or subsystem and its associated controllers, an automation system or subsystem with its one or more automation assets (e.g., imaging devices, detectors, emitters) mounted on or otherwise supported by the installation vehicle 1024 and with its associated controllers, a control system or subsystem, which can comprise the controllers for the various systems or which can integrate control of the various systems, a communications system or subsystem, a fluid (e.g., hydraulic) system or subsystem with its controllers, one or more sensors in communication with the control system, a navigation system for facilitating automated or semi-automated navigation with its associated controllers, or any other components, elements or systems to enable the installation vehicle 1024 to facilitate installation of the solar panels into the panel retention systems of the panel support assembly. One or more of the various operating systems can be onboard the installation vehicle 1024, external to the installation vehicle, but in connection therewith (e.g., electrical connection, physical connection, wireless connection, etc.), or a combination of these.

The solar panel installation system 1010 can further comprise or can be associated with one or more power sources operable to power the panel installation vehicle 1024 and its various components and systems. In one example, the power source can comprise one or more batteries, hydrogen fuel cells, or a combination of these operable to power various electrical systems. In another example, the installation vehicle 1024 can comprise and be operably coupled to or otherwise associated with a power source in the form of a combustion engine (e.g., a gas internal combustion (IC) engine, a liquid petroleum gas (LPG) engine, a natural gas engine, or any combination of these). In another example, the installation vehicle 1024 can be powered using a hybrid approach, such as by both electric and combustible fuel power. The power sources, whatever they may be, can be connected with and can control the various actuators and/or other components within the installation vehicle 1024 and the presentation system 213. In addition, the power source(s) can further be connected to and operable with the control system operable to control operation of the actuators and/or power source. The power sources can be onboard the installation vehicle 1024, external to the installation vehicle 1024 and connected via an umbilical, or a combination of these. Indeed, in one example, the one or more power sources can be on-board the panel installation vehicle 1024, such as a plurality of batteries supported by the chassis 1042. In another example, the one or more power sources can be independent of and located away from the panel installation vehicle 1024, but operably connected to the panel installation vehicle 1024 using an umbilical that carries, via a power distribution line, power from the one or more power sources to the panel installation vehicle 1024, or any other component or system within the solar panel installation system 1010, as controlled by the control system. For instance, the panel installation vehicle 1024 and/or the panel presentation system 213 can be operably connected to an external power source (e.g. a ground-based power source connected to a local power grid), and thus obtain power from the external power source.

The umbilical can further be operable to carry at least one of power, data, or pressurized fluid to the panel installation vehicle 1024 and the presentation system 213 that is external to these. Specifically, the umbilical can comprise a power distribution line configured and used to carry power to any of the actuators, the control system, etc. of the solar panel installation system 1010. The umbilical can also comprise a data distribution line configured and used to carry data to and from the control system 260 or any other systems or components within the solar panel installation system 1010, namely the panel installation vehicle 1024 and the panel presentation system 213. The umbilical can also comprise a fluid distribution line configured and used to carry pressurized fluid from a fluid actuator system to and from at least one of the panel installation vehicle 1024, the presentation system 213, or any other systems or components within the solar panel installation system 1010 utilizing fluid control, such as a hydraulic or pneumatic fluid actuator.

The solar panel installation system 1010 can further comprise or can be associated with one or more sensors. The sensors can be associated with one or more systems of the panel installation vehicle 1024 and/or the panel presentation system 213, such as the drive system, the solar panel dispensing hopper 214, the multi-degree of freedom platform, the panel acquisition and placement system, as well as with the torque tube 8 or any other element of the panel support assembly 2, and any other components, elements, systems within or associated with the solar panel installation system 1010 to facilitate operation and/or monitoring of the panel installation vehicle 1024, the panel presentation system 213, the installation of solar panels onto the panel support assembly 2, the operating environment, etc. Essentially, it is contemplated that the one or more sensors can be deployed to be associated with any of the components, devices, systems of the solar panel installation system 1010, the panel installation vehicle 1024, the panel presentation system 213, as well as the installation of the solar panels themselves. In addition, the sensors can be of the type that facilitate partial or full automation of the operation of the solar panel installation system 1010. Sensors can include, but are not limited to, position sensors, motor rotor position sensors, force sensors, torque sensors, thermal or temperature sensors, current sensors, motion sensors such as Inertial Measurement Units (IMUs), imaging sensors, audio sensors (e.g., microphones, sonar, audio positioning sensors or others), chemical sensors, electromagnetic radiation sensors (e.g. antennas with signal conditioning electronics), magnetometers (single axis and multi-axis magnetometer), radars. In short, any sensor, imager, recorder, or other device, and any combination of these, can be used in the configuration of the sensors described herein.

The solar panel installation system 1010 can further comprise a computer automation system. The computer automation system can be operable to facilitate partial or fully automated installation of the solar panels into the panel retention systems supported on the torque tube 8. The control system can be operably connected with the computer automation system that is part of or otherwise operable with the panel installation vehicle 1024 and the panel presentation system 213. The computer automation system can comprise a number of automation assets in the form of sensors and/or devices (e.g., emitters), that facilitate partial or fully automated installation of the solar panels into the panel retention systems on the torque tube 8. In addition, the automation assets can comprise a number of different types, such as different types of sensors and/or devices. For example, the types of sensors that can be utilized in the computer automation system include, but are not limited to imaging sensors (e.g., cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, and/or a structured light sensor, or any combination of these).

While some of the sensors of the automation system discussed herein are identified as imaging sensors (e.g., cameras), it is to be understood that any of these can be sensors of any type and may be used to accomplish vision or other types of sensing by the clamp installation vehicle. For example, the cameras/sensors can provide fluorescence imaging, hyperspectral imaging, or multispectral imaging. Furthermore, some of the sensors can be audio sensors (e.g., microphones, sonar, audio positioning sensors or others), chemical sensors, electromagnetic radiation sensors (e.g. antennas with signal conditioning electronics), magnetometers (single axis and multi-axis magnetometer) and radars. In short, any sensor, imager, recorder, or other device, and any combination of these, can be used in the configuration of the sensors described herein. The computer automation system can further comprise one or more emitters, such as ultrasonic emitters, to assist in locating certain objects.

As indicated, one or more computer automation assets or fiducials, as part of the computer automation system, can be attached to the panel installation vehicle 1024 and/or the panel presentation system 213, namely the solar panel dispensing hopper 214, at any location. The automation assets can comprise the computer automation system sensors and/or devices discussed above (e.g., an imaging system comprising one or more imaging sensors, such as one or more cameras), or any other types of sensors and/or other types of devices. The computer automation assets can gather and provide information, such as visual, audio or other information, to the control system. The control system can utilize the information to assist the panel installation vehicle 1024 and the solar panel presentation system 213 in any number of automated tasks. For example, the automation system can be used to identify and locate in three-dimensional space the torque tube 8 of the panel support assembly 2 and its various components, and particularly the panel retention systems supported on the torque tube 8. The automation system can further be configured to facilitate the proper positioning, orienting, and dispensing of the solar panels from the panel presentation system 213 by locating and comparing the position and orientation of the solar panels to be dispensed and installed relative to the position and orientation of the torque tube 8 and the panel retention systems of the panel support assembly 2 into which a solar panel is to be installed. Of course, this is not intended to be limiting in any way as those skilled in the art will recognize that the automation system can be configured to perform a number of different functions related to facilitating the dispensing and installing of the solar panels into the panel retention systems of the panel support assembly 2.

In one example, the computer automation system can comprise one or more processors and memory for executing software code capable of facilitating the function of the automation system. Alternatively, the automation system can be operably connected with the control system having one or more processors and memory or a top-level control system (e.g., see top-level control system 113 of FIG. 1) having one or more processors and memory, or both.

The solar panel installation system 1010 can further comprise or can be associated with a communications module operable to transmit and receive data, such as command signals, to and from the control system. The communications module can comprise a wireless system, or a combination of wired and wireless systems. The control system can be operably connected to the communications module that is part of or otherwise operable with the panel installation vehicle 1024 and/or the panel presentation system 213 and any other appropriate components, systems, mechanisms within the solar panel installation system 1010. The control system can utilize the communications module to transmit and receive data from the various components, devices, systems operating within the solar panel installation system 1010 using known protocols.

The solar panel installation system 110 can further comprise or can be associated with a navigation system. In one example, the panel installation vehicle 1024 can be operated manually using various manually operated controllers. In another example, the panel installation vehicle 1024 can comprise a variety of different navigation and/or automation systems, such as navigation systems of various types, vision systems, and control systems, to facilitate semi-automated or fully automated operation of the panel installation vehicle 1024 and/or installation of the solar panels into the panel retention systems supported on the torque tube 8. In one example, the panel installation vehicle 1024 can comprise an automated guided vehicle (AGV), which can utilize radio waves, vision devices, magnets, or lasers for automated navigation. Indeed, the panel installation vehicle 1024 can utilize a number of different types of navigation systems depending upon the environment in which the solar panels are being installed. Example navigation systems include, but are not limited to wired, guide tape, laser target, inertial guidance systems, (gyroscopic), natural feature (natural target), vision guidance systems, Geoguidance systems, precision satellite-based radio navigation systems, such as a global navigation satellite systems (GNSS), and more specifically Global Positioning Systems (GPS), robotic mapping systems, or any combination of these. The panel installation vehicle 1024 can utilize any one of these or other systems, along with various associated automation assets associated with the panel installation vehicle 1024 and/or the panel presentation system 213, the panel support assembly 2, or any combination of these. The automation assets can include, but are not limited to, various sensors and sensor types, detection assets, emission assets (e.g., ultrasonic emitter(s), laser(s)), imaging systems and assets, and others. Indeed, it is contemplated that any assets needed to facilitate operation of the panel installation vehicle 1024 and its various systems in a semi-automated or fully automated manner can be part of the solar panel installation system.

The solar panel installation system 1010 can further comprise or can be associated with a control system. The control system can comprise one or more processors and memory (e.g., one or more memory devices) associated with the one or more processors, wherein these are operable to facilitate processing and storage of data and to execute instructions that facilitate the overall functionality of the control system, and wherein these are operable to control the various elements and systems within and/or associated with the solar panel installation system 1010 including the panel installation vehicle 1024 and/or the panel presentation system 213, such as the drive system 1840, the solar panel dispensing hopper 214, the multi-degree of freedom platform, the panel acquisition and placement system, the navigation system, the automation system, the communications module, the power source(s) and any others. Indeed, the control system can comprise, or otherwise be operable with, one or more processors and one or more memory devices operatively coupled to or otherwise associated with at least one of the one or more processors and having instructions stored thereon that, when executed by at least one of the one or more processors, cause the components or elements or systems of the solar panel installation system 1010 to perform one or more tasks related to the installation of solar panels into the panel retention systems on the torque tube 8. The control system can be operably connected with the one or more sensors that are part of or otherwise operable with the panel installation vehicle 1024 and/or the panel presentation system 213. In other words, the control system can be operable to control the various components and systems within the solar panel installation system 1010 in a manual, semi-automated or fully automated manner, and to gather and process information from the one or more sensors to facilitate operation of the panel installation vehicle 1024 and/or the panel presentation system 213 within an operation environment using the data provided by the sensors. For example, the data from the sensors can be used to monitor and measure actuator usage, forces acting on various components of or within the solar panel installation system 1010 including the panel installation vehicle 1024 and the panel presentation system 213, be operable with the an automation system to produce combined images, stereo images, depth maps, or other images that can be processed and used by algorithms or software stored in the memory to allow, for instance, the panel installation vehicle 1024 to correctly position itself on the torque tube 8, to avoid collisions with objects or personnel in an operating environment, to interact with objects, such as the torque tube 8 or a panel retention system, or to properly move along the torque tube 8 and install a solar panel at a proper location.

Furthermore, the control system can comprise one or more actuator controllers operable to control the various actuators within the solar panel installation system 1010. The control system can further comprise a drive system controller operable to control the drive system of the panel installation vehicle 1024. The drive system controller can be in communication with the actuator(s) of the torque tube interfacing assembly and any sensors operable or otherwise associated with the drive system. The control system can further comprise a multi-degree of freedom controller operable to control any multi-degree of freedom platform that may be in support of the solar panel dispensing hopper 214. The multi-DOF controller can be in communication with the actuators of a multi-DOF platform and any sensors operable or otherwise associated therewith. The control system can further comprise a panel acquisition and placement system controller operable to control this system, namely the first and second installation arms. The panel acquisition and placement system controller can be in communication with the actuators of the first and second installation arms and any sensors operable or otherwise associated therewith. Each of these controllers can be in communication with the one or more processors and memory of the control system so as to be able to execute the instructions corresponding to the command signals received for operation of the respective controlled systems.

It is noted that the control system, with each of the controllers, respectively, and the processor(s)/memory, can be a local or standalone control system within the solar panel installation system 1010. In this example, the control system can also be operably connected to a top-level control system (e.g., see top-level control system 112 of the solar panel installation system 110 of FIG. 1). Alternatively, the control system can be an integral part of a top-level control system of the solar panel installation system (see top-level control system 112 of the solar panel installation system 110 of FIG. 1).

In operation, the installation vehicle 1024 can initially be placed on the torque tube 8 such that the endless track system 1058, and specifically the endless tracks 1078A and 1078B, is/are resting on and supported by at least two panel mount assemblies 30, namely the panel mounts 36 of the panel mount assemblies 30 (e.g., see the two panel mount assemblies with their respective panel mounts and torque tube clamps within the panel retention system 38C of FIG. 15G), which panel mount assemblies 30 are secured to the torque tube 8. It is noted herein that a single panel mount assembly 30 can be part of two panel retention systems 38 as a single panel mount assembly 30 can be configured to receive and retain two adjacent solar panels (e.g., see the single panel mount assembly 30 in FIG. 15C retaining two adjacent solar panels, including solar panel 50 just installed by the installation vehicle 1024; see also the panel mount assemblies that are common to the panel retention systems 38A, 38B, and 38C, respectively, of FIG. 15G). The installation vehicle 1024, and specifically the endless tracks 1078A and 1078B of the endless track system 1058, can comprise a length greater than a distance between a first panel mount assembly and a second panel mount assembly (e.g., see distance between panel mount assemblies 30A and 30B of FIGS. 15G-15I), wherein the installation vehicle 1024 is stabilized on the torque tube 8, and the chance of the installation vehicle 1024 tipping minimized. Of course, the installation vehicle 1024 can be sized and configured to interface with and to be supported by more than two panel mount assemblies 30. The installation vehicle 1024 can be initially placed upon the torque tube 8, specifically upon the panel mount assemblies of a first panel retention system at the position shown in FIG. 15G (e.g., see the panel mount assemblies of the panel retention systems 38C of FIG. 15G supporting the installation vehicle 1024), or alternatively the installation vehicle 1024 can be placed upon the torque tube 8 so as to rest on any panel mount assemblies and then driven to the position shown in FIG. 15G. Essentially, the systematic installation of the solar panels 1 within the hopper enclosure 216 of the solar panel dispensing hopper 214 involves locating the installation vehicle 1024 along the torque tube 8 at a first location so as to be in a position for installing the lead solar panel 50 within a first installation site (in this case the first installation site being defined by the panel retention system 38A). Initially placing the installation vehicle 1024 upon the first and second panel mount assemblies of the panel retention system 38C so as to be in the position shown in FIG. 15G, or driving the installation vehicle 1024 to the position shown in FIG. 15G, can cause the installation vehicle 1024 to be located in a position to install a lead solar panel 50 at the first installation site, in this case the installation site defined by the panel retention system 38A. Specifically, as shown in this example, the installation vehicle 1024 is located in a position, such that the first installation site defined by the panel retention system 38A is caused to be located just behind the installation vehicle 1024 with each of the panel mount assemblies 36A and 36B accessible and ready to receive the lead solar panel 50 from the panel acquisition and placement system 1160 of the installation vehicle 1024.

Once the installation vehicle 1024 is located in a proper position about the first installation site, the endless track system 1058 can be operated to hold the installation vehicle 1024 in this proper position (or to make minor adjustments and then hold the position). This can involve at least one of operating the endless track system 1058 so as to prohibit actuation of the endless tracks 1078A and 1078B, or applying a braking function via a braking system (not shown, but contemplated). With the installation vehicle 1024 stabilized, the solar panel dispensing hopper 214 can be operated to dispense and present the lead solar panel 50 from the plurality of solar panels 1 stored within the hopper enclosure 216. As the solar panel dispensing hopper 214 is the same as the one discussed above with respect to FIGS. 3-5D, and as the example processes for dispensing and presenting a lead solar panel from the solar panel dispensing hopper 214 are set forth above with respect to FIGS. 7A-11J, the details of the configuration of the solar panel dispensing hopper 214 and the operation of the solar panel dispensing hopper 214 to dispense and present the lead solar panel 50 are not repeated here. Rather, the reader is referred to the description above and the associated figures for an understanding of these with it being noted that, in this example, the solar panel dispensing hopper 214 is controlled and operated merely to dispense and present the lead solar panel 50. It does not itself perform the function of installing the lead solar panel 50 into the panel retention system 38 as this is done by the panel acquisition and placement system 1160 of the installation vehicle 1024. With the lead solar panel 50 dispensed and presented (see, for example, FIG. 15D where the lead solar panel 50 is dispensed and resting on the panel support surface 1045; see an example alternative scenario in FIG. 15E where the lead solar panel 50 is dispensed but still being held by the dispensing system 236 of the solar panel dispensing hopper 214, with the lead solar panel 50 either resting on the panel support surface 1045 or in a suspended position above the panel support surface 1045 using the dispensing system 236 of the solar panel dispensing hopper 214 (e.g., the flippers 248A-D)), the panel acquisition and placement system 1160 of the installation vehicle 1024 can be actuated. It is noted that in this example, the dispensing system 236 can be configured to comprise a version of the panel acquisition and placement system 247 comprising the flippers 248A-D, but not the pushers 252 as these are not necessary due to the existence and operation of the panel acquisition and placement system 1160 on the installation vehicle 1024. Actuating the panel acquisition and placement system 1160 can comprise coordinating the movement and operation of the first and second installation arms 1161 and 1361 to cause the first and second panel capture assets 1192 and 1392 to engage, capture, and acquire the lead solar panel 50, wherein by "acquire" it is meant that the lead solar panel 50 is free from (i.e., out of contact with) the solar panel dispensing hopper 214, secured by the panel acquisition and placement system 1160 of the installation vehicle 1024, and able to be manipulated (i.e., at least one of positioned or oriented in three-dimensional space) by the panel acquisition and placement system 1160. In some cases, such as with the lead solar panel 50 being held in a dispensed and presented position by the solar panel dispensing hopper 214, actuation of the panel acquisition and placement system 1160 can be coordinated with operation of the solar panel dispensing hopper 214 to release the lead solar panel 50 once the panel acquisition and placement system 1160 has engaged and captured the lead solar panel 50. Actuation of the panel acquisition and placement system 1160 to engage, capture and acquire the lead solar panel 50 can comprise actuating at least one of the first and second stabilizing arms 1162 and 1362, the first and second acquisition arms 1182 and 1382, or the first and second panel capture assets 1192 and 1392. For example, the first and second stabilizing arms 1162 and 1362 can be actuated to locate the first and second acquisition arms 1182 and 1382 and/or the first and second panel capture assets 1192 and 1392 in a proper elevation and position relative to the lead solar panel 50 (see FIGS. 15D and/or 15E where the first and second stabilizing arms 1162 and 1362 are rotated upward or downward as needed; and FIG. 15J where the stabilizing arms 1162 and 1362 are rotated laterally inward or outward relative the chassis 1042 of the installation vehicle). The first and second acquisition arms 1182 and 1382 can be actuated (e.g., extended or retracted as needed) to further locate the first and second panel capture assets 1192 and 1392 at a proper position (e.g., a midpoint) along opposing ends of the lead solar panel 50 (see FIGS. 15D, 15E, and/or 15J). In some examples, the first and second panel capture assets 1192 and 1392 can further be actuated (e.g., see FIG. 15 J, wherein these can be actuated to extend or retract if appropriately configured, such as via a sliding interface mechanism and an associated linear actuator as discussed above). Actuating and/or coordinating the movement of one or more of the various arms within the panel acquisition and placement system 1160 as described can ultimately involve causing the first and second panel capture assets 1192 and 1392 to, depending upon their type, engage (i.e., grasp, grip, adhere to, etc.) and secure the lead solar panel 50, such as is shown in FIGS. 15B-15J.

With the lead solar panel 50 acquired by the panel acquisition and placement system 1160, the first and second installation arms 1161 and 1361 can further be actuated to guide the lead solar panel 50 away from the solar panel dispensing hopper 214 and through the gap 1043 between the bottommost surface of the solar panel dispensing hopper 214 and the panel support surface 1045 of the chassis 1042 just below the solar panel dispensing hopper 214, and to present the lead solar panel 50 in an installation position about the panel retention system 38A at the first installation site. This can be accomplished by actuating at least one of the first and second stabilizing arms 1162 and 1362, the first and second acquisition arms 1182 and 1382, or the first and second panel capture assets 1192 and 1392. For example, the first and second acquisition arms 1182 and 1382 can be actuated (e.g., extended or retracted as needed) to position the lead solar panel 50 at a proper longitudinal position (i.e., along the longitudinal axis of the torque tube 8) relative to the first panel retention system 38A (see FIG. 15G). Positioning of the acquired lead solar panel 50 at a proper longitudinal position to facilitate achievement of an installation position can further comprise actuating the endless track system 1058 to move the installation vehicle 1024 (thus adjusting the longitudinal position of lead solar panel 50) closer to or further away from the first panel retention system 38A and the first installation site as needed or desired. In addition, if needed, the first and second stabilizing arms 1162 and 1362 can be actuated to adjust at least one of an elevation or a pitch of the lead solar panel 50 relative to the first panel retention system 38. In some examples, if appropriately configured with an additional actuatable lateral rotational degree of freedom, the first and second stabilizing arms 1162 and 1362 can further be actuated to adjust a lateral position of the lead solar panel 50 relative to the first panel retention system 38A. In addition, if needed and if configured with a suitable actuatable rotational degree of freedom, the first and second panel capture assets 1192 and 1392 can be actuated to adjust a pitch of the lead solar panel 50 relative to the first panel retention system 38A. Any one of or all of these actions can be carried out to place the lead solar panel 50 in an installation position.

Upon achieving a proper installation position, the first and second installation arms 1161 and 1361 can further be actuated to fully insert and place the lead solar panel 50 within the first retention system 38A such that the lead solar panel 50 is fully and completely secured within the first panel retention system 38A by the first and second panel mount assemblies 30A and 30B, wherein the lead solar panel 50 is considered to be in a fully installed position. Depending upon the configuration of the panel mount assemblies 30A and 30B, the first and second installation arms 1161 and 1361 can be controlled and actuated to manipulate the lead solar panel 50 in accordance with such configuration. In one aspect, the first and second installation arms 1161 and 1361 can be operated to cause both sides of the lead solar panel 50 to be inserted into the panel mount assemblies 30A and

30B at the same time (e.g., see the panel mount assembly of FIG. 7B, and the discussion of FIGS. 8A-8I) to place the lead solar panel 50 in an installed position within the first panel retention system 38A, and specifically within the first and second panel mount assemblies 30A and 30B. In another aspect, the first and second installation arms 1161 and 1361 can be operated to first insert one side of the lead solar panel into one of the panel mount assemblies 30A or 30B and then to manipulate the lead solar panel 50 to cause the other side of the lead solar panel 50 to be inserted into the other of the panel mount assemblies 30A or 30B. In the example shown, the first and second installation arms 1161 and 1361 can be operated to pitch the lead solar panel 50 forward, and to at least one of lower the lead solar panel 50 using the first and second stabilizing arms 1162 and 1362 or extend the first and second acquisition arms 1182 and 1382 to cause a first side of the lead solar panel 50 to be inserted into the first panel mount assembly 30A (see FIGS. 15B and 15H). Once the first side of the lead solar panel 50 is properly inserted into the first panel mount assembly 30A, the first and second installation arms 1161 and 1361 can further be operated to rotate the lead solar panel 50 downward until the second side of the lead solar panel 50 is caused to be inserted into the second panel mount assembly 30B (see FIG. 15I). In this case, it may be necessary to adjust a longitudinal position of the lead solar panel 50 to achieve the correct installed position once it is initially seated and captured within the first panel retention system 38A, and specifically within the first and second panel mount assemblies 30A and 30B. This can be accomplished by at least one of further operating the first and second installation arms 1161 and 1361 (e.g., actuating the first and second acquisition arms 1182 and 1382 and/or actuating both the first and second acquisition arms 1182 and 1382 and the first and second stabilizing arms 1162 and 1362), or adjusting a longitudinal position of the installation vehicle 1024 along the torque tube 8. Of course, the first and second installation arms 1161 and 1361 can be operated to cause the second side of the lead solar panel 50 to be inserted first into the second panel mount assembly 30B and the first side of the lead solar panel 50 to be inserted second into the first panel mount assembly 30A.

Once the lead solar panel 50 has been installed within the first installation site, in this case within the panel mount assemblies 30A and 30B of the panel retention system 38A, the first and second installation arms 1161 and 1361 can then be operated to release the lead solar panel 50 and to return to their initial positions ready to acquire another lead solar panel from the solar panel dispensing hopper 214. At the same time, or subsequent to this, the installation vehicle 1024 can then be actuated or driven to travel along the torque tube 8 and to advance to a next or second installation site, in this example to the second installation site defined by the panel retention system 38B, wherein the above process can be repeated to acquire a new lead solar panel from the solar panel dispensing hopper 214, and to install this into the second panel retention system 38B. This process of acquiring and installing lead solar panels into the various panel retention systems supported along the torque tube 8 can be repeated as often as needed or desired until an array of solar panels is installed to provide a solar tracking system.

Figure 16A:
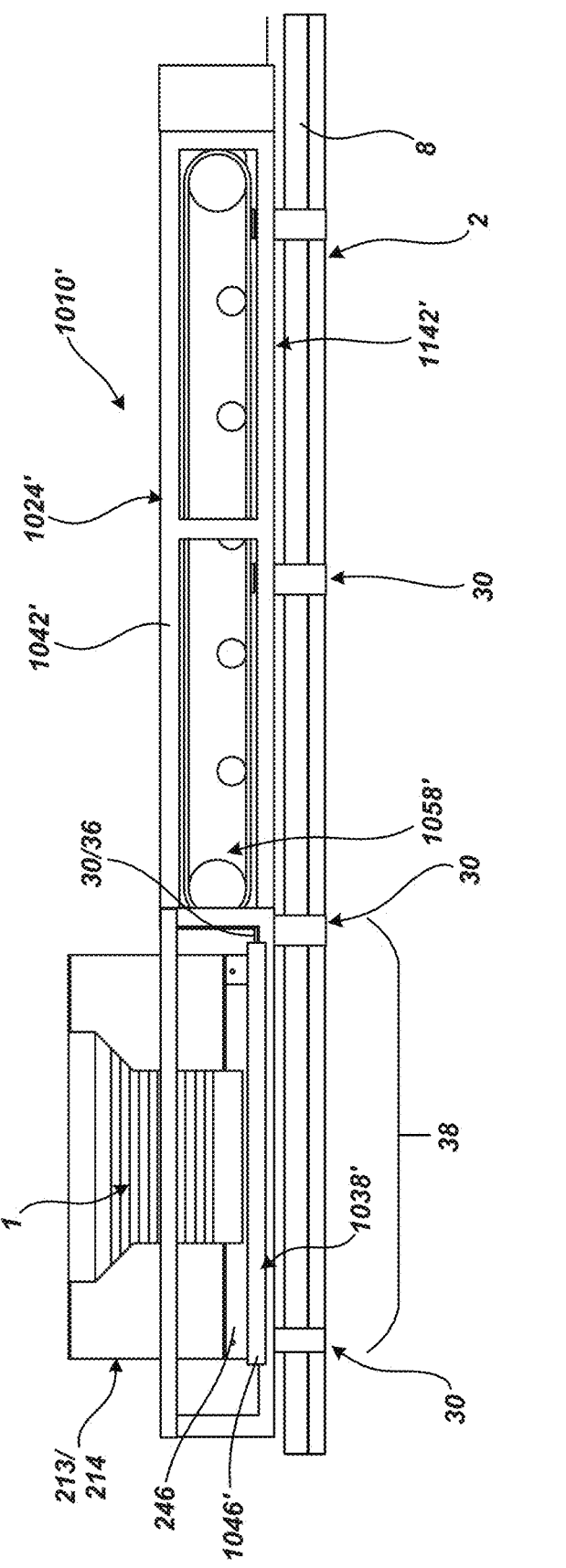
FIGS. 16A-16C illustrate various views of a solar panel installation system in accordance with an example of the present disclosure, the example solar panel installation system comprising the solar panel presentation system of FIG. 4 with the solar panel dispensing hopper of FIGS. 3 and 5A-5D, with some examples having the multi-degree of freedom platform of FIGS. 12A-12D.
Figure 16B:
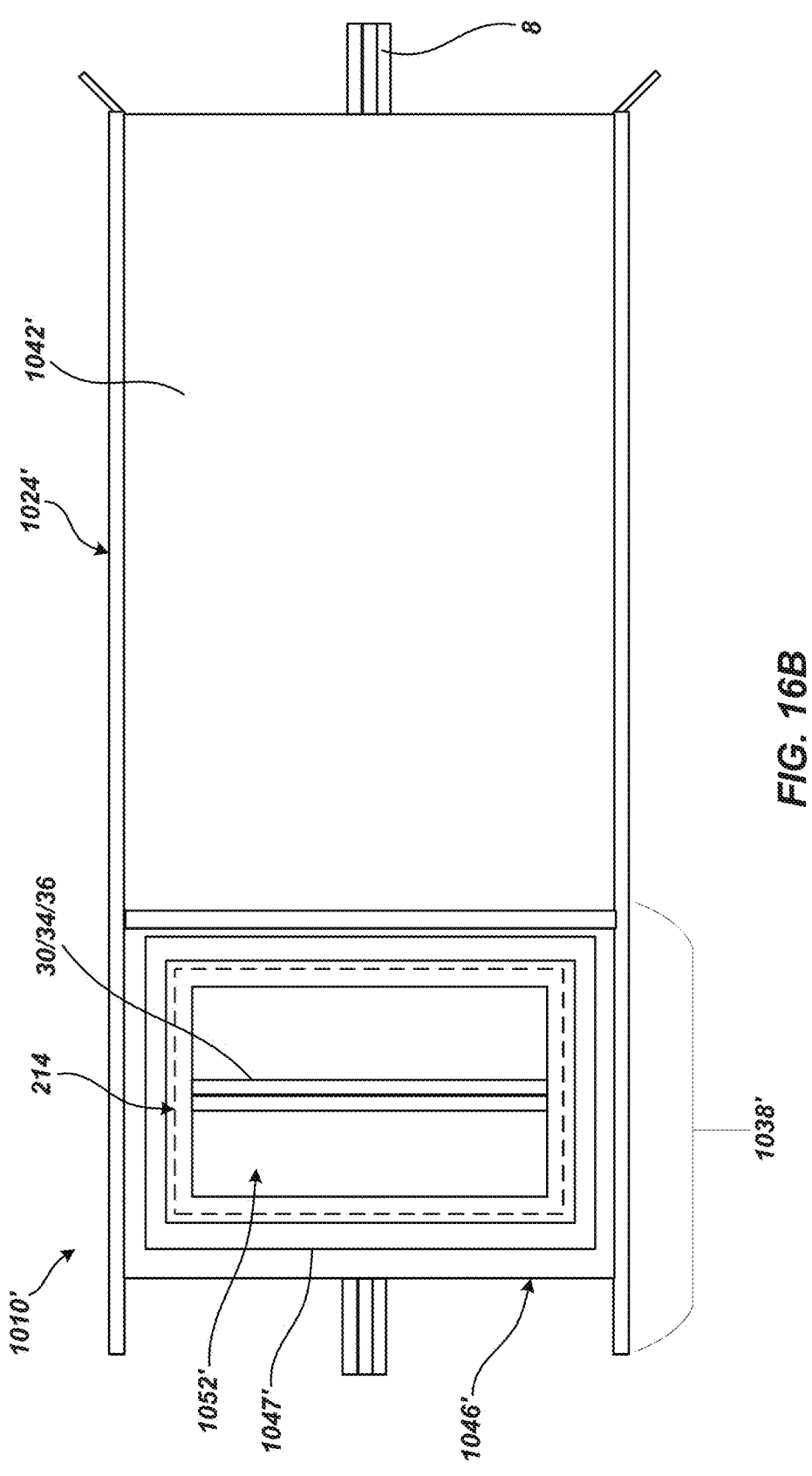
Figure 16C:
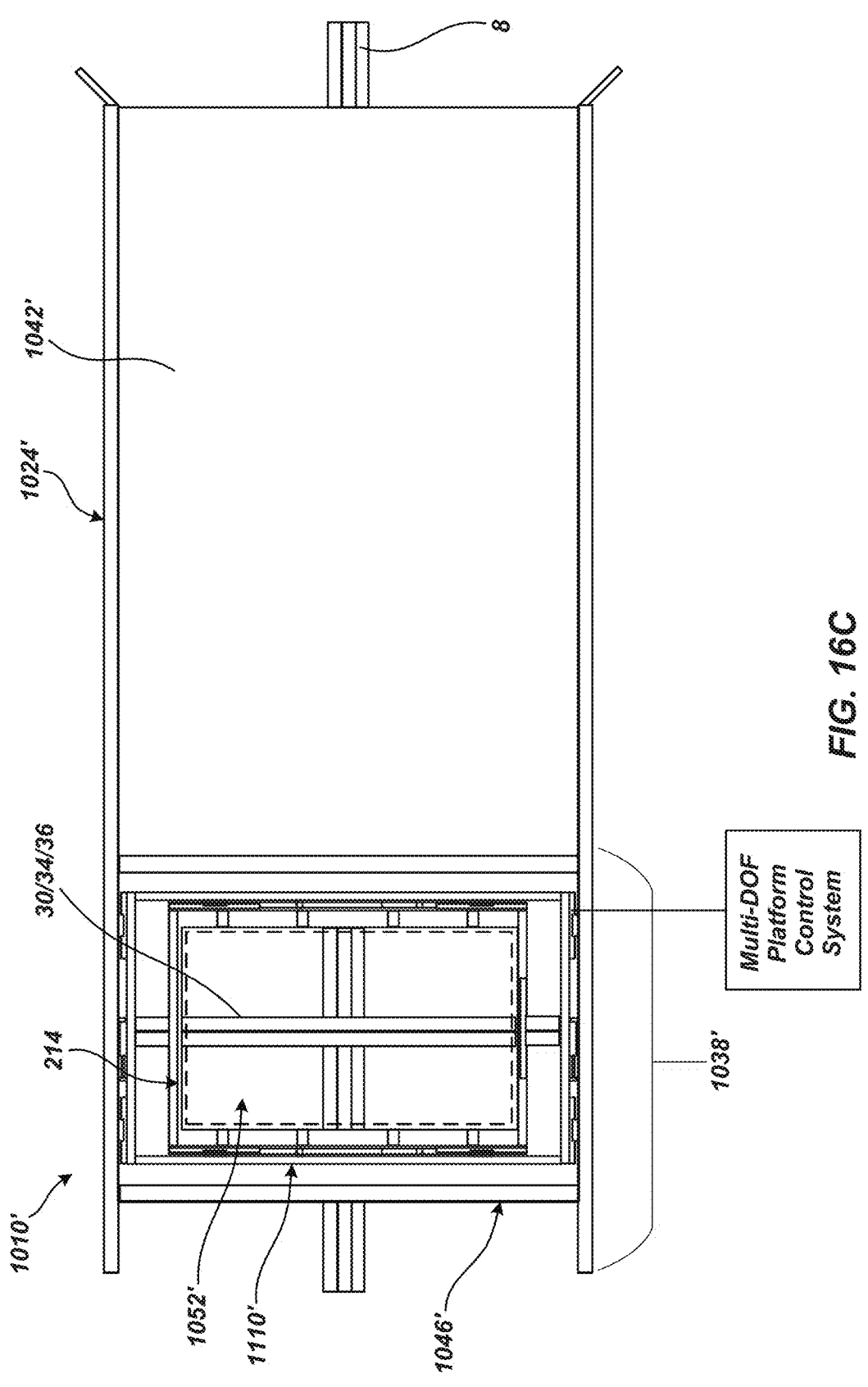

FIGS. 16A-16C illustrate another specific example of the solar panel installation system 1010 of FIG. 15A. Therefore, with reference to FIGS. 16A-16C, and with continued reference to FIGS. 3-4 and 15A, illustrated is a solar panel installation system 1010' that is similar in many respects to the solar panel installation system 1010 discussed above and shown in FIGS. 15B-15O, but without the installation vehicle panel acquisition and placement system 1160. As such, many of the details of the solar panel installation system 1010 discussed above are to be understood to be incorporated and applicable here and are not repeated. Indeed, the above discussion with respect to the solar panel installation system 1010 can be referenced in support of and for an understanding of many of the elements and components of the solar panel installation system 1010' shown in FIGS. 16A-16C. Like the solar panel installation system 1010 of FIGS. 15B-15O, the solar panel installation system 1010' in this example is operable to install a plurality of solar panels 1 within a panel support assembly 2 from an overhead position in accordance with an example of the present disclosure for the purpose of providing a working solar tracking system. However, unlike the solar panel installation system 1010 of FIGS. 15B-15O, the solar panel installation system 1010' in this example is operable to install a lead solar panel of a plurality of solar panels 1 within a panel support assembly 2 from an overhead position, wherein the solar panel dispensing hopper 214 (as part of the solar panel presentation system 213), via a dispensing system 236 comprising both a panel feed system 237 and a panel acquisition and placement system 247, directly dispenses and installs the solar panels into various panel retention systems in a similar manner as discussed above with respect to FIGS. 7A-8I and 10A-11J. In this example, the solar panel installation system 1010' can facilitate manual installation of solar panels, or partially or fully automated installation of solar panels depending on the specific configuration of the solar panel installation system 1010'.

The panel support assembly 2 shown in this example comprises a type used in a solar tracking system. The panel support assembly 2 can comprise one or more ground supports 4 that are securely anchored to the ground or another surface or structure. In this example, the ground supports 4 are shown as posts anchored within the ground, but this is not intended to be limiting in any way. The panel support assembly 2 can further comprise a torque tube 8 that is rotationally supported by the ground supports 4, such that the torque tube 8 can rotate relative to the ground supports 4 and the ground. The panel support assembly 2 can further comprise or otherwise be operable with one or more drive mechanisms 12 operable with one or more motors or actuators 16, respectively. The panel support assembly 2 can further comprise or otherwise be operable with a solar tracking system control 20 that functions to control operation of the solar tracking system and its components. The panel support assembly 2 can further comprise or be in support of a plurality of solar panel retention systems 38, each comprising one or more panel mount assemblies 30, configured in a manner as taught herein so as to facilitate overhead installation of solar panels from a solar panel dispensing hopper of a solar panel presentation system. The panel mount assemblies 30 can each comprise a torque tube clamp 34 that is clamped or otherwise coupled to the torque tube 8 and that is operable with a panel mount 36 comprising one or more retention features, wherein the panel mounts 36 are oriented transverse (e.g., orthogonal or otherwise transverse) to the torque tube 8. In the example shown, each panel retention system 38 comprises two (first and second) panel mount assemblies 30, each panel mount assembly 30 being operable to receive and retain a respective side of one or more solar panels.

The solar panel installation system 1010' can comprise the solar panel presentation system 213 comprising the solar panel dispensing hopper 214 of FIGS. 3-5C (with example methods of operation being shown in FIGS. 7A-8I and 10A-11J) capable of receiving and housing therein one or more solar panels 1 (see plurality of solar panels 1 arranged in a horizontal stack). The solar panel installation system 1010' can further comprise a solar panel installation vehicle 1024' operable to carry and transport the solar panel dispensing hopper 214. The solar panel presentation system 213 with its solar panel dispensing hopper 214 can be operable with the installation vehicle 1024 to facilitate overhead installation of the solar panels 1 into the panel mount assemblies 30 on the panel support assembly 2. This can include operably connecting the installation vehicle 1024 with the solar panel presentation system 213 via the vehicle interface 1048A and the panel dispenser interface 1048B, which can comprise mechanical connections or couplings, electrical connections or couplings, fluid connections or couplings, data connections or couplings, and any combination of these.

The installation vehicle 1024' can comprise a type in the form of a torque tube riding installation vehicle that is operable to be supported and to ride upon the panel support assembly 2 above ground, and is configured to span the torque tube 8 to facilitate overhead installation of the solar panels within the solar panel dispensing hopper 214. In this example, the installation vehicle 1024' is configured to be supported and ride on various the panel mount assemblies 30 that are supported on the torque tube 8 once these are coupled or otherwise secured to the torque tube 8. The installation vehicle 1024' will generally be configured to be supported by at least two panel mount assemblies at all time as it rides along the torque tube 8.

The installation vehicle 1024' can comprise a chassis 1042' sized and configured to span the torque tube 8, and to provide direct or indirect support to the various components, elements, systems, mechanisms, etc. of the installation vehicle 1024' as well as to the solar panel dispensing hopper 214, and any other components or systems operable with or within these (e.g., multi-degree of freedom platform(s), and others). The chassis 1042' can comprise a number of different sizes, shapes and configurations. In one example, the chassis 1042' can comprise a framework or frame-like structural configuration, wherein a number of different structural elements or components are coupled with one another to make up the chassis 1042'. In another example, the chassis 1042' can comprise a housing, body, or other more solid structural configuration. The chassis 1042' can comprise or support thereon a structure or structural assembly configured to receive and support the solar panel dispensing hopper 214. This can be referred to as the hopper support 1038 and the dispenser interface 1048B can be part of the hopper support 1038.

The hopper support 1038' can itself supported by, or can be a part of, the chassis 1042' of the installation vehicle 1024'. The hopper support 1038' can comprise a structure or structural assembly operable to support the solar panel dispensing hopper 214 on or as part of the installation vehicle 1024', and which can be part of or can comprise the dispenser interface 1048B operable and configured to receive and at least one of mechanically, fluidly, or electronically interface and couple with the solar panel dispensing hopper 214 via the vehicle interface 1048A of the solar panel dispensing hopper 214. The hopper support 1038' can be supported by, or can be part of, the chassis 1042' and positioned so as to locate the center of gravity of the installation vehicle 1024' (with the solar panel dispensing hopper 214 and any installed or loaded solar panels 1) in a position that enables the installation vehicle 1024' to ride along the tops of the panel mount assemblies 30 supported on the torque tube 8. In the example shown, the hopper support 1038' comprises a hopper platform 1046'. In one aspect, the hopper platform 1046' can be part of the chassis 1042'. In another aspect, the hopper platform 1046' can be a separate structural assembly that couples to the chassis 1042'. The hopper platform 1046' can be configured to receive and couple to or otherwise secure to the solar panel dispensing hopper 214, such as the support frame 246, thereby securing the solar panel dispensing hopper 214 to the chassis 1042'. The hopper support 1038' operates to secure the solar panel dispensing hopper 214 in a manner so as to be able to directly dispense and install a lead solar panel 50 into a panel retention system 38, which is discussed in more detail below. The hopper support 1038' operates to locate the solar panel dispensing hopper 214 at a rear of the installation vehicle 1024', with a front of the installation vehicle 1024' comprising other components (e.g., one or more power sources, such as batteries, electronics (e.g., for a control system, communications module and others), and any other components). The chassis 1042', the hopper support 1038' and all of the other components of the installation vehicle 1024' can be designed to place the center of gravity of the installation vehicle in an acceptable, workable position to allow the installation vehicle 1024' to be sufficiently balanced and to be operated as intended.

In one example, the solar panel dispensing hopper 214 can comprise a self-contained system, meaning that the solar panel dispensing hopper 214 is not an integral part of the solar panel installation vehicle 1024', rather that it is a module having its own housing or frame unit, and that it is removable or removably operable with one or a variety of different solar panel installation vehicles, such as the installation vehicle 1024' (or any of the other installation vehicles discussed herein), that are designed to receive the solar panel dispensing hopper 214 (the device 214 being a type of plug-in or module). This also means that some or all of the components, systems or other elements needed to carry out an installation task of inserting a solar panel into a panel support assembly are part of or on-board the solar panel dispensing hopper 214 (e.g., control system 260, communications module 274, sensor(s) 270, automation system 272, etc.). In this example, the vehicle interface 1048A of the solar panel dispensing hopper 214, that is inclusive of the support frame 246 of the solar panel dispensing hopper 214, can be used to mechanically interface with and couple to a suitable support structure or structural assembly as part of the dispenser interface 1048B of the hopper support 1038 of the installation vehicle 1024. In one example, the solar panel dispensing hopper 214 can be coupled to the installation vehicle 1024' by coupling or otherwise joining the support frame 246 (or another structural component) of the solar panel dispensing hopper 214 to a suitable support structure of the installation vehicle 1024', and particularly to the hopper support 1038', using one or more fasteners. A suitable support structure of the installation vehicle 1024' and the hopper support 1038' can comprise a platform, a framework, a housing, a structural element comprising a recess or bay, or any other structural assembly or arrangement, or combination of these. In a specific example, as indicated above, the installation vehicle 1024' can comprise a hopper support 1038' configured to comprise a hopper platform 1046' sized and configured to receive and secure the solar panel dispensing hopper 214 to the installation vehicle 1024', wherein the hopper platform 1046' can comprise any structure or structural arrangement that can interface with (e.g., couple to, join, be integrally formed with) the support frame 246 of the solar panel dispensing hopper 214. Additional securing means, such as fasteners, straps, brackets, and others can be used to secure the solar panel dispensing hopper 214 to the vehicle 1024' after it is seated on the hopper platform 1046'. In addition to providing a mechanical interface with mechanical connections or couplings, the vehicle interface 1048A and the dispenser interface 1048B can further comprise at least one of electrical connections or fluid connections. In another example, the solar panel dispensing hopper 214 can be integrally formed with and part of the installation vehicle 1024, for example integrally formed with the hopper platform 1046, such that the vehicle interface 1048A and the dispenser interface 1048B (comprising at least one of mechanical, fluid, or electrical interfaces) are also integrally formed with one another. In this example, the solar panel dispensing hopper 214 can be considered a dedicated, non-interchangeable component of the installation vehicle 1024'.

In one example, the hopper support 1038' can comprise the hopper platform 1046' configured as a static platform (see FIG. 16B) located about a rear or second end of the installation vehicle 1024', wherein the solar panel dispensing hopper 214 (shown in dotted lines at the position where it would be located) is secured (e.g., with fasteners) to a support rail 1047' of the hopper platform 1046' in a manner so as to be stationary relative to the chassis 1042' of the installation vehicle 1024' and the panel support assembly 2. The hopper platform 1046' can further comprise a clearance 1052' aligned with the opening of the solar panel dispensing hopper 214 to facilitate overhead or top-down installation of solar panels 1 by dispensing these from the solar panel dispensing hopper 214 through the clearance 1052' formed in hopper platform 1046', thus facilitating direct dispensing and installation of the solar panels 1 into respective panel retention systems 38 of the panel support assembly 2 by the solar panel dispensing hopper 214 itself in a similar manner as discussed above (see FIGS. 7A-8I and/or 10A-11J, and associated discussion of these figures). In one example, the clearance 1052' can be an opening in the hopper platform 1046' and/or the chassis 1042'. In another example, the clearance 1052' can be a portion of the hopper platform 1046' and/or the chassis 1042' defining a void or devoid of, but yet defined by, structural elements or components. In any case, the clearance 1052' can be sized and configured so as to ensure that a lead solar panel being dispensed from the solar panel dispensing hopper 214 clears (i.e., does not come into contact with) any elements or components of the installation vehicle 1024', such as the chassis 1042', the drive system 1056' (e.g., comprising the endless track system 1058'), or any other elements or components so that the lead solar panel can be properly dispensed from the hopper enclosure 216, through the clearance 1052', and installed by the solar panel dispensing hopper 214 directly into the one or more panel mount assemblies 30 of the panel retention system 38 of the panel support assembly 2 at an installation site. The hopper platform 1046' can be configured as needed to support the solar panel dispensing hopper 214 at a position and at an elevation relative to the panel retention system 38 and the torque tube 8, such that the components of the solar panel acquisition and presentation system 247 (e.g., the flippers and pushers) of the solar panel dispensing hopper 214 can be operated to dispense a lead solar panel, pass this through the clearance 1052', and to manipulate the lead solar panel into an installed position within the panel retention system 38 in the same or a similar manner as described herein.

In another example, the solar panel installation system 1010' can further comprise a multi-degree of freedom platform (or stage) 1110' supported between the solar panel dispensing hopper 214 (shown in dotted lines), namely the hopper enclosure 216, and the hopper support 1038' of the installation vehicle 1024' that is operable to facilitate movement of the solar panel dispensing hopper 214 in one or more translational and/or rotational degrees of freedom relative to the chassis 1042' of the installation vehicle 1024' and the panel support assembly 2 (specifically the panel mount assemblies 30 as supported on the torque tube 8) (see FIG. 16C). The multi-degree of freedom platform 1110' can be part of at least one of the vehicle interface 1048A or the dispenser interface 1048B. The multi-degree of freedom platform 1110' can be supported so as to align the solar panel dispensing hopper 214 about the clearance 1052', the multi-degree of freedom platform 1110' also comprising a clearance to permit the passage of a solar panel therethrough, so as to facilitate overhead or top-down installation of solar panels 1 by dispensing these from the solar panel dispensing hopper 214 through the clearance 1052' formed in hopper platform 1046', thus facilitating direct dispensing and installation of the solar panels 1 into respective panel retention systems 38 of the panel support assembly 2 by the solar panel dispensing hopper 214 itself in a similar manner as discussed above (see FIGS. 7A-8I and/or 10A-11J, and associated discussion of these figures). In one example, the multi-degree of freedom platform 1110' can comprise the multi-degree of freedom platform 510 as discussed above and shown in FIGS. 12A-12D (with some of its components configured as an X-Y platform, and in some examples comprising one or more lifts, such as a single lift or the lifts 559A and 559B, operable with the X-Y platform to provide movement in one or more additional translational and/or rotational degrees of freedom). In one example, the multi-degree of freedom platform 1110' can comprise a separate structural system coupled between the solar panel dispensing hopper 214 and the hopper support 1038' of the installation vehicle 1024', or in another example, one or more components of the multi-degree of freedom platform 1110' can be integrally formed with and part of at least one of the solar panel dispensing hopper 214 or the hopper support 1038' of the installation vehicle 1024'. Depending upon how it is configured, the multi-degree of freedom platform 1110' can be configured to provide between 1 and 6 degrees of freedom of movement to the solar panel dispensing hopper 214 supported by the multi-degree of freedom platform 1110'. The discussion of the multi-degree of freedom platform 510 set forth above can be referred to for additional details.

With reference to FIGS. 17A-17I, illustrated is a solar panel presentation system 1413 in accordance with an example of the present disclosure. The solar panel presentation system 1413 can be part of a solar panel installation system (e.g., such as the solar panel installation system 110 of FIG. 1, or any of the other solar panel installation systems described herein, namely solar panel installation systems 210, 610, 810, 1010). The solar panel presentation system 1413 can comprise a solar panel dispensing hopper, such as the example solar panel dispensing hopper 1414 illustrated.

The solar panel dispensing hopper 1414 can be configured to provide overhead or top down installation of solar panels within a panel support system, meaning that one or more solar panels within the solar panel dispensing hopper 1414 can be dispensed from the solar panel dispensing hopper 1414 with the solar panel dispensing hopper 1414 positioned above the torque tube 8 and a solar panel retention system supported thereon (comprising one or more panel mount assemblies) as part of a larger panel support assembly. The solar panel dispensing hopper 1414 can comprise a hopper enclosure 1416 operable to receive and house one or more solar panels 1. In the example shown, a plurality of solar panels 1 are supported in the hopper enclosure 1416 in a horizontally stacked arrangement. The hopper enclosure 1416 can comprise one or more sidewalls (e.g., see sidewalls 1418, 1420, 1422, and 1424 forming a rectangular configuration). The configuration of the hopper sidewalls can be any as needed or desired to house a particularly configured solar panel or solar panel stack. The hopper enclosure 1416 can further comprise an interior volume 1426 defined by the sidewall(s) and having a size and configuration suitable to receive and house one or more solar panels 1, and preferably one or more stacks of solar panels 1.

As solar panels typically are purchased and packaged in stacks, the hopper enclosure 1416 can comprise an opening in one of its sidewalls. In the example shown, the sidewall 1420 comprises an opening 1428 that is open along a top and bottom edge of the sidewall 1420, thus providing a slot in the sidewall 1420. This opening 1428 facilitates the loading of a stack of solar panels by providing a clearing for the support members used to initially lift the stack of solar panels 1 and load them into the hopper enclosure 1416. For example, a stack of solar panels 1 can be lifted by a forklift where the support members of the forklift comprise the forks or arms of the forklift. These arms can be used to lift the stack of solar panels and to load them into the hopper enclosure 1416. The opening 1428 in the sidewall 1420 allows the forks of the forklift to clear the hopper so that the solar panels 1 can be lowered or loaded into the hopper enclosure 1416. The opening 1428 also allows the forklift to keep the stack of solar panels level as the forklift is not required to rotate or tilt the solar panels to avoid the sidewall(s) of the hopper enclosure 1416. The forks of the forklift can be vertically aligned with the opening 1428, and while lowering the solar panels into the hopper enclosure 1416 the forks of the forklift can extend through and slide up and down within the slot created by the opening 1428. Similar openings for similar purposes can be provided on any number of the sidewalls of the hopper enclosure 1416 and in any configuration as needed or desired (e.g., see a similar opening 1429 formed in the opposing sidewall 1424). Moreover, the sidewall 1420 can be configured to provide one or more lead-in edges to further shape and define the slotted opening 1428 (with similar lead-in edges formed in the sidewall 1424 to further define the opening 1429). In the example shown, the sidewall 1420 comprises two opposing lead-in edges or surfaces extending downward on an angle or incline from a top edge of the sidewall to a vertical edge of the sidewall on each side of the opening, the inclined lean-in edges and the vertical edges defining the size, shape and configuration of the opening 1428. The inclined lead-in edges of the sidewall 1420 can facilitate proper alignment of the one or more forks of a vehicle loading the solar panel stack into the hopper enclosure 1416, such a forklift or fork-lift type of vehicle or another type of vehicle comprising a set of forks. If not quite aligned, one or more of the forks can contact the lead-in edges of the slotted opening 1428, which lead-in edges can function to shift one or more of the forks and the associated solar panel payload they are carrying so as to properly align the solar panel payload with the hopper enclosure 1416, thus achieving proper loading of the solar panels within the hopper.

The hopper enclosure 1416 can further comprise one or more top edge lead-in members extending upward and outward from a top edge of a respective sidewall of the hopper enclosure 1416. These can be add-on extension members that can be removed once the solar panel stack is loaded into the hopper enclosure 1416, or they can be integrally formed with the sidewalls of the hopper enclosure 1416. In the example shown, the hopper enclosure 1416 comprises a top edge lead in member 1434. Although not shown, the hopper enclosure 1416 can comprise additional top edge lead-in members similar to the lead-in members described above with respect to the hopper 214, and shown in FIG. 3, thus comprising lead-in members extending upward and outward from the four respective sidewalls 1418, 1420 1422, and 1424 of the hopper enclosure 1416. The lead-in members (e.g., lead-in member 1430, and others) can facilitate installation of the solar panels 1 into the hopper enclosure 1416 by acting as guides. As the solar panels 1 are lowered into the interior volume 1426 of the hopper enclosure 1416, the solar panels 1 can contact one or more of the lead-in members in the event the solar panels 1 are not properly aligned with the hopper enclosure 1416. The lead-in members can help to align or realign the solar panels 1 upon contacting the solar panels 1, and can subsequently guide them into a proper position and orientation as they are loaded into the interior volume 1426 of the hopper enclosure 1416. It will be apparent to those skilled in the art that the lead-in members can comprise a number of different components, mechanisms, sizes, shapes and/or configurations. As such, those shown here are not intended to be limiting in any way.

The solar panel dispensing hopper 1414 can further comprise a dispensing system 1436 operable to facilitate acquiring and dispensing of the one or more solar panels from the solar panel dispensing hopper 1414, and particularly the hopper enclosure 1416. In one example, the dispensing system 1436 can comprise a panel feed system operable to perform a dispensing function that merely dispenses a lead solar panel. Alternatively, the dispensing system 1436 can function to both dispense and install a lead solar panel into the panel retention system 38 of the panel support assembly 2, as such the dispensing system 1436 can comprise a panel feed system 1437 and a panel acquisition and placement system 1447. In one example, as shown, the dispensing system 1436 can comprise a panel acquisition and placement system 1447 operable to acquire, dispense (i.e., retrieve) and install a lead solar panel 50 into the panel retention system 38. In this example, unlike the dispensing system 236 of the solar panel dispensing hopper 214 discussed above and shown in FIGS. 3-5D that comprises both a panel feed system 237 and a panel acquisition and placement system 247 that can be operated in a controlled and coordinated matter to both dispense and install a lead solar panel into the panel retention system 38, the solar panel dispensing hopper 1414 here comprises a passive hopper enclosure 1416 in that it eliminates or does not comprise a panel feed system. Stated differently, in one example, the dispensing system 1436 of the solar panel dispensing hopper 1414 comprises a panel acquisition and placement system 1447 but not a panel feed system, with the panel acquisition and placement system 1447 being of a different configuration than that of the dispensing system 236 of the solar panel dispensing hopper 214. By "passive" it is meant that the hopper enclosure 1416 merely receives and houses or contains the solar panels 1 therein without means for acting on the solar panels 1, such as moving or displacing these in an up or down manner, or any other manner within the hopper enclosure 1416. However, in another example, the solar panel dispensing hopper 1414 can comprise an active hopper that comprises both a panel feed system and the panel acquisition and placement system 1447 that can be operated in a controlled and coordinated matter to both dispense and install a lead solar panel 50 into the panel retention system 38. In one example, the panel feed system can comprise one similar to the panel feed system 237 of the solar panel dispensing hopper 214 discussed herein with respect to FIGS. 3-5D. In another example, such as shown in FIG. 17I, the panel feed system 1437 of a solar panel dispensing hopper 1414' (with only the hopper enclosure 1416' illustrated, but still operable with the panel acquisition and placement system 1447 discussed herein) can comprise a lift table 1518 comprising a platform 1519 operable with a lift mechanism 1520 (e.g., a scissor type of lift system), wherein the platform 1519 is supported within the interior volume 1426 of the hopper enclosure 1416 and operable to receive and support the solar panels 1 thereon, and wherein the lift mechanism 1520 can be associated with an actuator and selectively controlled and actuated to lift the platform 1519 and the stack of solar panels 1 thereon so as to displace the solar panels 1, such as to advance these in turn towards the opening or exit opening in the hopper enclosure 1416' upon the dispensing of a lead solar panel. The panel acquisition and placement system 1447 is described in more detail below.

In some examples, the solar panel dispensing hopper 1414 can further comprise a support frame 1446 operable to provide support to the hopper enclosure 1416 (and its sidewalls), as well as, in some examples, to provide support to one or more other components of the solar panel dispenser 1414. Alternatively, the support frame 1446 can be integrally formed with the hopper enclosure 1416. The support frame 1446 can extend around one or more sides of the solar panel dispensing hopper 1414, and can comprise any size, shape, components or configuration. The hopper enclosure 1416 and the support frame 1446 can be made of metal, composite(s), or a high strength polymer material. Furthermore, the support frame 1446 can comprise a channel or other interface feature(s) designed and configured to interface with an installation vehicle, a multi-degree of freedom platform, and/or a torque tube spanning bridging support member, such as those described herein. In other words, the solar panel dispensing hopper 1414 can comprise an installation vehicle interface, which in this case comprises all, or a part of, the support frame 1446, or, in other examples, a part of the hopper enclosure 1416. As discussed above with respect to the solar panel dispensing hopper 114 of FIG. 1 (or the solar panel dispensing hopper 214 of FIGS. 3-5D), in one example the solar panel dispensing hopper 1414 can be a self-contained type of dispensing hopper. In this case, the support frame 1446 can be used to removably interface with one or more suitable structural members of an installation vehicle, a multi-degree of freedom platform, and/or a torque tube spanning bridging support member that is intended to carry and support the solar panel dispensing hopper 1414 in an overhead position relative to a panel retention system supported on a torque tube of a panel support assembly (i.e., a solar tracking system). In another example, the solar panel dispensing hopper 1414 can be integrally formed with and part of an installation vehicle, a multi-degree of freedom platform, and/or a torque tube spanning bridging support member. In this case, the support frame 1446 can be used to more permanently interface with one or more structural members of the installation vehicle, the multi-degree of freedom platform, and/or the torque tube spanning bridging support member. It will be apparent to those skilled in the art that the support frame 1446 can comprise a number of different components, mechanisms, sizes, shapes and/or configurations. As such, the support frame 1446 shown here is not intended to be limiting in any way.

Figure 17A:
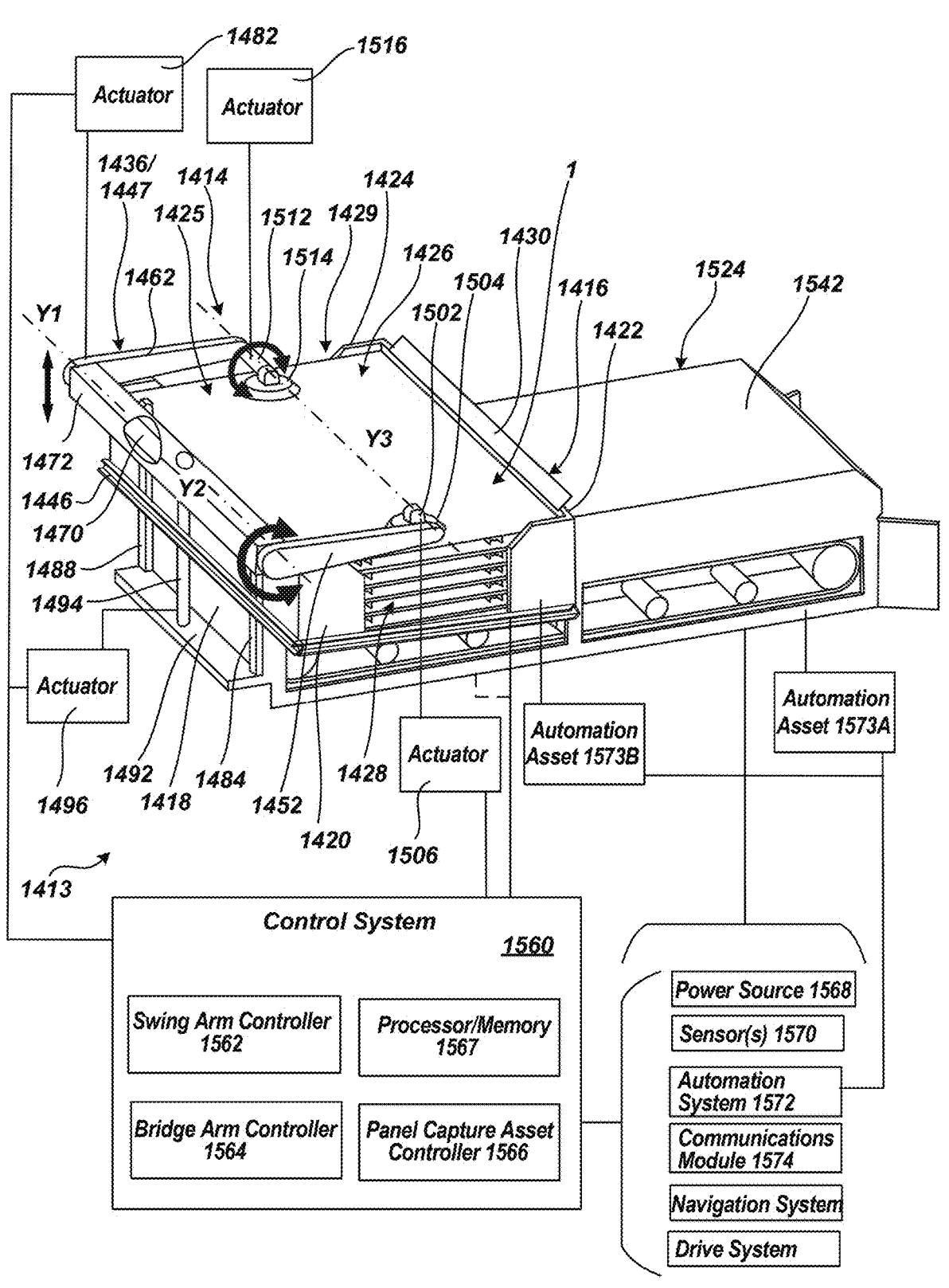
FIGS. 17A-17I illustrates various views of a solar panel presentation system having a solar panel dispensing hopper in accordance with an example of the present disclosure.

It is noted that the separate support frame 1446 shown in FIG. 17A can be optional. Indeed, in some examples, the solar panel dispensing hopper 1414 can, and particularly the hopper enclosure 1416, can comprise one or more structural components operable to interface with one or more structural members of an installation vehicle, a multi-degree of freedom platform, and/or a torque tube spanning bridging support member, as discussed herein. Indeed, it is contemplated that the hopper enclosure 1416 itself can comprise sufficient structure to enable the hopper enclosure 1416 to facilitate the solar panel dispensing hopper 1414 being integrally formed, or alternatively coupled to, any one of the installation vehicle, the multi-degree of freedom platform, and/or the torque tube spanning bridging support member.

The solar panel dispensing hopper 1414 can further comprise an open top 1425 (or opening 1425 located at the top) that defines, at least in part, and that operates as an exit through which the individual solar panels 1 pass as they are caused to be acquired and retrieved (i.e., dispensed) from the hopper enclosure 1416 and the solar panel dispensing hopper 1414 and as they are installed from an overhead position into a solar panel retention system of a panel support assembly. In other words, the hopper enclosure 1416 can comprise an exit or exit opening 1425 suitably configured to permit the passage of a solar panel therethrough. The open top 1425 can be defined by the hopper enclosure 1416 and its various sidewalls. In other words, the open top 1425, or the opening 1425 at the top of the solar panel dispensing hopper 1414, can be defined by the various components of the solar panel dispensing hopper 1414 so that the solar panels 1 can properly be caused to exit the opening 1425 and be dispensed from the solar panel dispensing hopper 1414 from the top that facilitates installing the solar panels 1 with the solar panel dispensing hopper 1414 positioned in an overhead position relative to a panel support assembly. How the solar panels 1 are supported within the solar panel dispensing hopper 1414 (e.g., vertically), how they are individually presented for dispensing, and how they are ultimately acquired and retrieved or dispensed through the opening 1425 will be described in detail below.

The panel acquisition and placement system 1447 of the solar panel dispensing hopper 1414 can comprise a system operable to interface with and acquire a lead solar panel 50 from the hopper enclosure 1416, to manipulate the lead solar panel 50 so as to retrieve it by causing it to be dispensed through the exit or opening 1425 in the top of the hopper enclosure 1416, to further position the lead solar panel 50 in an installation position proximate a panel retention system at an installation site of a panel support assembly (e.g., a solar tracking system), and to ultimately install the lead solar panel 50 within the panel retention system. In one example, as shown, the panel acquisition and placement system 1447 can comprise a first moveable arm in the form of a first swing arm 1452 and a second moveable arm in the form of a second swing arm 1462 supported on or by a bridge arm 1472. The first swing arm 1452 can be rotatably supported about (e.g., rotatably coupled to) a first end of the bridge arm 1472 at a first rotational joint, such that the first swing arm 1452 is operable to rotate in a bi-directional manner in a rotational degree of freedom about an axis Y1, the first rotational joint defining the axis of rotation Y1 of the first swing arm 1452. Likewise, the second swing arm 1462 can be rotatably supported about (e.g., rotatably coupled to) an opposing second end of the bridge arm 1472 at a second rotational joint, such that the second swing arm 1472 is operable to rotate in a bi-directional manner in a rotational degree of freedom about an axis Y2, the second rotational joint defining the axis of rotation Y2. The rotational axes Y1 and Y2 can be common to one another, meaning that the first and second swing arms 1452 and 1462 share a common rotational axis (are coaxial). Both of the first and second swing arms 1452 and 1462 can be associated and operable with an actuator 1482 (e.g., a motor, a fluid actuator), which can be selectively actuated to cause the first and second swing arms 1452 and 1462 to rotate relative to the hopper enclosure 1416. As such, the first and second rotational joints associated with the first and second swing arms 1452 and 1462 are active, actuatable joints. With the actuator 1482 associated with both of the first and second swing arms 1452 and 1462, actuation of the actuator 1482 can cause both of the first and second swing arms 1452 and 1462 to be rotated together. In other words, the first and second swing arms 1452 and 1462 can be linked together (e.g., via a rigid rod or other structural member 1470 extending between them, such as one that spans between them inside of a bore or lumen of the bridge arm 1472), such that they rotate the same number of degrees and at the same rate. However, this is not meant to be limiting in any way as, in another aspect, each of the first and second swing arms 1452 and 1462 can be associated with separate or individual actuators, such that each of the first and second swing arms 1452 and 1462 can be actuated independent of one another (e.g., different rotational degrees and/or at different rates). In this example, they can still be caused to rotate the same number of degrees and at the same rate by coordinating or synching their rotation.

The bridge arm 1472 can be sized and configured so as to space the first and second swing arms 1452 and 1462 apart from one another a suitable distance so as to be able to perform their intended function of retrieving a lead solar panel from the hopper enclosure 1416 and installing the lead solar panel into a panel retention system as supported within a panel support assembly. In one example, the bridge arm 1472 can be sized and configured to comprise a length at least as long as a length of the hopper enclosure 1416, thus spacing the first and second swing arms 1452 and 1462 apart from one another a greater distance than the length of the hopper enclosure 1416, and thus locating the first and second swing arms 1452 and 1462 outside of a perimeter of the hopper enclosure 1416. With this configuration, the first and second swing arms 1452 and 1462 can be rotated any number of rotational degrees and in any direction without coming into contact with the hopper enclosure 1416. Spacing the first and second swing arms 1452 and 1462 at this distance will also allow them to be rotated without coming into contact with any of the structural components of a panel support assembly (such as the various panel retention systems (each having one or more panel mount assemblies) or the torque tube supporting the panel retention systems) upon the solar panel dispensing hopper 1414 being positioned overhead the panel support assembly by an installation vehicle (see the example installation vehicle 1524 having a chassis 1542 in support of the solar panel dispensing hopper 1414, which is similar to the installation vehicle 1024 of FIGS. 15A-15J, but without the panel acquisition and installation system 1160). The first and second swing arms 1452 and 1462 and the bridge arm 1472 can be comprised of any rigid material, and can comprise a number of different sizes, shapes, configurations. In another example, although not shown, the panel acquisition and placement system 1447 can comprise first and second bridge arms that can be in support of the first and second swing arms 1452 and 1462, respectively. In other words, the example single bridge arm 1472 supporting both of the first and second swing arms 1452 and 1462 as shown is not required or intended to be limiting in any way.

The panel acquisition and placement system 1447 can further comprise first and second elevation guides 1484 and 1488 supported proximate (e.g., on an outer surface of a sidewall (in this case the sidewall 1418) of) the hopper enclosure 1416. The first and second elevation guides 1484 and 1488 can each comprise elongate structural members and can be spaced apart or offset from one another, and can interface with and moveably support the bridge arm 1472. In other words, the bridge arm 1472 can be moveably coupled to the first and second elevation guides 1484 and 1488 and operable to move along the elevation guides 1484 and 1488 to vary an elevation of the bridge arm 1472 relative to the hopper enclosure 216. In the example shown, the bridge arm 1472 can comprise an elongate body that is slidably coupled to the first and second elevation guides 1484 and 1488, wherein the bridge arm 1472 can be caused to slide in a bi-directional manner (e.g., up and down along a vertical axis) along the first and second elevation guides 1484 and 1488 relative to the hopper enclosure 1416. The first and second elevation guides 1484 and 1488 comprise a length sufficient so as to provide the bridge arm 1472 with the requisite travel needed to locate and position the first and second swing arms 1452 and 1462 during each of the acquisition stage, the retrieval or dispensing stage, and the installation stage. In the example show, the first and second elevation guides 1484 and 1488 are configured so as to extend along the outer surface of the sidewall 1418 and below a lowermost surface of the hopper enclosure 1416.

The panel acquisition and placement system 1447 can further comprise an elevation support platform 1492 that is located below the lowermost surface of the hopper enclosure 1416, and that is oriented transverse to the sidewall 1418 of the hopper enclosure 1416 so as to extend outward and away from the hopper enclosure 1416. In one example, the elevation support platform 1492 can be a part of the solar panel dispensing hopper 1414. In another example, the elevation support platform can be part of the installation vehicle in support of the solar panel dispensing hopper 1414. In any event, the elevation support platform 1492 can be supported in a fixed position relative to the hopper, and can also be sized and configured, and can function, to support the first and second elevation guides 1484 and 1488 in a fixed or stationary position relative to the hopper enclosure 1416. In one example, the first and second elevation guides 1484 and 1488 can comprise linear bearings or linear slides (e.g., rolling element bearings (e.g., ball bearing slides, roller slides), plain bearings (e.g., dovetail slides, compound slides, and rack slides), and other types), or any other slidable interfacing components, operable to interface with corresponding structural elements on the bridge arm 1472, such that the bridge arm 1472 is able to slide in both directions in a translational degree of freedom along the first and second elevation guides 1484 and 1488, thus altering an elevation of the bridge arm 1472 along with the first and second swing arms 1452 and 1462 and the first and second panel capture assets (and any solar panel supported by these) relative to the hopper enclosure 1416 (and relative to a panel support assembly).

The panel acquisition and placement system 1447 can further comprise a drive system operable to actuate the bi-directional movement of bridge arm 1472 along the first and second elevation guides 1484 and 1488. The drive system can comprise any type of operable to displace the bridge arm 1472. In the example shown, the drive system comprises a lead screw 1494 operable with an actuator 1496 (e.g., a motor, fluid actuator). The lead screw 1494 can be supported on the elevation support platform 1492, and can comprise one or more structural components operable to moveably interface with corresponding structure on the bridge arm 1472. For example, the lead screw 1494 can comprise a threaded rod operable to engage and interface with corresponding threads formed into the bridge arm 1472, such that actuation (i.e., rotation) of the lead screw 1494 in a first rotational direction causes the bridge arm 1472 to slide along the first and second elevation guides 1484 and 1488 in a first translational direction, and rotation of the lead screw 1494 in an opposing rotational direction causes the bridge arm 1472 to slide along the first and second elevation guides 1484 and 1488 in a second translational direction opposite the first translational direction. The lead screw 1494 can comprise a size and configuration suitable to provide the bridge arm 1472 with the requisite travel for its intended purpose of acquiring, retrieving and installing a lead solar panel within a panel retention system. A drive system comprising a lead screw is not intended to be limiting in any way. Indeed, other drive system types are contemplated for use for effectuating and facilitating the translational movement of the bridge arm 1472 relative to the hopper enclosure 1416. For example, in an alternative arrangement, although not shown, a drive system can comprise a scissor lift supported by the elevation support platform 1492 between the elevation support platform 1492 and the bridge arm 1472, wherein the scissor lift is actuatable by the actuator 1496 to cause the bridge arm 1472 to move.

The panel acquisition and placement system 1447 can further comprise first and second panel capture assets 1502 and 1512 rotatably coupled to the first and second swing arms 1452 and 1462, respectively, such that the first and second panel capture assets 1502 and 1512 are oriented along a common axis, and extend inward toward one another from a point of attachment to the first and second swing arms 1452 and 1462. The first panel capture asset 1502 can be rotatably supported about (e.g., rotatably coupled to) a distal end (i.e., the free end furthest from the coupled end) of the first swing arm 1452 at a first rotational joint, such that the first panel capture asset 1502 is operable to rotate in a bi-directional manner in a rotational degree of freedom about an axis Y3, the first rotational joint defining the axis of rotation Y3 of the first panel capture asset 1502. Likewise, the second panel capture asset 1512 can be rotatably supported about (e.g., rotatably coupled to) a distal end of the second swing arm 1462 at a second rotational joint, such that the second panel capture asset 1512 is operable to rotate in a bi-directional manner in a rotational degree of freedom about the axis Y3, the second rotational joint also defining the axis of rotation Y3. The first and second panel capture assets 1502 and 1512 can each comprise an end effector configured and operable to grasp, grip, adhere to, or otherwise secure a lead solar panel within the hopper enclosure 1416, and to allow the lead solar panel to be acquired and retrieved from the hopper enclosure 1416. Indeed, the panel capture assets 1502 and 1512 can comprise at least one of a gripper, a suction asset, an over center linkage assembly (e.g., see FIG. 15M-15N), a tapering channel structure (e.g., see FIG. 15K), opposing biased rollers (e.g., see FIG. 15L), or others. As in the example shown, which is not intended to be limiting in any way, the end effectors each can comprise a suction asset (see suction assets 1504 and 1514), which can comprise passive suction assets, or active suction assets (e.g., "active" meaning that they are associated with an actuatable vacuum source and fluid communication lines to provide selective suctioning upon actuation of the vacuum source). Both of the first and second panel capture assets 1502 and 1512 can each be associated and operable with an actuator (e.g., a motor, a fluid actuator), which can be selectively actuated to cause the first and second panel capture assets 1502 and 1512 to rotate relative to the first and second swing arms 1452 and 1462, respectively. As such, the first and second rotational joints associated with the first and second panel capture assets 1502 and 1512 are active, actuatable joints. Indeed, each of the first and second panel capture assets 1502 and 1512 can be associated with separate or individual actuators 1506 and 1516, respectively, such that each of the first and second panel capture assets 1502 and 1512 can be actuated independent of one another (e.g., different rotational degrees and/or at different rates). In this example, the first and second panel capture assets 1502 and 1512 can be caused to rotate the same number of degrees and at the same rate as one another by coordinating or synching their rotation. Rotating the first and second panel capture assets 1502 and 1512 can function to properly orient an acquired and retrieved lead solar panel as a result of rotation and positioning of the first and second swing arms 1452 and 1462, as well as to alter a pitch of the first and second panel capture assets 1502 and 1512, and particularly the end effectors (in this case suction assets 1504 and 1514 (and any solar panel secured thereby) relative to the hopper enclosure 1416 (and the panel support assembly) as needed or desired. In one aspect, the first and second panel capture assets 1502 and 1512 can be configured to undergo 0-360 degree rotation in either direction. In another aspect, the first and second panel capture assets 1502 and 1512 can be configured to undergo continuous rotation in either direction. The first and second panel capture assets 1502 and 1512 can be configured so as to be spaced apart from one another a given distance, which distance can be greater than a length of a panel mount of a panel retention system along a longitudinal axis of the panel mount (e.g., the length measured between opposing ends located laterally out in opposing directions from the torque tube 8). This can permit the first and second swing arms 1452 and 1462 to rotate about the panel retention systems without the first or second panel capture assets 1502 and 1512 impacting the panel mounts of the panel retention systems. In one example, the first and second panel capture assets 1502 and 1512 can be configured so that they engage the lead solar panel proximate at or near opposing sides of the lead solar panel.

As can be seen, the length of the first and second swing arms 1452 and 1462 as measured from their respective rotational joints along axes Y1 and Y2, which can be the same, to the respective rotational joints of the first and second panel capture assets 1502 and 1512 as rotatably coupled to the first and second swing arms 1452 and 1462 is greater than one half the width of the solar panels 1 along a lateral axis. Stated another way, the distance from an inside surface of the bridge arm 1472 to a longitudinal centerline dividing the lead solar panel into two equal halves is greater than the distance from the longitudinal centerline to a proximate edge of the lead solar panel (the edge closest to the bridge arm 1472) along a longitudinal axis. With the first and second swing arms 1452 and 1462, the bridge arm 1472, and the first and second panel capture assets 1502 and 1512 configured as such, any rotations of the first and second panel capture assets 1502 and 1512 and/or the first and second swing arms 1452 and 1462 will allow an acquired solar panel to always be out of contact with (i.e., avoid contacting or impacting) any of these components during operation of the solar panel dispensing hopper 1414. As such, it can be said that the length of the first and second swing arms 1452 and 1462 can be configured to be sufficient to provide a clearance between the bridge arm 1472 and a proximate edge of the lead solar panel 50 as captured by the first and second panel capture assets 1502 and 1512, thus facilitating rotation of the lead solar panel 50 relative to the swing arms 1452 and 1462 and/or the bridge arm 1472. This will further be apparent from the discussion below of the operation of the solar panel dispensing hopper 1414 to acquire and retrieve or dispense, and install, a lead solar panel.

The solar panel presentation system 1413 can further comprise a control system 1560, one or more power sources 1568, one or more sensors 1570, an automation system 1572, and a communications module 1574. The solar panel dispensing hopper 1414 can be capable of receiving and housing therein one or more solar panels 1 (see plurality of solar panels 1 arranged in a horizontal stack). In one example, the control system 1560, the one or more power sources 1568, the communications module 1574, the one or more sensors 1570, and the automation system 1572 can all be supported on and part of the solar panel dispensing hopper 1414. In another example, these can all be supported on an installation vehicle (e.g., on installation vehicle 1524) operable with the solar panel dispensing hopper 1414. In another example, some of these can be supported on and part of the solar panel dispensing hopper 1414 with the others being supported on and part of the installation vehicle.

The control system 1560 can comprise a swing arm controller 1562 as part of the panel acquisition and placement system 1547, the swing arm controller 1562 being configured to operate and control the first and second swing arms 1452 and 1462 of the solar panel dispensing hopper 1414. In one example, as shown, the swing arm controller 1562 can be operably connected to the actuator 1482, such as a motor, which is operable to power the first and second swing arms 1452 and 1462 as controlled by the swing arm controller 1562. Although not shown, each of the swing arms 1452 and 1462 can be powered and controlled by the same or separate actuators. In the aspect where each of the first and second swing arms 1452 and 1462 are independent of one another, these can be powered and controlled separately from one another, with their respective actuators being operably connected to the swing arm controller 1562. Linking the first and second swing arms 1452 and 1462 together, they can be operated using a single actuator connected to the swing arm controller 1562, where the rotational position and rate of rotation of each are in synch with one another. In either scenario, the swing arm controller 1562 can be configured and operated to provide synchronous driving of each of the first and second swing arms 1452 and 1462.

The control system 1560 can further comprise a bridge arm controller 1564 as part of the panel acquisition and placement system 1547, the bridge arm controller 1564 being configured to operate and control the bridge arm 1472, and specifically the elevation of the bridge arm 1472 (and the first and second swing arms 1452 and 1462 coupled thereto) relative to the installation vehicle (and a panel retention system). In one example, as shown, the bridge arm controller 1564 can be operably connected to the actuator 1496, such as a motor, which is operable to power the lead screw 1494 as controlled by the bridge arm controller 1562. The lead screw 1494 can be actuated to rotate in a bi-directional manner to control the elevation of the bridge arm 1472 (and the first and second swing arms 1452 and 1462 coupled thereto). For example, the bridge arm controller 1564 can control the actuator 1496 to actuate the lead screw 1494 in a first rotational direction (e.g., clockwise) to raise the bridge arm 1472 and the first and second swing arms 1452 and 1462. On the other hand, the bridge arm controller 1564 can control the actuator 1496 to actuate the lead screw 1494 in a second rotational direction (e.g., counter-clockwise) to lower the bridge arm 1472 and the first and second swing arms 1452 and 1462.

The control system 1560 can further comprise a panel capture asset controller 1566 as part of the panel acquisition and placement system 1547, the panel capture asset controller 1566 being configured to operate and control the first and second panel capture assets 1502 and 1512, and specifically the rotation of these (and any lead solar panel captured thereby). In one example, as shown, the panel capture asset controller 1566 can be operably connected to the actuators 1506 and 1516, such as motors, which are operable to power the rotation of the first and second panel capture assets 1502 and 1512, respectively. Actuation of the actuators 1506 and 1516 can be coordinated to control a position and/or orientation of the lead solar panel, for instance, a pitch of the lead solar panel relative to a panel retention system into which the lead solar panel is being installed. In one aspect, the first and second panel capture assets 1502 and 1512 can be actuated in synch with one another. In another aspect, one or both of the first and second panel capture assets 1502 and 1512 can be actuated independent of the other.

Although motors were provided in the above examples for the actuators of the solar panel presentation system 1414, this is not meant to be limiting in any way. Indeed, in another aspect, the first and second swings arms 1452 and 1462, the bridge arm 1472, and the first and second panel capture assets 1502 and 1512 can be operably connected to and actuated using a fluid actuator system, such as a hydraulic or pneumatic actuator system comprising the fluid types of actuators that are operable with one or more valves and a fluid delivery system comprising a pressure source for supplying pressurized fluid to each of the actuators. The fluid actuator system can be configured to actuate the actuators to facilitate the acquisition and installing of the solar panels.

The control system 1560 can further comprise one or more processors and memory operable to facilitate processing and storage of data and to facilitate the overall functionality of the control system 1560. Indeed, the control system 1560 can comprise, or otherwise be operable with, one or more processors and one or more memory devices operatively coupled to at least one of the one or more processors and having instructions stored thereon that, when executed by at least one of the one or more processors, cause the components or elements of the solar panel dispensing hopper 1414 and/or the solar power presentation system 1413 described herein to perform one or more tasks related to the installation of the solar panels 1 into the panel retention systems 38 of the panel support assembly 2.

The solar panel presentation system 1413 can further comprise one or more power sources 1568 configured to supply power to the solar panel dispensing hopper 1414 and its various components, systems, subsystems. The control system 1560 can further be operably connected to the power source 1568 to facilitate control and operation of the power source 1568. In one example, the power source 1568 can be on-board the solar panel dispensing hopper 1414, such as a plurality of batteries. In another example, the power source 1568 can be located away from or external to the solar panel dispensing hopper 1414, but operably connected to the solar panel dispensing hopper 1414 using an umbilical compris-ing a power distribution line configured to carry power from the power source to the solar panel dispensing hopper 1414 as controlled by the control system 1560. For instance, the solar panel dispensing hopper 1414 can be operably connected to a power source on the installation vehicle 1524 in support of the solar panel dispensing hopper 1414, and thus the solar panel dispensing hopper 1414 can obtain its power from the installation vehicle 1524.

The solar panel presentation system 1413 can further comprise one or more sensors 1570 configured to collect and gather information related to the solar panel dispensing hopper 1414, the installation vehicle (e.g., installation vehicle 1524) in support of the solar panel dispensing hopper 1414, the installation process, the panel support assembly 2, and others. The control system 1560 can be operably connected with the one or more sensors 1570 that are part of or otherwise operable with the solar panel dispensing hopper 1414. The sensor(s) 1570 can comprise a variety of types, and can be deployed in a variety of locations. The sensor(s) can be part of an automation system 1572 that facilitates partial or fully automated installation of the solar panels 1 into the panel support assembly 2. One or more sensors 1570 can further be associated with the first and second swing arms 1452 and 1462, the bridge arm 1472, the first and second panel capture assets 1502 and 1512, the various actuators controlling these (see actuators 1482, 1496, 1506, 1516), other actuators within the solar panel dispensing hopper 1414, the hopper enclosure 1416, the support frame 1446, or any other aspect of the solar panel dispensing hopper 1414 or its operating environment. Essentially, it is contemplated that one or more sensors 1570 can be deployed to be associates with any of the components, devices, systems of the solar panel dispensing hopper 1414 and/or the solar panel presentation system 1413, the operating environment of the solar panel dispensing hopper 1414, as well as the solar panels 1 themselves.

The solar panel presentation system 1413 can further comprise a computer automation system 1572 that is operable to facilitate at least partial, or fully automated installation of the solar panels 1 into the panel support assembly 2. The control system 1560 can be operably connected with the computer automation system 1572 that is part of or otherwise operable with the solar panel presentation system 1413 in support of the solar panel dispensing hopper 1414. The computer automation system 1572 can comprise a number of automation assets 1573A and/or 1573B. These can include sensors, such as one or more of the sensors 1570, or other sensors and/or devices, that facilitate partial or fully automated installation of the solar panels 1 into the panel support assembly 2. In addition, the sensors of the computer automation system 1572 can comprise a number of different types. For example, the types of sensors that can be utilized in the computer automation system 1572 include, but are not limited to imaging sensors (e.g., cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, and/or a structured light sensor, or any combination of these).

While some of the sensors of the automation system 1572 discussed herein are identified as imaging sensors (e.g., cameras), it is to be understood that any of these can be sensors of any type and may be used to accomplish vision or other types of sensing by the solar panel presentation system 1513. For example, the cameras/sensors can provide fluorescence imaging, hyperspectral imaging, or multispectral imaging. Furthermore, some of the sensors can be audio sensors (e.g., microphones, sonar, audio positioning sensors or others), chemical sensors, electromagnetic radiation sensors (e.g. antennas with signal conditioning electronics), magnetometers (single axis and multi-axis magnetometer) and radars. In short, any sensor, imager, recorder, or other device, and any combination of these, can be used in the configuration of the sensors 270 described herein. The computer automation system 1572 can further comprise automation assets in the form of one or more emitters, such as ultrasonic emitters, to assist in locating certain objects.

One or more computer automation assets or fiducials 1573A and/or 1573B, as part of the computer automation system 1572, can be attached to the solar panel dispensing hopper 1414 at any location. The automation assets 1573A and/or 1573B can comprise the computer automation system sensors and/or devices discussed above (e.g., an imaging system comprising one or more imaging sensors, such as one or more cameras), or any other types of sensors and/or other types of devices. The computer automation assets 1573A and 1573B can gather and provide information, such as visual, audio or other information, to the control system 1560. The control system 1560 can utilize the information to assist the solar panel dispensing hopper 1414 in any number of automated tasks. For example, the automation system 1572 can be used to identify and locate in three-dimensional space the panel support assembly 2 and its various components. The automation system 1572 can further be configured to facilitate the proper acquiring, dispensing or retrieving, positioning, and/or orienting of the solar panels 1 from the solar panel dispensing hopper 1414 by locating and comparing the position and orientation of the solar panels 1 to be dispensed relative to the position and orientation of the solar panel retention system 38 of the panel support assembly 2 into which the lead solar panel 50 is to be installed. Of course, this is not intended to be limiting in any way as those skilled in the art will recognize that the automation system 1572 can be configured to perform a number of different functions related to facilitating the automated dispensing and installing of the solar panels 1 into the panel support assembly 2.

In one example, the computer automation system 1572 can comprise one or more processors and memory for executing software code capable of facilitating the function of the automation system 1572. Alternatively, the automation system 1572 can be operably connected with the control system 1560 having one or more processors and memory or a top-level control system (e.g., see top-level control system 113 of FIG. 1) having one or more processors and memory, or both.

The solar panel presentation system 1413 can further comprise a communications module 1574 operable to transmit and receive data, such as command signals from the control system 1560. The communications module 1574 can comprise a wireless system, or a combination of wired and wireless systems. The control system 1560 can be operably connected to the communications module 1574 that is part of or otherwise operable with the solar panel dispensing hopper 1414. The control system 1560 can utilize the communications module 1574 to transmit and receive data from the various components, devices, systems operating within the solar panel presentation system 1413 using known protocols.

It is noted that the control system 1560, with each of the individual controllers, 1562, 1564, and 1566, respectively, and the processor(s)/memory 1567, can be a standalone control system within the solar panel dispensing hopper 1414 and/or the solar panel presentation system 1413. In this example, the control system 1560 can also be operably connected to a top-level control system (e.g., see top-level control system 112 of the solar panel installation system 110 of FIG. 1). Alternatively, the control system 1560 can be an integral part of a top-level control system of the solar panel installation system (see top-level control system 112 of the solar panel installation system 110 of FIG. 1).

With reference to FIGS. 17A-17D, in operation, the solar panel dispensing hopper 1414 can be operable with the example installation vehicle 1524, and these can be located and positioned atop the panel support assembly 2 in a similar manner as discussed herein so as to locate the solar panel dispensing hopper 1414 in an overhead position above and spanning the torque tube 8, thus facilitating overhead installation of a lead solar panel 50 into a panel retention system 38. With the plurality of solar panels loaded and contained within the hopper enclosure 1416, the installation vehicle 1524 can ride along the torque tube 8 on top of the panel mount assemblies 30 to locate the solar panel dispensing hopper 1414 at an installation site defined by a panel retention system, such as the panel retention system 38 shown (see FIG. 17B). Once in this position, the panel acquisition and placement system 1447 of the solar panel dispensing hopper 1414 can be actuated to engage or interface with a lead solar panel 50 by actuating at least one of the translation of the bridge arm 1472, the rotation of the first and second swing arms 1452 and 1462, or the rotation of the first and second panel capture assets 1502 and 1512. Upon acquiring the lead solar panel 50, the swing arms 1452 and 1462 can be rotated to lift and retrieve the lead solar panel 50 from the remaining solar panel stack within the hopper enclosure 1416 (see FIG. 17 C). Actuated movement of the bridge arm 1472, actuated rotation of the first and second swing arms 1452 and 1462, and/or actuated rotation of the first and second panel capture assets 1502 and 1512 can be coordinated to bring the lead solar panel 50 into a position and orientation, or in other words an installation position, with respect to the one or more panel mount assemblies 30 of the panel retention system 38 (see FIG. 17D). Further actuation of the bridge arm 1472, the first and second swing 1452 and 1462, and/or the first and second panel capture assets 1502 and 1512 can be coordinated to transition the lead solar panel 50 from the installation position to a final installed position within the panel retention system 38. Movement of the installation vehicle 1524 can also be used in conjunction with the panel acquisition and placement system 1447 to place the lead solar panel 50 in the installed position. In the example shown, and with the specific configuration of the panel mount assemblies 30 in which these are configured to flex or displace, the panel acquisition and placement system 1447 can be controlled to install the lead solar panel 50 directly into the panel retention system 38 by applying a downward force on the lead solar panel 50 sufficient to cause the lead solar panel 50 to displace one or both of the panel mount assemblies 30, wherein the lead solar panel 50 is caused to be seated and retained within the panel retention system 38. Of course, other types of panel mount assemblies can be used, which may require the panel acquisition and placement system 1447 to undergo different movements of one or more of the bridge arm 1472, the first and second swing 1452 and 1462, and/or the first and second panel capture assets 1502 and 1512. For example, the lead solar panel 50 may be manipulated to be oriented on an incline (i.e., pitched forward or backward) to cause a first side to be inserted first within a first panel mount assembly followed by rotation of the lead solar panel 50 to cause a second side of the solar panel 50 to be subsequently inserted within a second panel mount assembly 30 (e.g., see the panel mount assembly of FIGS. 10A-10C and the associated discussion regarding the orientation and manipulation of the solar panel to be installed therein). It is noted that in this example, the lead solar panel 50 comprises a frameless type of solar panel (as discussed above and shown in FIG. 2A) that is contained within the hopper enclosure 1416 in an upright orientation, meaning that the working surface or face (i.e., the surface made operable to facilitate the gathering of solar energy and to face upward in the installed position) of the lead solar panel 50 is facing upward. In this orientation, the first and second panel capture assets 1502 and 1512 engage and interface with the working surface or face of the lead solar panel 50. Moreover, the actuation of the first and second swing arms 1452 and 1462, as well as the first and second panel capture assets 1502 and 1512, can be coordinated to maintain the working surface or face of the lead solar panel 50 in the upright position from retrieval from the hopper enclosure 1416 to installation within the panel retention system 38. This is made possible due to the sizing and configuration of the first and second swing arms 1452 and 1462 to provide a clearance for the lead solar panel 50, as well as the engaging of the lead solar panel 50 by the first and second panel capture assets 1502 and 1512 proximate the edges of the lead solar panel 50.

Figures 17B, 17C:
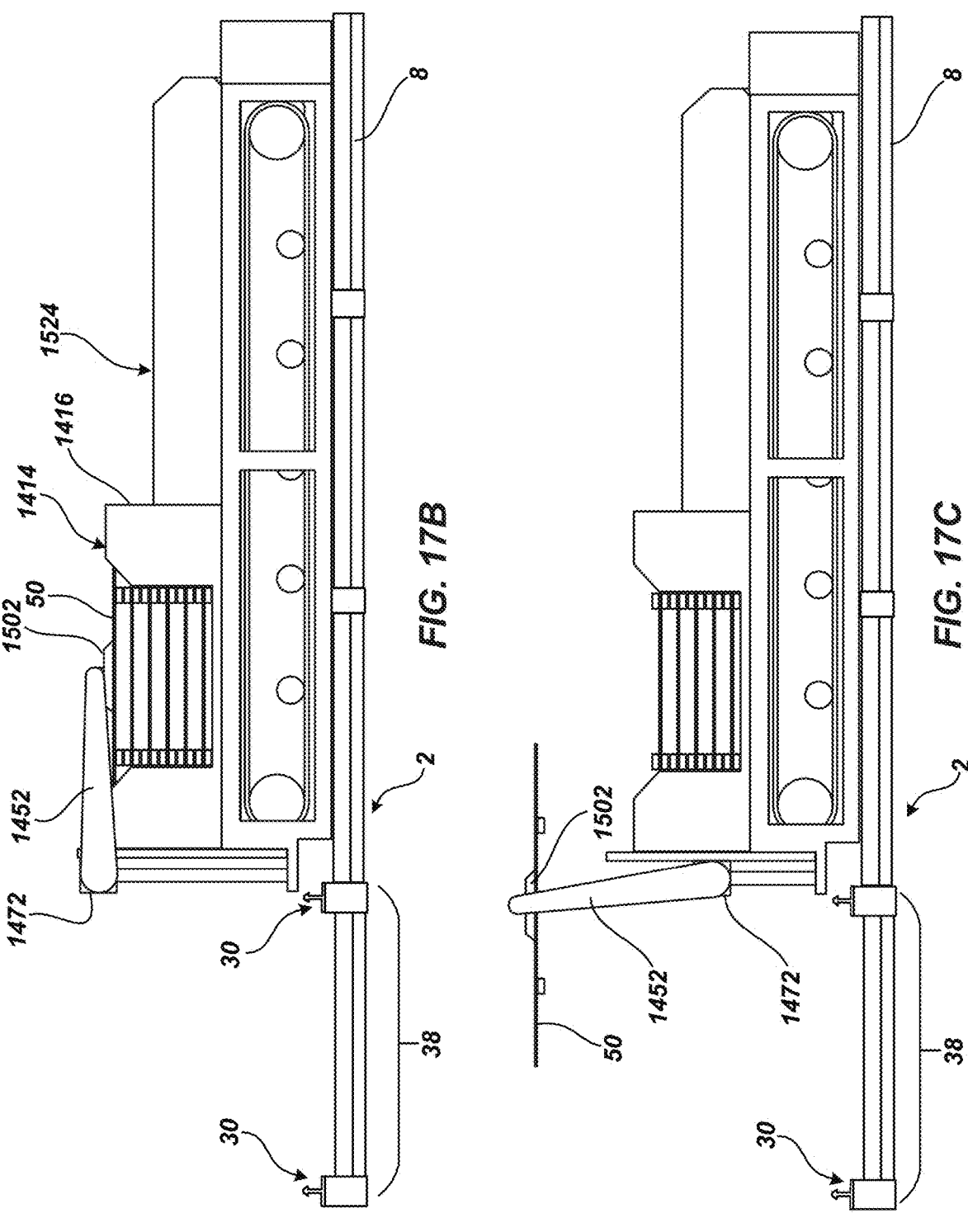
Figure 17D:
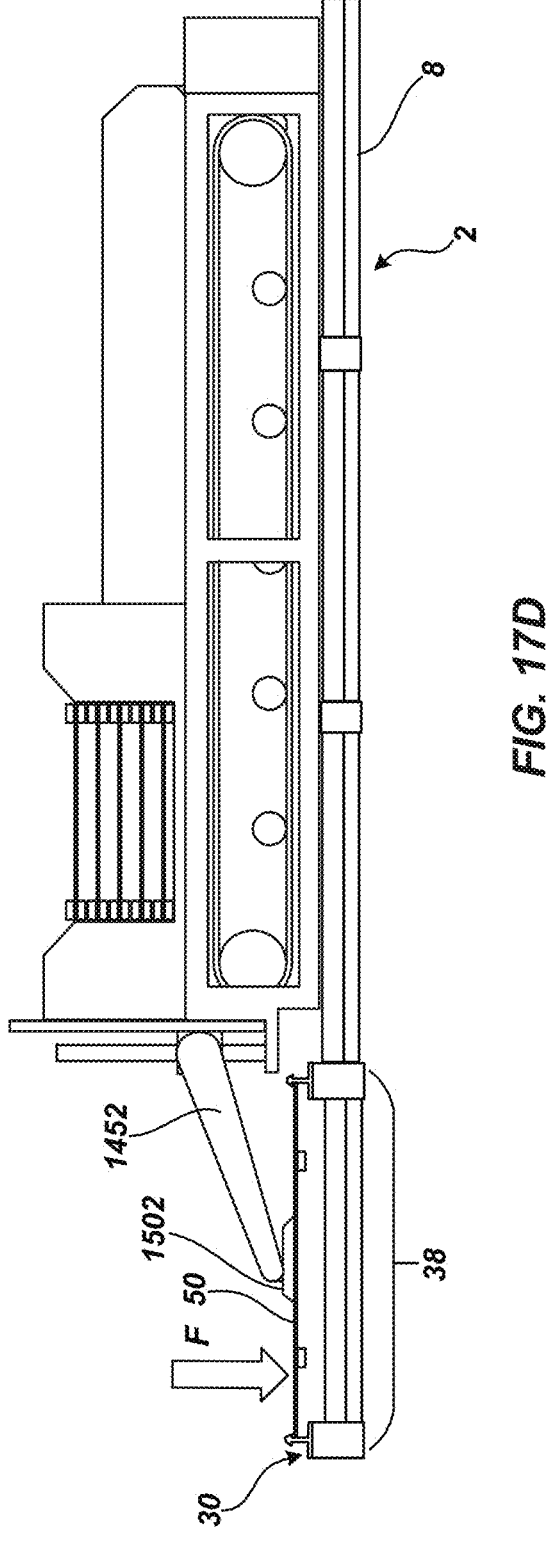
Figure 17E:
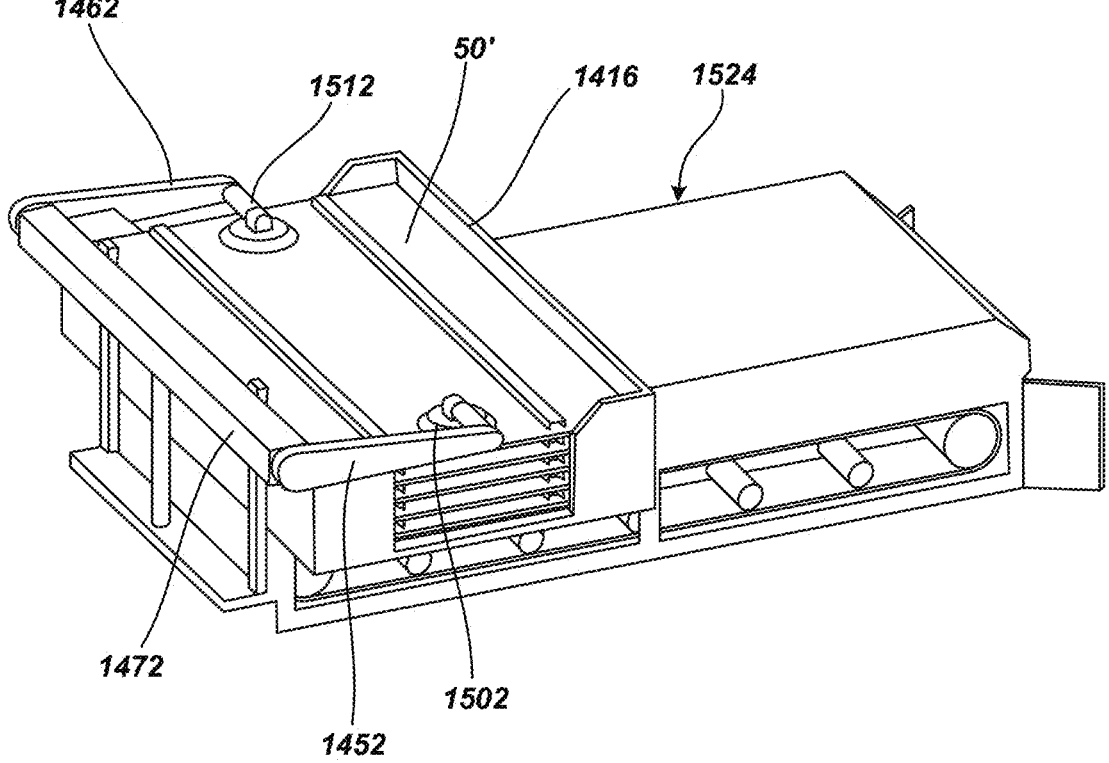
Figures 17F, 17G:
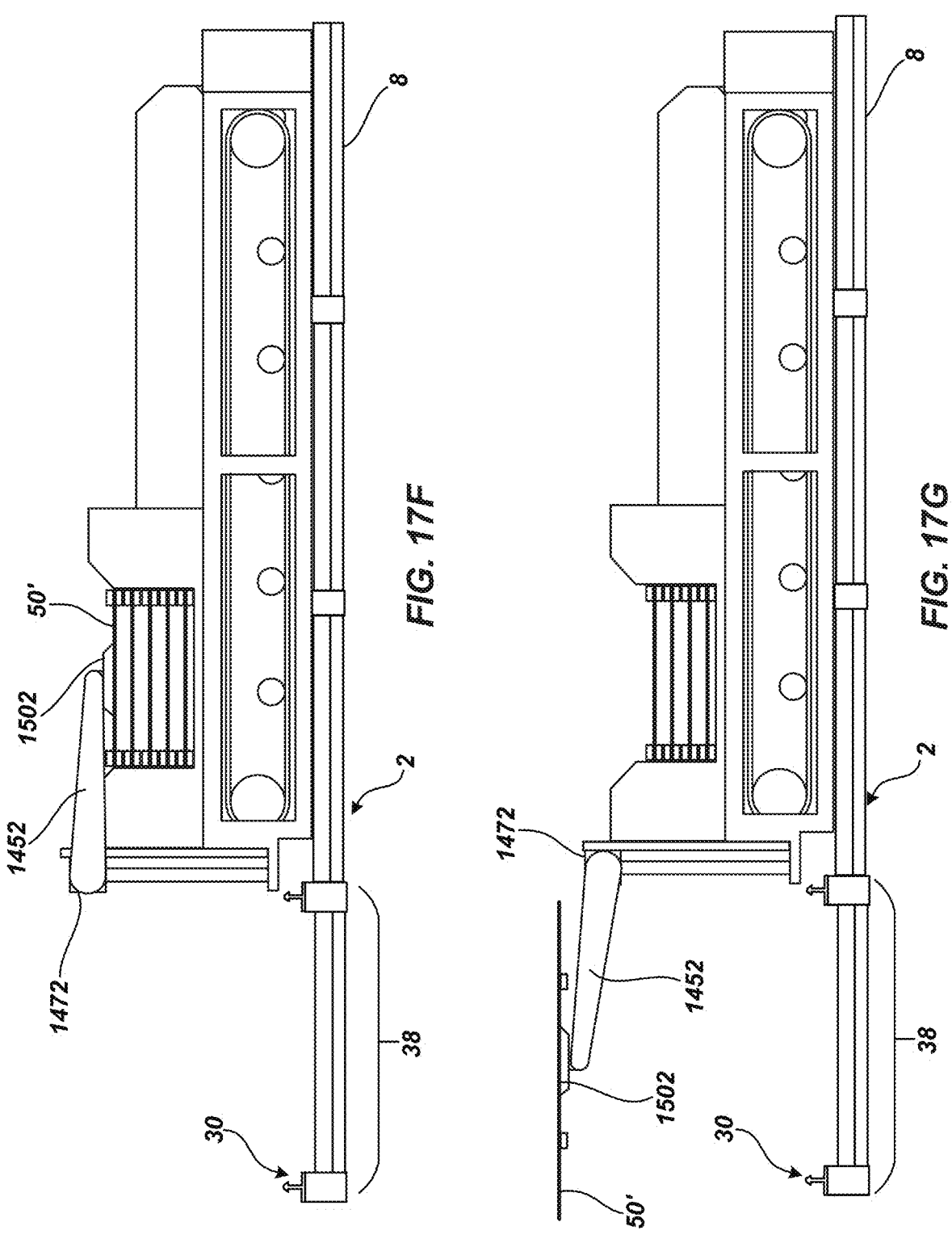
Figure 17H:
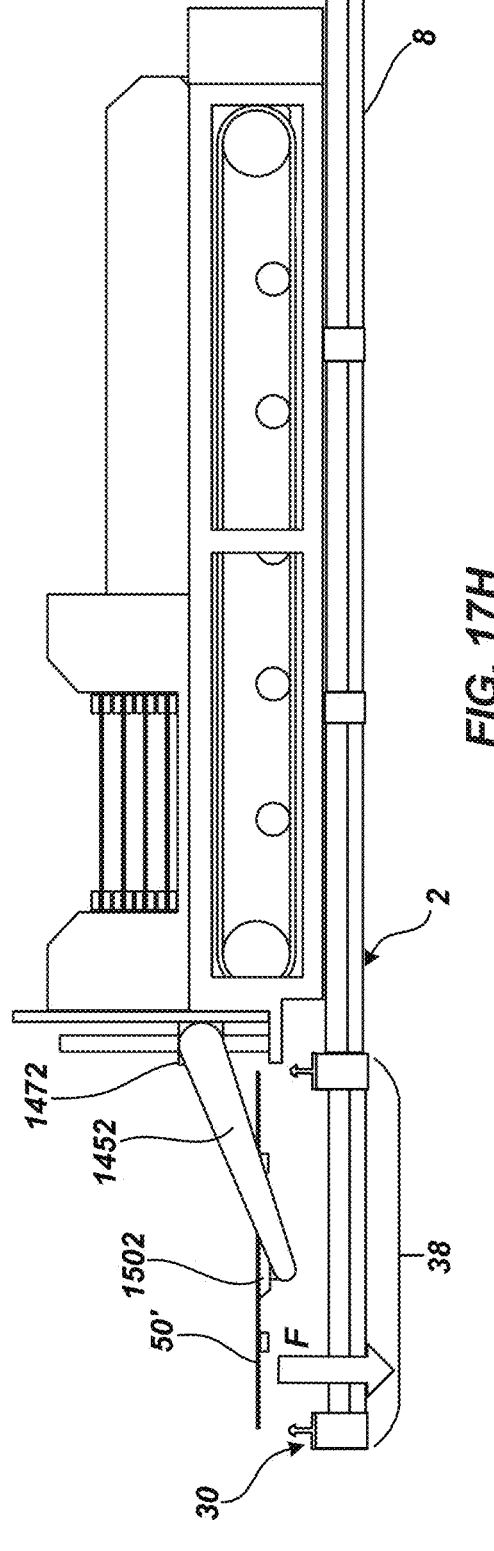
Figure 17I:
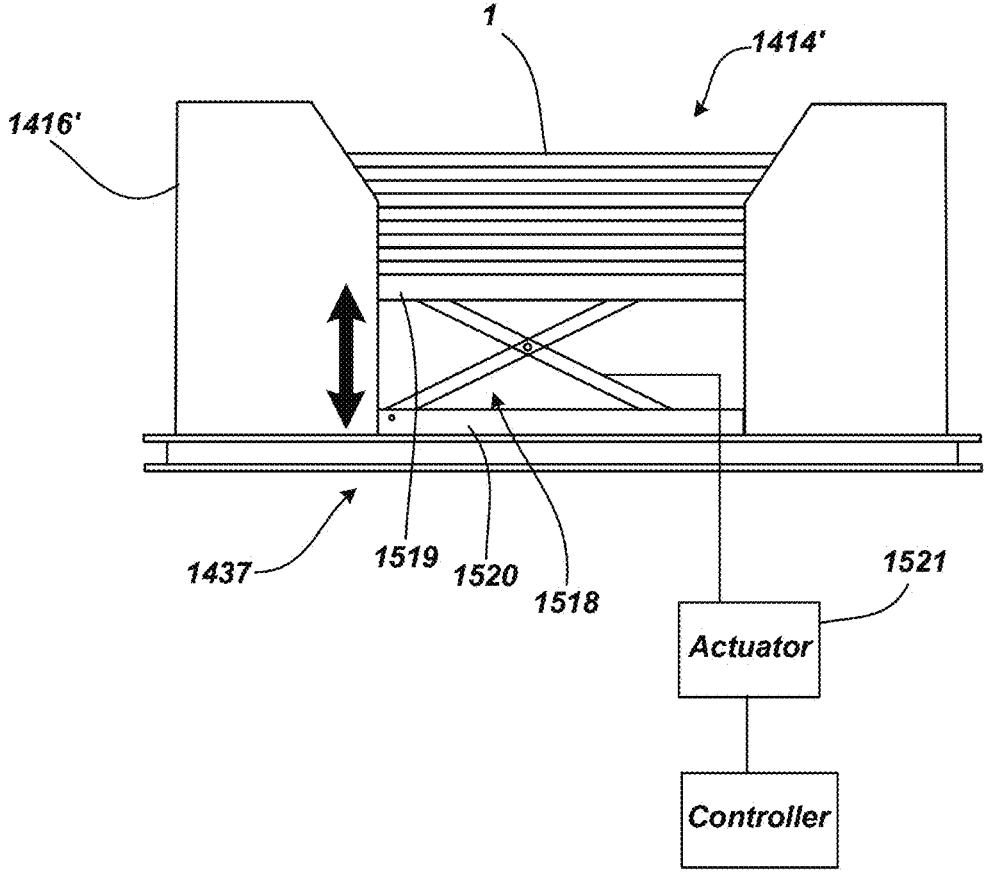

With reference to FIGS. 17A and 17E-17H, it is noted that the next lead solar panel 50' after the lead solar panel 50 in FIGS. 17B-17D has been retrieved and installed is upside down within the hopper enclosure 1416. In other words, the working surface of the now lead solar panel 50' is contained within the hopper enclosure 1416 with its working surface or face facing downward, and with its non-working surface facing upward. In this situation, the panel acquisition and placement system 1447 can be operated in a similar manner as discussed above to initially engage and acquire the lead solar panel 50' (see FIG. 17F). However, once acquired, the first and second swing arms 1452 and 1462 (and if necessary the first and second panel capture assets 1502 and 1512) can be actuated to retrieve the lead solar panel 50' from the hopper enclosure 1416. Once retrieved from the hopper enclosure 1416, the first and second swing arms 1452 and 1462 and/or the first and second panel capture assets 1502 and 1512) can be actuated to cause the lead solar panel 50' to be rotated to an upright position (i.e., to a position with the working surface facing upwards). In one aspect, this can be achieved by holding the panel capture assets 1502 and 1512 in a fixed rotational position and then rotating the first and second swing arms 1452 and 1462. In another aspect, this can be achieved by first rotating the first and second swing arms 1452 and 1462 to move the lead solar panel to a position away from the hopper enclosure 1416 and then rotating the first and second panel capture assets 1502 and 1512 until the working surface faces upwards. In another aspect, actuation of the first and second swing arms 1452 and 1462 and the first and second panel capture assets 1502 and 1512 can be coordinated to achieve this. Once the lead solar panel 50' is in a position with its working surface facing upward, the bridge arm 1472, the first and second swing 1452 and 1462, and/or the first and second panel capture assets 1502 and 1512 can be actuated to bring the lead solar panel 50' into an installation position proximate the panel retention system 38 (see FIG. 17H). Further actuation of the bridge arm 1472, the first and second swing 1452 and 1462, and/or the first and second panel capture assets 1502 and 1512 can be coordinated to transition the lead solar panel 50' from the installation position to a final installed position within the panel retention system 38. Movement of the installation vehicle 1524 can also be used in conjunction with the panel acquisition and placement system 1447 to place the lead solar panel 50' in the installed position. In the example shown, and with the specific configuration of the panel mount assemblies 30 in which these are configured to flex or displace, the panel acquisition and placement system 1447 can be controlled to install the lead solar panel 50' directly into the panel retention system 38 by applying a downward force on the lead solar panel 50 sufficient to cause the lead solar panel 50' to displace the panel mount assemblies 30 at the same time, wherein the lead solar panel 50' is caused to be seated and retained within the panel retention system 38. It is noted that in this example, the panel capture assets 1502 and 1512 are secured to the non-working side of the lead solar panel 50'. Thus, with the lead solar panel 50' rotated to place its working surface upright, the downward force applied to the lead solar panel 50' by the panel acquisition and placement system 1447 is accomplished by pulling downward on the lead solar panel 50' rather than pushing on it as in the example of FIGS. 17B-17D. The above acquisition and retrieval methods can be repeated depending upon the orientation of the lead solar panel within the hopper enclosure 1416.

It is noted that the solar panel presentation system 1414 is shown as being supported by and operable with the chassis 1542 of the installation vehicle 1524, which is similar to the installation vehicle 1024 of FIGS. 15A-15J, but without the panel acquisition and installation system 1160. However, this is not intended to be limiting in any way. Indeed, it is contemplated that the solar panel dispensing hopper 1414 can be used with any of the installation vehicles, any of the torque tube spanning bridging support members, and/or any of the multi-degree of freedom platforms/stages discussed herein as part of and to provide a solar panel installation system. For example, the solar panel dispensing hopper 1414 can be operable with the torque tube spanning bridging support member 612 as carried by the installation vehicles 324A and 324B of FIG. 13A-13J; the solar panel dispensing hopper 1414 can be operable with the multi-degree of freedom platform/stage, such as the dynamic base 510 of FIGS. 12A-12D; the solar panel dispensing hopper 1414 can be operable with the installation vehicle 824 of FIGS. 14A-14D; the solar panel dispensing hopper 1414 can be operable with the installation vehicle 1024 of FIGS. 15A-15O; the solar panel dispensing hopper 1414 can be operable with the installation vehicle 1024' of FIGS. 16A-16C; or any combination of an installation vehicle and a multi-degree of freedom platform/stage. Those skilled in the art will recognize that the configurations of the installation vehicles, the torque tube spanning bridging support members, and/or the multi-degree of freedom platforms/stages may need to be altered from the configurations shown herein in order to facilitate the proper support and functionality of the solar panel dispensing hopper 1414 (e.g., to provide the necessary clearance for the rotation and translational movement of the first and second swing arms 1452 and 1462) as it is different in form and function from the solar panel dispensing hopper 214 of FIGS. 3-5D. Nonetheless, such alternative configurations of these is contemplated herein and within the scope of the present technology.

It is further noted herein that the dispensing system 1436 comprising the panel acquisition and placement system 1447 can be entirely supported on and can be a part of the installation vehicle rather than part of a hopper. In this example, the hopper containing the solar panels would not comprise or be associated with any kind of panel acquisition and placement system. In one aspect the hopper can comprise a panel feed system, or in another aspect it can be simply an enclosure without any kind of moving parts or components. To illustrate this, it is contemplated that a modified version of the installation vehicle 1024 of FIGS. 15B-15O can be configured to comprise the panel acquisition and placement system 1447 discussed above and shown in FIGS. 17A-17H. In this example, rather than the elevation support platform 1492 being a part of a solar panel dispensing hopper (as the solar panel dispensing hopper 1414), the elevation support platform 1492 would be a part of a modified chassis 1042 of the modified installation vehicle 1024. In this example, the modified installation vehicle 1024 would also not comprise the panel acquisition and installation system 1160 as this would not be necessary or needed, and as this would be replaced by the panel acquisition and placement system 1447 of FIGS. 17A-17I.

With reference to FIGS. 18A-18K, illustrated is a solar panel installation system in accordance with an example of the present disclosure. The solar panel installation system 1810 is operable to install a plurality of solar panels within a panel support assembly 2 from an overhead position in accordance with an example of the present disclosure for the purpose of providing a working solar tracking system. In this example, the solar panel installation system 1810 can facilitate manual installation of the solar panels, or partially or fully automated installation of solar panels depending on the specific configuration of the solar panel installation system 1810. The panel support assembly 2 shown in this example comprises a type used in a solar tracking system. The panel support assembly 2 can comprise one or more ground supports 4 that are securely anchored to the ground or another surface or structure. In this example, the ground supports 4 are shown as posts anchored within the ground, but this is not intended to be limiting in any way. The panel support assembly 2 can further comprise a torque tube 8 that is rotationally supported by the ground supports 4, such that the torque tube 8 can rotate relative to the ground supports 4 and the ground. In one example, the torque tube 8 can be rotatably coupled to the ground supports 4 using bearings 6 that facilitate the rotation of the torque tube 8 relative to the ground supports 4. The panel support assembly 2 can further comprise or otherwise be operable with one or more drive mechanisms 12 operable with one or more motors or actuators 16, respectively, that function to drive the rotation of the torque tube 8. The panel support assembly 2 can further comprise or otherwise be operable with a solar tracking system control 20 that functions to control operation of the solar tracking system and its components.

The panel support assembly 2 can further comprise or be in support of a plurality of solar panel retention systems 38, each comprising one or more panel mount assemblies 30, configured in a manner as taught herein so as to facilitate overhead installation of solar panels from a solar panel dispensing hopper of a solar panel presentation system. The panel mount assemblies 30 can each comprise a torque tube clamp 34 that is clamped or otherwise coupled to the torque tube 8 and that is operable with a panel mount 36. In the example shown, each panel retention system 38 comprises two (first and second) panel mount assemblies 30, each panel mount assembly 30 being operable to receive and retain a respective side of one or more solar panels, such as taught herein.

FIGS. 18A-18H illustrate one specific example of the solar panel installation system 1810. In this example, the solar panel installation system 1810 can comprise a support clamp installation vehicle 1814 sized and configured to receive and carry a plurality of torque tube clamps 9 therein, wherein the installation vehicle 1824 facilitates overhead installation of the plurality of torque tube clamps 9 onto the torque tube 8 of the panel support assembly 2, which torque tube clamps 9 can each be in support of a solar panel mount, these forming a panel mount assembly operable to receive and support one or more solar panels. The support clamp installation vehicle 1814 can comprise a chassis 1816 sized and configured to span the torque tube 8, and to provide direct or indirect structural support to the various components, elements, systems, mechanisms, etc. of the installation vehicle 1814, and any other components or systems operable with or within these (e.g., batteries). The chassis 1816 can comprise a number of different sizes, shapes and configurations. In one example, the chassis 1816 can comprise a framework or frame-like structural configuration, wherein a number of different structural elements or components are coupled with one another to make up the chassis 1816. In another example, the chassis 1816 can comprise a housing or other more solid structural configuration.

The support clamp installation vehicle 1814 can further comprise a hopper 1826 operable to receive and carry therein one or more torque tube clamps 9. The hopper 1826 can be sized and configured to receive and carry any number and configuration of torque tube clamps 9. In one example, the hopper 1826 can be a separate component that is removably coupled to the chassis 1816, meaning that the hopper 1826 can be coupled/uncoupled to/from the chassis 1816 of the installation vehicle 1814. Securing means, such as fasteners, straps, brackets, and others can be used to secure the hopper 1826 to the installation vehicle 1814, and particularly to the chassis 1816. In another example, the hopper 1826 can be integrally formed with the chassis 1816. For example, the chassis 1816 can comprise a recess or bay formed therein sized and configured to receive and contain one or more torque tube clamps 9 therein. In any case, the hopper 1826 can further comprise an exit opening 1830 through which the torque tube clamps 9 can be actively dispensed from the hopper 1826. In one example, the exit opening 1830 can be formed in a bottom or lower surface of the hopper 1826, wherein a lead torque tube clamp 11 of the plurality of torque tube clamps 9 can be dispensed from the bottom of the hopper 1826. If needed, the chassis 1816 of the installation vehicle 1814 can further comprise a clearance aligned with the exit opening 1830 of the hopper to facilitate top-down installation of the torque tube clamps, the clearance being sized and configured to facilitate passage of the torque tube clamps therethrough. In one example, the clearance can comprise an opening defined by one or more structural elements of the chassis 1816. In another example, the clearance can comprise a portion of the chassis 1816 defining a void or devoid of structure.

The support clamp installation vehicle 1814 can further comprise a drive system 1840 supported by the chassis 1816 and comprising one or more frames 1844 and a torque tube interfacing assembly 1848 supported by the one or more frames 1844, the torque tube interfacing assembly 1848 being operable to interface with and engage the torque tube 8, and to facilitate locomotion of the installation vehicle 1814 on the torque tube 8. In other words, the torque tube interfacing assembly 1848 can enable the installation vehicle 1814 to engage, or interface with, and ride on the torque tube 8. The one or more frames 1844 can be separate structures extending from and supported by the chassis 1816. Alternatively, the one or more frames 1844 can be a part of and integrally formed with the chassis 1816. The drive system 1840 can comprise any of the components, systems, mechanisms, and computer control necessary for the installation vehicle 1814 to drive, turn or steer, and to otherwise move about the torque tube 8. The drive system 1840 can be operable with one or more actuators and/or power sources (e.g., batteries and one or more electric motors, a gas internal combustion engine, a liquid petroleum gas (LPG) engine, a hydrogen fuel cell engine, or any combination of these), and can comprise various types of torque tube interfacing assemblies (e.g., comprising wheels, endless tracks, or any combination of these), any type of drivetrain or other systems or mechanisms operable to facilitate the power source being able to actuate and power the torque tube interfacing assemblies, as well as other systems, devices, components (e.g., a transmission).

In one example, the drive system 1840 can comprise a wheel-based system, wherein the torque tube interfacing assembly 1848 comprises a first lateral wheel assembly 1852 supported by a first frame 1844A, the first lateral wheel assembly 1852 comprising one or more wheels (e.g., see wheels 1856A, 1856B, 1856C, and 1856D). At least one of the one or more wheels can comprise a drive wheel associated with an actuator of the drive system 1840 and a power source, wherein the drive wheel is actuatable to power and drive the locomotion of the installation vehicle 1814. The torque tube interfacing assembly 1848 can further comprise a second lateral wheel assembly 1872 supported by a second frame 1844B, the second lateral wheel assembly 1872 comprising one or more wheels (e.g., see wheels 1876A, 1876B, 1876C, and 1876D). At least one of the one or more wheels of the second lateral wheel assembly 1872 can comprise a drive wheel associated with an actuator of the drive system 1840 and a power source, wherein the drive wheel is actuatable to power and drive the locomotion of the installation vehicle 1814. The first and second lateral wheel assemblies 1852 and 1872 can be supported by their respective first and second frames 1844A and 1844B in a position so as to be offset from one another along a lateral axis Y1. The first lateral wheel assembly 1852 can be configured to be supported about a first side of the installation vehicle 1814, such that the first lateral wheel assembly 1852 is positioned and configured to engage a first side of the torque tube 8. The second lateral wheel assembly 1872 can be configured to be supported about a second side of the installation vehicle 1814, such that the second lateral wheel assembly 1872 is positioned and configured to engage a second side of the torque tube 8 (see FIG. 18E). The torque tube 8 shown comprises an octagon cross-sectional shape. However, this is not intended to be limiting in any way. Indeed, the torque tube 8 can comprise any cross-sectional shape, such as round, square, rectangular, or others. In the example shown, the first and second lateral wheel assemblies 1852 and 1872 are configured to engage and to ride along opposing surfaces of the torque tube 8. The distance that the first and second lateral wheel assemblies 1852 and 1872 are supported offset from one another can depend upon the size of the torque tube, and can correspond to the distance between opposing surfaces of the torque tube 8. For example, a distance between the inner surfaces of the wheels of each of the first and second lateral wheel assemblies 1852 and 1872 can be the same or less than the distance between opposing outer surfaces of the torque tube 8 upon which the respective wheels of the first and second lateral wheel assemblies 1852 and 1872 contact and travel.

The first lateral wheel assembly 1852 can further comprise one or more links, each being moveably coupled to the first frame 1844A in at least one degree of freedom and each operable to rotatably couple to and support a wheel of the one or more wheels of the first lateral wheel assembly 1852, such that each respective wheel of the first lateral wheel assembly 1852, as coupled to a link of the one or more links, is both rotatable relative to the link and the first frame 1844A, as well as pivotable relative to the frame 1844A. For example, the first lateral wheel assembly 1852 can comprise a first link 1862A rotatably coupled to the first frame 1844A such that it is rotatable relative to the first frame 1844A in a rotational degree of freedom about a rotational axis. The first link 1862A can also be rotatably coupled to the first wheel 1856A, such that the first wheel 1856A is rotatable relative to the first link 1862A in a rotational degree of freedom about a rotational axis. The first link 1862A can comprise a length so as to offset the rotational axis of the wheel relative to the first link 1862A from the rotational axis of the first link 1862A relative to the first frame 1844A. The first link 1862A can be configured to rotate laterally away from the first frame 1844A, and thus laterally away from the surface of the torque tube 8 with the installation vehicle 1814 on and engaging the torque tube 8. The first lateral wheel assembly 1852 can further comprise a first biasing member (e.g., a spring, such as a torsional spring) 1866A supported between the first link 1862A and the first frame 1844A the first biasing member 1866A being operable to store and release energy upon the movement of the first link 1862A relative to the first frame 1844A. The first biasing member 1866A can be sized and configured to apply a biasing force to the first link 1862A and the first wheel 1856A in a direction inward, or towards the chassis 1816. The first biasing member 1866A can further function to bias the first wheel 1856A against the torque tube 8 upon the installation vehicle 1814 being placed on the torque tube 8. Although only the first link 1862A as associated with the first wheel 1856A is discussed, it is noted that the first lateral wheel assembly 1852 can comprise a number of links supported from the first frame 1844A, each link being associated with a respective wheel, with these being configured to function in the same way as the first link 1862A and the first wheel 1856A.

The second lateral wheel assembly 1872 can further comprise one or more links, each being moveably coupled to the second frame 1844B in at least one degree of freedom and each operable to rotatably couple to and support a wheel of the one or more wheels of the second lateral wheel assembly 1872, such that each respective wheel of the second lateral wheel assembly 1852B, as coupled to a link of the one or more links, is both rotatable relative to the link and the second frame 1844B, as well as pivotable relative to the second frame 1844B. For example, the second lateral wheel assembly 1872 can comprise a first link 1882A rotatably coupled to the second frame 1844B such that it is rotatable relative to the second frame 1844B in a rotational degree of freedom about a rotational axis. The first link 1882A can also be rotatably coupled to the first wheel 1876A, such that the first wheel 1876A is rotatable relative to the first link 1882A in a rotational degree of freedom about a rotational axis. The first link 1882A can comprise a length so as to offset the rotational axis of the wheel relative to the first link 1882A from the rotational axis of the first link 1882A relative to the second frame 1844B. The first link 1882A can be configured to rotate laterally away from the second frame 1844B, and thus laterally away from the surface of the torque tube 8 with the installation vehicle 1814 on and engaging the torque tube 8. The second lateral wheel assembly 1872 can further comprise a biasing member (e.g., a spring, such as a torsional spring) 1886A supported between the first link 1882A and the second frame 1844B, the biasing member 1886A being operable to store and release energy upon the movement of the first link 1882A relative to the second frame 1844B. The biasing member 1886A can be sized and configured to apply a biasing force to the first link 1882A and the first wheel 1876A in a direction inward, or towards the chassis 1816. The biasing member 1866A can further function to bias the first wheel 1876A against the torque tube 8 upon the installation vehicle 1814 being placed on the torque tube 8. Although only the first link 1882A as associated with the first wheel 1876A is discussed, it is noted that the second lateral wheel assembly 1872 can comprise a number of links supported from the second frame 1844B, each link being associated with a respective wheel, with these being configured to function in the same way as the first link 1882A and the first wheel 1876A.

The torque tube interfacing assembly 1848 can further comprise an upper wheel assembly 1892 supported by at least one of the first or second frames 1848A or 1848B, or by the chassis 1816. The upper wheel assembly 1892 can comprise one or more wheels (e.g., see wheels 1896A, 1896B, 1896C, and 1896D) rotatably coupled to at least one of the first or second frames 1848A or 1848B, or the chassis 1816. At least one of the one or more wheels can comprise a drive wheel associated with an actuator of the drive system 1840 and a power source, wherein the drive wheel is actuatable to power and drive the locomotion of the installation vehicle 1814. The upper wheel assembly 1892 can be configured to engage and ride along an uppermost surface of the torque tube 8, and to support much of the weight of the installation vehicle 1814 on the torque tube 8. The upper wheel assembly 1892 can further comprise a plurality of couplings (e.g., axles, brackets, or others), each associated with a respective wheel, and each operable to rotatably couple a respective wheel to at least one of the first or second frames 1848A or 1848B, or by the chassis 1816. For example, as shown, the wheel 1896A can be rotatably coupled to the first and second frames 1844A and 1844B via an axle 1898A. The axle 1898A itself is also moveably coupled to the first and second frames 1844A and 1844B, such that the axle 1898A is able to move relative to the first and second frames 1844A and 1844B (and/or the chassis 1816) in bi-directional manner. In one example, the first and second frames 1844A and 1844B can each comprise a slot (see, for example, slot 1902A) formed therein for receiving opposing ends of the axle 1898A, wherein the axle 1898A moves in a translational degree of freedom relative to the first and second frames 1844A and 1844B along an axis Z1. One or more biasing members (e.g., see biasing member 1906A) can be associated with wheel 1896A and supported between the wheel 1896A and the first and second frames 1844A and 1844B, wherein the biasing member 1906A is operable to exert a biasing force on the wheel 1896A in the direction away from the chassis 1816 (and towards the torque tube 8 with the installation vehicle placed upon the torque tube 8). In this case, two separate and individual biasing members can be used, these being supported on different sides of the wheel 1896A, namely a first biasing member 1906A1 between the wheel and the first frame 1844A and a second biasing member 1906A2 between the wheel 1896A and the second frame 1844B (see FIG. 18F). Although not discussed in detail, each of the remaining wheels 1896B-1896D can comprise the same or a similar assembly, and can be configured and can function in the same or a similar manner as the wheel 1896A and its assembly.

Figure 18A:
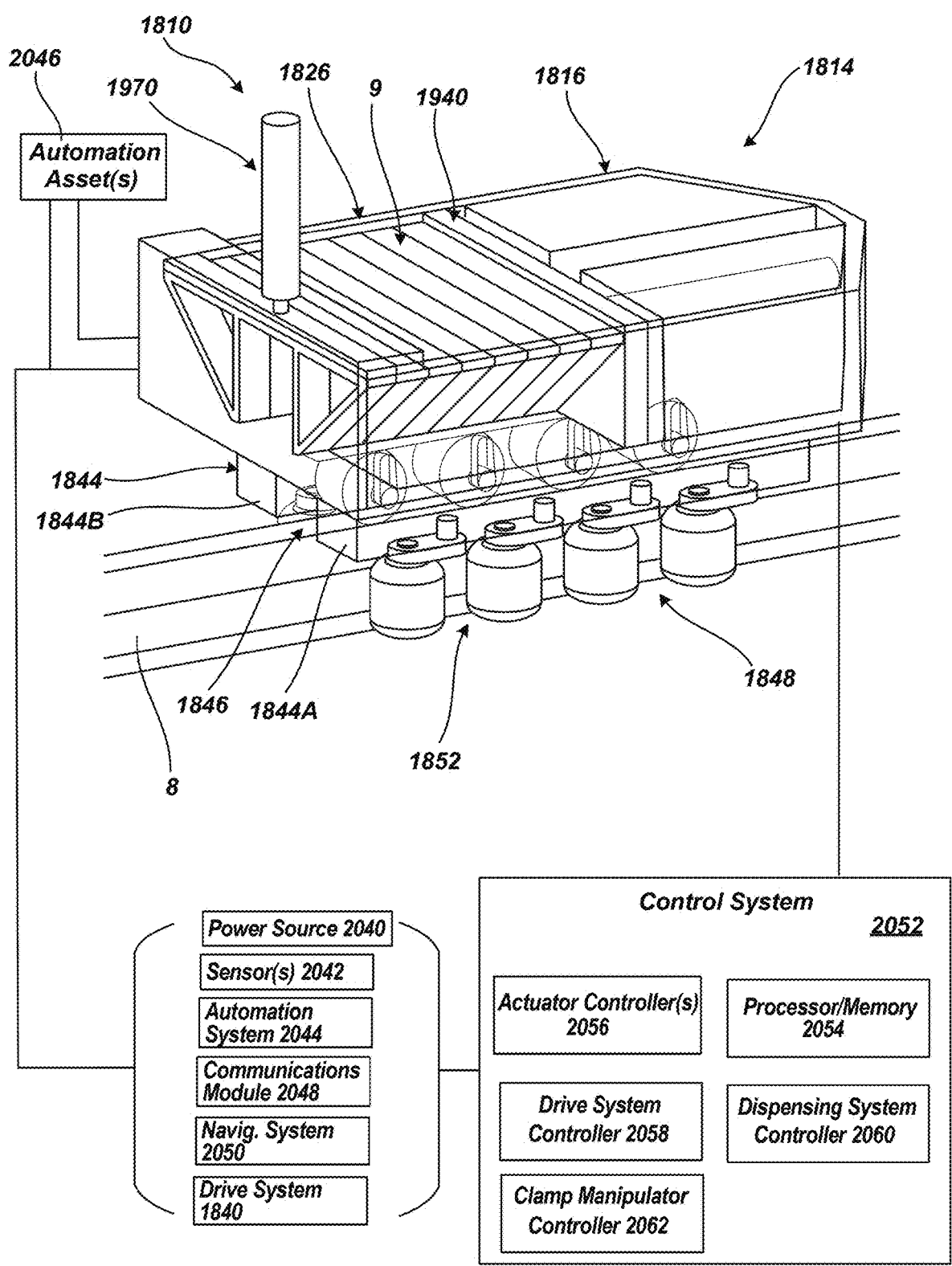
Figures 18C, 18D:
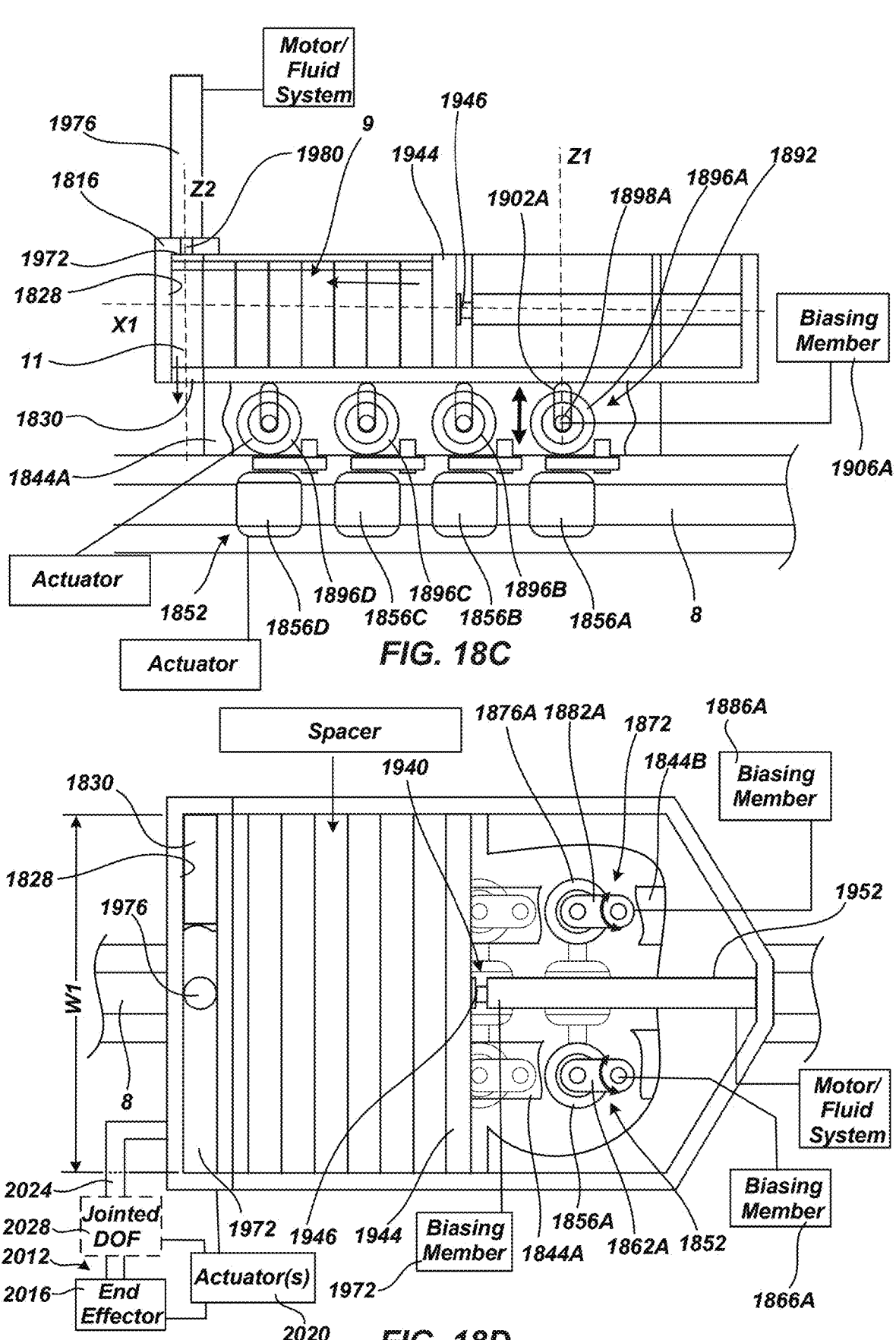
Figure 18G:
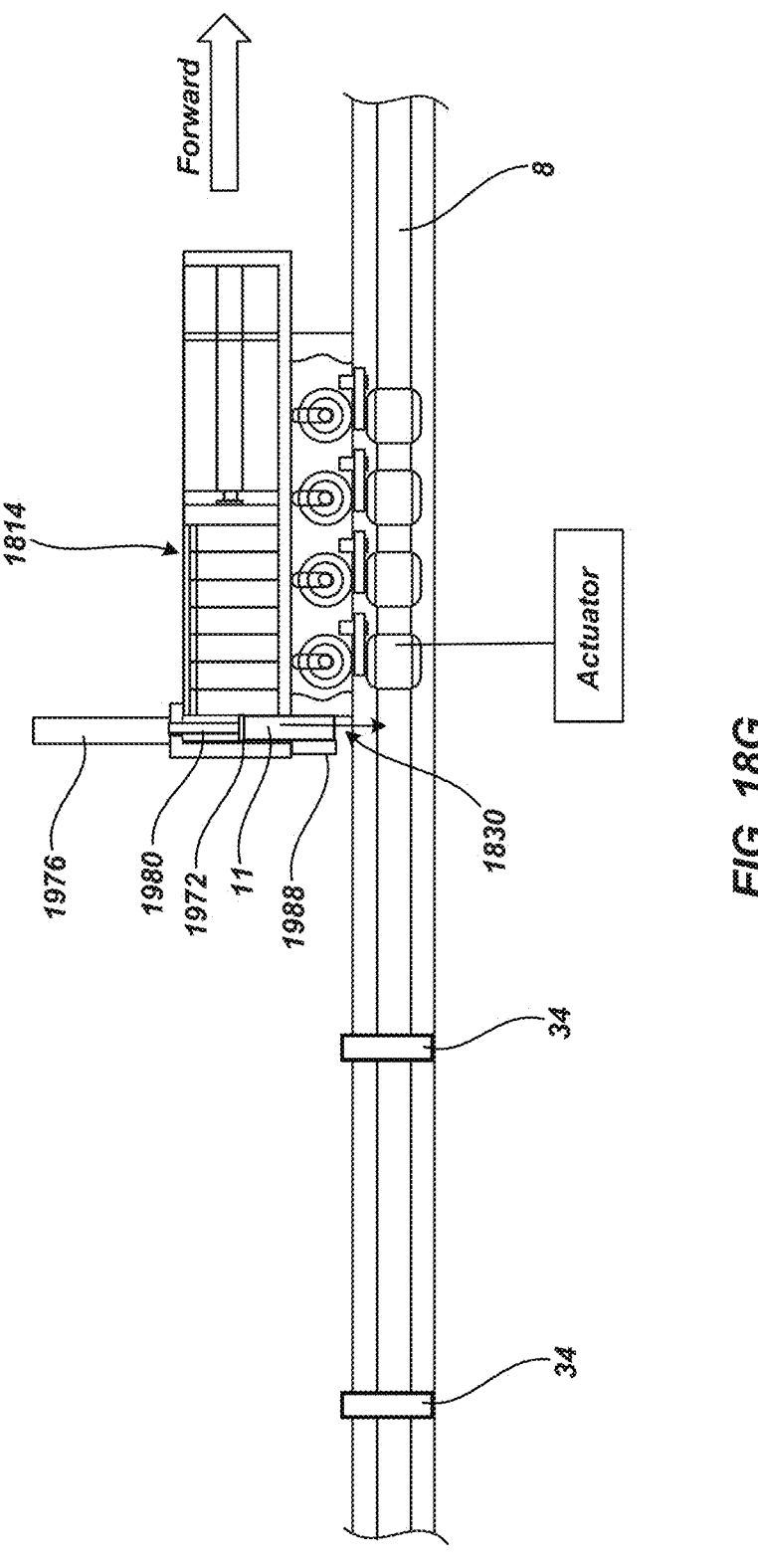
Figure 18H:
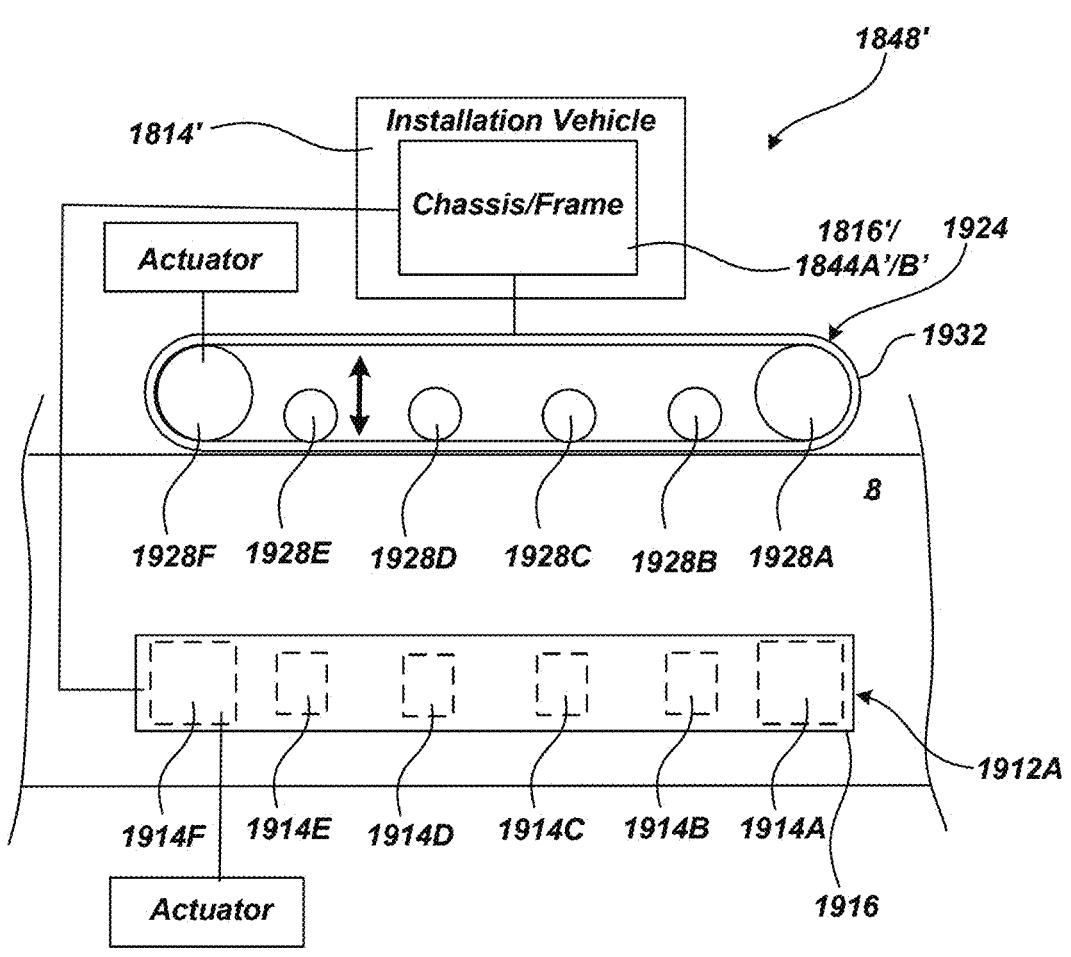
Figure 18I:
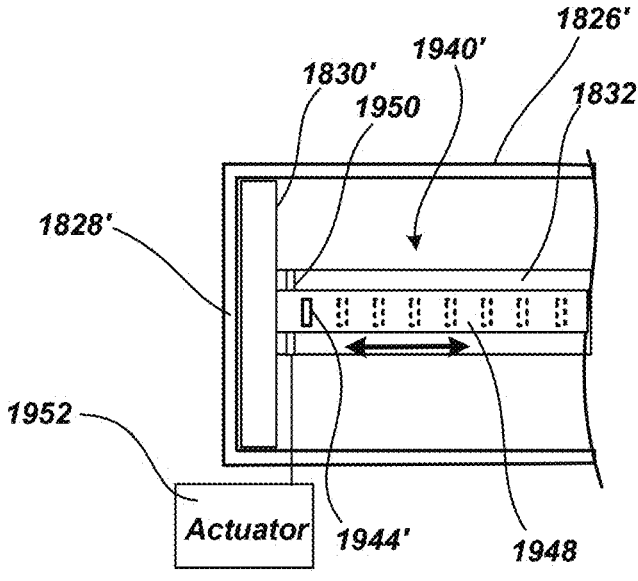
Figure 18J:
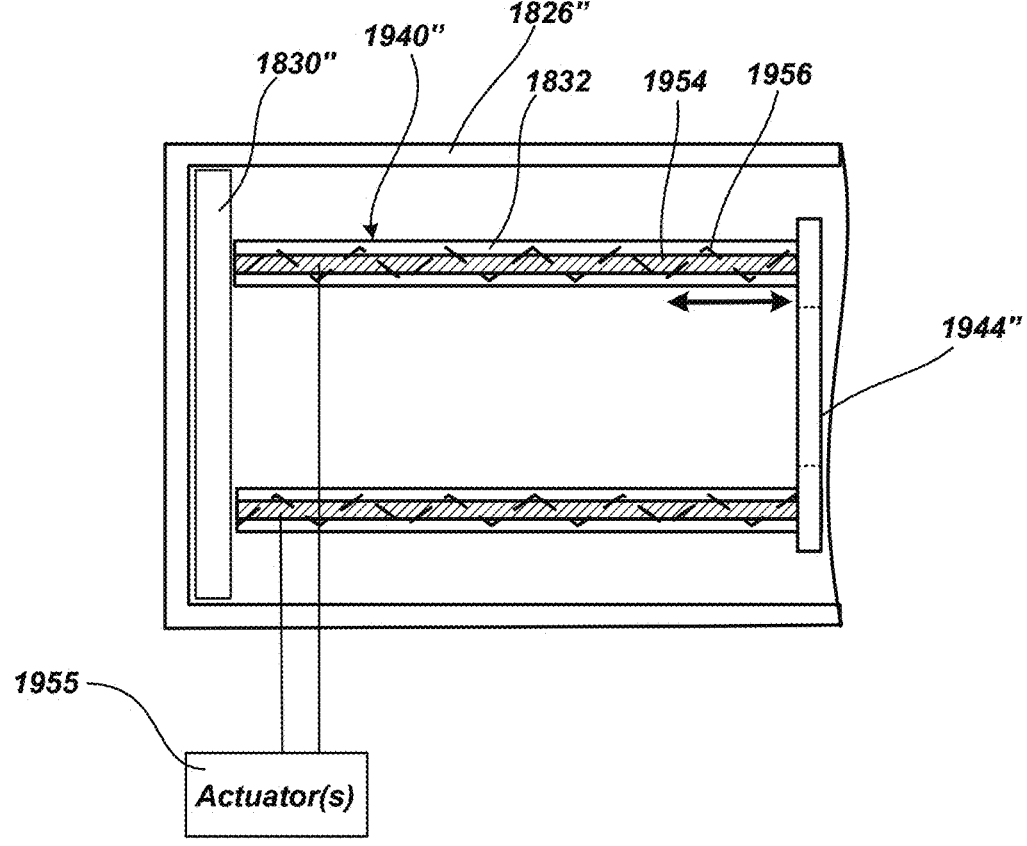
Figure 18K:
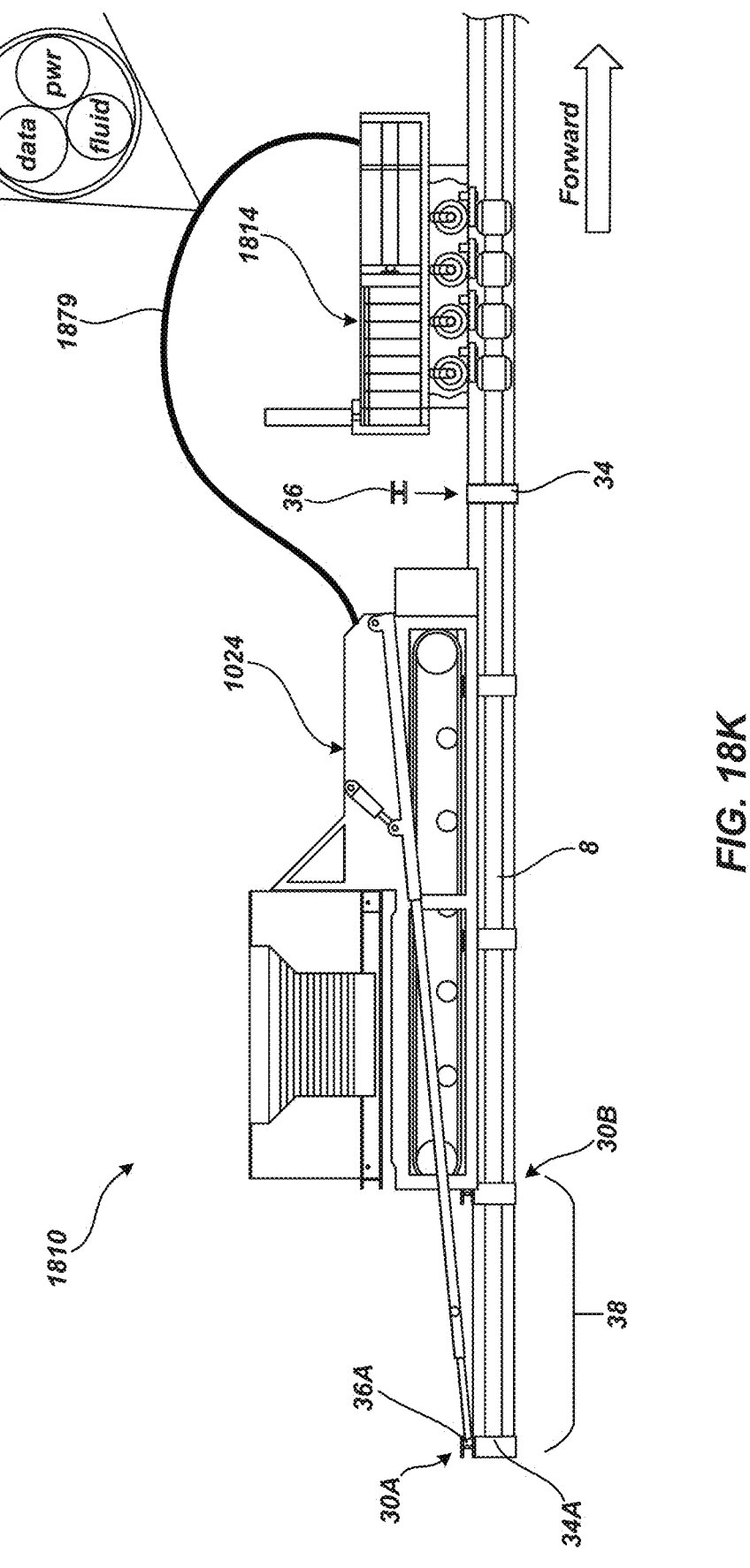

The installation vehicle 1814 can further comprise a channel 1846 formed by the chassis 1816 and the first and second frames 1844A and 1844B (see FIGS. 18A and 18E). The channel 1846 can extend in a direction along a longitudinal axis of the installation vehicle 1814. The upper wheel assembly 1892 can be supported within the channel 1846, and the channel 1846 can be sized and configured such that the one or more wheels of the upper wheel assembly 1892 are able to move within the channel 1846. As indicated above, the first and second frames 1844A and 1844B can be separate from and extend down from the chassis 1816, or the frames 1844A and 1844B can be part of and integrally formed with the chassis 1816. In any event, the frames 1844A and 1844B can be configured to provide a channel 1846 within which the upper wheel assembly 1892 can be supported and operate. Each of the first and second frames 1844A and 1844B can comprise a slot formed on their respective inside surfaces (the surfaces facing and defining, at least in part, the channel 1846) (e.g., see slot 1902A formed in the second frame 1844B).

In another example, rather than a wheel-based assembly, the drive system 1840 can comprise an endless track system, wherein the torque tube interfacing assembly 1848' comprises a first lateral endless track assembly, a second lateral endless track assembly, and an upper endless track assembly. For example, as shown, the torque tube interfacing assembly 1848' can comprise a first lateral endless track assembly 1912A and a similarly configured second lateral endless track assembly (not shown, but configured in the same manner as the first lateral endless track assembly 1912A), and an upper endless track assembly 1924 (see FIG. 18H), each supported by at least one of the first frame 1844A, the second frame 1844B or the chassis 1816. The first lateral endless track assembly 1912A can comprise one or more wheels or wheel assemblies (e.g., see wheels 1914A, 1914B, 1914C, 1914D, 1914E, and 1914F), which can comprise a drive wheel assembly, an idler wheel assembly, and one or more support wheel assemblies) and an endless track 1916 supported by and operable with the one or more wheels. At least one of the one or more wheels can comprise a drive wheel associated with an actuator of the drive system 1840 and a power source, wherein the drive wheel is actuatable to power and drive the endless track 1916 and the locomotion of the installation vehicle 1814. The torque tube interfacing assembly 1848 can further comprise a second lateral endless track assembly (not shown) supported by the second frame 1844B. The second lateral endless track assembly can be configured the same as the first lateral endless track assembly 1912A, and is thus not described in detail herein. The first and second lateral endless track assemblies can be supported by their respective first and second frames 1844A and 1844B (or by the chassis 1816) in a position so as to be offset from one another along a lateral axis the same as the first and second lateral wheel assemblies described above. The first lateral endless track assembly 1912A can be configured to be supported about a first side of the installation vehicle 1814, such that the first lateral endless track assembly 1912A is positioned and configured to engage a first side of the torque tube 8. The second lateral endless track assembly can be configured to be supported about a second side of the installation vehicle, such that the second lateral endless track assembly is positioned and configured to engage a second side of the torque tube 8 (in a manner similar to the first and second lateral wheel assemblies of the torque tube interfacing assembly 1848 discussed above). At least some of the wheels of the first and second endless track assemblies can be moveably supported by the first and second frames 1844A and 1844B, and operable to move relative to these so as to be able to displace in a degree of freedom upon encountering a support member (e.g., a bearing 6) of the torque tube 8 similar to the first and second wheel assemblies of the wheel-based torque tube interfacing assembly 1848 discussed above.

The torque tube interfacing assembly 1848 can further comprise an upper endless track assembly 1924 supported by at least one of the first or second frames 1848A' or 1848B', or by the chassis 1816'. The upper endless track assembly 1924 can comprise one or more wheels or wheel assemblies (e.g., see wheels 1928A, 1928B, 1928C, 1928D, 1928E, and 1928F), which can comprise a drive wheel assembly, an idler wheel assembly, and one or more support wheel assemblies) and an endless track 1932. At least one of the one or more wheels can comprise a drive wheel associated with an actuator of the drive system 1840 and a power source, wherein the drive wheel is actuatable to power and drive the endless track 1916 and the locomotion of the installation vehicle 1814. The upper endless track assembly 1924 can be configured to be supported below the chassis 1816', such that the upper endless track assembly 1924 is positioned and configured to engage an uppermost surface of the torque tube 8 (in a manner similar to the upper wheel assembly of the torque tube interfacing assembly 1848 discussed above). At least some of the wheels of the upper endless track assembly 1924 can be moveably supported by the first and second frames 1844A and 1844B, and operable to move relative to these so as to be able to displace in a degree of freedom upon encountering a support member (e.g., a bearing 6) of the torque tube 8 similar to the upper endless track assembly of the wheel-based torque tube interfacing assembly 1848 discussed above. Biasing members can also be associated with each of the one or more wheels of the first and second lateral endless track assemblies and the upper endless track assembly to bias the wheels toward the torque tube 8 with the installation vehicle 1814' placed upon the torque tube 8.

The first and second lateral wheel/endless track assemblies and the upper wheel/endless track assembly can be configured to enable the installation vehicle 1814 to travel on the torque tube 8, and to pass over a structural member in support of the torque tube 8, such as the various bearings 6 in support of and rotatably coupled to the torque tube 8 (e.g., see bearing 6 in FIG. 18B). Each of the link and wheel assemblies in each of the first and second lateral wheel/endless track assemblies and the upper wheel/endless track assembly can be configured to move (e.g., rotate, pivot, translate) in at least one degree of freedom relative to their respective first or second frames 1844A and 1844B independent of one another, such that as each comes into contact with and traverses across or over a bearing 6 as the installation vehicle 1814 advances along the torque tube 8 the link and the wheel operate to move (e.g., rotate, pivot, translate) (e.g., in a direction away from the torque tube 8), thus accommodating the temporary increase in elevation of the structural surface along the torque tube 8 (e.g., an increase in the distance between opposing surfaces with which the first and second lateral wheel/endless track assemblies are in contact, or a decrease in the distance between a surface part of or associated with the torque tube 8 with which the upper wheel/endless track assembly is in contact and a portion of the chassis 1816 of the installation vehicle 1814 above the upper wheel/endless track assembly). In other words, the various structural members (e.g., the bearings 6) in support of the torque tube 8 can create a bump or protruding surface along the torque tube 8 that the first and second lateral wheel/endless track assemblies and the upper wheel/endless track assembly are to accommodate and pass over. By being independent of one another, the remaining link and wheel assemblies that are not in contact with a bearing 6 can remain engaged (directly with wheels, or indirectly with an endless track) with the outer surface of the torque tube 8. Upon encountering and initially contacting a bearing, each link and wheel assembly can move outward away from the torque tube 8, wherein the biasing member associated with the link stores energy. As the wheel and link assembly passes over and ultimately leaves the bearing 6, the biasing member can release energy by inducing movement of the link in the opposing direction toward the torque tube 8, thus causing the wheel to return to contact with the surface of the torque tube 8 once the wheel clears the surface of the bearing 6.

Each wheel of the first and second lateral wheel assemblies 1852 and 1872 and the upper wheel assembly 1892 can be made of a material having a sufficient coefficient of friction to enable the wheels to grip the surface of the torque tube 8. In one example, the wheels can be made of a compliant polymer material. In one example, one or more wheels of each of the first and second lateral wheel assemblies 1852 and 1872 and the upper wheel assembly 1892 can comprise one or more magnets, or be made of a magnetized material, such that they are configured with magnetic properties that enable them to be magnetically attracted to the torque tube 8, thus enhancing the interface connection between the first and second lateral wheel assemblies 1852 and 1872 and the torque tube 8, as well as that of the upper wheel assembly 1892 and the torque tube 8. Likewise, the endless tracks of the first and second lateral endless track assemblies and the upper endless track assembly (see for example first lateral endless track assembly 1912A and the upper endless track assembly 1924) can be made of a compliant material, or in another example, can comprise one or more magnets, or itself be made of a plurality of interconnecting members, at least some of which are made of a magnetized material.

As indicated above, the drive system 1840 of the support clamp installation vehicle 1814 can be operable to facilitate support and locomotion of the installation vehicle 1814 on the torque tube 8 itself. As such, the drive system 1840 can enable the installation vehicle 1814 to engage, be supported on, and to drive on and along the torque tube 8. Specifically, the drive system 1840 can comprise any components, elements, and/or systems that operate to support the support clamp installation vehicle 1814, namely the chassis 1816 and the hopper 1826 (as well as any torque tube clamps 9 within the hopper 1826), in an overhead position above the torque tube 8, as well as to facilitate controlled locomotion of the support clamp installation vehicle 1814 along the torque tube 8, particularly as the torque tube interfacing assembly engages and interfaces with the surfaces of the torque tube 8, therefore facilitating the support clamp installation vehicle 1814 to be supported on and to ride on (e.g., atop) the torque tube 8. With the lateral wheel or endless track systems being biased towards the torque tube 8, and with these working together with the upper wheel or endless track assembly, which bears much of the weight of the installation vehicle 1814, the torque tube interfacing assembly 1848 (or 1848') can contact the torque tube 8 along multiple longitudinal axes and/or planes, wherein the torque tube interfacing assembly is operable to exert a plurality of radially inward forces on the torque tube 8 in different directions originating from the points of contact of the torque tube interfacing assembly with the torque tube 8 (e.g., see radial forces F2, F2, and F3 in FIG. 18E). In other words, the torque tube interfacing assembly is configured to essentially squeeze the torque tube 8 as the installation vehicle 1814 is placed upon and travels along the torque tube 8. This can also aid in the actual installation of a lead torque tube clamp onto the torque tube 8 as the forces required to install the torque tube clamp can be countered by those exerted on the torque tube 8 by the installation vehicle 1814, thus stabilizing the installation vehicle 1814 during the clamp installation process.

The support clamp installation vehicle 1814 can further comprise a clamp dispensing system operable to dispense one or more torque tube clamps 9 from the hopper 1826 of the installation vehicle 1814, and seat the torque tube clamps 9 onto the torque tube 8. Depending upon the type of torque tube clamp, the dispensing system itself can be configured to fully install the torque tube clamps 9 onto the torque tube 8 without further manipulation of the torque tube clamps 9. The clamp dispensing system can comprise a clamp feed system 1940 operable to advance the one or more clamps 9 within the hopper 1826 towards the exit opening 1830 of the hopper 1826 initially, or upon a lead torque tube clamp 11 being dispensed and installed onto the torque tube 8. In one example, as shown, the clamp feed system 1940 can comprise a clamp interface member 1944 slidably supported within the hopper 1826, wherein the clamp interface member 1944 can move back and forth (bi-directionally) within the hopper 1826 along an axis X1. The clamp interface member 1944 can be sized and configured to be in contact with a trailing torque tube clamp, and to provide support to the one or more torque tube clamps so as to maintain these in a proper position and orientation within the hopper 1826. In one example, the clamp interface member 1944 can comprise a plate or plate-like configuration. The clamp feed system 1940 can further comprise an actuator 1952 supported by the chassis 1816 and operable to exert a force on the clamp interface member 1944, such as via a plunger 1946, to cause the clamp interface member 1944 to move within the hopper 1826, thereby advancing the one or more torque tube clamps 9 within the hopper 1826 and in contact with the clamp interface member 1944 in a direction towards the exit opening 1830 of the hopper 1826. The hopper 1826 can comprise a stopper placed adjacent the exit opening 1830 in a location so as to cause the lead torque tube clamp 11 to be advanced and stopped in a position over the exit opening 1830, wherein the clamp placement system can then be actuated to exert a force and act upon the lead torque tube clamp to cause the lead torque tube clamp 11 to be moved through the exit opening 1830 onto the torque tube 8. Indeed, the clamp feed system 1949 can be configured to locate a lead torque tube clamp 11 in a position so that it can be aligned with the exit opening 1830 and subsequently acted upon by the clamp placement system to dispense the lead torque tube clamp 11 from the hopper 2826. In one example, as shown, the stopper can comprise a sidewall 1828 of the hopper 1826, and the exit opening 1830 can be located just below the sidewall 1828, such as at an intersection of the sidewall 1826 and a plane defined by a lower surface of the hopper 1826. However, this is not intended to be limiting in any way as the hopper 1826 can comprise other types and configurations of stoppers.

The actuator 1952 can comprise any type of actuator that can be associated with the clamp interface member 1944, and configured to move and advance the clamp interface member 1944 (and any torque tube clamps supported thereby). In one example, the actuator 1952 can comprise a passive linear actuator. The passive linear actuator can comprise one or more biasing members (e.g. one or more springs (e.g., one or more coil spring)) coupled between the chassis 1816 and the clamp interface member 1944, wherein the biasing member biases (i.e., exerts a force upon) the clamp interface member 1944 in a direction towards the exit opening 1830 of the hopper 1826. To load the hopper 1826, the clamp interface member 1944 can be caused to move in a direction so as to compress the biasing member. The torque tube clamps 9 can then be loaded into the hopper 1826, wherein the passive actuator will function to exert a continuous force on the one or more torque tube clamps within the hopper 1826 sufficient to displace or advance the one or more torque tube clamps in a direction towards the exit opening 1830 of the hopper 1826. Advancement of the torque tube clamps 9 can be caused to occur each time a lead torque tube clamp 11 is dispensed from the hopper 1826. In another example, the actuator 1952 can comprise an active actuator that is associated with a power source operable to facilitate actuation of the actuator 1952 (such as via a controller or control system) in order to actuator or drive the plunger 1946 and the clamp interface member 1944 (and any torque tube clamps 9 within the hopper 1826) in a bi-directional manner. In one aspect, the active actuator can comprise an electric actuator associated with a motor. In another aspect, the active actuator can comprise a fluid actuator (e.g., a hydraulic or pneumatic actuator) associated with a fluid system operable to facilitate control of the fluid actuator.

The hopper 1826 and the clamp feed system 1940 can be configured in multiple different ways to facilitate supporting of the torque tube clamps 9 in the hopper 1826, and advancement of the torque tube clamps 9 towards the exit opening 1830 in the hopper 1826. In one example (see FIG. 18I, where the hopper 1826' and the clamp feed system 1940' are shown without any other elements of the installation vehicle 1814), the hopper 1826' can comprise a slot 1832 formed in its bottom surface. A clamp feed system 1940' can be disposed and supported within the slot 1832, and can comprise a clamp interface member 1944' coupled to a drive belt 1948, wherein the drive belt 1948 is rotatably supported so as to facilitate bi-directional movement of the clamp interface member 1944' within and relative to a bottom surface of the hopper 1826'. The drive belt 1948 can be supported by a plurality of wheels or axles (e.g., see axle 1950) that are rotatably supported by the hopper 1826' or the chassis 1818. The clamp interface member 1940' can further comprise an actuator 1952 associated with a drive wheel/axle in support of the drive belt 1948 (such as the axle 1950), the actuator 1952 being operable to actuate rotation of the drive wheel/axle to rotate the drive belt 1948, and thus move the clamp interface member 1944'. The clamp interface member 1944' can be configured to exert a force on the torque tube clamps (not shown) within the hopper 1826', wherein movement of the clamp interface member 1944' operates to advance the torque tube clamps towards the exit opening 1830' of the hopper 1826' until a lead torque tube clamp is aligned with the exit opening 1830'. In one aspect, the drive belt 1948, with its associated assembly, can be configured to rotate bi-directionally. In another aspect, the drive belt 1948, with its associated assembly, can be configured to be driven continuously in a 360-degree rotation. In a related example, the clamp feed system 1940' can comprise a number of clamp interface members 1944' (as shown in dotted lines) spaced apart from one another, wherein individual torque tube clamps can be inserted into the gaps or spaces between the plurality of clamp interface members 1944', wherein each clamp interface member 1944' exerts a force upon and advances one or more torque tube clamps in a direction towards the exit opening 1830' upon actuation of the clamp feed system 1940'. It is noted that the clamp feed system 1940' can alternatively be supported and operable about a sidewall of the hopper 1826', wherein the clamp interface member 1940' would extend outward from the sidewall and move along the sidewall. In addition, the clamp interface member 1940' can comprise a second clamp interface member and drive belt assembly, this being configured in the same or a similar manner, and comprising the same or similar components and elements, as the one discussed above. This second clamp interface member and drive belt assembly can be configured to be supported about one of a bottom surface or a sidewall of the hopper 1826', and can be operated in coordination with the first clamp interface member and drive belt assembly.

In another example, (see FIG. 18J, where the hopper 1826" and the clamp feed system 1940" are shown without any other elements of the installation vehicle 1814), the hopper 1826" can comprise a slot 1832 formed in its bottom surface. A clamp feed system 1940" can be disposed and supported within the slot 1832, and can comprise a clamp interface member 1944" coupled to a drive screw 1954 rotatably supported by the hopper 1826" or the chassis 1816 of the installation vehicle 1814. The drive screw 1954 can be associated with an actuator 1955 operable to rotate the drive screw 1954 in a bi-directional manner (i.e., to rotate in both directions about a rotational axis). The clamp interface member 1944 can comprise a threaded through hole configured to match threads formed on an outer surface of the drive screw 1954, such that rotation of the drive screw 1954 operates to cause the clamp interface member 1944" to move in a translational degree of freedom relative to the hopper 1826". The clamp interface member 1944" can be configured to exert a force on the torque tube clamps (not shown) within the hopper 1826", wherein movement of the clamp interface member 1944" operates to advance the torque tube clamps towards the exit opening 1830" of the hopper 1826" until a lead torque tube clamp is aligned with the exit opening 1830". From this position, the clamp placement system can operate to dispense the lead torque tube clamp through the exit opening 1830", wherein the clamp placement system 1944" can be actuated to advance the next lead torque tube clamp towards and into alignment with the exit opening 1830" of the hopper 1826". It is noted that the clamp feed system 1940" can alternatively be supported and operable about a sidewall of the hopper 1826", wherein the clamp interface member 1940" would extend outward from the sidewall and move along the sidewall. In addition, the clamp interface member 1940" can comprise a second clamp interface member and drive screw assembly (or alternatively, a single clamp interface member 1944" can be operable with both drive screw assemblies, as shown), this being configured in the same or a similar manner, and comprising the same or similar components and elements, as the one discussed above. This second clamp interface member and drive screw assembly can be configured to be supported about one of a bottom surface or a sidewall of the hopper 1826", and can be operated in coordination with the first clamp interface member and drive screw assembly. In another example, the clamp feed system 1944" can comprise a passive system, wherein a biasing member (e.g., see spring 1956) is operably supported by the hopper 1826" or the chassis 1816 of the installation vehicle 1814 (and/or by a rigid rod (e.g. see drive screw 1954 which could represent a rigid rod), and configured to exert a force on the clamp interface member 1944" in a direction towards the exit opening 1830" of the hopper 1826". The clamp interface member 1944" can be configured to interface with and slide along the rigid rod (again, drive screw 1954 can represent a rigid rod) supported by the hopper 1826" or the chassis 1816 of the installation vehicle 1814. In the example shown, the biasing member is shown in a stretched or tensioned state, wherein the stored potential energy within the biasing member operates to exert a pulling force on the clamp interface member 1944" in the direction towards the exit opening 1830". The biasing member 1956 can be configured with a spring constant sufficient to cause the clamp interface member 1944" and any torque tube clamps loaded and contained within the hopper 1826" to move towards the exit opening 1830", wherein a lead torque tube clamp can be aligned with the exit opening 1830" for subsequent dispensing by the clamp placement system.

Returning to FIGS. 18A-18H, the clamp dispensing system can further comprise a clamp placement system 1970 operable to dispense a lead torque tube clamp 11 from the hopper 1826 through the exit opening 1830 of the hopper 1826, and to apply a force to the lead torque tube clamp 11 sufficient to install the lead torque tube clamp 11 onto the torque tube 8. For example, with a snap-on type of torque tube clamp, the clamp placement system 1970 can exert a force on the lead torque tube clamp 11 (once it is aligned with the exit opening 1830 by the clamp feed system 1940) sufficient to cause the lead torque tube clamp 11 to move through and out of the exit opening 1830 of the hopper 1826 towards the torque tube 8. The clamp placement system 1970 can further be actuated to continue to displace the lead torque tube clamp 11 until it contacts the torque tube 8, and until the lead torque tube clamp 11 snaps into place onto the torque tube 8. As such, the clamp placement system 1970 can comprise a length of travel sufficient to dispense and install the lead torque tube clamp 11. In one example, as shown, the clamp placement system 1970 can comprise a clamp applicator 1972 operable to interface with an upper portion of the lead torque tube clamp 11. The clamp applicator 1972 can be slidable within the hopper 1826 along an axis Z2, and can be configured to be actuated and to move in a bi-directional manner within the hopper 1826. The clamp applicator 1972 can be coupled to an actuator 1976 supported by at least one of the hopper 1826 or the chassis 1816, and that comprises a plunger 1980, wherein the actuator 1976 is sized and configured to displace the clamp applicator 1972 and the lead torque tube clamp 11. The clamp applicator 1972 can be supported in a position so as to be aligned with the exit opening in the hopper 1826 (meaning the clamp applicator 1972, upon being displaced, can extend toward, and in some cases at least partially through, the exit opening 1830). In one example, the actuator 1976 can be configured to comprise a stroke length (i.e., a length of travel) sufficient to cause at least a portion of the clamp applicator 1972 to extend beyond the exit opening in the hopper 1826 so as to facilitate installation of the lead torque tube clamp 11 onto the torque tube 8. In one example, the actuator 1976 can comprise an electric actuator associated with a motor. In another example, the actuator 1976 can comprise a fluid actuator (e.g., a hydraulic or pneumatic actuator) associated with a fluid system operable to facilitate control of the fluid actuator.

The installation vehicle 1814 can further comprise a lead clamp guide system 1988 supported by the chassis 1816 at a position proximate the exit opening 1830 of the hopper 1826. The lead clamp guide system 1988 can comprise, or at least partially define (along with a portion of the chassis 1816), a presentation channel 1992 aligned and in communication with the exit opening 1830 of the hopper 1826, the presentation channel 1992 extending downward from the exit opening 1830 and the chassis 1816. The lead clamp guide system 1988 can comprise an opening, which effectively can be considered an exit opening 1830 of the hopper 1826 extended or relocated to a position offset from the interior volume of the hopper 1826, and closer to the torque tube 8. The guide system 1988 with its presentation channel 1992 can provide a guide to the lead torque tube clamp 11 as it is being acted upon and displaced in a downward direction by the actuator 1976. The guide system 1988 can comprise rails or other structural elements that extend from the chassis 1816 and/or the hopper 1826, and that operate to form and define the presentation channel 1992. The lead clamp guide system 1988 with its presentation channel 1992 can operate to maintain a proper alignment and orientation of the lead torque tube clamp 11 until it is fully installed onto the torque tube 8. More specifically, the lead clamp guide system 1988 with its presentation channel 1992 can operate to maintain constant contact with the lead torque tube clamp 11 as it is being dispensed and as it is being installed, with the lead clamp guide system 1988 being configured such that the lead torque tube clamp 11 releases or disengages from the lead clamp guide system 1988 just prior to fully being seated on the torque tube 8, thus allowing the installation vehicle 1814 to move to a new location on the torque tube 8 without the just installed torque tube clamp interfering with the lead clamp guide system 1988. The chassis 1816 and/or the frames 1844 can further be configured to provide one or more guide surfaces that are aligned with an edge of and that extend away from the exit opening 1830, wherein the lead clamp guide system 1988 can be positioned offset a distance from the guide surface(s), such that the guide surface(s) and the lead clamp guide system 1988 define, at least in part, the boundaries of the presentation channel 1992. In the example shown (e.g., see FIG. 18G), the first and second frames 1844A and 1844B each comprise a guide surface aligned with an edge and extending away from the exit opening 1830 in the hopper 1826.

The solar panel installation system 1810 can further comprise a clamp manipulator 2012 supported by at least one of the hopper 1826 or the chassis 1816, and moveable in at least one degree of freedom to act upon a moveable component of a torque tube clamp. The clamp manipulator 2012 can be operated in the event the particular torque tube clamps carried by the installation vehicle 1814 are not capable of being fully installed by the clamp placement system 1970 itself, but instead require further manipulation once at least partially engaged with (e.g., seated onto) the torque tube 8 by the clamp placement system 1970. In one example, the clamp manipulator 2012 can be supported in a position rearward of the clamp placement system 1970. The clamp manipulator 2012 can be configured to be actuatable in one or more degrees of freedom to manipulate a moveable component of lead torque tube clamp after the lead torque tube clamp is seated against the torque tube 8, such as to complete an installation of the lead torque tube clamp 8 onto the torque tube 8. The clamp manipulator 2012 can comprise an end effector 2016, and an actuator 2020 operably connected to the end effector 2016, and configured to facilitate movement of the end effector 2016 in at least one degree of freedom. In one example, the clamp manipulator 2012 can comprise an actuator 2020 in support of the end effector 2016, wherein the actuator 2020 is supported about the hopper 1836 and/or the chassis 1816, and wherein the actuator 2020 can be directly coupled to the end effector 2016 and actuated to move the end effector 2016. In another example, the clamp manipulator 2012 can comprise a manipulator arm 2024 (e.g., a robotic arm) comprising two or more structural support members rotatably coupled to one another via one or more joints (e.g., see joint 2028), the manipulator arm 2024 supporting the end effector 2016 about a distal end of the manipulator arm 2024. The manipulator arm 2024 can comprise one or more joints 2028 that facilitate movement of the end effector 2016 in one or more degrees of freedom (e.g., one or more translational degrees of freedom, one or more rotational degrees of freedom, and/or both). The end effector 2016 can be coupled to an end of the manipulator arm 2024, and can comprise one or more clamp engagement or interface portions. In one example, the end effector 2016 itself can be a passive end effector, being moveable by an actuator or a manipulator arm. In another example, the end effector 2016 itself can comprise one or more jointed structural members that can be actuated in one or more degrees of freedom. The clamp manipulator 2012 can be configured to act upon a torque tube clamp once it is at least partially engaged with the torque tube 8. For example, a particular torque tube clamp may require an element to be manipulated in order to fully install the torque tube clamp onto the torque tube. One example of such a torque tube clamp is the torque tube clamp 2210 of FIG. 19A, which requires a force to be applied to the over-center linkage mechanism 2250 of the pivotable locking assembly 2220 in order to cause the over-center linkage mechanism 2250 to move to an over-center, locked position, thus clamping the torque tube clamp to the torque tube 8. In this example, once the torque tube clamp 2210 is at least partially seated onto and engaged with the torque tube 8, the clamp manipulator 2012 can be actuated to apply the needed force F to the over-center linkage mechanism 2250 to cause the over-center linkage mechanism 2250 to move to the over-center, locked position, thus securing the torque tube clamp 2210 to the torque tube 8. To do so, the end effector 2016 of the clamp manipulator 2012 can be configured to interface with one or more portions of the over-center linkage mechanism 2250 (e.g., the end effector 2016 can comprise a simple plunger, it can comprise a structural member comprising a channel that fits over the linkages of the over-center linkage mechanism, it can comprise an actuatable gripper of some kind, or others). Once the over-center linkage mechanism 2250 is locked, the end effector 2016 can be caused to disengage from the torque tube clamp 2210. Of course, this is only an example and is not intended to be limiting in any way.

The support clamp installation vehicle 1814 can comprise or be associated with a number of operating systems that facilitate and enable both the maneuvering and operation of the installation vehicle 1814 itself, as well as the various systems supported on the installation vehicle 1814 (e.g., the drive system, the dispensing system, the clamp manipulator, and any others). These operating systems can include, but are not limited to, at least one of one or more power sources and controllers for such power sources, a drive system or subsystem and its associated controllers, an automation system or subsystem with its one or more automation assets (e.g., imaging devices, detectors, emitters) mounted on or otherwise supported by the installation vehicle 1814 and with its associated controllers, a control system or subsystem, which can comprise the controllers for the various systems or which can integrate control of the various systems, a communications system or subsystem, a hydraulic system or subsystem with its controllers, one or more sensors in communication with the control system, a navigation system for facilitating automated or semi-automated navigation with its associated controllers, or any other components, elements or systems to enable the installation vehicle 1814 to facilitate installation of the torque tube clamps onto the torque tube of the panel support assembly. One or more of the various operating systems can be onboard the installation vehicle 1814, external to the installation vehicle, but in connection therewith (e.g., electrical connection, physical connection, wireless connection, etc.), or a combination of these.

The solar panel installation system 1810 can further comprise or can be associated with one or more power sources 2040 operable to power the installation vehicle 1814 and its various components and systems. In one example, the power source 2040 can comprise one or more batteries, hydrogen fuel cells, or a combination of these operable to power various electrical systems. In another example, the installation vehicle 1814 can comprise and be operably coupled to or otherwise associated with a power source in the form of a combustion engine (e.g., a gas internal combustion (IC) engine, a liquid petroleum gas (LPG) engine, a natural gas engine, or any combination of these). In another example, the installation vehicle 1814 can be powered using a hybrid approach, such as by both electric and combustible fuel power. The power sources, whatever they may be, can be connected with and can control the various actuators and/or other components within the installation vehicle 1814. In addition, the power source(s) can further be connected to and operable with the control system 2052 operable to control operation of the actuators and/or power source. The power sources 2040 can be onboard the installation vehicle, external to the installation vehicle 1814 and connected via an umbilical, or a combination of these. Indeed, in one example, the one or more power sources 2040 can be on-board the clamp installation vehicle 1814, such as a plurality of batteries supported by the chassis 1816. In another example, the one or more power sources 2040 can be independent of and located away from the clamp installation vehicle 1814, but operably connected to the clamp installation vehicle 1814 using an umbilical 1879 that carries, via a power distribution line, power from the one or more power sources to the clamp installation vehicle 1814, or any other component or system within the solar panel presentation system 1810, as controlled by the control system 2052. For instance, the clamp installation vehicle 1814 can be operably connected to a power source on a solar panel installation vehicle (see those discussed herein, and particularly the solar panel installation vehicle 1024 of FIG. 18K) operating to install one or more solar panels via the umbilical 1879, and thus the solar clamp installation vehicle 1814 can obtain its power from the solar panel installation vehicle.

The umbilical 1879 can further be operable to carry at least one of power, data, or pressurized fluid to the clamp installation vehicle 1814 that is external to and independent of the clamp installation vehicle 1814. Specifically, the umbilical 1879 can comprise a power distribution line configured and used to carry power to any of the actuators, the control system, etc. of the solar panel presentation system. The umbilical 1879 can also comprise a data distribution line configured and used to carry data to and from the control system 260 or any other systems or components within the solar panel installation system 1810. The umbilical 1879 can also comprise a fluid distribution line configured and used to carry pressurized fluid from a fluid actuator system to and from the clamp installation vehicle 1814 or any other systems or components within the solar panel installation system 1810 utilizing fluid control, such as a hydraulic or pneumatic fluid actuator.

The solar panel installation system 1810 can further comprise or can be associated with one or more sensors 2042. The sensors can be associated with one or more systems of the installation vehicle 1814, such as the drive system 1840, the dispensing system (including the clamp feed system 1949 and the clamp placement system 1970), the torque tube 8, the panel support assembly 2, the actuators controlling these, and others to facilitate operation and/or monitoring of the clamp installation vehicle 1814 and its one or more systems, the operating environment, etc. Essentially, it is contemplated that the one or more sensors 2042 can be deployed to be associated with any of the components, devices, systems of the solar panel installation system 1810, the clamp installation vehicle 1814, as well as the torque tube clamps 9 themselves. In addition, the sensors 2042 can be of the type that facilitate partial or full automation of the operation of the installation vehicle 1814. For example, a position sensor can be associated with an actuator of the clamp placement system 1970 to ensure proper actuation of the actuator. A Hall Effect sensor can be associated with the drive system 1840 of the clamp installation vehicle 1814, wherein the Hall Effect sensor operates to measure the rotations of one or more wheels of the torque tube interface assembly to facilitate precise positioning of the clamp installation vehicle 1814 at various positions along the torque tube 8 for installation of a torque tube clamp. Other sensors can include, but are not limited to, position sensors, motor rotor position sensors, force sensors, torque sensors, thermal or temperature sensors, current sensors, motion sensors such as Inertial Measurement Units (IMUs), imaging sensors, audio sensors (e.g., microphones, sonar, audio positioning sensors or others), chemical sensors, electromagnetic radiation sensors (e.g. antennas with signal conditioning electronics), magnetometers (single axis and multi-axis magnetometer), radars. In short, any sensor, imager, recorder, or other device, and any combination of these, can be used in the configuration of the sensors 2042 described herein.

The solar panel installation system 1810 can further comprise a computer automation system 2044. The computer automation system 2044 can be operable to facilitate partial or fully automated installation of the torque tube clamps onto the torque tube 8. The control system 2052 can be operably connected with the computer automation system 2044 that is part of or otherwise operable with the clamp installation vehicle 1814. The computer automation system 2044 can comprise a number of automation assets 2046 in the form of sensors, such as one or more of the sensors 2042, or other sensors and/or devices (e.g., emitters), that facilitate partial or fully automated installation of the torque tube clamps onto the torque tube 8. In addition, the automation assets 2046 can comprise a number of different types, such as different types of sensors and/or devices. For example, the types of sensors that can be utilized in the computer automation system 2044 include, but are not limited to imaging sensors (e.g., cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, and/or a structured light sensor, or any combination of these).

While some of the sensors of the automation system 2044 discussed herein are identified as imaging sensors (e.g., cameras), it is to be understood that any of these can be sensors of any type and may be used to accomplish vision or other types of sensing by the clamp installation vehicle. For example, the cameras/sensors can provide fluorescence imaging, hyperspectral imaging, or multispectral imaging. Furthermore, some of the sensors can be audio sensors (e.g., microphones, sonar, audio positioning sensors or others), chemical sensors, electromagnetic radiation sensors (e.g. antennas with signal conditioning electronics), magnetometers (single axis and multi-axis magnetometer) and radars. In short, any sensor, imager, recorder, or other device, and any combination of these, can be used in the configuration of the sensors 2042 described herein. The computer automation system 2044 can further comprise one or more emitters, such as ultrasonic emitters, to assist in locating certain objects.

As indicated, one or more computer automation assets or fiducials 2046, as part of the computer automation system 2044, can be attached to the clamp installation vehicle 1814 at any location. The automation assets 2046 can comprise the computer automation system sensors and/or devices discussed above (e.g., an imaging system comprising one or more imaging sensors, such as one or more cameras), or any other types of sensors and/or other types of devices. The computer automation assets 2046 can gather and provide information, such as visual, audio or other information, to the control system 2052. The control system 2052 can utilize the information to assist the clamp installation vehicle 1814 in any number of automated tasks. For example, the automation system 2044 can be used to identify and locate in three-dimensional space the torque tube 8 of the panel support assembly 2 and its various components. The automation system 2044 can further be configured to facilitate the proper positioning, orienting, and dispensing of the torque tube clamps from the clamp installation vehicle 1814 by locating and comparing the position and orientation of the torque tube clamps to be dispensed and installed relative to the position and orientation of the torque tube 8 of the panel support assembly 2 onto which a torque tube clamp is to be installed. Of course, this is not intended to be limiting in any way as those skilled in the art will recognize that the automation system 2044 can be configured to perform a number of different functions related to facilitating the dispensing and installing of the torque tube clamps onto the torque tube 8 of the panel support assembly 2.

In one example, the computer automation system 2044 can comprise one or more processors and memory for executing software code capable of facilitating the function of the automation system 2044. Alternatively, the automation system 2044 can be operably connected with the control system 2052 having one or more processors and memory or a top-level control system (e.g., see top-level control system 113 of FIG. 1) having one or more processors and memory, or both.

The solar panel installation system 1810 can further comprise or can be associated with a communications module 2048 operable to transmit and receive data, such as command signals, to and from the control system 2052. The communications module 2048 can comprise a wireless system, or a combination of wired and wireless systems. The control system 2052 can be operably connected to the communications module 2048 that is part of or otherwise operable with the clamp installation vehicle 1814 and any other appropriate components, systems, mechanisms within the solar panel installation system 1810. The control system 2052 can utilize the communications module 2048 to transmit and receive data from the various components, devices, systems operating within the solar panel installation system 1810 using known protocols.

The solar panel installation system 1810 can further comprise or can be associated with a navigation system 2050. In one example, the installation vehicle 1814 can be operated manually using various manually operated controllers. In another example, the installation vehicle 1814 can comprise a variety of different navigation and/or automation systems, such as navigation systems of various types, vision systems, and control systems, to facilitate semi-automated or fully automated operation of the installation vehicle 1814 and/or installation of the torque tube clamps 9 onto the torque tube 8. In one example, the installation vehicle 1814 can comprise an automated guided vehicle (AGV), which can utilize radio waves, vision devices, magnets, or lasers for automated navigation. Indeed, the installation vehicle 1814 can utilize a number of different types of navigation systems depending upon the environment in which the solar panels are being installed. Example navigation systems include, but are not limited to wired, guide tape, laser target, inertial guidance systems, (gyroscopic), natural feature (natural target), vision guidance systems, Geoguidance systems, precision satellite-based radio navigation systems, such as a global navigation satellite systems (GNSS), and more specifically Global Positioning Systems (GPS), robotic mapping systems, or any combination of these. The installation vehicle 1814 can utilize any one of these or other systems, along with various associated automation assets 2046 associated with the installation vehicle 1814, the panel support assembly 2, or any combination of these. The automation assets 2046 can include, but are not limited to, various sensors and sensor types, detection assets, emission assets (e.g., ultrasonic emitter(s), laser(s)), imaging systems and assets, and others. Indeed, it is contemplated that any assets needed to facilitate operation of the installation vehicle 1814 and its various systems in a semi-automated or fully automated manner can be part of the solar panel installation system.

The solar panel installation system 1810 can further comprise or can be associated with a control system 2052. The control system 2052 can comprise one or more processors and memory 2054 (e.g., one or more memory devices) associated with the one or more processors, wherein these are operable to facilitate processing and storage of data and to execute instructions that facilitate the overall functionality of the control system 2052, and wherein these are operable to control the various elements and systems within and/or associated with the solar panel installation system 1810 including the clamp installation vehicle 1814, such as the drive system 1840, the dispensing system, the clamp feed system 1970, the clamp placement system 1970, the clamp manipulator, the navigation system 2050, the automation system 2044, the communications module 2048, the power source(s) 2040 and any others. Indeed, the control system 2052 can comprise, or otherwise be operable with, one or more processors and one or more memory devices operatively coupled to or otherwise associated with at least one of the one or more processors and having instructions stored thereon that, when executed by at least one of the one or more processors, cause the components or elements or systems of the solar panel installation system 1810 with its clamp installation vehicle 1814 described herein to perform one or more tasks related to the installation of torque tube clamps onto the torque tube 8. The control system 2052 can be operably connected with the one or more sensors 2042 that are part of or otherwise operable with the clamp installation vehicle 1814. In other words, the control system 2052 can be operable to control the various components and systems within the solar panel installation system 1810, including the clamp installation vehicle 1814, in a manual, semi-automated or fully automated manner, and to gather and process information from the one or more sensors 2042 to facilitate operation of the clamp installation vehicle 1814 within an operation environment using the data provided by the sensors 2042. For example, the data from the sensors 2042 can be used to monitor and measure actuator usage, forces acting on various components of or within the solar panel installation system 1810 including the clamp installation vehicle 1814, be operable with the an automation system to produce combined images, stereo images, depth maps, or other images that can be processed and used by algorithms or software stored in the memory to allow, for instance, the clamp installation vehicle 1814 to correctly position itself on the torque tube 8, to avoid collisions with objects or personnel in an operating environment, to interact with objects, such as the torque tube 8 or a torque tube clamp, or to properly move along the torque tube 8 and install a torque tube clamp at a proper location.

Furthermore, the control system 2052 can comprise one or more actuator controllers 2056 operable to control the various actuators within the solar panel installation system 1810. The control system 2052 can further comprise a drive system controller 2058 operable to control the drive system 1840. The drive system controller 2058 can be in communication with the actuator(s) of the torque tube interfacing assembly 1848 and any sensors operable or otherwise associated with the drive system 1840. The control system 2052 can further comprise a dispensing system controller 2060 operable to control the dispensing system, namely the clamp feed system 1940 and the clamp placement system 1970. The dispensing system controller 2060 can be in communication with the actuators of the clamp feed system 1940 and the clamp placement system 1970 and any sensors operable or otherwise associated with the dispensing system. The control system 2052 can further comprise a clamp manipulator controller 2062 operable to control the clamp manipulator 2012. The clamp manipulator controller 2062 can be in communication with the actuators of the clamp manipulator 2012 and any sensors operable or otherwise associated with the clamp manipulator 2012. Each of these controllers can be in communication with the one or more processors and memory 2054 of the control system 2052 so as to be able to execute the instructions corresponding to the command signals received for operation of the respective controlled systems.

It is noted that the control system 2052, with each of the controllers, respectively, and the processor(s)/memory 2054, can be a local or standalone control system within the solar panel installation system 1810. In this example, the control system 2052 can also be operably connected to a top-level control system (e.g., see top-level control system 112 of the solar panel installation system 110 of FIG. 1). Alternatively, the control system 2052 can be an integral part of a top-level control system of the solar panel installation system (see top-level control system 112 of the solar panel installation system 110 of FIG. 1).

With reference to FIGS. 18A-18K, the solar panel installation system 1810 can further comprise a torque tube riding solar panel installation vehicle that itself is operable with a solar panel presentation system (e.g., one comprising a solar panel dispensing hopper), wherein the torque tube riding solar panel installation vehicle can operate atop the torque tube 8 to install solar panels within the panel mount assemblies comprising a torque tube clamp previously installed by the support clamp installation vehicle 1824. In one example, the torque tube riding solar panel installation vehicle operable with a solar panel presentation system can comprise any of those discussed herein, such as the installation vehicle 1024 and the solar panel presentation system 213 discussed above and shown in FIGS. 15A-15O, the installation vehicle 1024' and the solar panel presentation system 213 discussed above and shown in FIGS. 16A-16C, or the installation vehicle 1524 and the solar panel presentation system 1413 discussed above and shown in FIGS. 17A-17I. In the example shown, the support clamp installation vehicle 1814 can be placed atop the torque tube 8 and operated to install a plurality of torque tube clamps 34 on the torque tube 8, as discussed herein. A panel mount 36 can be mounted or otherwise coupled or secured to each of the torque tube clamps 34, thus forming a plurality of panel mount assemblies (e.g., see panel mount assemblies 30A and 30B). A solar panel installation vehicle 1024 can also be placed atop the torque tube 8, and specifically onto the panel mount assemblies, wherein the solar panel installation vehicle 1024 can follow the support clamp installation vehicle 1814 to install solar panels within the panel retention systems (e.g., see panel retention system 38) formed by the panel mount assemblies, also as discussed herein. The operation of the support clamp installation vehicle 1814 and the solar panel installation vehicle 1024 can be coordinated so that the installation of the torque tube clamps 34 and the ultimate installation of the solar panels by the solar panel installation vehicle 1024 are done in a systematic and efficient manner and without interfering with one another. The coordination of these vehicles can be done via a single controller, such as the high-level control system of FIG. 1, or via individual control systems. Moreover, the support clamp installation vehicle 1814 and the solar panel installation vehicle 1024 can be operated manually, or in a partial or fully automated manner.

Figure 19A:
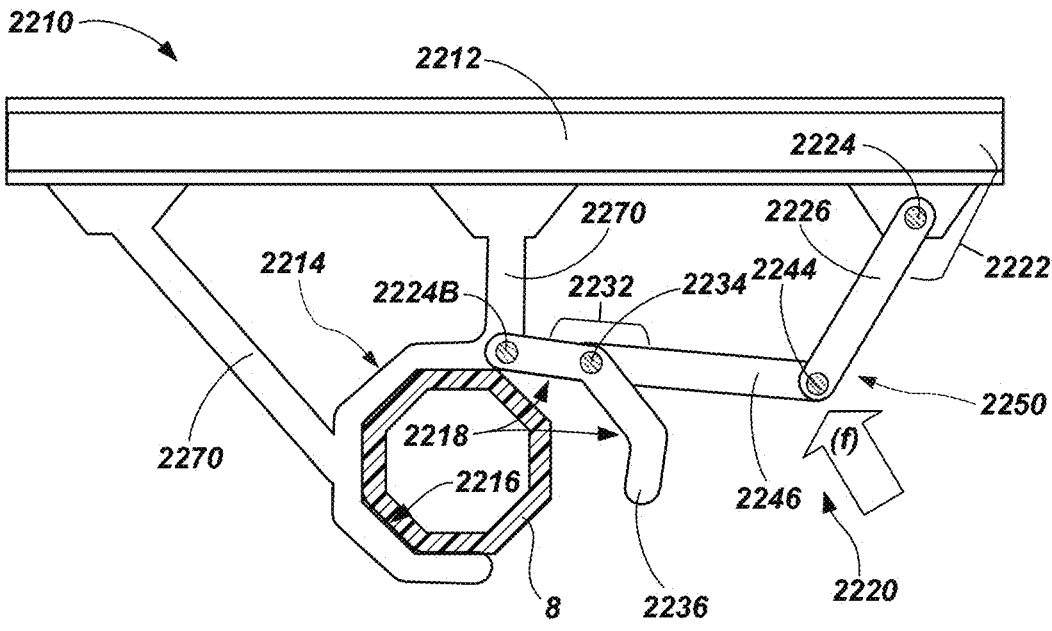
FIGS. 19A and 19B illustrate two different example torque tube clamps that can be installed onto a torque tube by the support clamp installation vehicle of FIGS. 18A-18K.
Figure 19B:
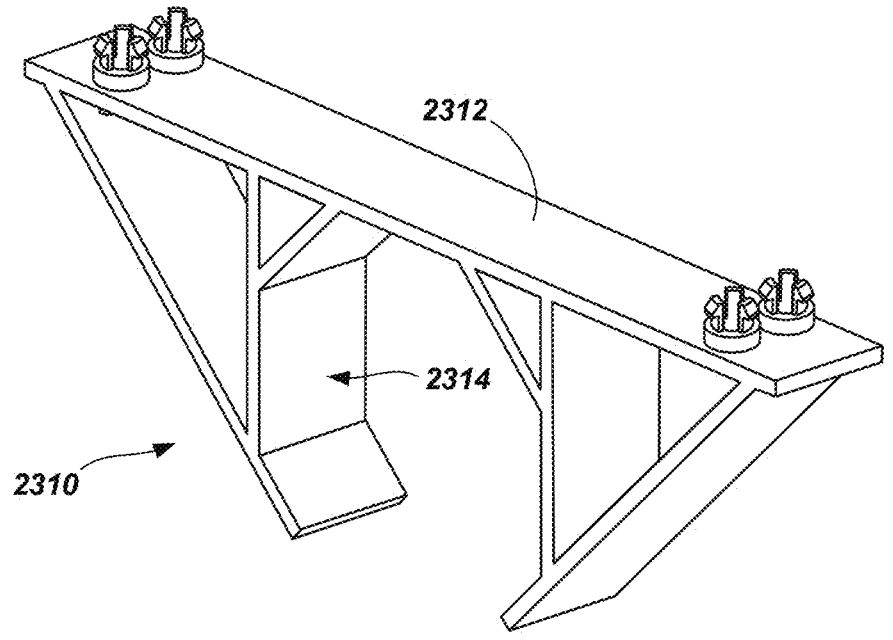

With reference to FIGS. 19A and 19B, and with continued reference to FIGS. 18A-18K, illustrated are two example torque tube clamps that can be loaded into the hopper 1826 of the installation vehicle 1814 and installed onto the torque tube 8 by the dispensing system of the installation vehicle 1814. FIG. 19A illustrates a torque tube clamp 2210 that includes a clamp support 2212 and a pivotable locking assembly 2220 including an over-center linkage mechanism 2250. The pivotable locking mechanism includes ground linkage 2222, which couples the clamp support 2212 with a ground bar 2226 by a ground pivot 2224. An intermediate bar 2244 is coupled to the ground bar 2226 via an intermediate pivot 2246, and is also coupled to an engagement bar 2236 via an engagement pivot 2234. In this particular example, a torque tube collar 2214 is defined partially by a fixed collar portion 2216, and an engagement collar portion 2218. The engagement collar portion includes the engagement bar, which includes surfaces suitable for engaging with three sides of an octagon shaped torque tube 8 in this example. The fixed collar portion in this example is notably coupled with the clamp support by two fixed support beams 2270. One of the two fixed support beams includes a second ground pivot 2224B (as it is grounded by the clamp support), which allows for rotation of the engagement bar. Rotation of the engagement bar at the second ground pivot from an open torque tube-receiving position, as shown in FIG. 19A, to a closed torque tube-locking position can occur by applying a force (f) to the intermediate pivot (in this instance), which is the pivot point of the over-center linkage mechanism in this example. As the torque tube 8 has an octagon cross-sectional shape, the shape of the engagement bar (or engagement collar portion) is such to engage with three sides of the octagon, and the fixed collar portion is configured to engage with the remaining five sides of the octagon-shaped torque tube, including at the lowermost surface of the torque tube for support from beneath. Thus, the engagement collar portion and the fixed collar portion can work together to enclose or partially enclose all eight sides of the torque tube, preventing any unwanted rotation of the torque tube clamp relative to the torque tube. That stated, it is understood that other arrangements can be used that do not interface with all eight sides of the octagon-shaped torque tube. For example, the engagement bar shown could be configured with two surfaces, leaving open the lower right quadrant of the octagon-shaped torque tube. Even with seven sides being surrounded by the torque tube collar, the torque tube would still remain securely fastened within the torque tube collar. As mentioned, once the over-center linkage mechanism has been forced to its "over-center" position, which is in position beyond alignment of the ground bar and the intermediate bar, the closure of the torque tube collar against the torque tube prevents the over-center linkage from moving further beyond the locking position shown. In other words, the over-center position can provide self-locking in this example because after the over-center position is reached, the torque tube collar is abutted against the torque tube, preventing the over-center linkage mechanism from moving beyond the locking position shown.

FIG. 19B illustrates a torque tube clamp 2310 at a clamp support 2312 thereof. The torque tube clamp 2310 is configured with a torque tube collar 2314 configured for attachment to the torque tube 8 having a cross-sectional shape of an octagon to prevent lateral rotation of the clamp 2310 when attached to the torque tube 8. In this example, with enough force applied to the torque tube clamp 2310 by the clamp placement system 1970, the torque tube clamp 2310 can snap onto the torque tube 8 by causing the torque tube collar 2314 to flex outward and then return to their original position as the clamp placement system 1970 causes the torque tube clamp 2310 to move further downward toward the torque tube 8 until fully seated onto the torque tube 8.

Figure 20:
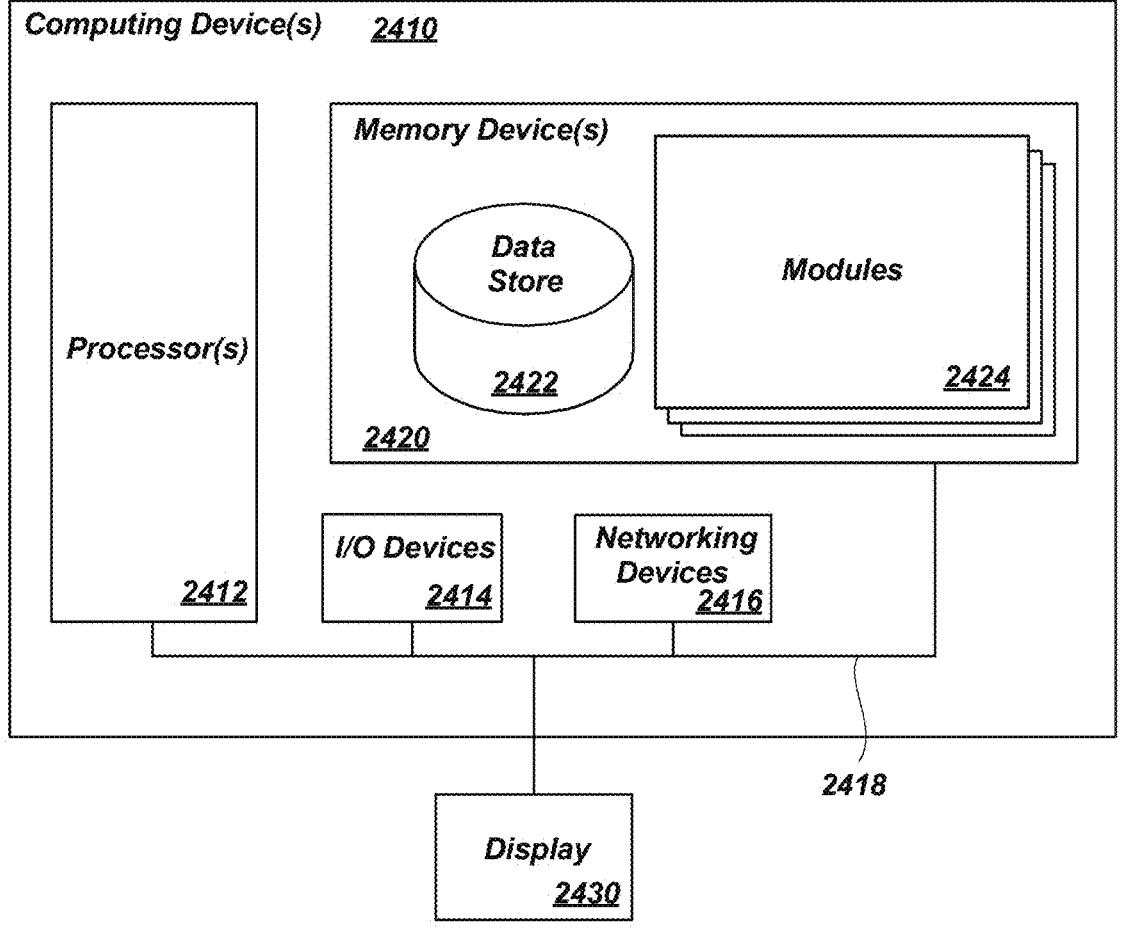
FIG. 20 illustrates an example computing device that can be used in any of the solar panel installation systems described herein.

The various computer controlled components, systems, mechanisms, control systems discussed herein, and any associated user interface computer, can comprise a computing device such as a computing device 2410 illustrated in FIG. 20 on which modules of this technology may execute. The computing device 2410 is shown at a high-level and may be used as a main controller and/or a controller for a component, such as a component of the solar panel presentation systems, installation vehicles, etc. discussed herein. The computing device 2410 may include one or more processors 2412 that are in communication with memory devices 2420. The computing device 2410 may include a local communication interface 2418 for the components in the computing device. For example, the local communication interface 2418 may be a local data bus and/or any related address or control busses as may be desired.

The memory device 2420 may contain modules 2424 that are executable by the processor(s) 2412 and data for the modules 2424. In one example, the memory device 2420 can contain a main robotic controller module, a robotic component controller module, data distribution module, power distribution module, and other modules. The modules 2424 may execute the functions described earlier. A data store

2422 may also be located in the memory device 2420 for storing data related to the modules 2424 and other applications along with an operating system that is executable by the processor(s) 2412.

Other applications may also be stored in the memory device 2420 and may be executable by the processor(s) 2412. Components or modules discussed in this description that may be implemented in the form of software using high-level programming languages that are compiled, interpreted or executed using a hybrid of the methods.

The computing device 2410 may also have access to I/O (input/output) devices 2414 that are usable by the computing device 2410. In one example, the computing device 2410 may have access to a display 2430 to allow output of system notifications. Networking devices 2416 and similar communication devices may be included in the computing device. The networking devices 2416 may be wired or wireless networking devices that connect to the internet, a LAN, WAN, or other computing network.

The components or modules that are shown as being stored in the memory device 2420 may be executed by the processor(s) 2412. The term "executable" may mean a program file that is in a form that may be executed by a processor 2412. For example, a program in a higher-level language may be compiled into machine code in a format that may be loaded into a random-access portion of the memory device 2420 and executed by the processor 2412, or source code may be loaded by another executable program and interpreted to generate instructions in a random-access portion of the memory to be executed by a processor. The executable program may be stored in any portion or component of the memory device 2420. For example, the memory device 2420 may be random access memory (RAM), read only memory (ROM), flash memory, a solid-state drive, memory card, a hard drive, optical disk, floppy disk, magnetic tape, or any other memory components.

The processor 2412 may represent multiple processors and the memory device 2420 may represent multiple memory units that operate in parallel to the processing circuits. This may provide parallel processing channels for the processes and data in the system. The local communication interface 2418 may be used as a network to facilitate communication between any of the multiple processors and multiple memories. The local communication interface 2418 may use additional systems designed for coordinating communication such as load balancing, bulk data transfer and similar systems.

The functions described herein with respect to the array can be carried out by the computer systems and devices described herein. For example, the memory devices can store instructions that, when executed by the processor, can cause the robotic systems described herein to execute a method including steps of generating an image/data based on a signal output by the first camera/sensor, generating an image/data generated based on a signal provided by the second camera/sensor, combining the generated images/data of the first and second cameras/sensors to produce an aggregate data output comprising a stereo image/data or panoramic image based on the combined generated images/data of the first and second sensors.

The method can further include steps of generating an image/data based on a signal provided by the first camera/sensor, generating an image based on a signal provided by the second camera/sensor, combining the generated images/data of the first and second cameras/sensors to produce a first aggregate data output comprising a first stereo image/data based on the combined generated images/data of the first and second cameras/sensors. The method can further include steps of generating an image based on a signal provided by the first camera/sensor, generating an image/data based on a signal provided by the third camera/sensor, combining the generated images/data of the first and third cameras/sensors, and generating a second aggregate data output comprising a second stereo image/data based on the combined generated images of the first and third cameras/sensors.

The method can further include steps of selectively operating a first combination of at least two cameras/sensors of the plurality of cameras/sensors to generate respective images of a first viewable region viewable by the first combination of cameras/sensors, and selectively operating a second combination of at least two cameras/sensors of the plurality of cameras/sensors to generate respective images/data of a second viewable region different from the first viewable region and viewable by the second combination of cameras/sensors. The method can further include steps of generating images/data simultaneously from the first, second and third cameras/sensors to generate multiple images/data in different directions, and to facilitate combination of the generated multiple images/data to produce multiple aggregate data outputs comprising stereo images/data or other images or maps. The method may further comprise presenting a stereo image/data to the user via the head-mounted display device based on the generated images/data from the first and second cameras/sensors. The method may further comprise presenting a stereo image/data to the user via the head-mounted display device based on the generated images/data from the first and third cameras/sensors. The method can further include presenting a non-overlapping portion of at least one of the first or second images/data, combined with the stereo image/data to the user.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples of the present invention can be referred to herein along with alternatives for the various components thereof. It is understood that such examples and alternatives are not to be construed as de facto equivalents of one another, but are to be considered as separate and autonomous representations of the present technology.

Furthermore, the described features, structures, or characteristics can be combined in any suitable manner in one or more examples. In the description, numerous specific details are provided, such as examples of lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description. Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

Although the disclosure may not expressly disclose that some examples or features described herein may be combined or interchanged with other examples or features described herein, this disclosure should be read to describe any such combinations that would be practicable by one of ordinary skill in the art no matter the specific examples that were described. Indeed, unless a certain combination of elements or functions not expressly disclosed would conflict with one another, such that the combination would render the resulting example inoperable or impracticable as would be apparent to those skilled in the art, this disclosure is meant to contemplate that any disclosed element or feature or function in any example described herein can be incorporated into any other example described herein (e.g., the elements or features or functions combined or interchanged with other elements or features or functions across examples) even though such combinations or interchange of elements or features or functions and resulting examples may not have been specifically or expressly disclosed and described. Indeed, the following examples are further illustrative of several embodiments of the present technology:

Example 1. A robotic solar panel dispensing hopper facilitating installation of solar panels into a panel retention system of a panel support assembly, the solar panel dispensing hopper comprising:

a hopper enclosure operable to receive and support one or more solar panels within an interior volume, the hopper enclosure comprising an exit opening sized and configured to permit passage of a lead solar panel of the one or more solar panels therethrough; and a dispensing system comprising a panel acquisition and placement system comprising at least one moveable arm, wherein the panel acquisition and placement system is operable to acquire and manipulate the lead solar panel into an overhead installation position relative to the panel retention system, and to facilitate placement of the lead solar panel into an installed position within the panel retention system.

2. The robotic solar panel dispensing hopper of example 1, wherein the dispensing system further comprises a panel feed system supported within the hopper enclosure and comprising a solar panel interface, the panel feed system being operable to act upon the solar panels to displace the solar panels within the hopper enclosure.

3. The robotic solar panel dispensing hopper of any preceding example, wherein the panel feed system comprises:

a plurality of belt drive mechanisms strategically arranged and positioned within the hopper enclosure; and at least one actuator operable to actuate one or more of the plurality of belt drive mechanisms.

4. The robotic solar panel dispensing hopper of any preceding example, wherein the plurality of belt drive mechanisms comprises:

first and second belt drive mechanisms supported about opposing sidewalls of the hopper enclosure, such that the first and second belt drive mechanisms face one another and contact opposing sides of one or more of the solar panels contained within the hopper enclosure between the first and second belt drive mechanisms; and third and fourth belt drive mechanisms supported about opposing sidewalls of the hopper enclosure, such that the third and fourth belt drive mechanisms face one another and contact opposing sides of one or more of the solar panels contained within the hopper enclosure between the third and fourth belt drive mechanisms.

5. The robotic solar panel dispensing hopper of any preceding example, wherein each of the plurality of belt drive mechanisms comprises:

a support chassis;

a drive roller rotatably coupled to the support chassis;

a passive roller rotatably coupled to the support chassis;

a drive belt supported in tension about the drive and passive rollers;

a plurality of force applicators coupled to the support chassis between the drive roller and the passive roller, each of the plurality of force applicators being configured to apply a force to the drive belt and to one of the one or more solar panels in contact with the drive belt, wherein the drive roller is operable with the at least one actuator to facilitate actuation and rotation of the drive roller and therefore the drive belt around the drive roller and the passive roller to displace the one or more solar panels.

6. The robotic solar panel dispensing hopper of any preceding example, wherein each of the plurality of force applicators comprises:

one or more posts supported by the support chassis;

a roller carriage moveably supported on the one or more posts;

a force applicator roller rotatably coupled to the roller carriage, and operable to rotate with rotation of the drive belt;

a biasing member supported on the post between the roller carriage and the support chassis so as to bias the roller carriage, the force applicator roller, and the drive belt away from the support chassis, wherein each force applicator is operable to be compressed by one of the one or more solar panels upon being loaded into the hopper enclosure.

7. The robotic solar panel dispensing hopper of any preceding example, wherein a force applicator from a first belt drive mechanism is arranged along a common plane with a force applicator from an opposing belt drive mechanism, so as to act on opposing sides of a same solar panel of the one or more solar panels.

8. The robotic solar panel dispensing hopper of claim 5, wherein the drive roller and the passive roller are arranged along a common plane, and wherein the plurality of force applicators are arranged along a common plane offset outward and away from the common plane of the drive and passive rollers and the support chassis, such that a portion of the belt drive transitioning between the drive roller and an adjacent force applicator is formed on an incline, and such that a portion of the belt drive transitioning between the passive roller and an adjacent force applicator is formed on an incline.

9. The robotic solar panel dispensing hopper of any preceding example, wherein the drive belt comprises a smooth outer surface.

10. The robotic solar panel dispensing hopper of any preceding example, wherein the drive belt comprises a plurality of protrusions extending upward from an outer surface, the protrusions being sized and configured so as to receive and support a solar panel resting thereon.

11. The robotic solar panel dispensing hopper of any preceding example, wherein at least one of the plurality of belt drive mechanisms comprises one or more sensors associated with one or more of the plurality of force applicators, respectively, the one or more sensors being operable to monitor a force applied by the force applicators to a respective solar panel of the one or more solar panels.

12. The robotic solar panel dispensing hopper of any preceding example, wherein each of the plurality of force applicators are spaced apart from one another at a distance that equals a thickness of a solar panel of the one or more solar panels, such that each of the force applicators is configured to be aligned with a center or midpoint of a thickness of a respective solar panel of the one or more solar panels.

13. The robotic solar panel dispensing hopper of any preceding example, wherein each of the force applicators comprises:

one or more fluid actuators supported by the support chassis;

a roller carriage supported by the one or more fluid actuators;

a force applicator roller rotatably coupled to the roller carriage, and operable to rotate with rotation of the drive belt, wherein the panel feed system further comprises a fluid supply in fluid communication with the fluid actuator, and a fluid control system, and wherein the fluid control system is selectively operable to actuate the one or more fluid actuators to displace the roller carriage and the force applicator roller to cause the force applicator to apply a force to the drive belt and a solar panel of the one or more solar panels in contact with the drive belt.

14. The robotic solar panel dispensing hopper of any preceding example, wherein the panel feed system comprises a lift table comprising:

a platform supported within the hopper enclosure and comprising an upper surface, the platform being operable to receive and support the one or more solar panels thereon; and a lift mechanism coupled to the platform and associated with an actuator, the lift mechanism being actuatable to displace the platform and the one or more solar panels within the hopper enclosure.

15. The robotic solar panel dispensing hopper of any preceding example, further comprising a support frame operable to provide support to the hopper enclosure.

16. The robotic solar panel dispensing hopper of any preceding example, wherein the support frame is integrally formed with the hopper enclosure.

17. The robotic solar panel dispensing hopper of any preceding example, wherein the support frame comprises an interface feature operable to interface with, and facilitate support of the solar panel dispensing hopper by, at least one of an installation vehicle or a torque tube spanning bridging support member.

18. The robotic solar panel dispensing hopper of any preceding example, wherein the exit opening is at one of a top or a bottom of the hopper enclosure.

19. The robotic solar panel dispensing hopper of any preceding example, wherein the at least one moveable arm of the panel acquisition and placement system comprises a first set of moveable arms.

20. The robotic solar panel dispensing hopper of any preceding example, wherein the first set of moveable arms comprises two or more actuatable flippers supported about the exit opening of the hopper enclosure, the flippers being configured to receive and support the lead solar panel, and to manipulate at least one of a position or orientation of the lead solar panel relative to the hopper enclosure.

21. The robotic solar panel dispensing hopper of any preceding example, wherein the panel acquisition and placement system further comprises a second set of moveable arms comprising two or more actuatable pushers supported about the exit opening of the hopper enclosure, the two or more pushers each being configured to apply a downward force to the lead solar panel.

22. The robotic solar panel dispensing hopper of any preceding example, wherein the two or more flippers and the two or more pushers are operable to be actuated via respective actuators in a coordinated manner to acquire and install the lead solar panel into the panel retention system.

23. The robotic solar panel dispensing hopper of any preceding example, wherein the panel acquisition and placement system comprises:

one or more elevation guides supported proximate the hopper enclosure;

a bridge arm moveably coupled to the one or more elevation guides, and being operable to move along the one or more elevation guides to vary an elevation of the bridge arm relative to the hopper enclosure;

a drive system operable to actuate movement of the bridge arm;

the at least one moveable arm rotatably coupled to the bridge arm; and at least one panel capture asset rotatably coupled to the at least one moveable arm, wherein the at least one panel capture asset is sized and configured to engage and capture the lead solar panel.

24. The robotic solar panel dispensing hopper of any preceding example, wherein the at least one moveable arm comprises first and second swing arms, wherein the at least one panel capture asset comprises first and second capture assets, and wherein operation of the first and second swing arms, and the first and second panel capture assets can be coordinated to acquire and retrieve the lead solar panel from the hopper enclosure.

25. The robotic solar panel dispensing hopper of any preceding example, wherein first and second swing arms are laterally spaced apart from one another on the bridge arm a distance greater than a length of the lead solar panel as captured by the first and second panel capture assets so as to provide a clearance between the lead solar panel and the first and second swing arms.

26. The robotic solar panel dispensing hopper of any preceding example, wherein the first and second swing arms comprise a length sufficient to provide a clearance between the bridge arm and a proximate edge of the lead solar panel as captured by the first and second panel capture assets, thus facilitating rotation of the lead solar panel relative to at least one of the swing arms or the bridge arm.

27. The robotic solar panel dispensing hopper of any preceding example, wherein a distance between the first and second panel capture assets is greater than a distance between a longitudinal length of a panel mount of the panel retention system.

28. The robotic solar panel dispensing hopper of any preceding example, wherein the at least one panel capture asset comprises at least one of a gripper, a suction cup, an over center linkage assembly, a tapering channel structure, or opposing thread rollers.

29. The robotic solar panel dispensing hopper of any preceding example, wherein the dispensing system further comprises a panel feed system supported within the hopper enclosure, the panel feed system being operable to act upon the solar panels to displace the solar panels within the hopper enclosure.

30. The robotic solar panel dispensing hopper of any preceding example, wherein the panel feed system comprises a plurality of actuatable belt drive mechanisms strategically arranged and positioned within the hopper enclosure.

31. The robotic solar panel dispensing hopper of any preceding example, wherein the panel feed system comprises a lift table comprising a platform and an actuatable lift mechanism.

32. The robotic solar panel dispensing hopper of any preceding example, further comprising a multi-degree of freedom platform operable with the hopper enclosure to facilitate movement of the hopper enclosure in one or more degrees of freedom relative to ground.

33. The robotic solar panel dispensing hopper of any preceding example, wherein the multi-degree of freedom platform comprises an X-Y platform comprising an inner frame moveably coupled to at least one of the hopper enclosure or a support frame in support of the hopper enclosure, such that the hopper enclosure is moveable in a first degree of freedom relative to the inner frame, the inner frame being moveably coupled to an outer frame and moveable in a second degree of freedom relative to the outer frame.

34. The robotic solar panel dispensing hopper of any preceding example, wherein the multi-degree of freedom platform comprises a lift system operable to facilitate movement of the solar panel dispensing hopper in an elevation degree of freedom.

35. The robotic solar panel dispensing hopper of any preceding example, wherein the multi-degree of freedom platform is at least one of coupled to or integrally formed with at least one of the hopper enclosure or a support frame in support of the hopper enclosure.

36. The robotic solar panel dispensing hopper of any preceding example, further comprising one or more lead-in members extending upward and outward from a top edge of one or more respective sidewalls of the hopper enclosure.

37. The robotic solar panel dispensing hopper of any preceding example, wherein the hopper enclosure comprises a sidewall.

38. The robotic solar panel dispensing hopper of any preceding example, wherein the sidewall comprises a slotted opening along at least one of a top or bottom edge of the sidewall.

39. The robotic solar panel dispensing hopper of any preceding example, wherein the sidewall is configured to comprise a lead-in edge along the slotted opening in the sidewall.

40. A robotic solar panel presentation system facilitating installation of solar panels into a panel retention system of a panel support assembly, the solar panel presentation system, comprising:

a solar panel dispensing hopper comprising:

a hopper enclosure operable to receive and support one or more solar panels, the hopper enclosure comprising an exit opening sized and configured to permit passage of a lead solar panel of the one or more solar panels therethrough; and a dispensing system comprising a panel acquisition and placement system comprising at least one moveable arm, wherein the panel acquisition and placement system is operable to acquire and manipulate the lead solar panel into an overhead installation position relative to the panel retention system, and to facilitate placement of the lead solar panel into an installed position within the panel retention system; and a control system associated with the solar panel dispensing hopper, and comprising one or more processors and memory operable to control the panel acquisition and placement system.

41. The robotic solar panel presentation system of any preceding example, wherein the solar panel dispensing hopper further comprises a panel feed system supported within the hopper enclosure and operably controlled by the control system, the panel feed system comprising a solar panel interface, and being actuatable to act upon the solar panels to advance the solar panels towards the exit opening of the hopper enclosure, and to present a lead solar panel to the panel acquisition and placement system.

42. The robotic solar panel presentation system of any preceding example, wherein the control system comprises at least one of a panel feed system controller, a panel acquisition and placement system controller.

43. The robotic solar panel presentation system of any preceding example, wherein the control system comprises:

one or more processors;

a memory device including instructions that are executable by the one or more processors.

44. The robotic solar panel presentation system of any preceding example, further comprising at least one of a plurality of sensors, a communications module, one or more power source, an automation system, or a fluid actuation system in connection with the control system.

45. The robotic solar panel presentation system of any preceding example, wherein at least one of the one or more power sources or the fluid actuation system is supported on the solar panel dispensing hopper.

46. The robotic solar panel presentation system of any preceding example, wherein at least one of the one or more power sources or the fluid actuation system is independent of the solar panel dispensing hopper, and operably connected to the solar panel dispensing hopper via an umbilical.

47. The robotic solar panel presentation system of any preceding example, further comprising an umbilical comprising at least one of a power distribution line, a data distribution line, or a fluid distribution line, the umbilical being operable to carry at least one of power, data, or pressurized fluid to the solar panel presentation system from respective sources independent of and external to the solar panel presentation system.

48. The robotic solar panel presentation system of any preceding example, wherein the plurality of sensors are associated with one or more actuatable components of the solar panel dispensing hopper.

49. The robotic solar panel presentation system of any preceding example, wherein the solar panel dispensing hopper comprises a self-contained type.

50. The robotic solar panel presentation system of any preceding example, further comprising an automation system comprising one or more automation assets operable with the solar panel dispensing hopper to facilitate at least one of partial or fully automated operation of the solar panel dispensing hopper.

51. The robotic solar panel presentation system of any preceding example, wherein the one or more automation assets comprise one or more imaging sensors, cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, structured light sensors, audio sensors, chemical sensors, electromagnetic radiation sensors, magnetometers, radar systems, ultrasonic emitters, or any combination of these.

52. The robotic solar panel presentation system of any preceding example, further comprising a multi-degree of freedom platform operable with the hopper enclosure to facilitate movement of the hopper enclosure in one or more degrees of freedom relative to ground.

53. A solar panel dispensing hopper facilitating installation of solar panels into a panel retention system of a panel support assembly, the solar panel dispensing hopper comprising:

a hopper enclosure operable to receive and support one or more solar panels within an interior volume, the hopper enclosure comprising an exit opening sized and configured to permit passage of a lead solar panel of the one or more solar panels therethrough; and a dispensing system comprising a panel feed system comprising:

a platform supported within the hopper enclosure and comprising an upper surface, the platform being operable to receive and support the one or more solar panels thereon; and a lift mechanism coupled to the platform and associated with an actuator, the lift mechanism being actuatable to displace the platform and the one or more solar panels within the hopper enclosure.

54. The robotic solar panel dispensing hopper of any preceding example, wherein the dispensing system further comprises a panel acquisition and placement system comprising at least one moveable arm, wherein the panel acquisition and placement system is operable to acquire and manipulate the lead solar panel into an overhead installation position relative to the panel retention system, and to facilitate placement of the lead solar panel into an installed position within the panel retention system.

55. The robotic solar panel dispensing hopper of any preceding example, wherein the panel acquisition and placement system comprises:

one or more elevation guides supported proximate the hopper enclosure;

a bridge arm moveably coupled to the one or more elevation guides, and being operable to move along the one or more elevation guides to vary an elevation of the bridge arm relative to the hopper enclosure;

a drive system operable to actuate movement of the bridge arm;

the at least one moveable arm rotatably coupled to the bridge arm; and at least one panel capture asset rotatably coupled to the at least one moveable arm, wherein the at least one panel capture asset is sized and configured to engage and capture the lead solar panel.

56. The robotic solar panel dispensing hopper of any preceding example, wherein the at least one moveable arm comprises first and second swing arms, wherein the at least one panel capture asset comprises first and second panel capture assets, and wherein operation of the first and second swing arms, and the first and second panel capture assets can be coordinated to acquire and retrieve the lead solar panel from the hopper enclosure.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The term "comprising" is used throughout to mean including at least the recited feature(s) such that any greater number of the same feature and/or additional types of other features are not precluded. It will also be appreciated that specific embodiments have been described herein for purposes of illustration, but that various modifications can be made without deviating from the technology. Further, while advantages associated with some embodiments of the present technology have been described in the context of those embodiments, other embodiments can also exhibit such advantages, and not all embodiments need necessarily exhibit such advantages to fall within the scope of the technology. Accordingly, the disclosure and associated present technology can encompass other embodiments not expressly shown or described herein.

Moreover, unless the word "or" is expressly limited to mean only a single item exclusive from other items in reference to a list of two or more items, then the use of "or" in such a list is to be interpreted as including (a) any single item in the list, (b) all of the items in the list, or (c) any combination of the items in the list. In other words, the use of "or" in this disclosure should be understood to mean non-exclusive "or" (i.e., "and/or") unless otherwise indicated herein.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described present technology.

What is claimed is:

1. A robotic solar panel dispensing hopper facilitating installation of solar panels into a panel retention system of a panel support assembly, the solar panel dispensing hopper comprising:

a hopper enclosure operable to receive and support one or more solar panels within an interior volume, the hopper enclosure comprising an exit opening sized and configured to permit passage of a lead solar panel of the one or more solar panels therethrough; and a dispensing system supported at least in part within the hopper enclosure, the dispensing system comprising a panel acquisition and placement system comprising at least one moveable arm, wherein the panel acquisition and placement system is operable to acquire and manipulate the lead solar panel into an overhead installation position relative to the panel retention system, and to facilitate placement of the lead solar panel into an installed position within the panel retention system.

2. The robotic solar panel dispensing hopper of claim 1, wherein the dispensing system further comprises a panel feed system supported within the hopper enclosure and comprising a solar panel interface, the panel feed system being operable to act upon the solar panels to displace the solar panels within the hopper enclosure.

3. The robotic solar panel dispensing hopper of claim 2, wherein the panel feed system comprises:

a plurality of belt drive mechanisms strategically arranged and positioned within the hopper enclosure; and at least one actuator operable to actuate one or more of the plurality of belt drive mechanisms.

4. The robotic solar panel dispensing hopper of claim 3, wherein the plurality of belt drive mechanisms comprises:

first and second belt drive mechanisms supported about opposing sidewalls of the hopper enclosure, such that the first and second belt drive mechanisms face one another and contact opposing sides of one or more of the solar panels contained within the hopper enclosure between the first and second belt drive mechanisms; and third and fourth belt drive mechanisms supported about opposing sidewalls of the hopper enclosure, such that the third and fourth belt drive mechanisms face one another and contact opposing sides of one or more of the solar panels contained within the hopper enclosure between the third and fourth belt drive mechanisms.

5. The robotic solar panel dispensing hopper of claim 3, wherein each of the plurality of belt drive mechanisms comprises:

a support chassis;

a drive roller rotatably coupled to the support chassis;

a passive roller rotatably coupled to the support chassis;

a drive belt supported in tension about the drive and passive rollers;

a plurality of force applicators coupled to the support chassis between the drive roller and the passive roller, each of the plurality of force applicators being configured to apply a force to the drive belt and to one of the one or more solar panels in contact with the drive belt, wherein the drive roller is operable with the at least one actuator to facilitate actuation and rotation of the drive roller and therefore the drive belt around the drive roller and the passive roller to displace the one or more solar panels.

6. The robotic solar panel dispensing hopper of claim 5, wherein each of the plurality of force applicators comprises:

one or more posts supported by the support chassis;

a roller carriage moveably supported on the one or more posts;

a force applicator roller rotatably coupled to the roller carriage, and operable to rotate with rotation of the drive belt;

a biasing member supported on the post between the roller carriage and the support chassis so as to bias the roller carriage, the force applicator roller, and the drive belt away from the support chassis, wherein each force applicator is operable to be compressed by one of the one or more solar panels upon being loaded into the hopper enclosure.

7. The robotic solar panel dispensing hopper of claim 5, wherein a force applicator from a first belt drive mechanism is arranged along a common plane with a force applicator from an opposing belt drive mechanism, so as to act on opposing sides of a same solar panel of the one or more solar panels.

8. The robotic solar panel dispensing hopper of claim 5, wherein the drive roller and the passive roller are arranged along a common plane, and wherein the plurality of force applicators are arranged along a common plane offset outward and away from the common plane of the drive and passive rollers and the support chassis, such that a portion of the belt drive transitioning between the drive roller and an adjacent force applicator is formed on an incline, and such that a portion of the belt drive transitioning between the passive roller and an adjacent force applicator is formed on an incline.

9. The robotic solar panel dispensing hopper of claim 5, wherein the drive belt comprises a smooth outer surface.

10. The robotic solar panel dispensing hopper of claim 5, wherein the drive belt comprises a plurality of protrusions extending upward from an outer surface, the protrusions being sized and configured so as to receive and support a solar panel resting thereon.

11. The robotic solar panel dispensing hopper of claim 5, wherein at least one of the plurality of belt drive mechanisms comprises one or more sensors associated with one or more of the plurality of force applicators, respectively, the one or more sensors being operable to monitor a force applied by the force applicators to a respective solar panel of the one or more solar panels.

12. The robotic solar panel dispensing hopper of claim 5, wherein each of the plurality of force applicators are spaced apart from one another at a distance that equals a thickness of a solar panel of the one or more solar panels, such that each of the force applicators is configured to be aligned with a center or midpoint of a thickness of a respective solar panel of the one or more solar panels.

13. The robotic solar panel dispensing hopper of claim 5, wherein each of the force applicators comprises:

one or more fluid actuators supported by the support chassis;

a roller carriage supported by the one or more fluid actuators;

a force applicator roller rotatably coupled to the roller carriage, and operable to rotate with rotation of the drive belt, wherein the panel feed system further comprises a fluid supply in fluid communication with the fluid actuator, and a fluid control system, and wherein the fluid control system is selectively operable to actuate the one or more fluid actuators to displace the roller carriage and the force applicator roller to cause the force applicator to apply a force to the drive belt and a solar panel of the one or more solar panels in contact with the drive belt.

14. The robotic solar panel dispensing hopper of claim 2, wherein the panel feed system comprises a lift table comprising:

a platform supported within the hopper enclosure and comprising an upper surface, the platform being operable to receive and support the one or more solar panels thereon; and a lift mechanism coupled to the platform and associated with an actuator, the lift mechanism being actuatable to displace the platform and the one or more solar panels within the hopper enclosure.

15. The robotic solar panel dispensing hopper of claim 1, further comprising a support frame operable to provide support to the hopper enclosure.

16. The robotic solar panel dispensing hopper of claim 15, wherein the support frame is integrally formed with the hopper enclosure.

17. The robotic solar panel dispensing hopper of claim 15, wherein the support frame comprises an interface feature operable to interface with, and facilitate support of the solar panel dispensing hopper by, at least one of an installation vehicle or a torque tube spanning bridging support member.

18. The robotic solar panel dispensing hopper of claim 1, wherein the exit opening is at one of a top or a bottom of the hopper enclosure.

19. The robotic solar panel dispensing hopper of claim 1, wherein the at least one moveable arm of the panel acquisition and placement system comprises a first set of moveable arms.

20. The robotic solar panel dispensing hopper of claim 19, wherein the first set of moveable arms comprises two or more actuatable flippers supported about the exit opening of the hopper enclosure, the flippers being configured to receive and support the lead solar panel, and to manipulate at least one of a position or orientation of the lead solar panel relative to the hopper enclosure.

21. The robotic solar panel dispensing hopper of claim 20, wherein the panel acquisition and placement system further comprises a second set of moveable arms comprising two or more actuatable pushers supported about the exit opening of the hopper enclosure, the two or more pushers each being configured to apply a downward force to the lead solar panel.

22. The robotic solar panel dispensing hopper of claim 21, wherein the two or more flippers and the two or more pushers are operable to be actuated via respective actuators in a coordinated manner to acquire and install the lead solar panel into the panel retention system.

23. The robotic solar panel dispensing hopper of claim 1, wherein the panel acquisition and placement system comprises:

one or more elevation guides supported proximate the hopper enclosure;

a bridge arm moveably coupled to the one or more elevation guides, and being operable to move along the one or more elevation guides to vary an elevation of the bridge arm relative to the hopper enclosure;

a drive system operable to actuate movement of the bridge arm;

the at least one moveable arm rotatably coupled to the bridge arm; and at least one panel capture asset rotatably coupled to the at least one moveable arm, wherein the at least one panel capture asset is sized and configured to engage and capture the lead solar panel.

24. The robotic solar panel dispensing hopper of claim 23, wherein the at least one moveable arm comprises first and second swing arms, wherein the at least one panel capture asset comprises first and second panel capture assets, and wherein operation of the first and second swing arms, and the first and second panel capture assets can be coordinated to acquire and retrieve the lead solar panel from the hopper enclosure.

25. The robotic solar panel dispensing hopper of claim 24, wherein first and second swing arms are laterally spaced apart from one another on the bridge arm a distance greater than a length of the lead solar panel as captured by the first and second panel capture assets so as to provide a clearance between the lead solar panel and the first and second swing arms.

26. The robotic solar panel dispensing hopper of claim 24, wherein the first and second swing arms comprise a length sufficient to provide a clearance between the bridge arm and a proximate edge of the lead solar panel as captured by the first and second panel capture assets, thus facilitating rotation of the lead solar panel relative to at least one of the swing arms or the bridge arm.

27. The robotic solar panel dispensing hopper of claim 24, wherein a distance between the first and second panel capture assets is greater than a distance between a longitudinal length of a panel mount of the panel retention system.

28. The robotic solar panel dispensing hopper of claim 23, wherein the at least one panel capture asset comprises at least one of a gripper, a suction cup, an over center linkage assembly, a tapering channel structure, or opposing rollers.

29. The robotic solar panel dispensing hopper of claim 23, wherein the dispensing system further comprises a panel feed system supported within the hopper enclosure, the panel feed system being operable to act upon the solar panels to displace the solar panels within the hopper enclosure.

30. The robotic solar panel dispensing hopper of claim 29, wherein the panel feed system comprises a plurality of actuatable belt drive mechanisms strategically arranged and positioned within the hopper enclosure.

31. The robotic solar panel dispensing hopper of claim 29, wherein the panel feed system comprises a lift table comprising a platform and an actuatable lift mechanism.

32. The robotic solar panel dispensing hopper of claim 1, further comprising a multi-degree of freedom platform operable with the hopper enclosure to facilitate movement of the hopper enclosure in one or more degrees of freedom relative to ground.

33. The robotic solar panel dispensing hopper of claim 32, wherein the multi-degree of freedom platform comprises an X-Y platform comprising an inner frame moveably coupled to at least one of the hopper enclosure or a support frame in support of the hopper enclosure, such that the hopper enclosure is moveable in a first degree of freedom relative to the inner frame, the inner frame being moveably coupled to an outer frame and moveable in a second degree of freedom relative to the outer frame.

34. The robotic solar panel dispensing hopper of claim 32, wherein the multi-degree of freedom platform comprises a lift system operable to facilitate movement of the solar panel dispensing hopper in an elevation degree of freedom.

35. The robotic solar panel dispensing hopper of claim 32, wherein the multi-degree of freedom platform is at least one of coupled to or integrally formed with at least one of the hopper enclosure or a support frame in support of the hopper enclosure.

36. The robotic solar panel dispensing hopper of claim 1, further comprising one or more lead-in members extending upward and outward from a top edge of one or more respective sidewalls of the hopper enclosure.

37. The robotic solar panel dispensing hopper of claim 1, wherein the hopper enclosure comprises a sidewall.

38. The robotic solar panel dispensing hopper of claim 37, wherein the sidewall comprises a slotted opening along at least one of a top or bottom edge of the sidewall.

39. The robotic solar panel dispensing hopper of claim 38, wherein the sidewall is configured to comprise a lead-in edge along the slotted opening in the sidewall.

40. A robotic solar panel presentation system facilitating installation of solar panels into a panel retention system of a panel support assembly, the solar panel presentation system, comprising:

a solar panel dispensing hopper comprising:
  a hopper enclosure operable to receive and support one or more solar panels, the hopper enclosure comprising an exit opening sized and configured to permit passage of a lead solar panel of the one or more solar panels therethrough; and
  a dispensing system supported at least in part within the hopper enclosure, the dispensing system comprising a panel acquisition and placement system comprising at least one moveable arm, wherein the panel acquisition and placement system is operable to acquire and manipulate the lead solar panel into an overhead installation position relative to the panel retention system, and to facilitate placement of the lead solar panel into an installed position within the panel retention system; and
  a control system associated with the solar panel dispensing hopper, and comprising one or more processors and memory operable to control the panel acquisition and placement system.

41. The robotic solar panel presentation system of claim 40, wherein the solar panel dispensing hopper further comprises a panel feed system supported within the hopper enclosure and operably controlled by the control system, the panel feed system comprising a solar panel interface, and being actuatable to act upon the solar panels to advance the solar panels towards the exit opening of the hopper enclosure, and to present a lead solar panel to the panel acquisition and placement system.

42. The robotic solar panel presentation system of claim 40, wherein the control system comprises at least one of a panel feed system controller, a panel acquisition and placement system controller.

43. The robotic solar panel presentation system of claim 40, wherein the control system comprises:
  one or more processors;
  a memory device including instructions that are executable by the one or more processors.

44. The robotic solar panel presentation system of claim 40, further comprising at least one of a plurality of sensors, a communications module, one or more power source, an automation system, or a fluid actuation system in connection with the control system.

45. The robotic solar panel presentation system of claim 44, wherein at least one of the one or more power sources or the fluid actuation system is supported on the solar panel dispensing hopper.

46. The robotic solar panel presentation system of claim 44, wherein at least one of the one or more power sources or the fluid actuation system is independent of the solar panel dispensing hopper, and operably connected to the solar panel dispensing hopper via an umbilical.

47. The robotic solar panel presentation system of claim 44, further comprising an umbilical comprising at least one of a power distribution line, a data distribution line, or a fluid distribution line, the umbilical being operable to carry at least one of power, data, or pressurized fluid to the solar panel presentation system from respective sources independent of and external to the solar panel presentation system.

48. The robotic solar panel presentation system of claim 40, wherein the plurality of sensors are associated with one or more actuatable components of the solar panel dispensing hopper.

49. The robotic solar panel presentation system of claim 40, wherein the solar panel dispensing hopper comprises a self-contained type.

50. The robotic solar panel presentation system of claim 40, further comprising an automation system comprising one or more automation assets operable with the solar panel dispensing hopper to facilitate at least one of partial or fully automated operation of the solar panel dispensing hopper.

51. The robotic solar panel presentation system of claim 40, wherein the one or more automation assets comprise one or more imaging sensors, cameras, monochromatic image sensors, RGB image sensors, LIDAR sensors, RGBD image sensors, stereo image sensors, thermal sensors, radiation sensors, global shutter image sensors, rolling shutter image sensors, RADAR sensors, ultrasonic based sensors, interferometric image sensors, image sensors configured to image electromagnetic radiation outside of a visible range of the electromagnetic spectrum including one or more of ultraviolet and infrared electromagnetic radiation, structured light sensors, audio sensors, chemical sensors, electromagnetic radiation sensors, magnetometers, radar systems, ultrasonic emitters, or any combination of these.

52. The robotic solar panel presentation system of claim 40, further comprising a multi-degree of freedom platform operable with the hopper enclosure to facilitate movement of the hopper enclosure in one or more degrees of freedom relative to ground.

53. A solar panel dispensing hopper facilitating installation of solar panels into a panel retention system of a panel support assembly, the solar panel dispensing hopper comprising:

a hopper enclosure operable to receive and support one or more solar panels within an interior volume, the hopper enclosure comprising an exit opening sized and configured to permit passage of a lead solar panel of the one or more solar panels therethrough; and a dispensing system supported at least in part within the hopper enclosure, the dispensing system comprising a panel feed system comprising:

a platform supported within the hopper enclosure and comprising an upper surface, the platform being operable to receive and support the one or more solar panels thereon; and a lift mechanism coupled to the platform and associated with an actuator, the lift mechanism being actuatable to displace the platform and the one or more solar panels within the hopper enclosure.

54. The robotic solar panel dispensing hopper of claim 53, wherein the dispensing system further comprises a panel acquisition and placement system comprising at least one moveable arm, wherein the panel acquisition and placement system is operable to acquire and manipulate the lead solar panel into an overhead installation position relative to the panel retention system, and to facilitate placement of the lead solar panel into an installed position within the panel retention system.

55. The robotic solar panel dispensing hopper of claim 54, wherein the panel acquisition and placement system comprises:

one or more elevation guides supported proximate the hopper enclosure;

a bridge arm moveably coupled to the one or more elevation guides, and being operable to move along the one or more elevation guides to vary an elevation of the bridge arm relative to the hopper enclosure;

a drive system operable to actuate movement of the bridge arm;

the at least one moveable arm rotatably coupled to the bridge arm; and at least one panel capture asset rotatably coupled to the at least one moveable arm, wherein the at least one panel capture asset is sized and configured to engage and capture the lead solar panel.

56. The robotic solar panel dispensing hopper of claim 55, wherein the at least one moveable arm comprises first and second swing arms, wherein the at least one panel capture asset comprises first and second panel capture assets, and wherein operation of the first and second swing arms, and the first and second panel capture assets can be coordinated to acquire and retrieve the lead solar panel from the hopper enclosure.

* * * * *